US006850900B1

(12) United States Patent
Hare et al.

(10) Patent No.: US 6,850,900 B1
(45) Date of Patent: Feb. 1, 2005

(54) FULL SERVICE SECURE COMMERCIAL ELECTRONIC MARKETPLACE

(76) Inventors: Gary W. Hare, 134 Big Horn Rd., Shelton, CT (US) 06484; Michael R. Sundquist, 6 Triple Crown Ct., North Potomac, MD (US) 20878; Stephen D. Kovacs, Jr., 43254 Stoneyglen Ct., Ashburn, VA (US) 20147

( * ) Notice: Subject to any disclaimer, the term of this patent is extended or adjusted under 35 U.S.C. 154(b) by 405 days.

(21) Appl. No.: 09/597,925

(22) Filed: Jun. 19, 2000

(51) Int. Cl.[7] .............................................. G06F 17/60
(52) U.S. Cl. ........................................................ 705/26
(58) Field of Search ...................................... 705/26, 27

(56) References Cited

U.S. PATENT DOCUMENTS

| | | | | |
|---|---|---|---|---|
| 5,664,115 A | * | 9/1997 | Fraser | 705/37 |
| 5,745,681 A | * | 4/1998 | Levine et al. | |
| 5,758,328 A | * | 5/1998 | Giovannoli | 705/26 |
| 5,774,873 A | * | 6/1998 | Berent et al. | 705/26 |
| 5,794,207 A | * | 8/1998 | Walker et al. | 705/23 |
| 5,794,219 A | * | 8/1998 | Brown | 705/37 |
| 5,802,497 A | * | 9/1998 | Manasse | 705/27 |
| 5,802,502 A | * | 9/1998 | Gell et al. | |
| 5,818,914 A | * | 10/1998 | Fujisaki | |
| 5,826,244 A | * | 10/1998 | Huberman | |
| 5,835,896 A | * | 11/1998 | Fisher et al. | |
| 5,842,178 A | * | 11/1998 | Giovannoli | 705/26 |
| 5,862,223 A | * | 1/1999 | Walker et al. | |
| 5,870,719 A | * | 2/1999 | Maritzen et al. | 705/26 |
| 5,890,138 A | * | 3/1999 | Godin et al. | |
| 5,895,454 A | * | 4/1999 | Harrington | 705/26 |
| 5,897,622 A | * | 4/1999 | Blinn et al. | 705/26 |
| 5,899,980 A | * | 5/1999 | Wilf et al. | 705/26 |
| 5,903,878 A | * | 5/1999 | Talati et al. | 705/26 |
| 5,905,974 A | * | 5/1999 | Fraser et al. | 705/37 |
| 5,905,975 A | * | 5/1999 | Ausubel | 705/37 |
| 5,909,492 A | * | 6/1999 | Payne et al. | |
| 5,924,082 A | * | 7/1999 | Silverman et al. | 705/37 |
| 5,926,798 A | * | 7/1999 | Carter | 705/26 |
| 5,960,411 A | * | 9/1999 | Hartman et al. | 705/26 |
| 5,970,475 A | * | 10/1999 | Barnes et al. | 705/27 |

OTHER PUBLICATIONS

Jack Welch's Cyber–Czar written by Business Week, published on Aug. 5, 1996.
Double Click for Resin written by Forbes Magazine, published on Mar. 10, 1997.
GE Sees the Payoff written by Information Week, published on Jan. 27, 1997.
Sales are Clicking on Manufacturing's Internet Mart written by Fortune, published on Jul. 7, 1997.
Intranets & Extranets: Building the Web–Enabled Enterprise written by Fortune, published on Apr. 13, 1998.
Plugging the Leaks written by Electronic Commerce World, published in Nov. 1998.
e–business are you ready? written by Oracle Corporation, published in 1999.

(List continued on next page.)

*Primary Examiner*—F. J. Bartuska
(74) *Attorney, Agent, or Firm*—Bell, Boyd & Lloyd

(57) ABSTRACT

The present invention provides an internet based or locally hosted business to business full service secure commercial electronic marketplace which facilitates transactions between suppliers and buyers. The system transforms the suppliers' content into generic content and enables the suppliers to review, correct and update the supplier content. The system distributes the content back to the supplier and to selected buyers in a generic and usable format across multiple forums. The system further provides multiple levels of sourcing for the suppliers and buyers including a private on-contract sourcing level, a, private off-contract sourcing level, a private index off-contract sourcing level, a private supplier or seller sourcing level, a public buyer sourcing level, and content distribution for buy side sourcing levels, supply side sourcing levels, multi-buyer exchanges and multi-supplier exchanges.

35 Claims, 112 Drawing Sheets

OTHER PUBLICATIONS

Growing Internet Marketplace is Attracting Suppliers and Analysts' Attention (Press Release) written by TPN Register, published on Jun. 10, 1999.

INTERMAT® Form Electronic Catalog Alliance Moving Content Management to New Levels (Press Release) written by TPN Register, published on Mar. 15, 1999.

GE Lighting Selects TPN Register for Full Rollout of Internet Procurement Solution (Press Release) written by TPN Register, published on Jan. 13, 1999.

Boeing Chooses Oracle Strategic Procurement Solution for General Procurement (Press Release) written by TPN Register, published on Jan. 5, 1999.

[Excerpt] Oracle Announces Comprehensive Strategic Procurement Solution (Press Release) written by TPN Register, published on Nov. 16, 1998.

TPN Register's New Java Architecture Ensures Better E–Commerce Services For Industrial Buyers and Suppliers (Press Release) written by TPN Register, published on Oct. 21, 1998.

TPN Register Delivers New Content Management Services Using Java—Based Technology (Press Release) written by TPN Register, published on Sep. 21, 1998.

Raymond Schiavone Named to Head TPN Register (Press Release) written by TPN Register, published on Aug. 5, 1998.

Oracle Teams With TPN Register to Deliver Total Procurement Management Solution (Press Release) written by TPN Register, published on May 12, 1998.

Thomas, TPN Register, and Requisite Join Leading Publishers Using CADIS Krakatoa Technology (Press Release) written by TPN Register, published on Jun. 16, 1997.

Register to Offer Data—Enriched Electronic Payment Service (Press Release) written by TPN Register, published on May 5, 1997.

TPN Register Signs Up EC Cubed Inc. as TPNPost Developer (Press Release) written by TPN Register, published on Apr. 1, 1997.

GE Information Services and Thomas Publishing Form New Joint Venture (Press Release) written by TPN Register, published on Feb. 24, 1997.

GE Information Services Announces TPNPost (Press Release) written by TPN Register, published on Jun. 24, 1996.

GE Launches New Internet—Based Commerce Network (Press Release) written by TPN Register, published on Jan. 2, 1996.

We Serve Both Sides of the Net (website) written by TPN Register, published 1997.

GE TPNWeb Services Brochure written by GE Information Services, Inc., published 1996.

TPN Register and Thomas Register on the Internet Frequently Asked Questions Brochure written by TPN Register, published Mar., 1998.

The TPN Register Electronic Procurement Solution to Indirect/RO Purchasing & Supplier Management Brochure written by TPN Register, published 1997.

A Special offer for Thomas Register clients Brochure written by TPN Register, published Mar., 1998.

A Joint Venture between, GE Information Services and Thomas Publishing Company Brochure written by TPN Register, published in 1997.

Internet Procurement Solution Brochure written by TPN Register, published in 1998.

TPN Register Brochure written by TPN Register, published in 1999, updated in 2000.

Delivering Results Brochure written by TPN Register, published in 1999.

Content Management: Key to the Success of Internet Procurement for Non–production Supplies Brochure written TPN Register, published 1998–1999.

Electronic Marketplace Services for Buyers and Sellers Brochure written by TPN Register, published in 1998.

Where Supply Meets Demand Brochure written by TPN Register, published in 1997.

TPN Register Buyer Services A GE Electronic Marketplace Solution Brochure written by GE Information Services, published in 1999.

* cited by examiner

FIG. 6
TPN Register Services - Microsoft Internet Explorer
TPN
marketplace
Company
Username
Password
ENTER
CLEAR
WHERE SUPPLY MEETS DEMAND
© 1998 TPN Register. All rights reserved. v3.2.02d
Programs

Supplier Integration

Buyer Integration

FULL SERVICE SECURE COMMERCIAL ELECTRONIC MARKETPLACE

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to an electronic marketplace, and in particular to a full service secure commercial electronic marketplace which generically organizes, stores, updates and distributes product information from a plurality of suppliers to facilitate multiple levels of sourcing, including contract and off-contract purchasing between the suppliers and a plurality of buyers.

BACKGROUND OF THE INVENTION

Large companies and other businesses have extended their cost-cutting efforts to the area of procurement of non-production supplies. Non-production supplies, which are also known as non-production products, indirect supplies and maintenance, repair and operations ("MRO") products, encompass all the supplies and materials that a business uses, but which do not wind up in the business end products. Non-production products range from office supplies to facility maintenance supplies.

Indirect or MRO procurement for large companies and other businesses is a cumbersome process characterized by large amounts of paperwork, lengthy cycle times, returns, frequent errors and costly "maverick" buying outside of established procurement rules and supplier contracts. To manage this process, business requisitioners are often required to spend substantial amounts of time on inefficient, tactical tasks instead of focusing on strategic sourcing activities that reduce costs. The result is an unbalanced business equation, in which businesses incur high per-transaction expenses for indirect supplies that, in and of themselves, have a relatively low-dollar value.

With the recent expansion of the Internet, businesses are now looking to Internet-based procurement as a means to save time and money in the indirect purchasing process. Businesses want to streamline the purchasing process by enabling their requisitioners to easily search, find, select, compare and order contracted items from approved suppliers. Businesses also want to enable their requisitioners to easily search, find, select, compare and order other supplies (which are not contracted items from approved suppliers), as necessary and in accordance with standardized procedures. Businesses expect that this will eliminate paperwork, encourage contract and procurement procedure compliance, improve order accuracy, and relieve their requisitioners of certain day-today paper management burdens and thus recognize substantial cost savings. Additionally, for Internet-based procurement systems to meet the expectations of business and to provide the full potential cost savings to businesses, Internet-based procurement solutions need to provide data on actual spending activity, which the businesses can use to leverage their true buying power during negotiations with suppliers.

Internet-based procurement systems require accurate, up-to-date and easily searchable product information or content from the suppliers. Good content, rather than simply a large volume of content, is one of the keys to any procurement solution. However, many suppliers do not have product data available in electronic form or, if they do, supplier electronic product data is often incomplete or indecipherable and therefore unsearchable by buyers. Further, there are few convenient and efficient methods for keeping supplier electronic product data information up-to-date on a daily basis.

To meet these business demands, a small and growing number of MRO suppliers offer their own electronic catalogs at their web sites (i.e., electronic supply or sell-side catalogs). These suppliers typically manage the catalog content themselves or use an intermediary. While this is a promising new selling channel for businesses, sell-side catalogs alone usually do not meet the needs of large corporate buyers. First, buyers with hundreds or even thousands of suppliers do not have the time or resources to go to each supplier's web site. The fact that each web site has its own look and feel and ordering process complicates the procurement process and makes direct comparison between suppliers more difficult. Instead, these buyers need one secure, central location where they can access product information provided by all of their contracted suppliers using a single search and ordering process. Secondly, most suppliers with Internet based electronic catalogs do not have the necessary mechanisms in place to display each particular buying organization's contracted items with negotiated prices. Third, such systems do not account for, are not integrated with, or are not compatible with the existing procurement systems of buying organizations. Finally, purchases from such electronic sell-side catalogs are difficult to track and therefore do not provide buying organizations with the spending data needed to help the businesses make strategic purchasing decisions.

To improve control over their non-production spending, some businesses are building their own electronic catalogs (i.e., electronic buyer or buy-side catalogs). These catalogs contain data on all the products approved by the business through negotiated contracts. The software runs locally on the business's information technology (IT) infrastructure (i.e., usually its Intranet) and can be accessed by requisitioners using standard Internet browsers on their desktop computers. While electronic buy-side catalogs can streamline the requisitioning and ordering processes, can provide corporate buyers greater control over spending and can improve the purchasing process, these applications depend on the ability of the suppliers to provide data to the buyers in usable formats and update the information on a regular basis reflecting price and product changes. This is a major challenge for large buying organizations, which often have a large number of suppliers ranging from small operations with paper catalogs to electronic commerce-savvy major distributors. Buyers are often left on their own to manage the content input or ramp process, to decode all of the various catalog formats that are provided by suppliers, and to solve the data quality issues that undoubtedly arise. In addition, the "build your own" option can be prohibitively expensive for buyers due to the sizable investment in software, hardware and people required to create the catalogs, host them, and keep all the catalog information up-to-date. Such buyer-side systems can also take significant periods of time and buyer personnel to implement. It is also difficult to integrate commercial procurement systems with such buyer side systems.

Additionally, several intermediary systems have been proposed and developed. For instance, static product content providers provide the product content from several suppliers to a buyer's intranet or internet management system. Such systems work best for buying organizations with the ability to manage content, but lack complete product information update processes. Additionally, buyers and suppliers do not favor such systems because these systems reduce direct contact between buyers and suppliers. Vertical aggregation systems are also known. Such systems enable a single third party purchasing organization to purchase products from a plurality of suppliers through a vertical network. Such systems work best for spot buys or sourcing for specific products in select vertical markets. However, such systems have limited product lines and require use of multiple supplier interfaces.

Therefore, while various Internet-based intermediary catalog web sites and systems, sell-side web sites and systems, and buy-side web sites and systems have been proposed, developed and implemented, such known systems do not provide an all encompassing system which fully integrates the systems, needs and requirements of suppliers and buyers. More specifically, such known systems generally have one or more of the following content related problems: (1) they provide only static content; (2) they either do not provide transactive content or provide transactive catalog content which requires significant resources and capabilities to create and maintain; (3) they do not integrate supplies and supplier content into existing purchaser procurement programs; (4) they provide content in different or incompatible formats; (5) they do not provide product information which is standardized or classified; (6) they provide complex and costly procedures for maintaining and managing content; (7) they do not integrate content providers; or (8) they require a large number of commodity managers to convert and update catalogs from suppliers. Such known systems also have one or more of the following non-content related problems: (1) they do not provide suitable scalability; (2) they provide catalogs and order management limits with few suppliers; (3) they only support national or local contract ordering for known products, known suppliers, known prices, high volume orders or repetitive orders; (4) they require buyer customization; (5) they do not support non-contract ordering for planned or emergency spot buys or strategic buying for known or new products; (6) they require product and supplier differentiation (such that a supplier cannot also use the system to purchase products); (7) they provide only buyer managed catalogs; (8) they provide only supplier managed catalogs; (9) they permit only one buyer-manager (which works best for smaller organizations with a limited number of suppliers); (10) they permit only one supplier-manager (which works best for sophisticated suppliers with highly e-commerce enabled web sites); (11) they are inefficient because they require buyers to use multiple supplier sites, each site having different interfaces and search methods; (12) they provide supplier sites which do not integrate with buyer purchasing systems; (13) they reduce direct contact between suppliers and buyers; or (14) they work best for spot or one time purchases. Additionally, existing systems do not simultaneously satisfy the needs and requirements of large, medium and small sized suppliers and large, medium and small sized buyers. Accordingly, there is a need for a single integrated system which solves all of these problems for such suppliers and buyers.

SUMMARY OF THE INVENTION

The present invention solves the above problems by providing an Internet-based full service secure commercial electronic marketplace for participating suppliers and participating buyers. The full service secure commercial electronic marketplace provides an all encompassing system for suppliers and buyers: which uses and integrates existing supplier and buyer systems; facilitates the organization, storage, updating and distribution of cleansed, standardized, generic electronic product information for a plurality of suppliers; and facilitates multiple levels of sourcing including contract and off-contract purchasing between suppliers and buyers.

The full service secure commercial electronic marketplace of the present invention is alternatively referred to herein for brevity as the "marketplace," the "system," the "electronic marketplace" or the "secure electronic marketplace." However, the scope of the present invention is not intended to be limited by such abbreviated terms or the use of any other abbreviated terms herein to describe the present invention or components, steps or processes thereof. It also should be appreciated that several of the figures of this application have one or more of the following trademarks or service marks which are not part of the system of the present invention: (a) TPN; (b) TPN REGISTER; (c) TPN and logo; (d) TPN MARKETPLACE; (e) CONTRACTSOURCE; (f) TOTALSOURCE; (g) MARKETSOURCE; and (h) THOMAS REGISTER of American Manufactures. It should also be appreciated that various third party company names, trademarks and products names are used throughout this application and that such names and trademarks are not part of the present invention.

The present invention provides an Internet-based hosted business-to-business marketplace that facilitates transactions between participating suppliers (generally referred to herein as "suppliers") and participating buyers (generally referred to herein as "buyers"). The system generally includes content transformation, storage, management, updating and distributing applications for supplier content, a buyer and supplier contract management application and multiple sourcing applications or levels of sourcing for suppliers and buyers including: (a) private on-contract sourcing; (b) private off-contract sourcing; (c) private product index off-contract sourcing; (d) private supplier or seller sourcing; (e) content distribution for buy-side sourcing; (f) content distribution for supply-side sourcing; (g) content distribution for exchanges including multi-buyer exchanges and multi-supplier exchanges; and (h) public buyer sourcing.

The content transformation application facilitates the transformation of electronic and non-electronic data from existing supplier databases and catalogs to the generic electronic format of the system of the present invention. The system stores the transformed content in temporary databases until the suppliers verify the accuracy and completeness of the transformed content using a content management application. The ontent management application also enables suppliers to easily update his data on a regular basis. The system provides a content distribution application which facilitates the distribution of updated content on a real time or regular basis to the buyer databases in the buyer's procurement system and distributes the content back to the supplier for internal use, for use with non-participating buyers or supply-side sites and as otherwise desired by supplier. The marketplace thereby provides electronic catalog product information in a cleansed, standardized, categorized, easily searchable and generic format which enables suppliers to maintain, update and distribute product information from a single location in a single format using a single technical infrastructure or system which is also readily usable by a plurality of buyers through a plurality of sourcing applications. The system enables the supplier catalog data and information to be loaded into the system once and provides and transforms the data for use in the multiple types of sourcing levels.

The multiple levels of sourcing enable buyers to search, find, select, compare and purchase on-contract and off-contract items from a supplier community in a quick, easy and consistent manner through the buyers' procurement applications. The system also enables the buyers to customize the content provided to their requisitioners on an individual or group basis. For on-contract sourcing, the present invention enables buyers and suppliers to create, negotiate, review, edit (to the extent provided below), enter into, search and track contracts for the purchase of designated products.

The private on-contract sourcing level enables buyers to purchase on-contract items from suppliers, while the private off-contract sourcing level enables buyers to spot buy from the participating suppliers. The buyer's requisitioners use the marketplace by accessing their local procurement application. The buyer's local procurement application creates a new requisition or enables the buyer to use a previously created requisition. The system then enables the requisitioner to access the marketplace to purchase in the private catalog or on-contract sourcing level where the requisitioner finds and selects negotiated on-contract items from a private catalog. After a requisitioner successfully completes a search, the marketplace enables the requisitioner to view detailed product specifications and attachments related to the products, compare the products and select desired items to add to the requisition. The system stores these items in an electronic storage device or shopping cart. Upon the requisitioner's request, the system sends the items in the requisitioner's shopping cart back to the local procurement application to populate the requisition form.

If the requisitioner cannot find a desired item in a private catalog in the on-contract sourcing level or the item is not available at a suitable price or on acceptable terms, the system enables the requisitioner to access the off-contract sourcing level to find additional items from their existing suppliers or items from other participating suppliers. This enhances or increases the likelihood that the participating buyers will purchase off-contract items from their existing suppliers or from other participating suppliers. This enables the suppliers to capture a greater share of the purchases of all on-contract buyers and expand their market reach with the plurality of participating buyers using the system. Products selected from this off-sourcing level or environment are also sent back to the local procurement application to populate the requisition form. After the buyer selects all of the desired products, the buyer submits the requisition for work flow approval routing through the buyers standard practices or procurement application. After approval, the requisition is converted into one or more purchase orders and submitted to the respective suppliers in a pre-defined document delivery format such as EDI or XML by the buyer's procurement application.

If the requisitioner is unable to find an item using the on-contract sourcing or the off-contract sourcing levels, the marketplace enables the buyer to access a private product index off-contract sourcing level. The private product index off-contract sourcing level provides a relatively large industrial index of electronic products which enables the buyer to search for products. One such product index is an enhanced version of the THOMAS REGISTER™ product index web site available at http://www.thomasregister.com. If a requisitioner finds and desires to purchase a product through this private product index off-contract sourcing level, in one embodiment of the present invention, the system does not send this product back to the requisition. Rather, a request for information or purchase order is created at this level and is sent to the supplier directly from the site. In an alternative embodiment, the system could be adapted to send the product information back to the buyer or procurement application. It should also be appreciated that the product index off-contract sourcing level could be any suitable publicly accessible web site or database.

The present invention provides additional levels of content distribution and sourcing. For instance, for smaller to medium size buyers who do not have procurement applications, the present invention could be adapted to provide a private seller sourcing application which provides a procurement application for such buyers. This private seller sourcing enables the non-participating buyers to access the generic product databases of one or more suppliers to search for, select and purchase products.

The system is also preferably adapted to provide content distribution for buyer-side sourcing in which certain supplier content is downloaded on the buyer's procurement system or buy-side site, enabling the buyer to search and review supplier content without accessing the marketplace of the present invention. The marketplace of the present invention tracks all such content downloads to buyers to facilitate additional downloads of updated supplier product information or content to the buyer's procurement application or buy-side site to maintain such information up-to-date (preferably in real time) as the supplier updates the product information.

The present invention additionally enables buyers to create a plurality of private buyer catalogs accessible by specific requisitioners. The system also provides enhanced product content updating and searching features.

The present invention thereby provides the following benefits and advantages for buyers: (1) control of contract leakage and capture of spending volume; (2) reduction of errors and rework of purchases; (3) fast and efficient requisition experiences; (4) customizable e-catalogs; (5) multiple level on-contract and off-contract searching capability; (6) organized, categorized, aggregated and up-to-date dynamic content; (7) scalability across an entire company, network of companies or aggregated purchasing entities; (8) management control over access to suppliers and product categories; (9) global currencies and languages capability; (10) aggregated catalogs; (11) access to existing marketplace suppliers; and (12) a process to ramp up an approved supplier base.

The system of the present invention also provides suppliers with several advantages. The system enables a supplier to access the system using a conventional internet browser without requiring additional software or hardware equipment or costs. Each supplier provides its content once, updates its content as often as necessary and publishes its content numerous times to an unlimited number of potential buyers. This enables the suppliers to manage their content from one place, in one format and for multiple buyers. This also enables the suppliers to distribute a customer specific catalog to any buyer organization directly across the web. The system further enables the catalogs and contracts (between buyers and suppliers) to be kept up-to-date using internet browser based online tools for easy access to catalogs to input and implement changes. The system enables each supplier to enter into new electronic sales channels for it at a low cost, and enables each supplier to develop an entire catalog at the marketplace at a relatively inexpensive price and on an expedited basis.

Additionally, the system provides content distribution for supply-side sites which enables a participating supplier to retrieve or download its transformed data or content for internal users or for use in the supplier's sourcing systems or other systems as desired by the supplier. Accordingly, the present invention enables buyers and suppliers to better maintain their existing systems using the content transformation and management applications of the present invention.

It is therefore an object of the present invention to provide a full service, secure, commercial electronic marketplace having multiple levels of sourcing.

Other objects, features and advantages of the present invention will be apparent from the following detailed disclosure, taken in conjunction with the accompanying sheets of drawings, wherein like reference numerals refer to like parts, components, processes and steps.

DETAILED DESCRIPTION OF THE INVENTION

Marketplace Overview

Figure 1:
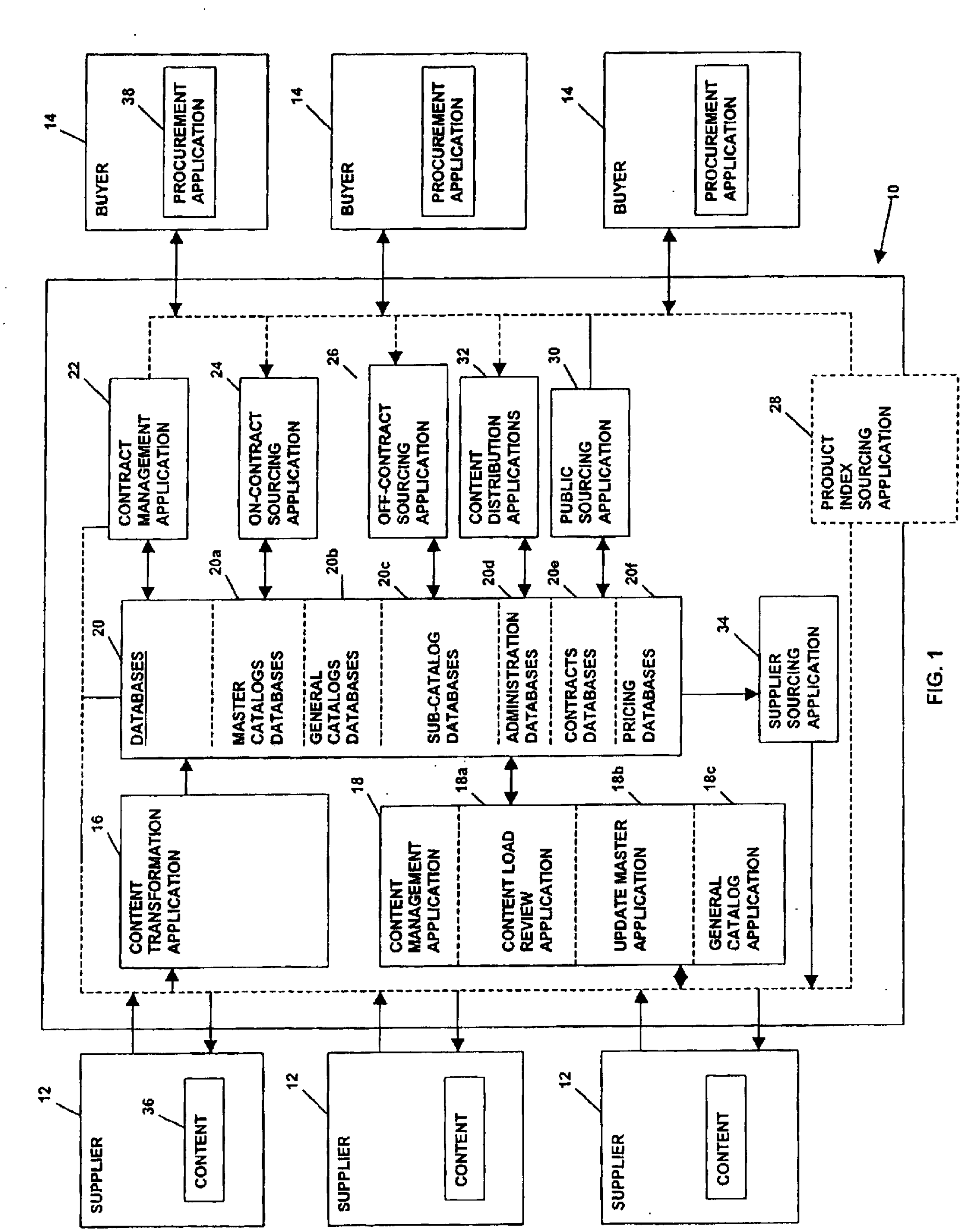
FIG. 1 is a schematic diagram of one embodiment of the electronic marketplace of the present invention.

Referring now to the drawings and in particular to FIG. 1, the full service secure commercial electronic marketplace of the present invention, generally indicated by numeral 10, is adapted to be utilized by a plurality of suppliers 12 and a plurality of buyers 14. The plurality of suppliers 12 and buyers 14 preferably access the marketplace through the Internet (or through their own intranets). It is contemplated that each supplier has administrators, contract managers and content managers and each buyer has administrators, contract managers and requisitioners who access and use the system.

The supplier administrators determine the extent of the access and abilities for each contract manager and each content manager, and otherwise manage the supplier's use of the system. The supplier contract managers create and negotiate the contracts with the contract managers of the buyer. The supplier content managers review, correct and update the transformed supplier content on the system.

The buyer administrators determine the extent of access and abilities of the buyer contract managers and the requisitions (i.e., what products the requisitioners can purchase) of the buyer requisitioners and otherwise manage the buyers use of the system. The buyer contract managers negotiate contracts with the supplier contract managers. The requisitioners find, select, compare, review and purchase on-contract and off-contract products.

Preferably, each supplier administrator, contract manager, content manager, buyer administrator, buyer contract manager and requisitioner has a separate user I.D. and password, in addition to, and separate from, the supplier or buyer I.D. (and password). Accordingly, the system provides a secure marketplace with limited individual access which enables the individuals to solely perform their designated or specified function. It should be appreciated that for relatively smaller businesses, these various functions could be preformed by the same individual. All of these individuals are able to access the system of the invention using a conventional computer and Internet browser, or through the buyers' procurement application as appropriate. For purposes of this application, the present invention may at times be described in relation to one supplier, one buyer and their respective administrators, contract managers, content managers and requisitioners.

As illustrated in FIG. 1, the system 10 provides a content transformation application 16 for transforming electronic and non-electronic product information into a generic form. The system further includes a content management application 18: (a) for reviewing and updating the generic product information using a working master catalog with a contract load review application 18*a*, and an update master application 18*b*; and (b) for creating general catalogs using a general catalog application 18*c*. The system 10 provides a plurality of content and other databases 20. The system 10 further provides a contract management application 22 enabling suppliers 12 and buyers 14 to enter into contracts and multiple levels of sourcing for suppliers and buyers, including: (a) a private on-contract sourcing application 24; (b) a private off-contract sourcing application 26; (c) a private product index off-contract sourcing application 28; (d) a public sourcing application 30; and (e) one or more content distribution applications 32 for distributing content to buy-side sourcing systems, supply-side sourcing systems, multi-buyer exchanges and multi-supplier exchanges.

Generally, the marketplace 10 obtains electronic and non-electronic content 36 such as electronic and non-electronic catalogs and product information from each participating supplier 12. As discussed in more detail below, the content transformation application 16 transforms this raw data into cleansed, standardized and generic product data, adds additional descriptive information to this data and stores this transformed data in master catalogs in databases 20. The supplier's transformed data is made accessible to the supplier for review and updating purposes (including changing prices) and for other uses through the content load review application 18*a*, update master application 18*b* and general catalog creation application 18*c* accessible by the supplier as discussed below. The supplier's transformed data is made accessible to participating buyers at various levels as discussed below.

More particularly, the system 10 enables the participating suppliers to manage supplier contracts and supplier catalogs on the system. After a supplier's content is transformed and reviewed, a master catalog for the supplier is created and saved in the master catalog databases 20*a*. The supplier uses the general catalog application 18*c* to create one or more general catalogs which are attached to one or more contracts which are negotiated with buyers. The system 10 also enables the participating buyers 14 to manage the buyer contracts, buyer catalogs and buyer sub-catalogs on the system. The buyers and the suppliers can group the contracts, catalogs and sub-catalogs into resources enabling access to the designated users or user groups. After a buyer 14 enters into one or more contracts with one or more suppliers 12, the system creates a master catalog for the buyer which includes all of the general catalogs from all of the contracts that the buyer has entered into with one or more suppliers. The system 10 enables the buyer to create sub-catalogs from the buyer's master catalog. The sub-catalogs are created based on the suppliers' categories of products, products and other attributes. Accordingly, the buyer can create catalogs across multiple suppliers.

The system 10 provides the participating buyers with multiple levels or tiers of sourcing capabilities enabling the buyers access to the product information provided by various suppliers. The marketplace enables the participating suppliers to create relationships with any participating buyer. The marketplace provides a contract management application 22 for suppliers 12 and buyers 14 to create, negotiate and enter into contracts which are used in the first level of sourcing. When the supplier 12 wants to create a contract, the supplier 12 accesses the system 10 and uses the content management application 18 and specifically the general catalog application 18*c* to create a general catalog. The general catalog includes all the items the supplier 12 wants in a particular buyer's contract. The supplier 12 then uses the contract management application 22 to create an electronic contract. The supplier 12 attaches the general catalog to the contract using the contract management application 22 and submits or sends the contract to the buyer 14 using the electronic marketplace.

The buyer 14 uses the contract management application 22 to review the contract and either approve, reject, or edit the contract. If the buyer 14 rejects or edits the contract, the contract is sent back to the supplier 12 for approval and the process repeats until the contract is approved by the both the supplier 12 and buyer 14. The buyer 14 and supplier 12 can each edit certain portions of the contract. For instance, preferably only the supplier 12 can make price changes. After a contract is approved, the buyer 14 controls which requisitioners (i.e., employees) in their organization have access to the general catalog or sub-catalogs formed from the general catalog as discussed below. The requisitioners can shop on-line in these sub-catalogs for items using the search interfaces of the on-contract sourcing application 24.

A requisitioner of a buyer who has entered into a contract with a supplier for the regular purchase of products may use the first tier sourcing or private on-contract sourcing application 24 provided by the marketplace 10 to search for and purchase contracted products. If the requisitioner is unable to find the desired products through the on-contract sourcing application 24, the requisitioner may access a second tier sourcing or off-contract sourcing application 26. The off-contract sourcing application 26 enables the requisitioner to search and purchase products from suppliers for whom the buyer 14 does not have a contract. When the requisitioner purchases an item in the first tier or the second tier, the items purchased are placed in a temporary database or shopping cart. When the buyer is done in both of these levels, the items in the shopping cart are sent to the buyer's procurement application 38 as discussed below.

If the requisitioner is unable to find products in the first tier or the second tier, the system 10 enables the requisitioner to search and access product information and purchase products through a third tier sourcing or private product index sourcing application 28. The product index sourcing application 28 is preferably at least one web site which provides detailed product and supplier information on a large number of products, which enables a requisitioner to search for products not found in the first two tiers.

In one embodiment, if a requisitioner uses the product index sourcing application 28, the products selected at the third tier are not placed in the requisitioner's shopping cart. Instead, the requisitioner uses the product index sourcing application 28 to send an inquiry, purchase order or RFI to the supplier of the product(s) which are selected at this third tier. In this embodiment the items selected at the third tier are thus not passed back to the procurement application of the buyer. However, it should be appreciated that the third tier sourcing level could be integrated with the buyer's procurement application 38 and the items selected by the requisitioner could be sent back to the buyer procurement application 38. In such case, the products would not be in the existing master catalog.

It should be appreciated that the first level of sourcing provides the requisitioner a limited number of on-contract products, the second level of sourcing provides a greater number of products which include all of the products from the participating suppliers and the third level of sourcing provides a vast amount of products and suppliers from commercial products indexes. The present invention thereby provides multiple levels of sourcing with an increasing number of products in each level. These sourcing applications are described in greater detail below.

As indicated above, each participating buyer 14 preferably has a procurement application 38. The present invention enables the buyer 14 to use its existing procurement application with relatively minor modifications to access the multiple tiers of sourcing. In particular, if the buyer 14 has a legacy or existing procurement application or system, the system 10 is modified to access the marketplace using an internet browser as discussed below. This eliminates the need for the buyer to retrain its individual requisitioner to use a new procurement system. This provides a substantial advantage of the system 10 of the present invention for both the buyers 14 and their individual requisitioners. Accordingly, the system can be used by any buyer 14 without retraining its requisitioners or substantially changing its existing systems.

System Architecture

Figure 2:
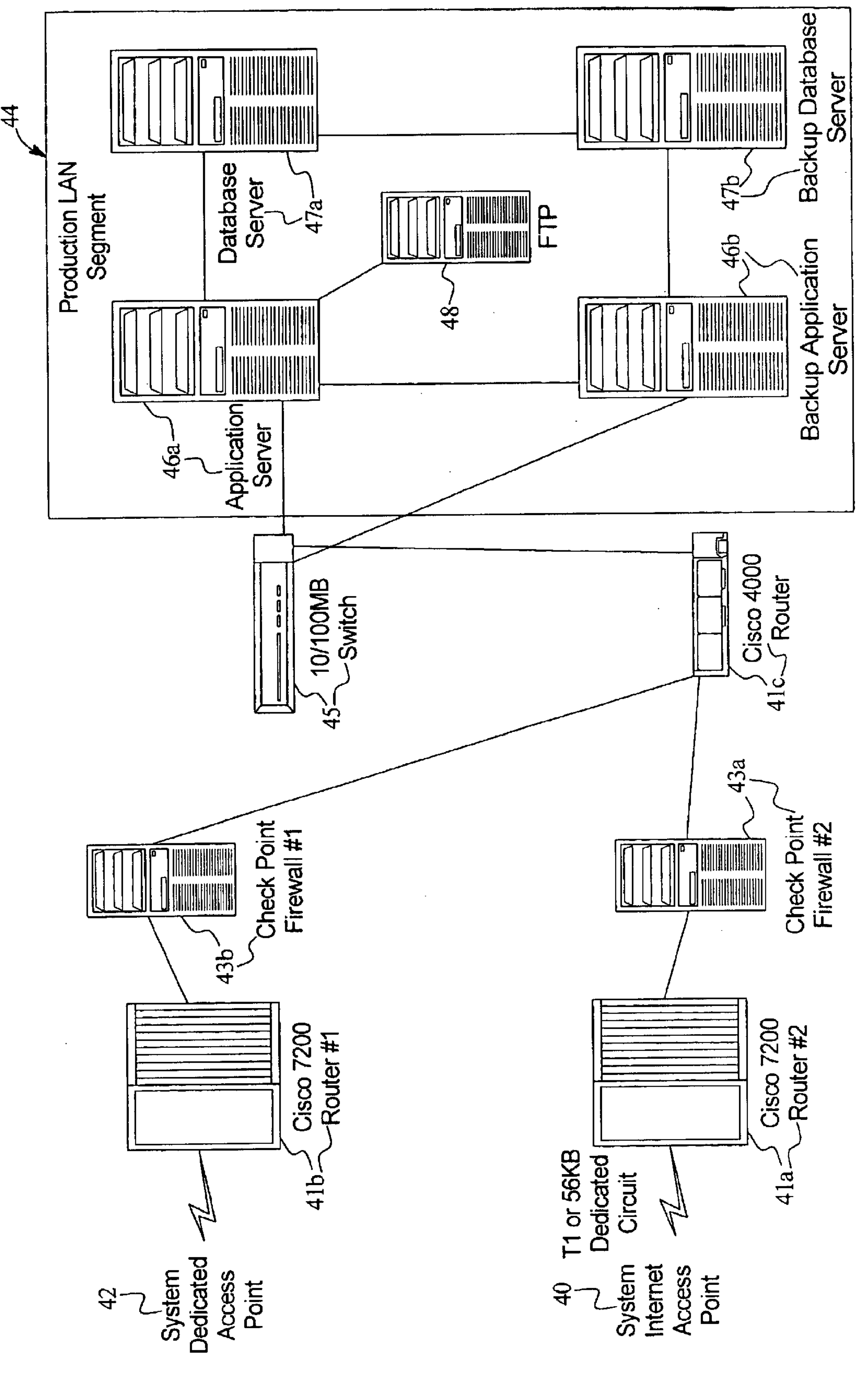
FIG. 2 is a schematic diagram of the physical architecture of one embodiment of the electronic marketplace of the present invention.

The system of the present invention preferably provides or includes an open, distributed, object-oriented component-based, n-tier client/server architecture using technology standards such as Java, Javascript, XML, EJB, etc. Access to the system is preferably provided through the Internet at one or more designated URL's, an IP dial-up or a dedicated line Extranet. The system provides a secure environment through the usernames and passwords at the user level, HTTPS, SSL and an authentication at the packet level, firewalls and choke routers at the access level and database encryption and profiling at the data level. One embodiment of the electronic marketplace of the present invention includes the physical architecture or operational infrastructure illustrated in FIG. 2. In particular, FIG. 2 illustrates the interaction and operable communication between the system Internet access point 40, the system dedicated access point 42 and a production local area network 44 ("LAN"). In this embodiment, the system employs a plurality of routers and firewalls which enable the production LAN to interconnect, interact and communicate securely with both the Internet access points and the dedicated access points.

In one embodiment, a first router **41*a* directs communication or traffic through a first firewall 43*a* between the Internet access points 40 and the production LAN 44. The firewall acts as a security system or checkpoint that accepts or blocks packets of information, ultimately protecting the production LAN. A second router 41*b* directs communication or traffic through a second firewall 43*b* between the dedicated access points 42 and the production LAN 44. The second firewall 43*b* also provides security as mentioned above. The second firewall 43*b* interacts with and communicates with a third router 41*c*, which also communicates with the first firewall 43*a*. The third router 41*c* communicates with both the first and second firewalls and a switch 45**. The third router controls the communication between the first and second firewalls and the production LAN through the switch.

The production LAN includes a plurality of application and database servers. The switch 45 communicates with an application server **46*a* and a backup application server 46*b*. The application server 46*a* runs the applications, processes data and requests and sends information back to the users. The backup application server 46*b* serves as a backup to the application server 46*a*. A database server 47*a* is connected with the application server 46*a* and a backup database server 47*b*. The backup database server 47*b* is also connected to the backup application server 46*b*. The database server 47*a* stores the information stored in the database and receives information from and transmits information to the application server 46*a*. The production LAN 44 also includes an FTP server 48** which provides file transfer capabilities. Alternatively, several application servers and database servers could be connected in parallel as is well known in the art.

Figure 3:
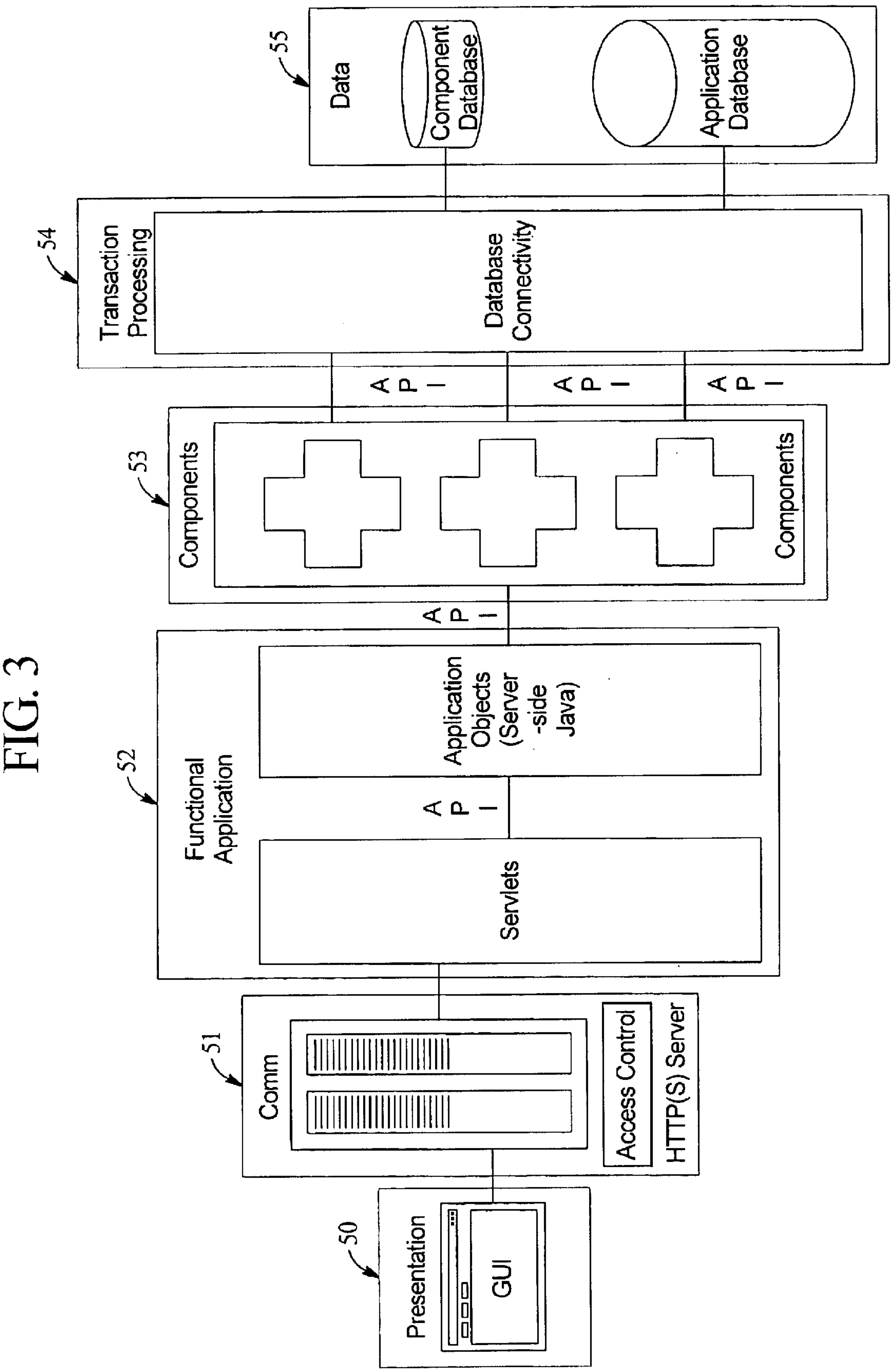
FIG. 3 is a schematic diagram of the multi-tier application architecture of one embodiment of the electronic marketplace of the present invention.

Referring now to FIG. 3, one embodiment of the system of the present invention includes a multi-tiered application architecture including a presentation or GUI layer 50, a communication layer 51, a functional layer 52, a component layer 53, a transaction processing layer 54 and data storage 55. The functional layer communicates with the component layer which provides various expanded capabilities. The transaction processing layer communicates with the component layer and the database storage. It should be appreciated that the structional and functional system architecture could be alternatively developed by one of skill in the art.

Content Transformation

Figure 4:
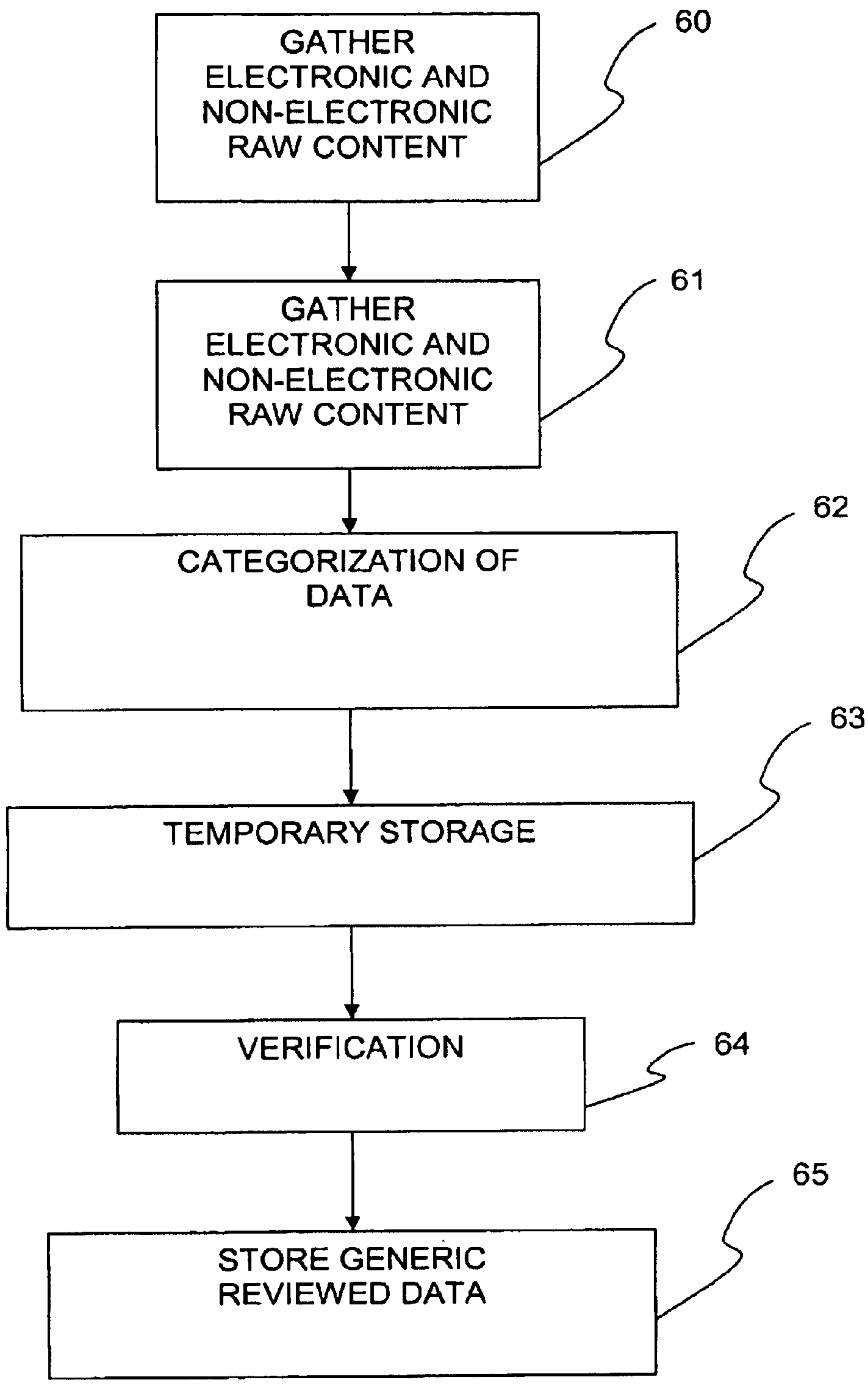
FIG. 4 is a flowchart of the content transformation process of one embodiment of the electronic marketplace of the present invention.

Content management is the comprehensive process by which electronic product catalog data is acquired, transformed, organized, stored, maintained and presented to the buyer for easy multi-tier on-line purchasing. Referring now to FIG. 4, the first step of the content transformation application 16 or data transformation process is to gather all of the raw computerized or electronic data available on a participating supplier product and all of the raw non-electronic data on a participating supplier product as indicated by block 60. For instance, product data on a MRO product such as an electric wire may be received as follows: Part # 78010022, Product-Name Description: WIRE THHN-12-ORN-19STR-CU500S/R, UOM-EACH, Price 2690.

The content transformation then transforms this raw data into a standard data format as indicated by block 61. Each abbreviation in this data is converted into its full name. In this example, it is difficult to know if "ORN" means orange or ordinary. Thus, the transformation process involves suggesting likely meanings for the more obvious abbreviations, asking the supplier to verify the accuracy of the suggestions for expanded abbreviations, and producing a complete and searchable description of the product (i.e., searchable by any field). The content transformation application 16 enables the implementor of the system to perform these functions. In this example, the full description may be Wire: Electrical: THHN, 12 AWG, 19 Strand, Copper Conductor, Orange Insulation.

After the data has been normalized, standardized or made generic, and categorized using predetermined attributes the information is loaded into specific fields including standard attributes and extended attributes as described below. This enables users of buy-side catalogs or the electronic marketplace to search and compare similar products quickly and easily. For example, a requisitioner searching for electrical wire can limit his or her search to only copper wires since this attribute has been separated out in the content transformation process of the present invention. The data is then categorized as indicated by block 62.

The content transformation application stores the data for each supplier 12 in a separate temporary master catalog (not shown) in the databases 20 as indicated by block 63. After the content in the temporary master catalogs is reviewed and verified by the supplier content manager as indicated by block 64, the content is stored, as indicated by block 65, in a master catalog database 20*a*. As described below, items in the master catalog for the supplier may be used by the supplier to create working catalogs and general catalogs.

To ensure its usefulness within an electronic catalog, product information must be organized according to well-known industry standards. In the United States, for example, the system preferably uses the THOMAS REGISTER of American Manufacturers[SM] which has descriptive product headings for thousands of MRO supplies. Several THOMAS REGISTER™ product headings apply to the electrical wire example, and some products may have as many as fifteen headings. Such headings serve as a springboard for creating the categories necessary for unlimited cross-referencing of supplies within an electronic catalog. It should be appreciated that other suitable product headings, identification systems and product category systems are preferably used in accordance with the present invention to identify and categorize products in any manner desired by the supplier or implementor of the system.

The product information is then organized in a way that assures maximum search flexibility. A supplier or its content manager (or the supplier's vendor or manufacturer) must create product categories using recognized industry terminology, then cross-reference products in each applicable category. Based on the industry product headings applicable to the electrical wire mentioned above, for example, the product could be listed under "Wire: Electrical" and other relevant categories.

It should be appreciated that other categories can be created to meet the specific needs of a particular buying organization. For example, many buying organizations perform commodity analyses at the end of each fiscal year to assess how much money was spent by different segments of this business. Buying organizations with catalogs or secure electronic marketplaces that include commodity code categories such as UN/SPSC codes can export this information easily for internal reporting.

The transformed product data preferably include a plurality of base attributes or fields and a plurality of extended attributes or fields. For each product, the base attributes preferably include the supplier part number, category, product name (short description), product description (long description), currency, list price, product unit of measure, quantity per unit of measure, manufacturer's name, manufacturer's part number, dimensions, UPC, product weight, product unit of weight, freight included in price, trade name, hazardous material, attachment file name, supplier source description, product effective date, product end date, replacement part number, industrial part number, OEM effective date, OEM end date, accept flag, item type, (i.e., THOMAS REGISTER of American Manufactures[SM]) TR heading and status. The extended attributes provide additional information relating to each specific product. For example, for an office chair, the extended attributes may include: size, style, types, frame material, seat material, frame color, seat color, arm and back. For a vertical cabinet, the extended attributes may include: capacity, color, depth, height, length, size, type, width and application. For an abrasive belt, the extended attributes may include: length, material, type, width, bond/bracking and grit. The content transformation and storage process as well as the updating process discussed below make all supplier content standard for the entire marketplace. This enables easy searching for products and comparison of products. The transactive product content is processed and stored in a plurality of databases.

Figure 5:
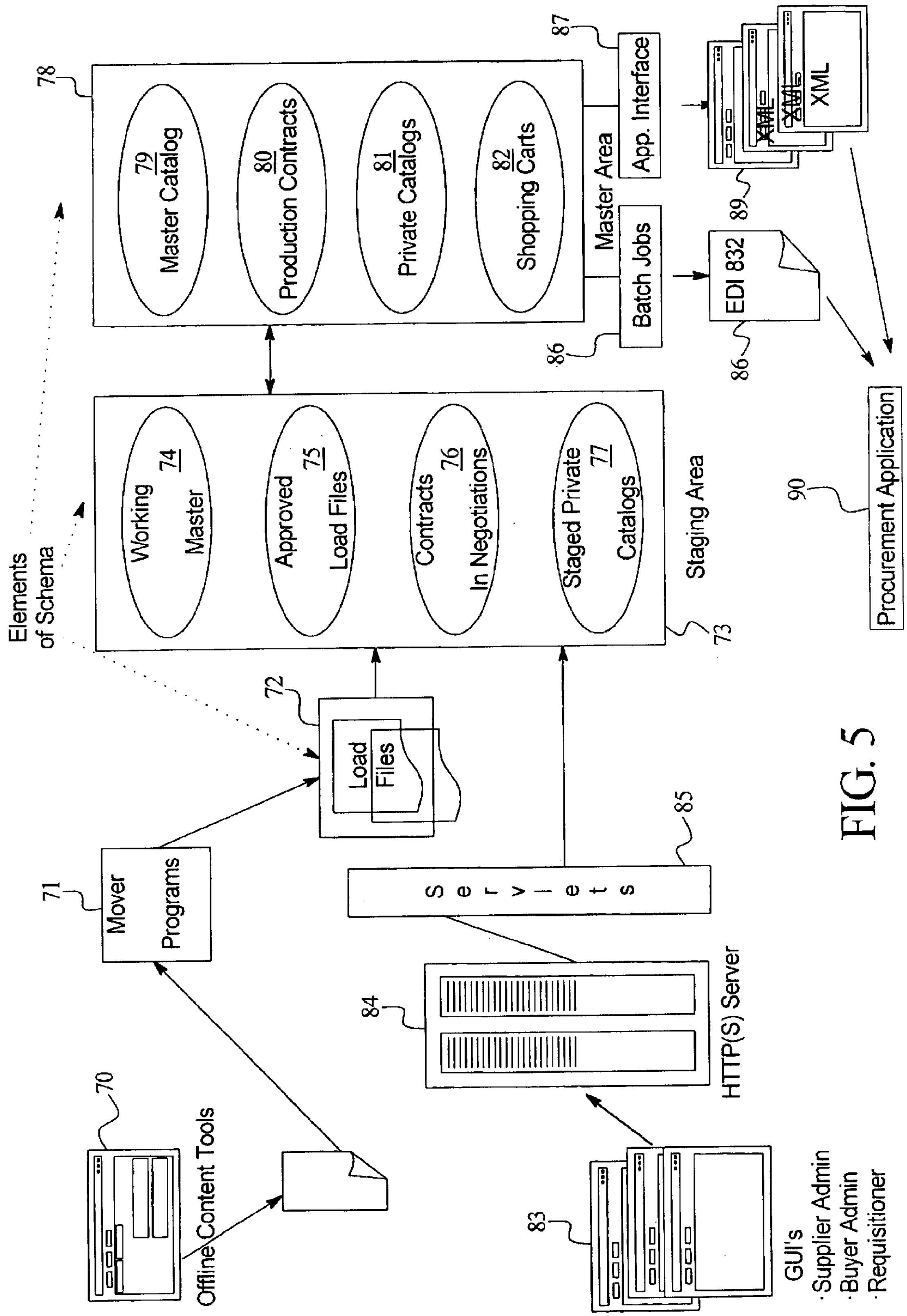
FIG. 5 is a schematic diagram of the data process flows of one embodiment of the electronic marketplace of the present invention.

Turning now to FIG. 5, a schematic diagram of the data process flow of one embodiment of the present invention is generally illustrated. The user uses off-line content tools 70 to communicate with mover programs 71 which load files using appropriate load files applications 72. The load files applications 72 communicates with a staging area 73, loading files into the staging area which include working master files 74, approved load files 75, contracts in negotiations 76, and staged private catalogs 77. In turn, the staging area 73 communicates with the master area 78, providing information which is stored in the master catalogs 79, production contracts 80, private catalogs 81 and shopping carts 82. The supplier administrators, buyer administrators and requisitioners use a GUI 83 to communicate through the HTTP server 84 and servlets 85 to access the staging area 73 and master areas 78 as indicated above. The master area 78 provides the information stored in the staging and master areas to the users either as batch jobs 86 or application interfaces 87 which produce EDI files 88 or XML files 89 (for example) which are sent to the buyers procurement application 90.

Content Management

The system 10 initially transforms and categorizes all of the supplier's products or items for inclusion in the content databases 20 as described above. After the transformation is complete, the system 10 enables the supplier and particularly the supplier's content managers to review the results of the transformation process, correct any errors, add any additional products, information or price changes and delete any discontinued products. This content load review application 18*a* enables the supplier to check if all of the products in the temporary master catalog created for the supplier 12 have been correctly entered into the system 10 during the transformation process.

As generally illustrated in FIG. 1, the content load review application 18*a* enables the supplier's content manager to review and edit the files that are processed to be loaded into the system. These files include files that have been transformed through the content transformation application and include files that a supplier may wish to update to their master catalog. Examples of this are global pricing updates are discussed below. As stated above, the supplier has the ability to review and approve the files that have been processed through the content transformation application. Once the files has been approved by the supplier, the content contained within the load review application 18*a* will update the supplier's master catalog. These updates will include new items that will be added to the master catalog and updates to the items, such as price or manufacturer name.

The supplier and its content and contract managers also use the content management application 18 to update, delete and add items to create and save general catalogs as discussed below.

Figure 6:
FIG. 6 is an illustration of the user login interface of one embodiment of the electronic marketplace of the present invention.

After the supplier content manager accesses the appropriate system web site using a browser, the system 10 provides a supplier login interface as illustrated in FIG. 6. The supplier content manager logs in using this interface, entering the company ID, user name and password. The system 10 verifies the company ID, user name and password in a conventional manner.

Figure 6A:
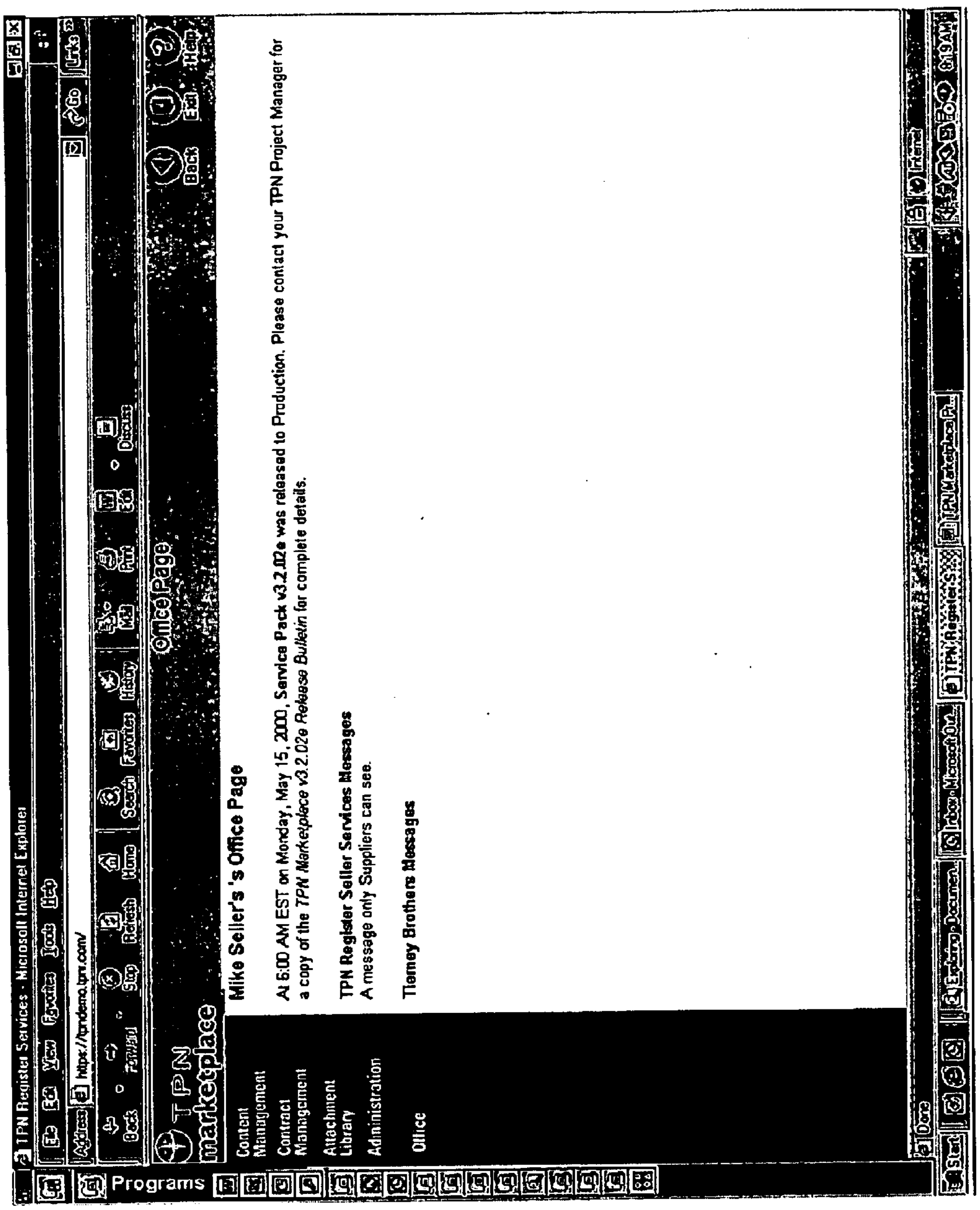
FIGS. 6A through 6S are illustrations of the load review and content updating interfaces provided to the supplier by one embodiment of the electronic marketplace of the present invention.
Figure 6B:
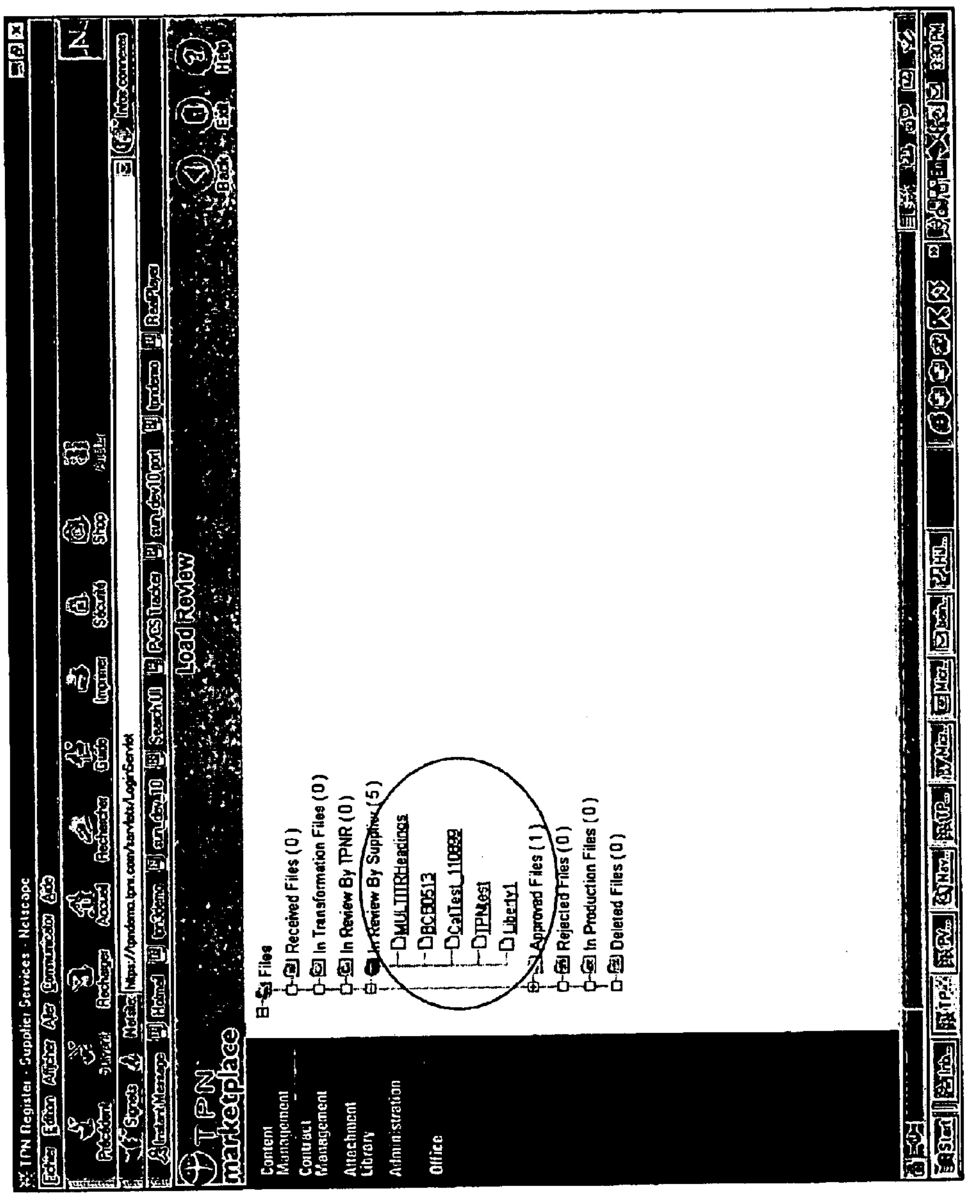
Figure 6C:
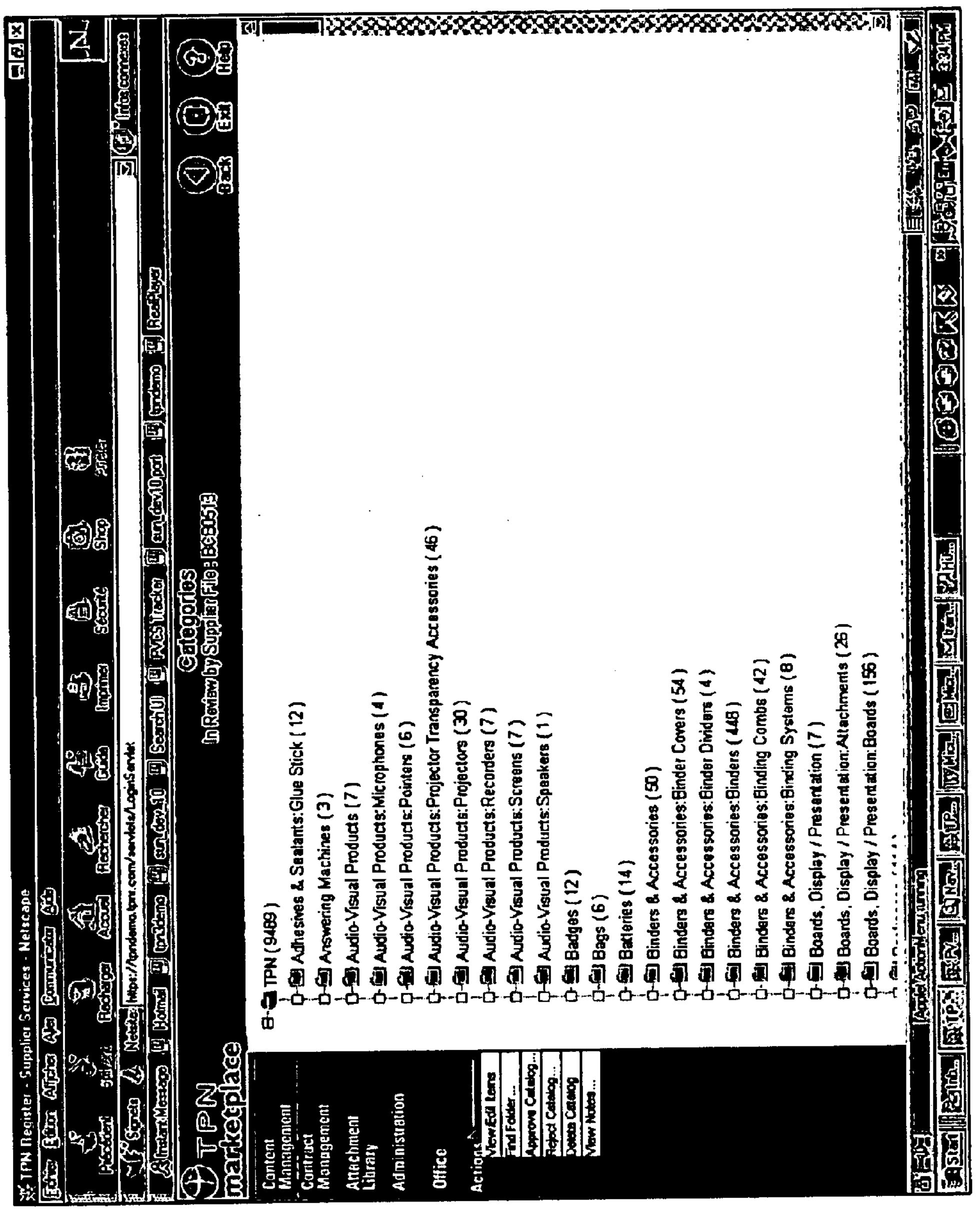
Figure 6D:
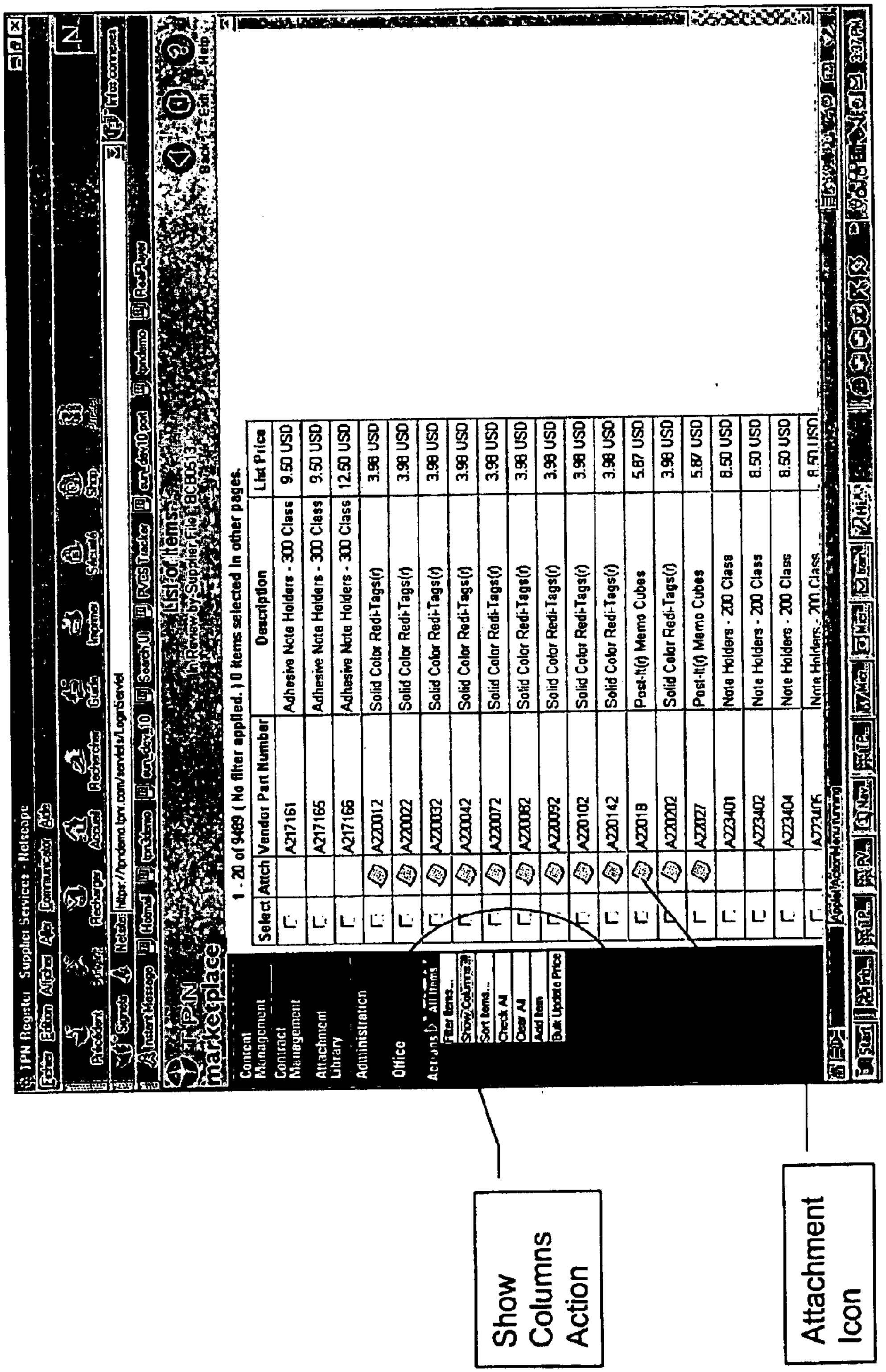
Figure 6E:
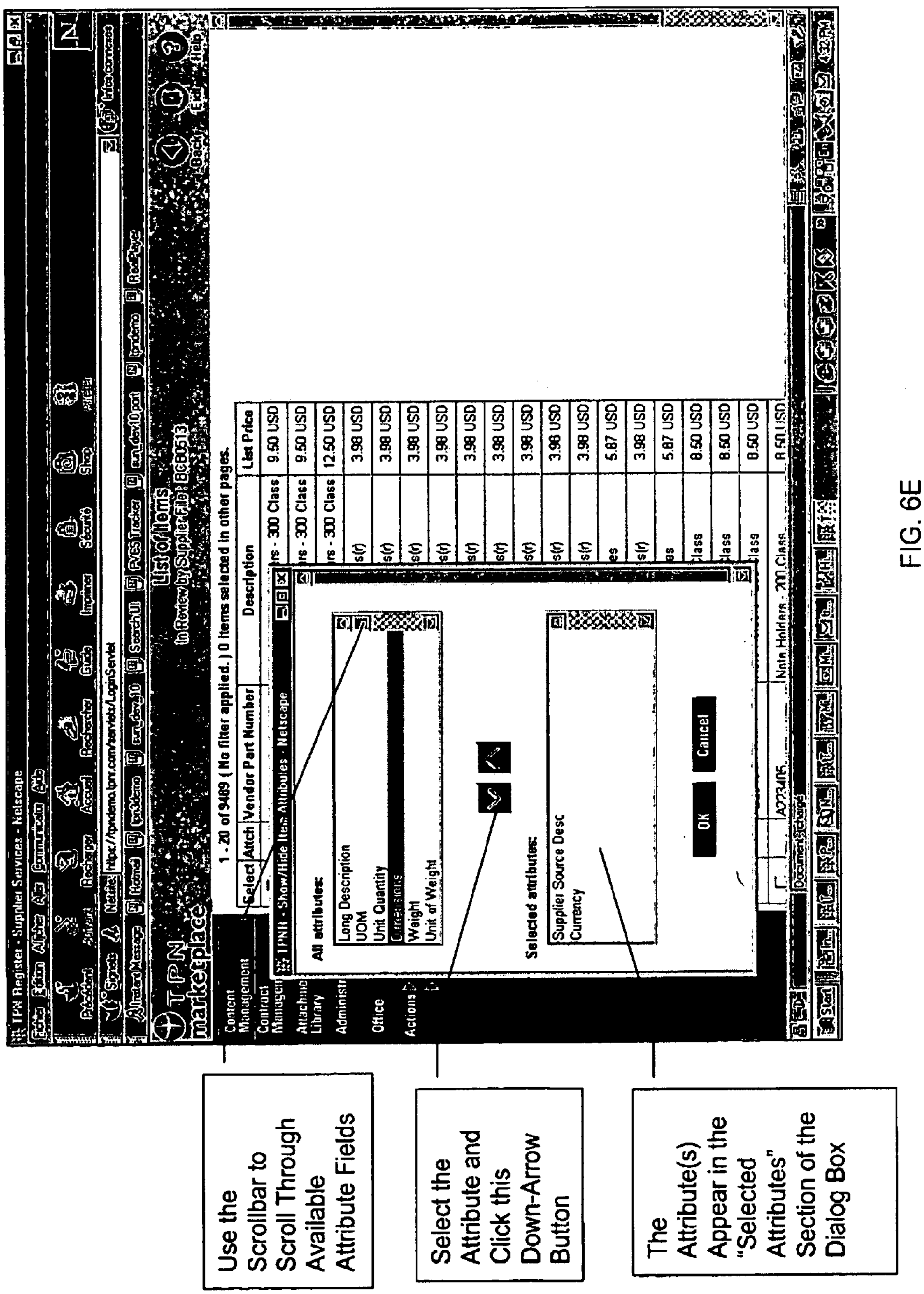
Figure 6F:
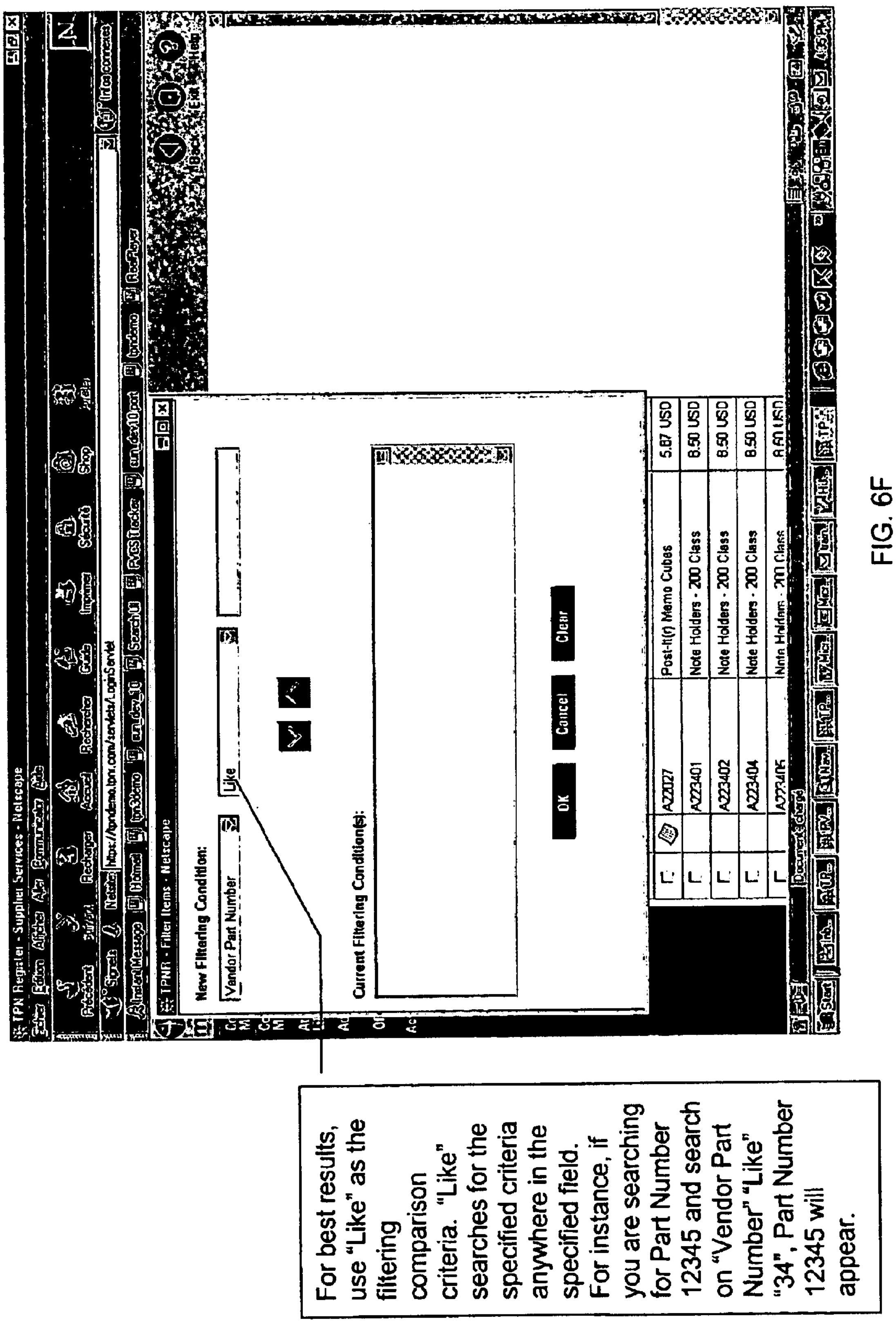
Figure 6G:
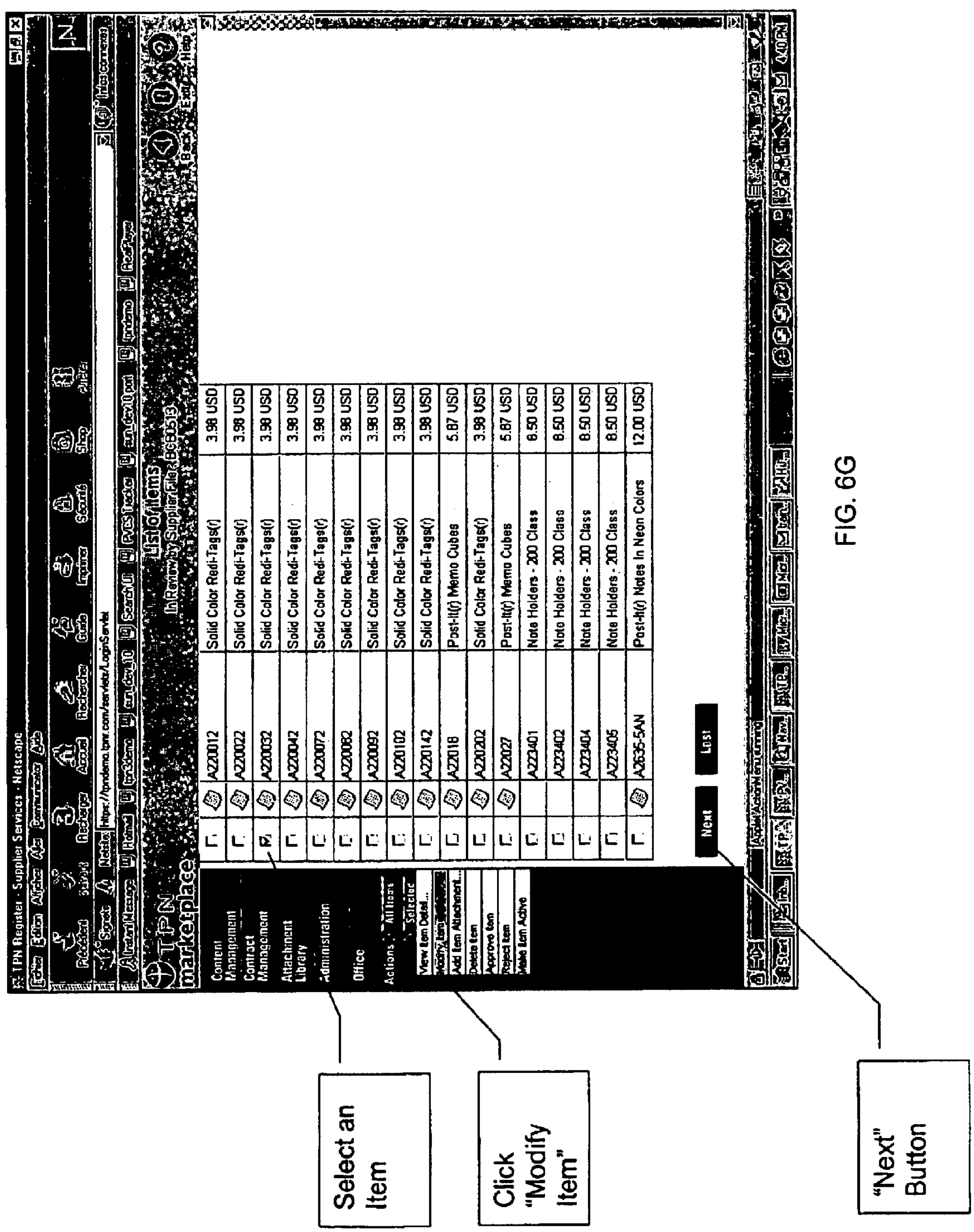
Figure 6H:
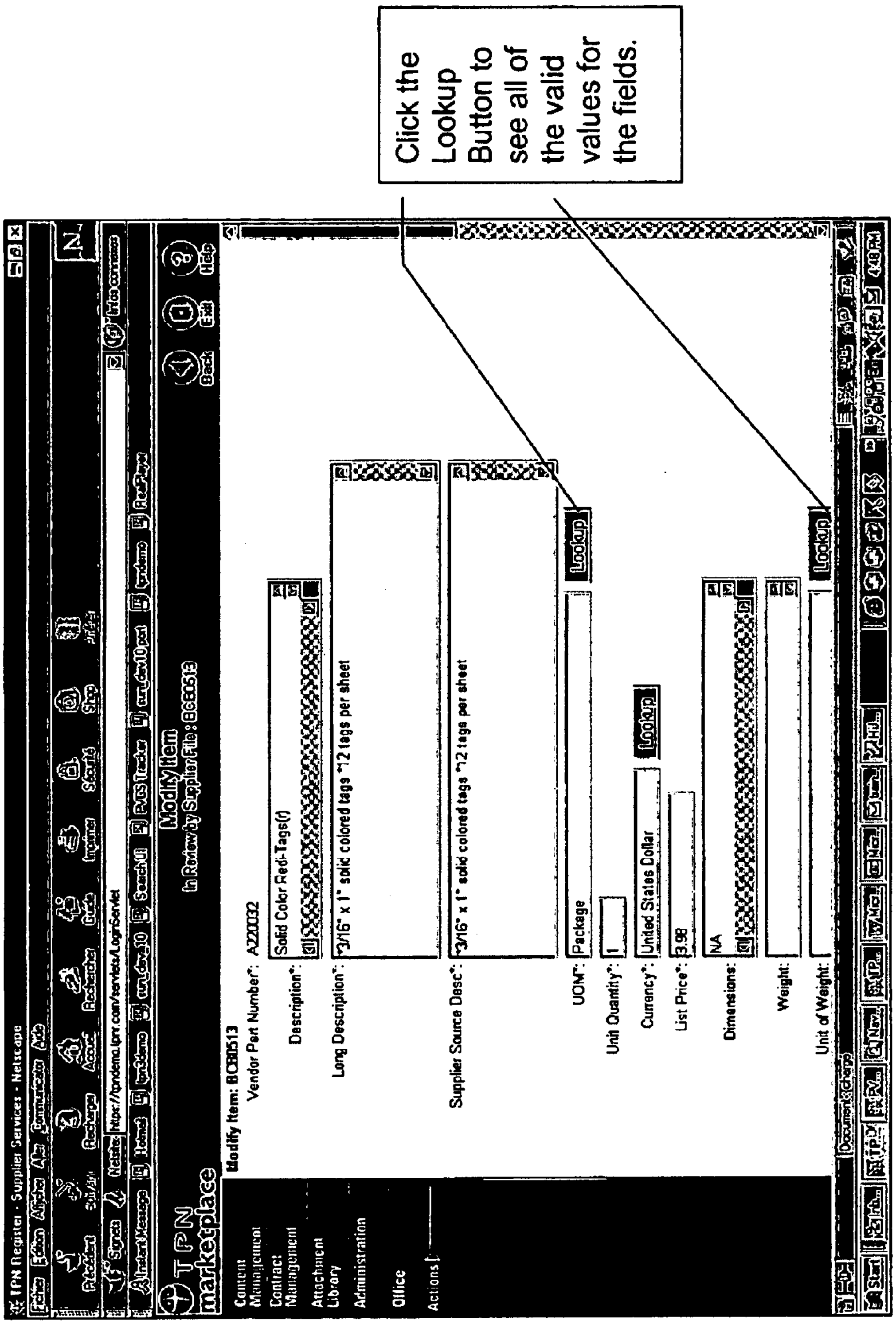
Figure 6I:
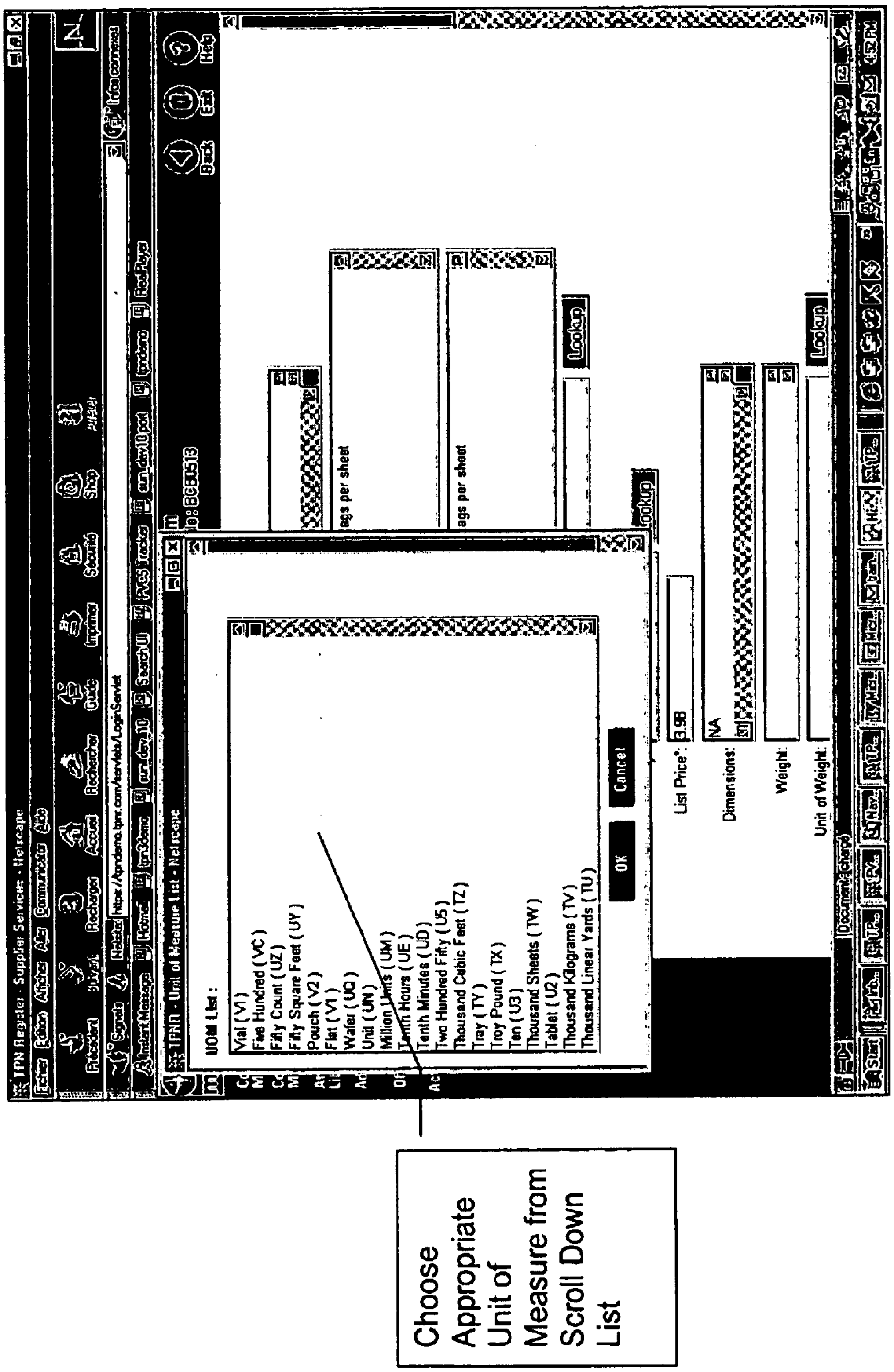
Figure 6J:
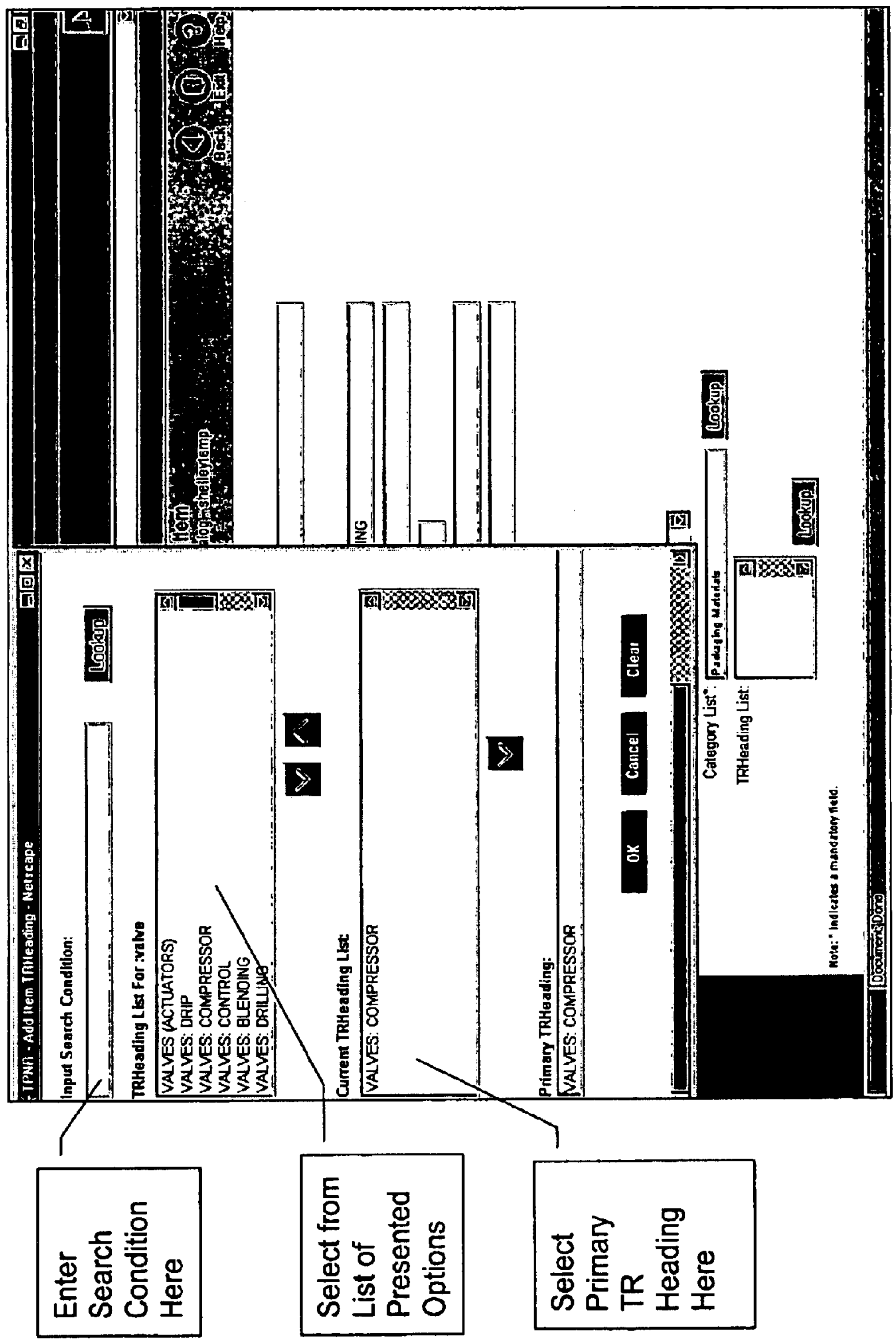
Figure 6K:
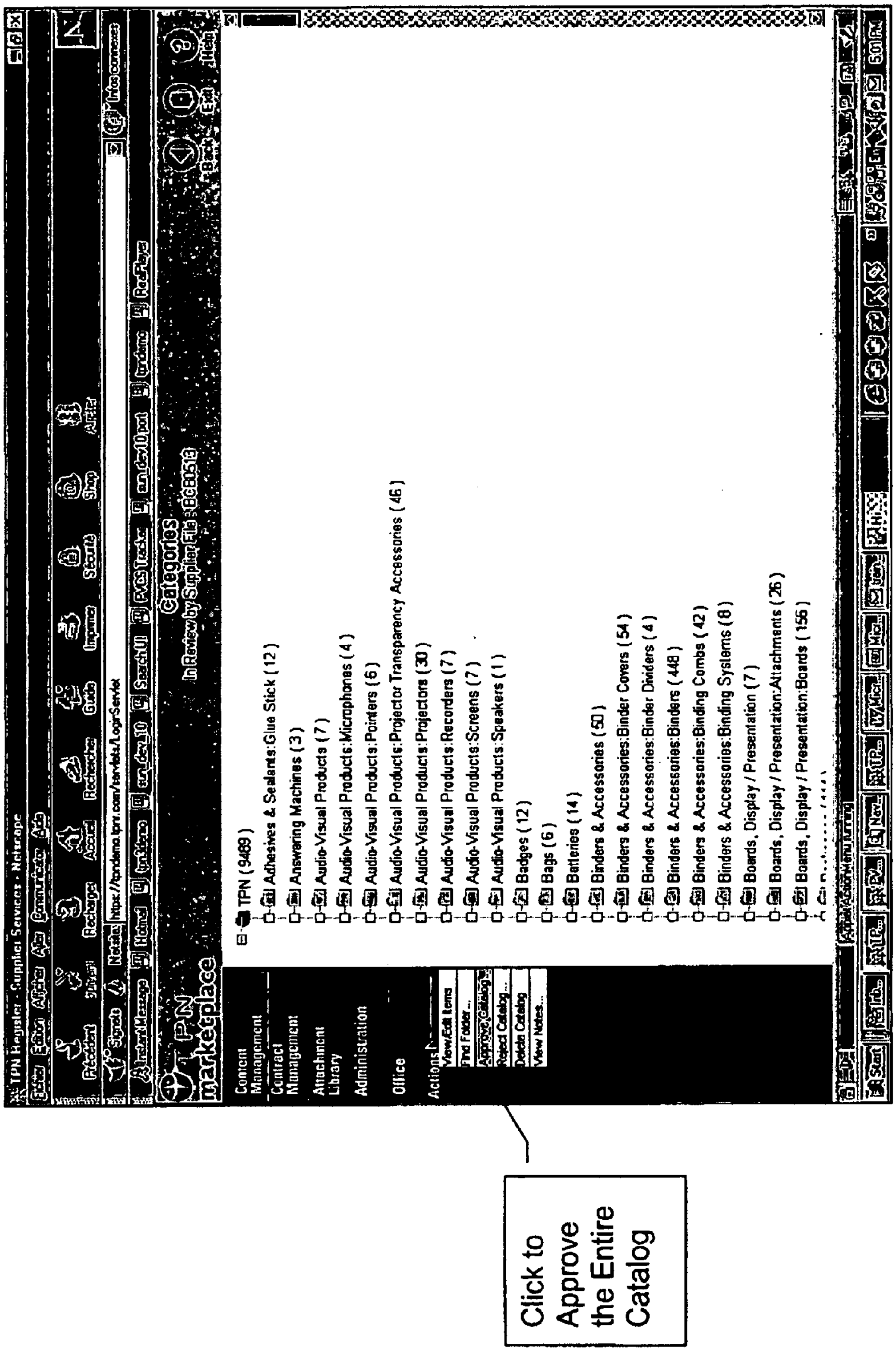
Figure 6L:
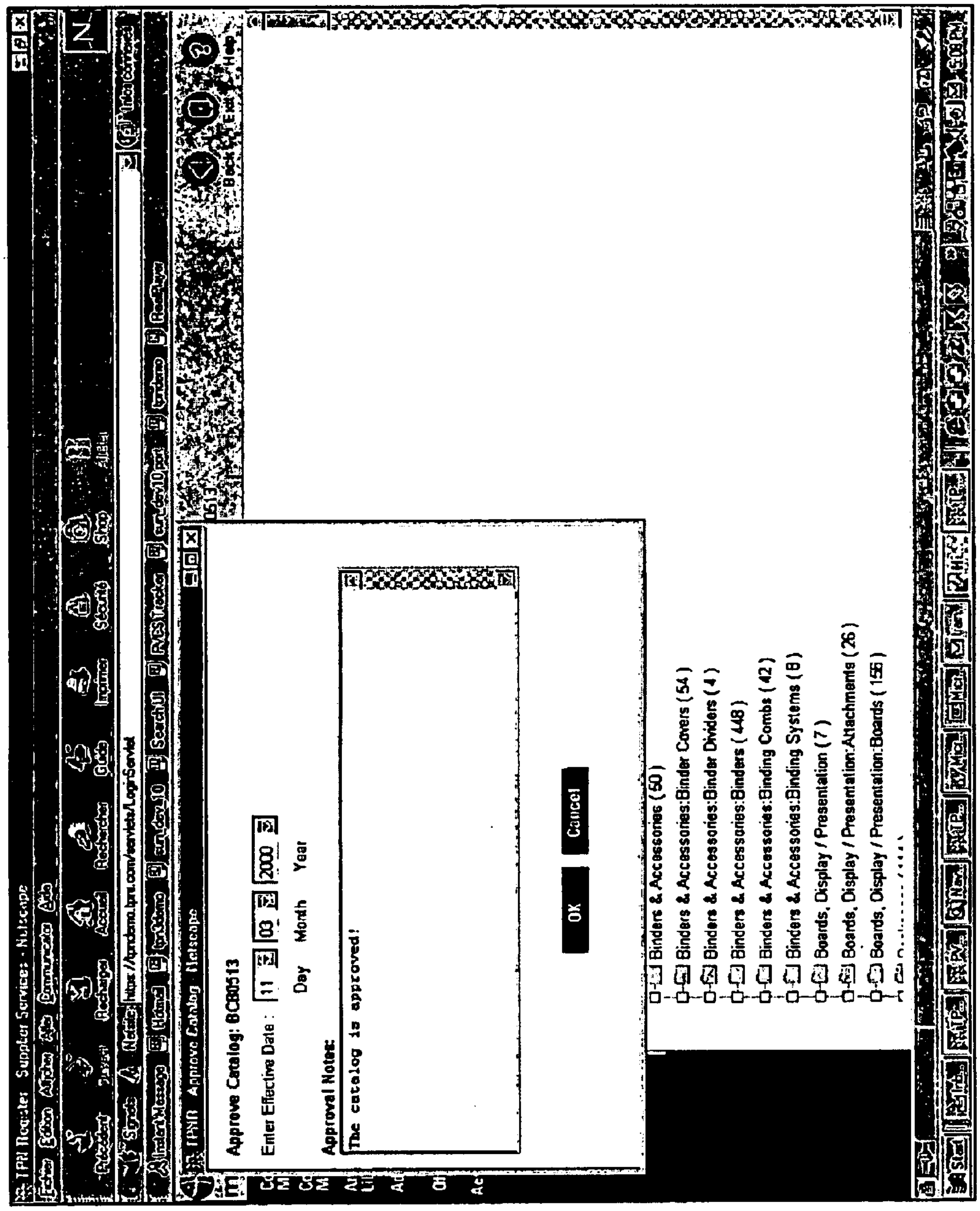
Figure 6M:
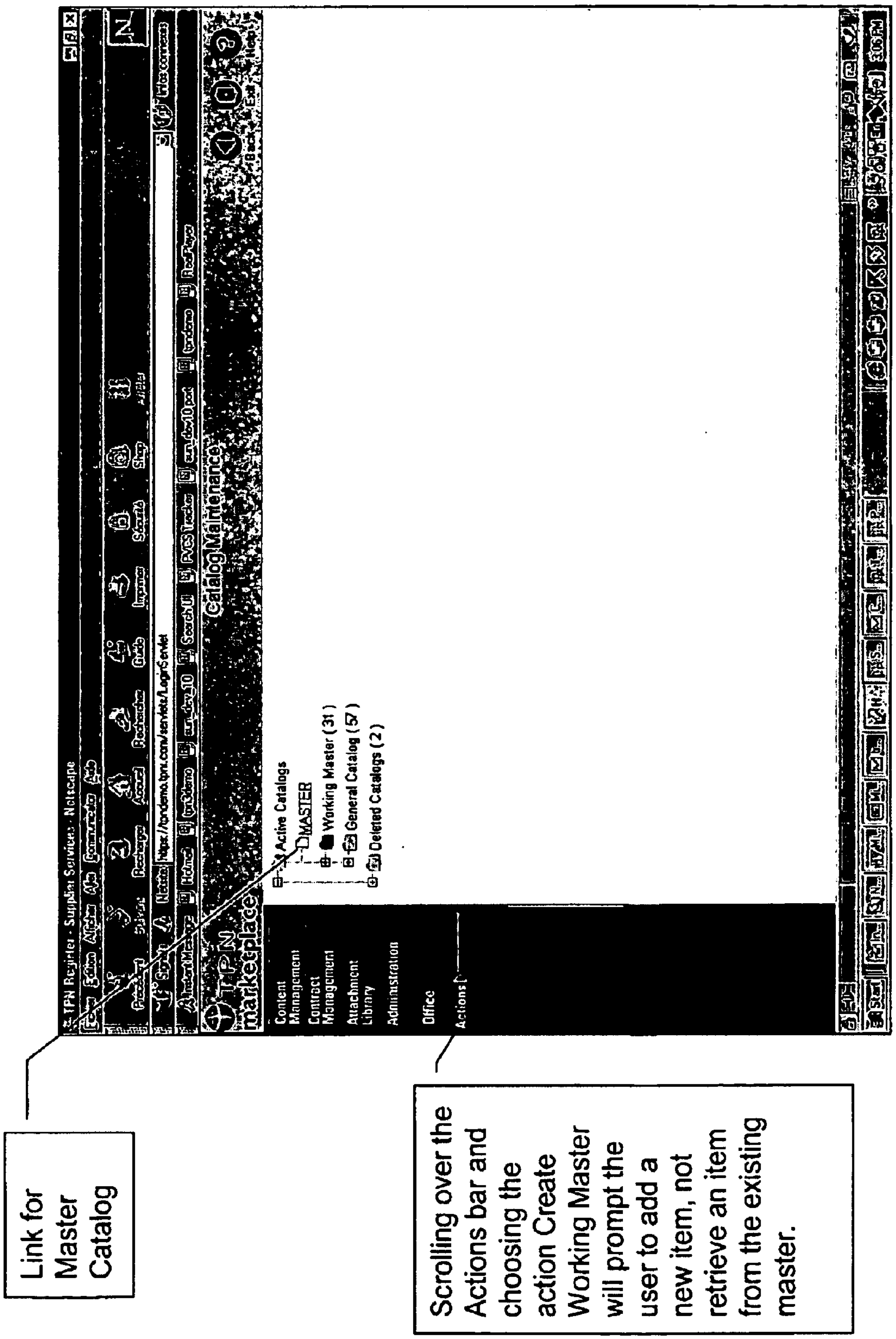
Figure 6N:
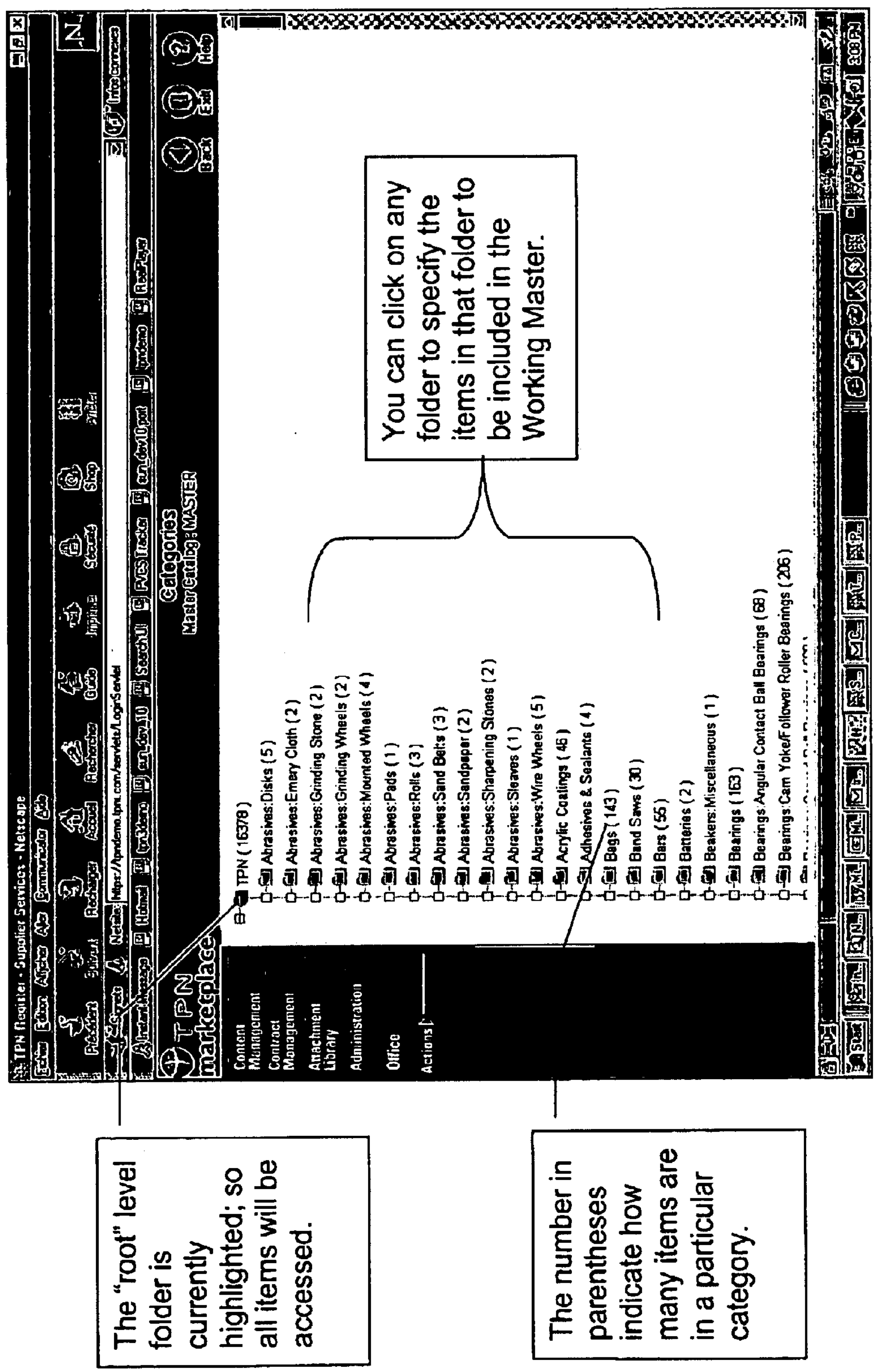
Figure 6O:
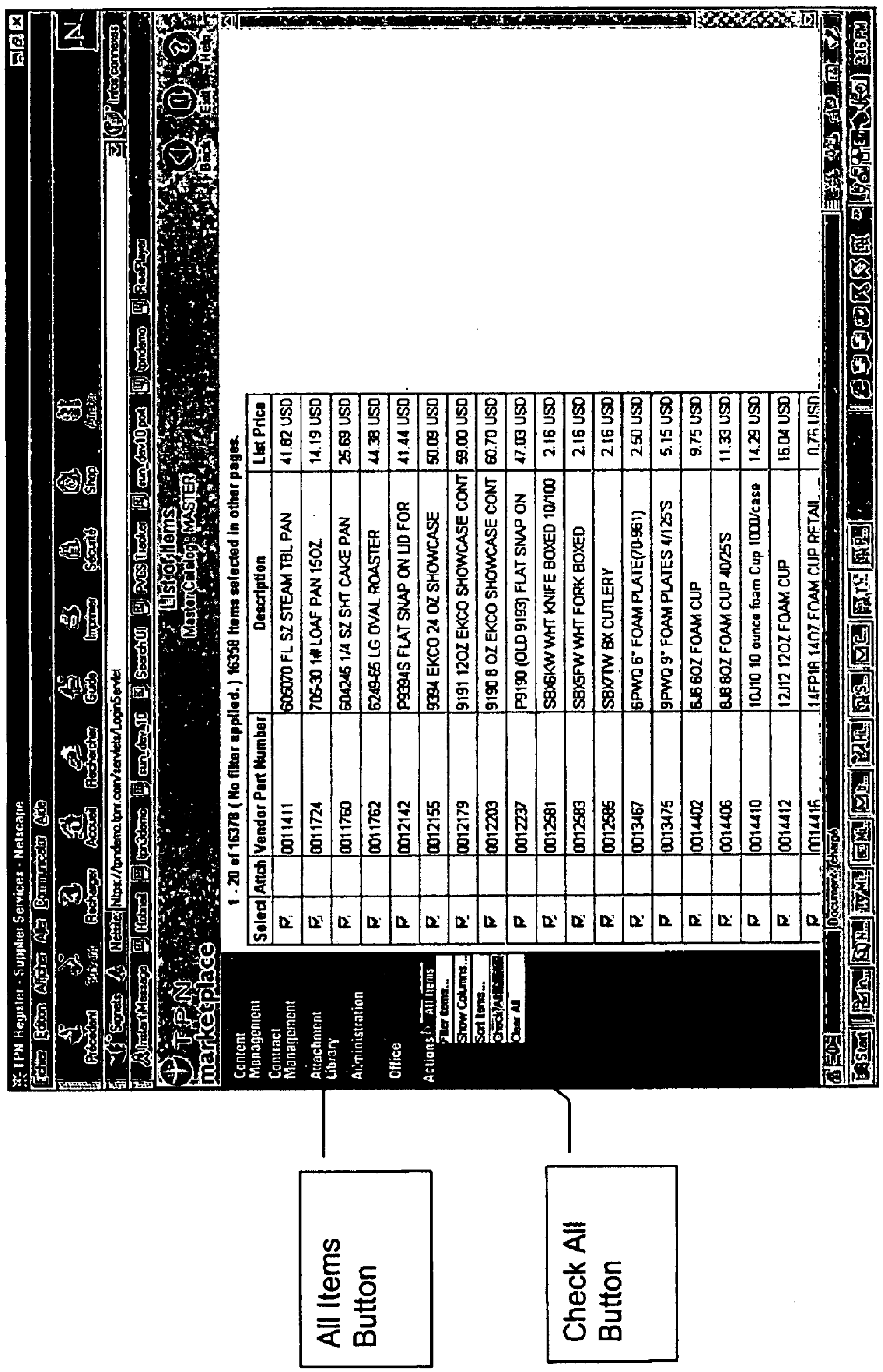
Figure 6P:
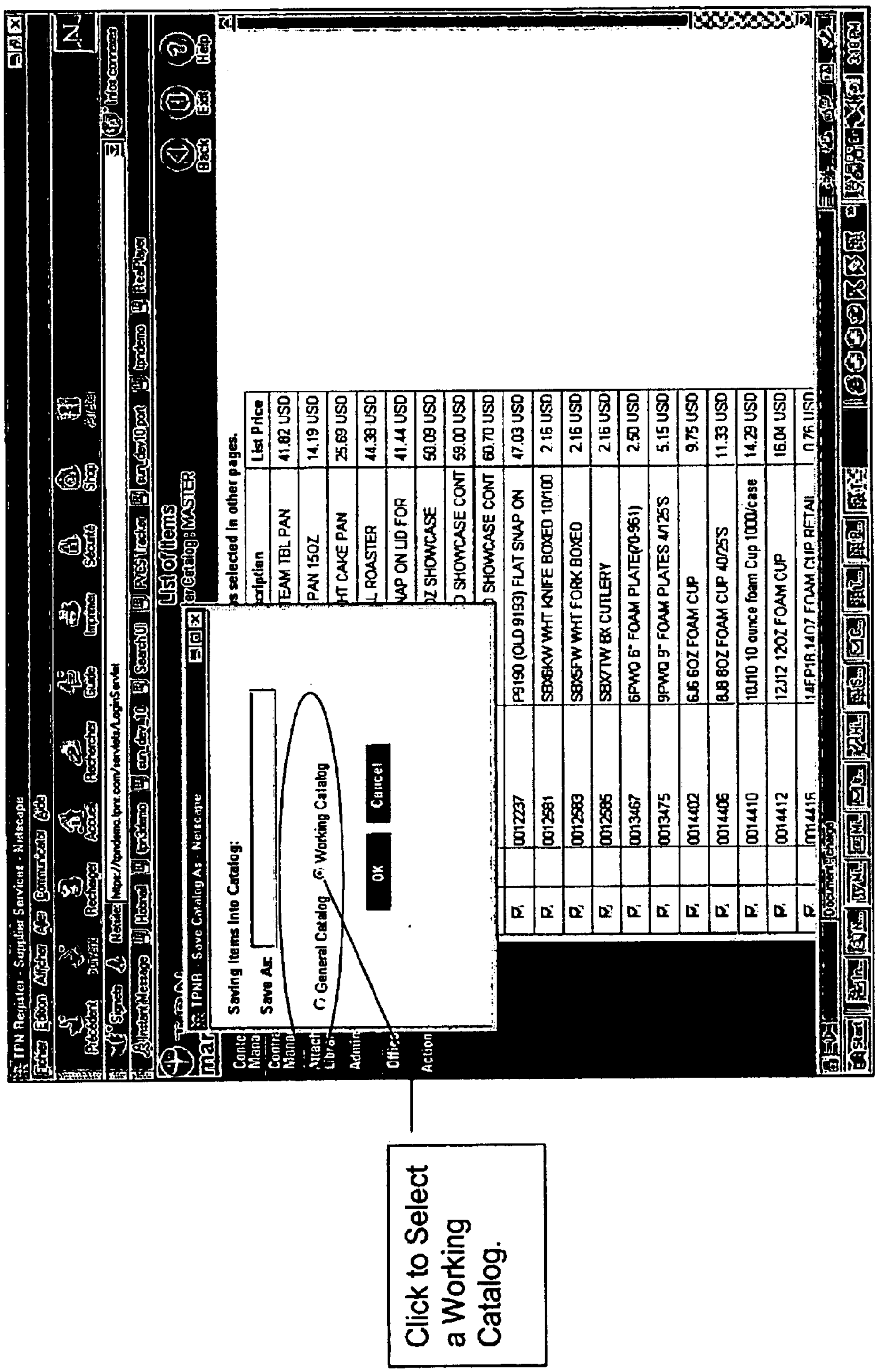
Figure 6Q:
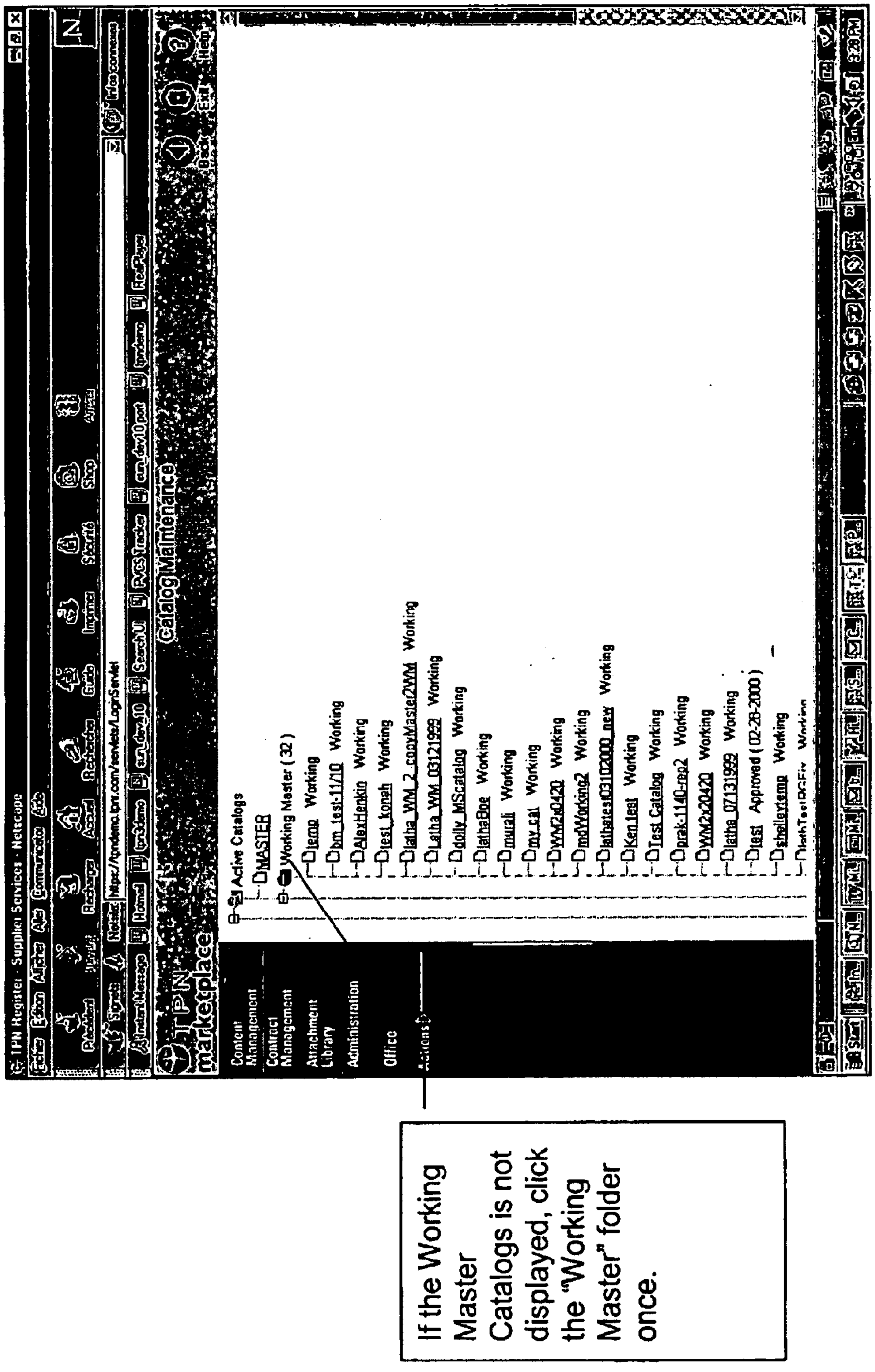
Figure 6R:
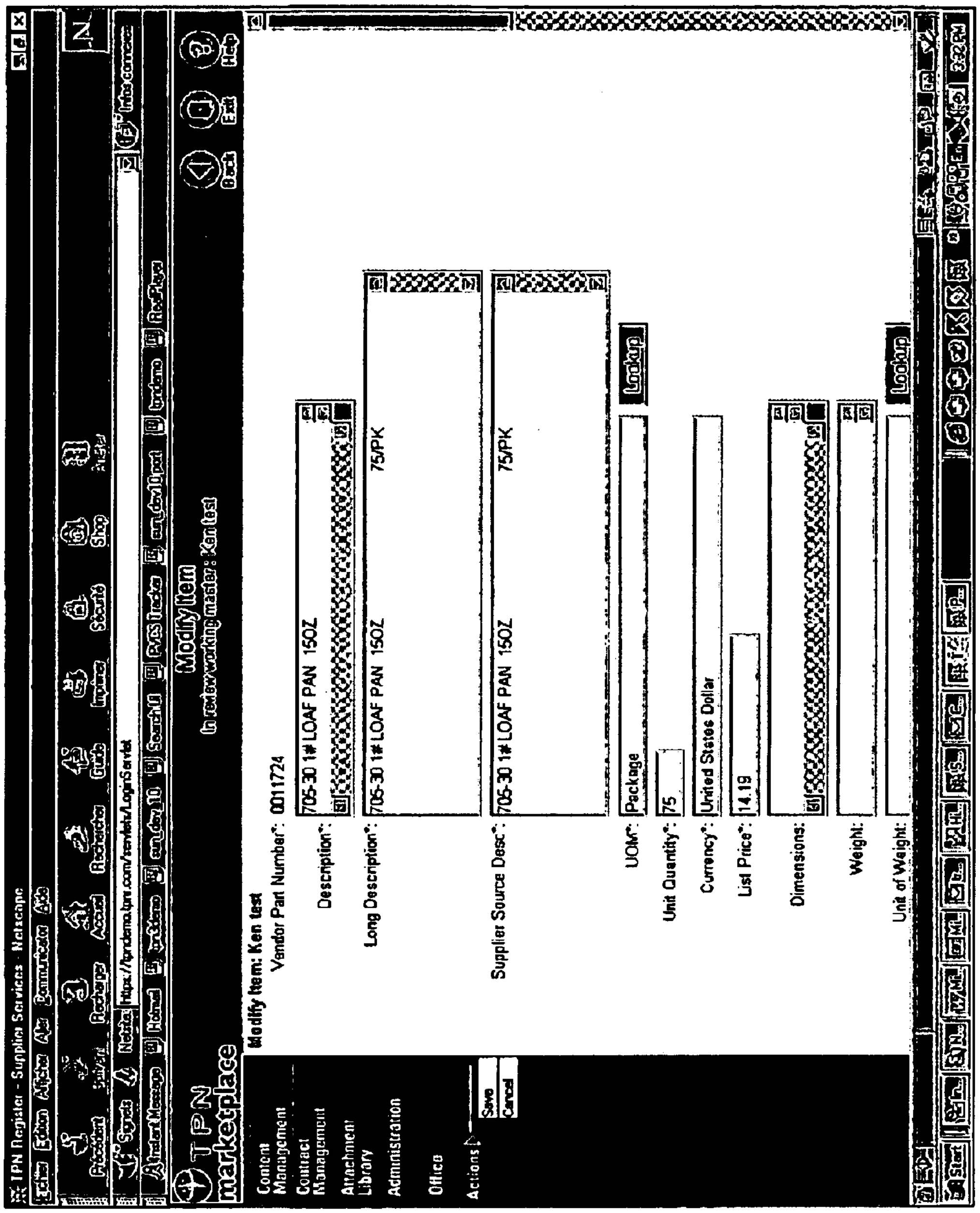
Figure 6S:
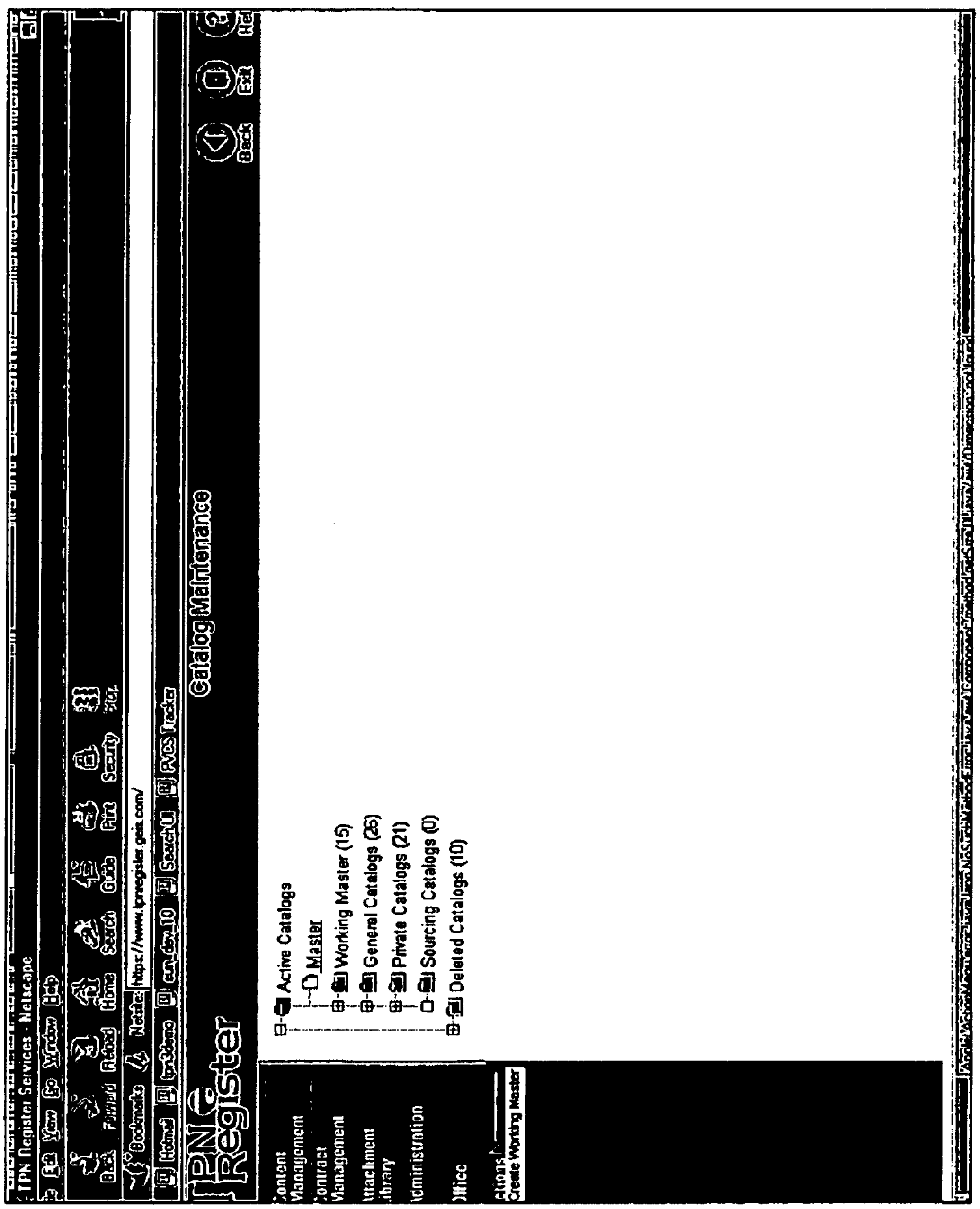

After logging into the system 10, the supplier content manager can use a plurality of interfaces provided by the content management application 18 including: (a) an office page interface as illustrated in FIG. 6A that enables the suppliers to view messages from the system implementor or buyer administrators, view messages from the system and perform any task within the system including content management functions, contract creation functions, attachment functions and administrative functions; (b) a load review-select a catalog interface as illustrated in FIG. 6B which enables a supplier to access product files including recently loaded or transformed product files, to review and update the data as well as to see the status of content in transformation; (c) a load review-viewing items interface as illustrated in FIG. 6C which enables the supplier to view the categories in which the items from a catalog file are placed, view the item, find a category (i.e., folder), approve, reject or delete the catalog, and view notes from the catalog; (d) a load review-add or remove data files interface as illustrated in FIG. 6D which enables the supplier to view and modify items; (e) a load review-select attributes to display interface as illustrated in FIG. 6E which enables the supplier to view the available data fields or attributes in the "all attributes" section and to add as many of the available attributes to the display screen as they choose; (f) a load review-filtering items interface as illustrated in FIG. 6F which enables the supplier to locate particular items using specific attributes; (g) a load review-select items to modify interface as illustrated in FIG. 6G which enables the supplier to modify items prior to approving the catalog; (h) a load review-modifying items interface as illustrated in FIG. 6H which enables the supplier to update item information; (i) a load review-select unit of weight or measure as illustrated in FIG. 61 which enables the supplier to choose a value for an item from a list of valid values; (j) a load review-select TR heading interface as illustrated in FIG. 6J which enables the supplier to select a THOMAS REGISTER® heading or category pop-up box to select a relevant category for the supplier's product; (k) a load review-approve the catalog interface as illustrated in FIG. 6K which enables the supplier to approve the entire catalog and denote when the approval is effective; (l) a load review-approving approving the catalog interface as illustrated in FIG. 6L which designates that the catalog is approved; (m) a working master creation interface as illustrated in FIG. 6M which enables the supplier to change product descriptions, attributes or list price; (n) a master-select select items interface as illustrated in FIG. 6N which enables the supplier to select the folders to view items for inclusion in the working master catalog; (O) a master-select items interface as illustrated in FIG. 6O which enables the supplier to select specific items and include them in the working master catalog 40; (p) a working master-naming naming interface as illustrated in FIG. 6P which enables the supplier to name the working master catalog 40; (q) a working master-access and view and update items interface as illustrated in FIG. 6Q which enables the supplier to access the working master catalog and make changes, which are reflected in the master catalog; (r) a working master-adding a new item to existing interface as illustrated in FIG. 6R which enables the supplier to add a new item to or modify an item in a master catalog by editing an existing working master catalog or creating a new working master catalog; and (s) a working master-adding adding only one item interface as illustrated in FIG. 6S which enables the supplier to create a new working master with only one item.

Figure 7A:
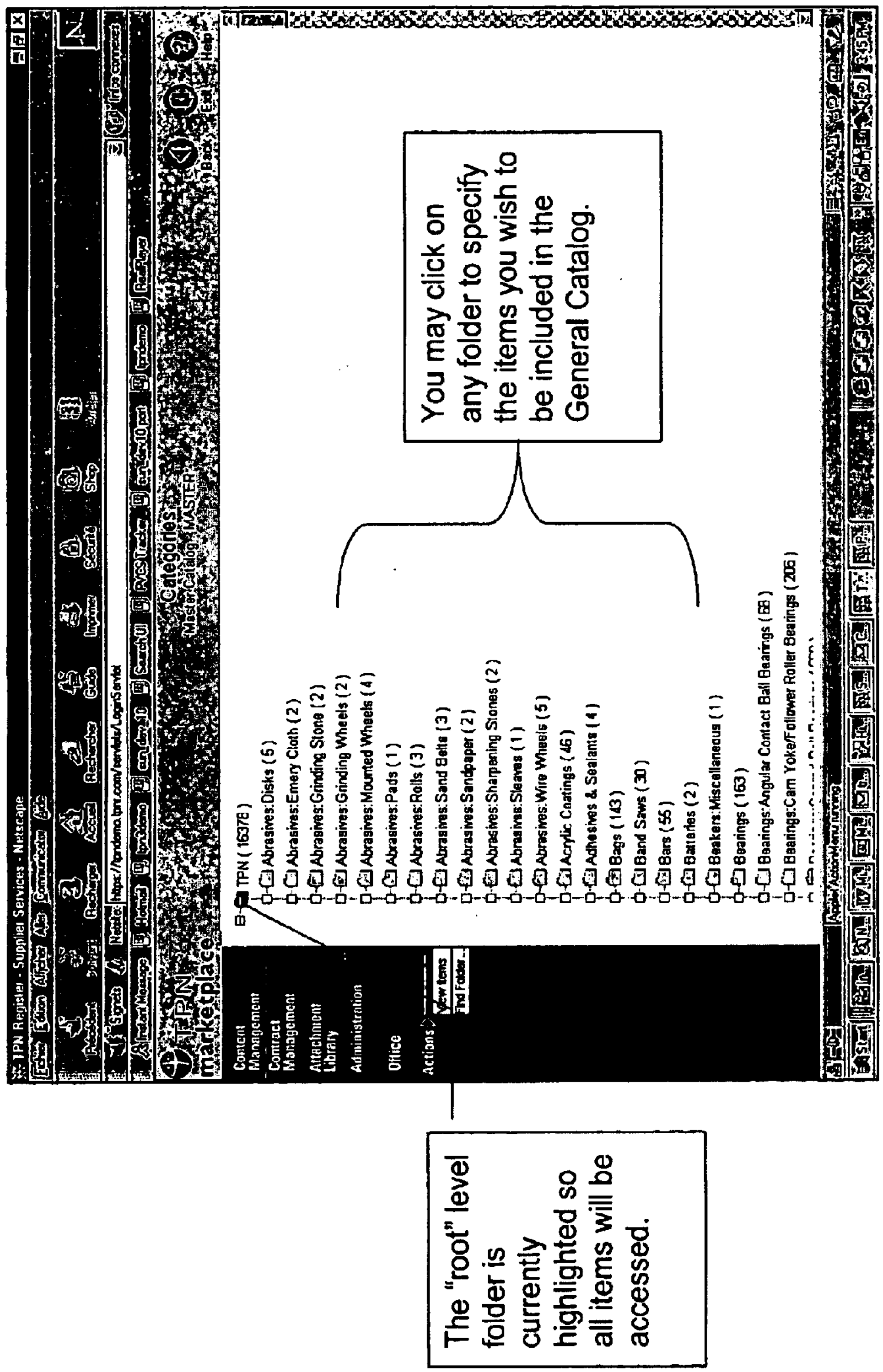
FIGS. 7A through 7C are illustrations of the general catalog creation interfaces of one embodiment of the electronic marketplace of the present invention.
Figure 7B:
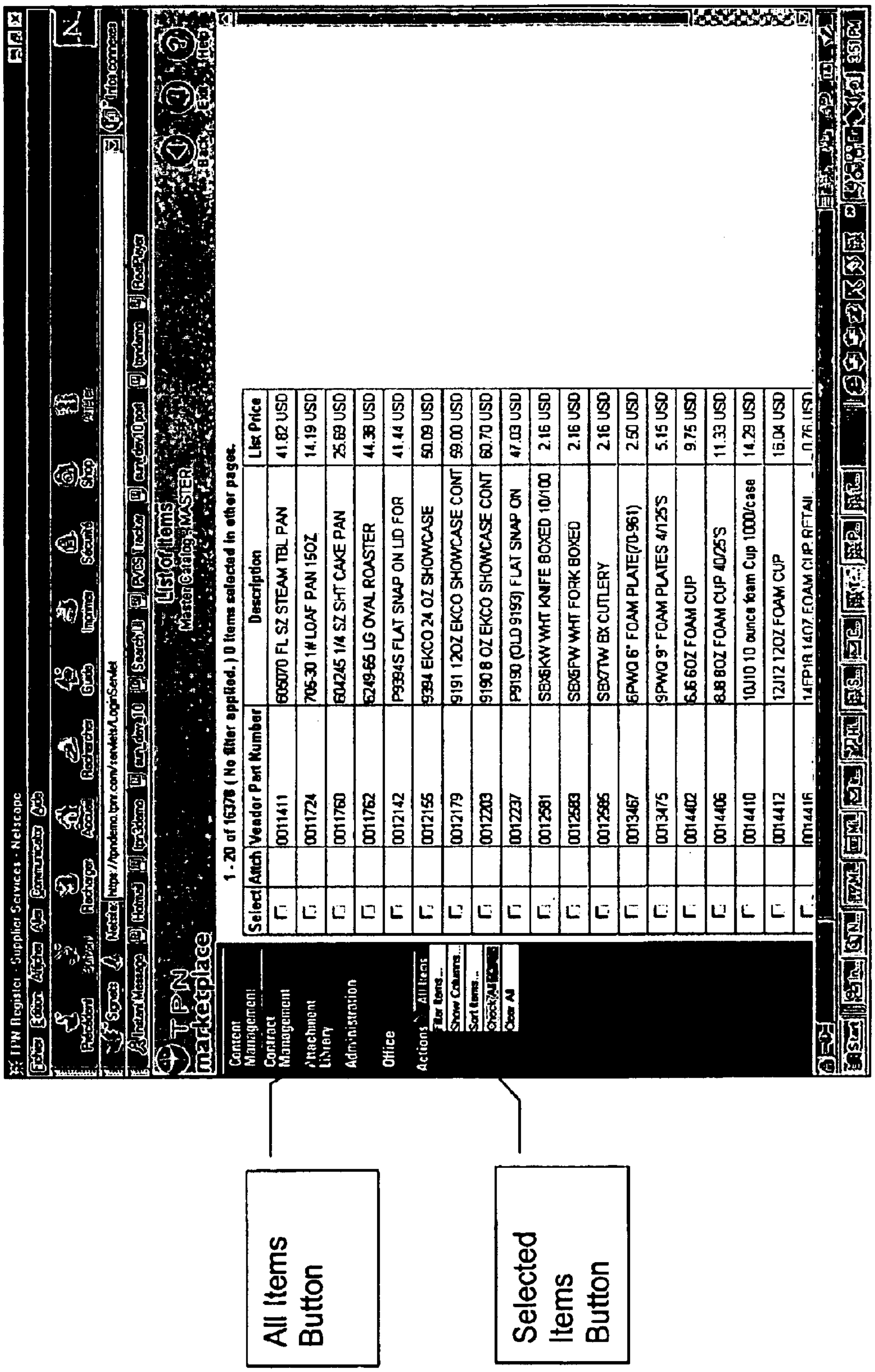
Figure 7C:
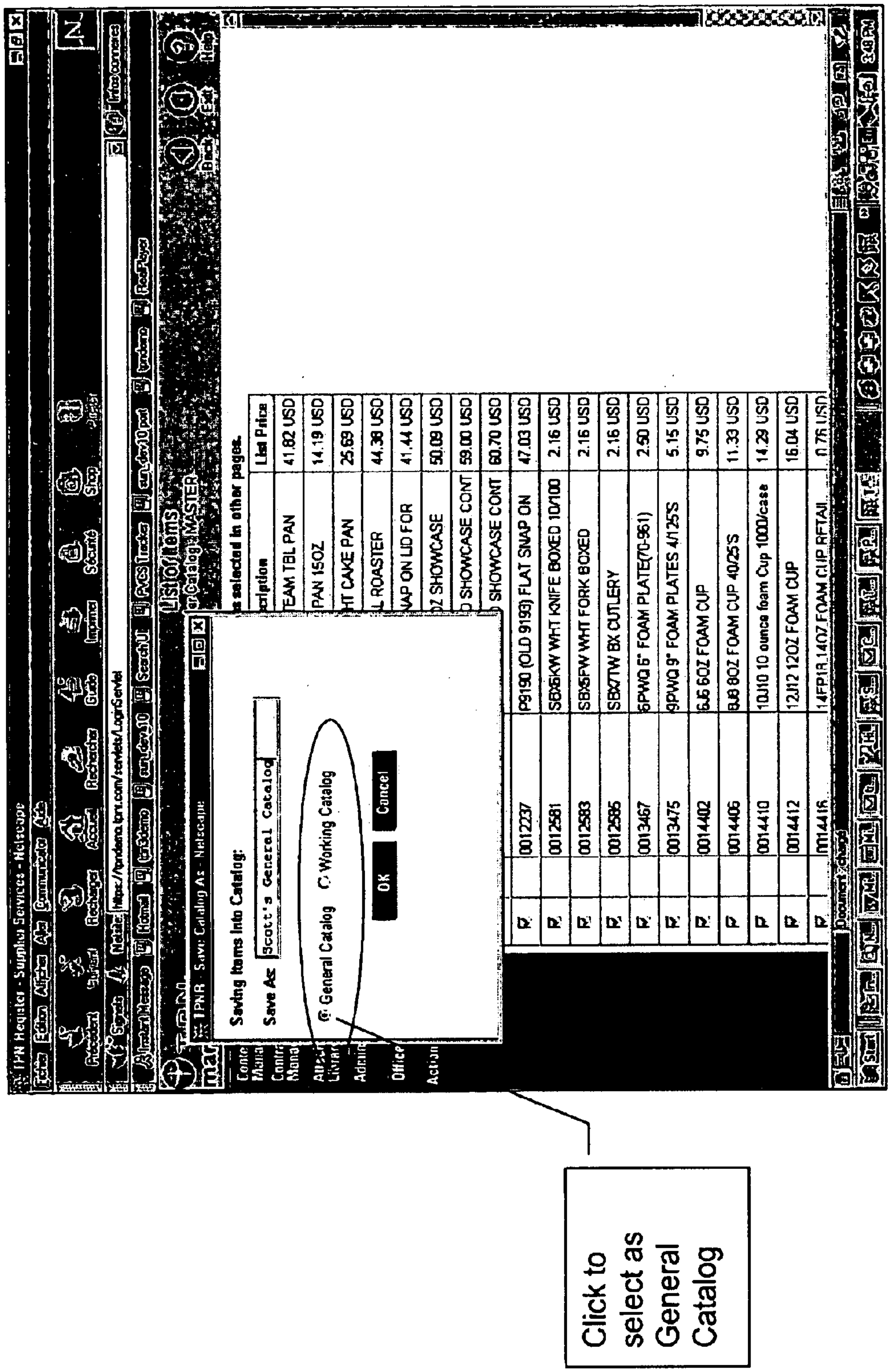

The content management application 18 also provides a plurality of interfaces which enable the supplier's contract manager to create general catalogs for buyers and specifically general catalogs for contracts with specific buyers. The system provides: (a) a general catalog-select items interface as illustrated in FIG. 7A which enables the supplier contract manager to select items for inclusion in the general catalog; (b) a general catalog-select items interface as illustrated in FIG. 7B which enables the supplier to include the selected items in the general catalog; and (c) a general catalog-naming interface as illustrated in FIG. 7C which enables the supplier to name the general catalog.

Supplier and Buyer Contract Formation

Figure 8:
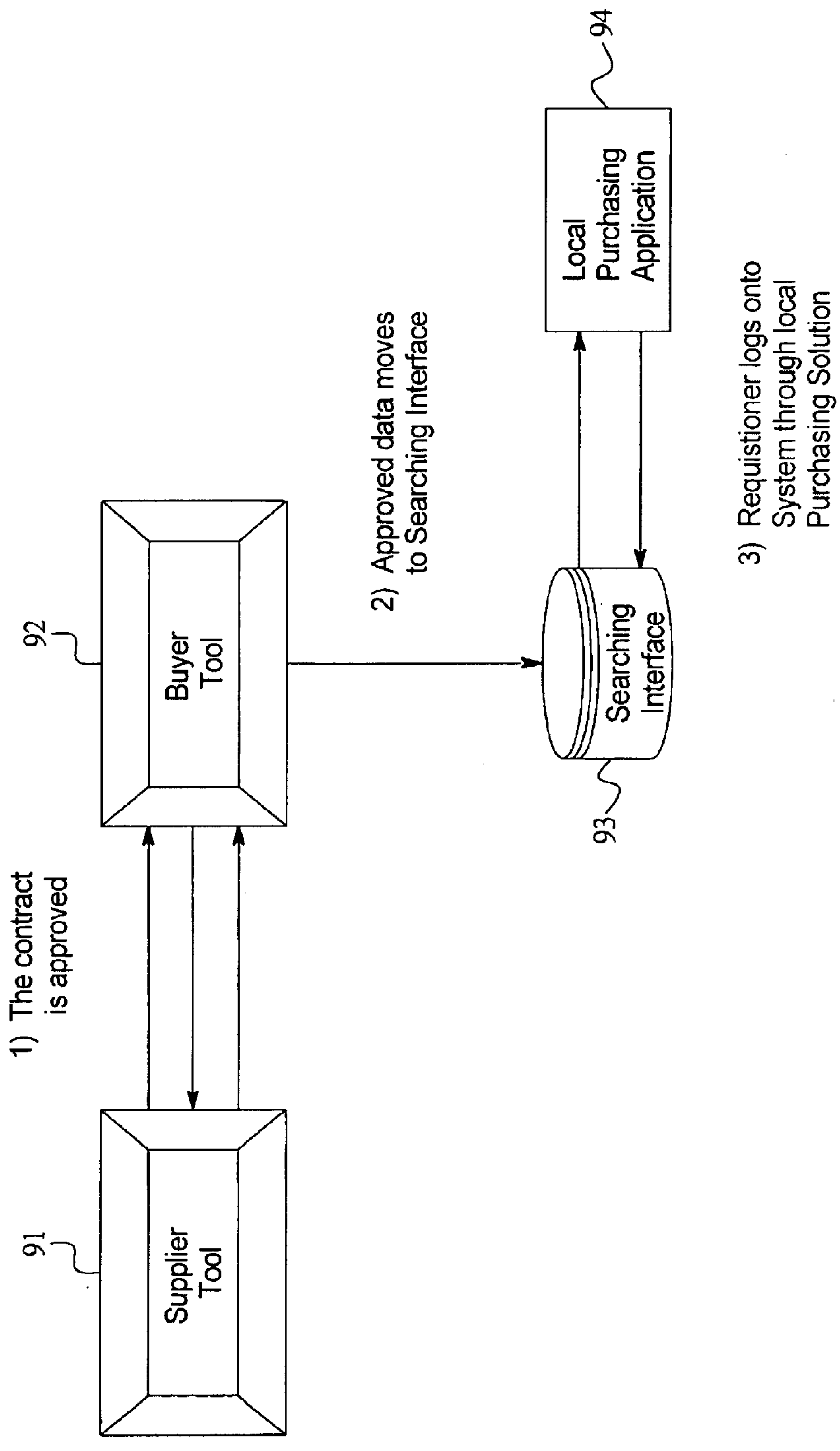
FIG. 8 is a schematic diagram of the contract and the on-contract sourcing processes of one embodiment of the electronic marketplace of the present invention.
Figure 9:
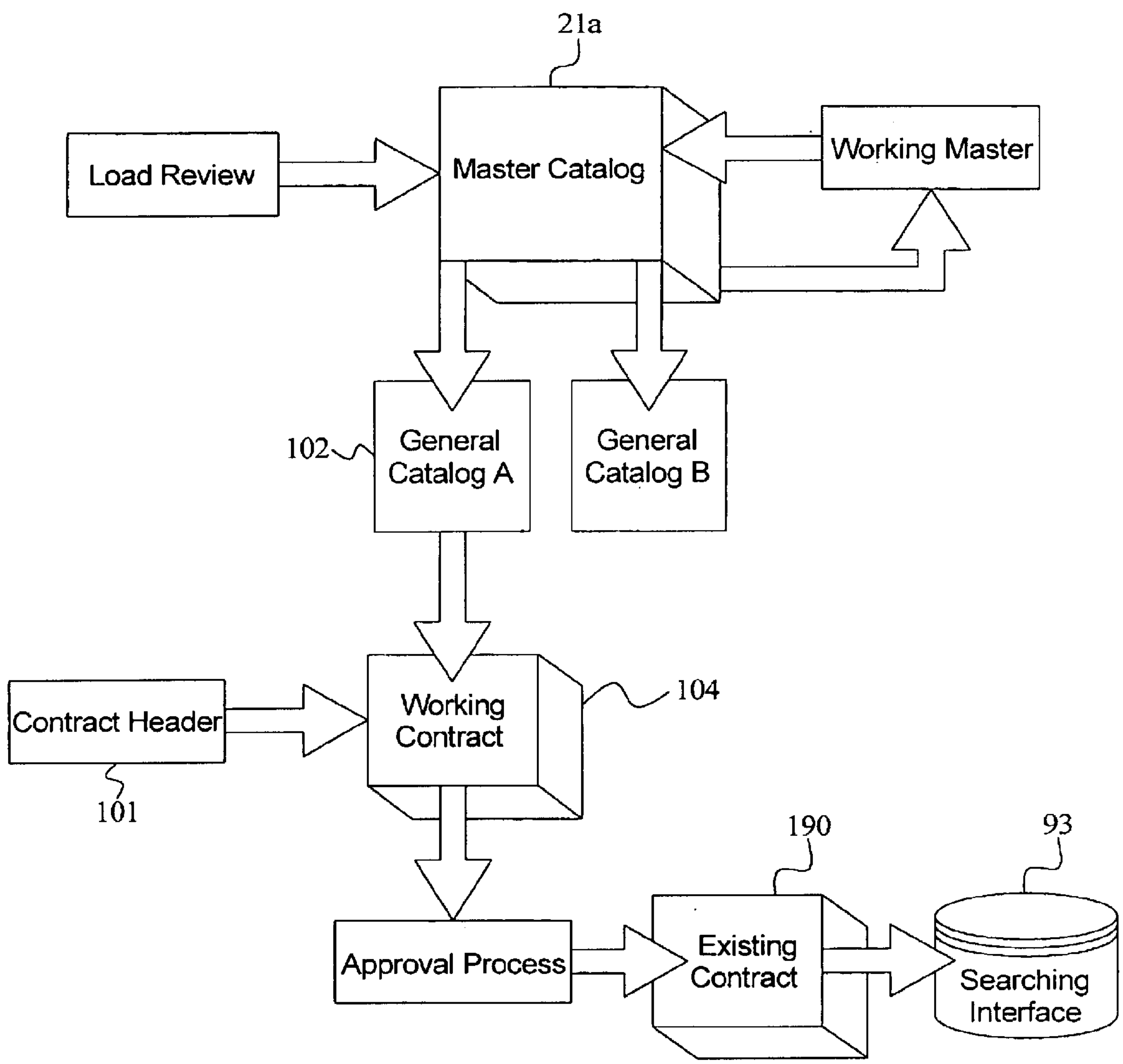
FIG. 9 is a flow diagram of the supplier and buyer contract and private catalog creation processes of one embodiment of the electronic marketplace of the present invention.
Figure 10:
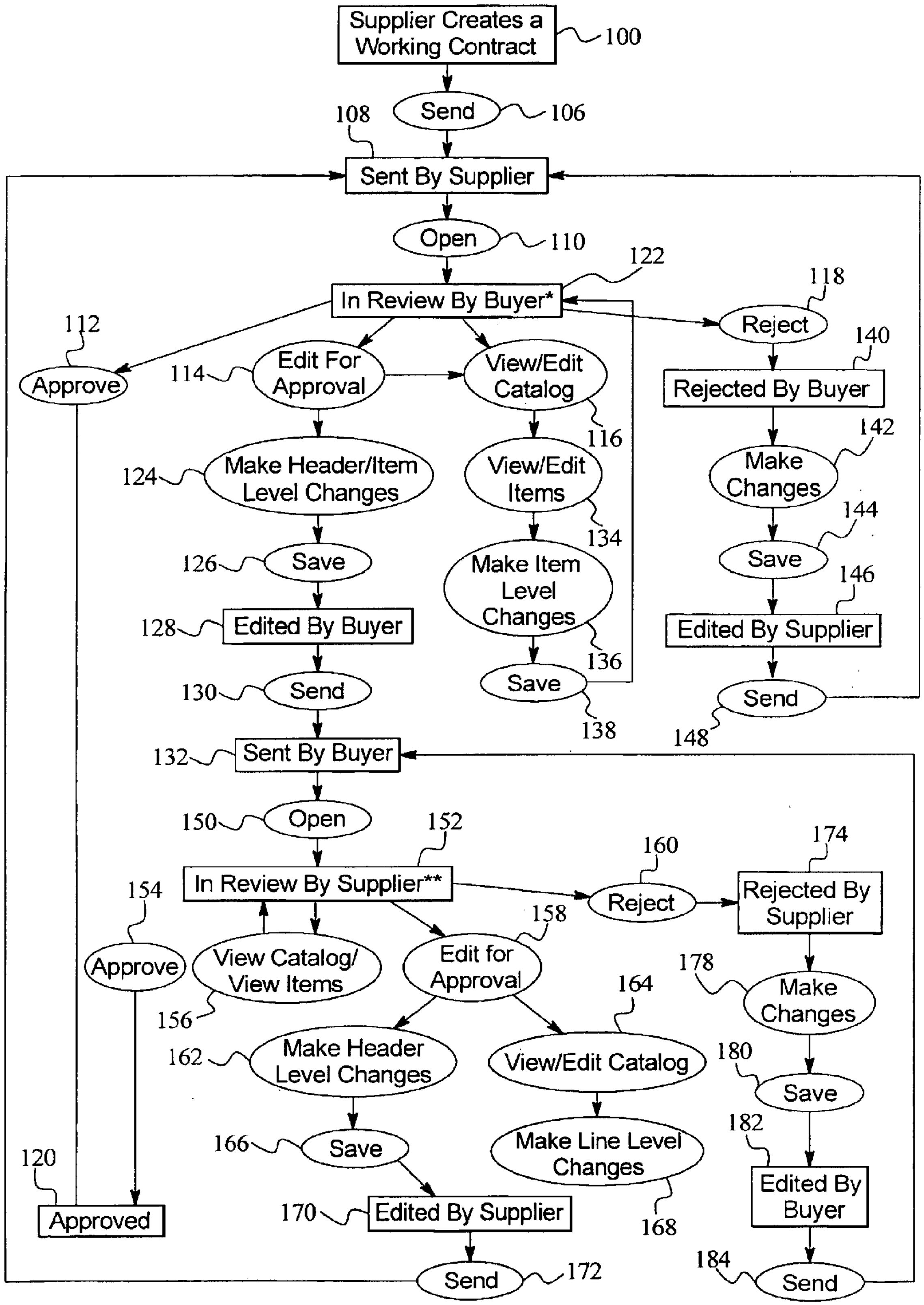
FIG. 10 is a flow diagram of the contract creation process of one embodiment of the electronic marketplace of the present invention.

Referring now to FIGS. 8, 9 and 10, the system 10 generally provides a supplier on-line contract tool 91 and a buyer on-line contract tool 92 which enable participating suppliers and buyers to negotiate and enter into contracts. Generally, the supplier on-line 91 contract tool enables the supplier to prepare a contract, attach a general catalog which includes products that the buyer may purchase under the contract, send the contract to the buyer for approval, and review a contract revised which is sent or returned by a buyer. Generally, the buyer on-line contract tool 92 enables the buyer to create a contract, review a contract provided by the supplier, approve the contract, edit the contract and send the approved or edited contract back to the supplier.

After the buyer approves the contract, the system 10 provides an on-contract searching interface 93 which enables the requisitioners of the buyers to access the products in the contract under contract between the supplier and buyer. The buyer's requisitioners access the on-contract searching interface through the buyer's procurement application or local purchasing solution 94. The buyer's requisitioners may use the on-contract searching interface 93 provided by the system to search, compare and purchase products. As discussed in detail below, the items available to each requisitioner may be selected by the buyer's administrator or contract administrator.

As further illustrated in FIGS. 9 and 10, to form and enter into a contact with a buyer, the supplier contract manager creates a working contract, as indicated in block 100. The supplier contract manager creates the contract having certain terms, an attached general catalog and an attachment having general contract terms and conditions. To select the products, the supplier contract manager creates a general catalog 102 (with a particular buyer in mind) from the master catalog 21*a* of the supplier which generally includes all the suppliers' products at list price in the supplier's base currency. For example, the master catalog 21*a* may include all 10,000 items offered by the supplier, but the supplier may only include 2,500 items that the supplier knows are of interest to the buyer in the general catalog 102. The general catalog 102 of 2,500 items is thus a subset or sub-catalog of the master catalog 21*a*. When the supplier selects the items from the master catalog 21*a* that it wants to appear in the contract with the buyer, the system copies these items into general catalog 102. It should be appreciated that each product in the general catalog includes a base price which is preferably defaulted to the list price in the master catalog 21*a* unless the supplier changes the price. It should be appreciated that the supplier could create a plurality of general catalogs for the same or multiple buyers as illustrated in FIG. 9.

The supplier contract manager then creates a contract header which includes the start and end dates of the contract, relevant information and contract terms and conditions (preferably as an attachment to the contract). The supplier attaches the general catalog 102 to the contract header 101 which becomes a working contract 104. It should be appreciated that more than one general catalog can be attached to the same contract header. After the supplier saves the working contract 104, the supplier sends the contract to the buyer for approval as indicated by oval 106 in FIG. 10 and the contract is designated "sent by supplier" as indicated by block 108. After the contract is sent by supplier, the contract management application 22 prohibits the supplier from making any changes to the contract.

The buyer opens the contract as indicated by oval 110. The buyer can approve the contract as indicated by oval 112, edit it for approval as indicated by oval 114, view and edit the catalog as indicated by oval 116 or reject the contract as indicated by oval 118. If the buyer approves the contract without making any changes as indicated by oval 112, the contract management application 22 changes the contract status to "approved" as indicated by block 120. If the buyer changes the contract, the system changes the contract status to "in review by buyer" as indicated by block 122.

The contract management application 22 enables the buyer to make header and item level changes and save the changes as indicated by blocks 124 and 126. The contract is then designated "edited by buyer" as indicated by block 128 and sent to the supplier where it is designated sent by buyer as indicated by oval 130. After the buyer sends the contract to the supplier, the system changes the status of the contract to "sent by buyer" as indicated by block 132.

The buyer 14 can also view or edit the catalog or the items (making line level rejections and suggesting changes) as indicated by ovals 116, 134 and 136. The buyer saves the suggested contract changes as indicated by oval 138. This enables the buyer's contract manager to request a change of the products appearing in a particular catalog. The contract management application also enables the buyer to reject the products as a whole or reject products on a line by line basis (such as rejecting based on price). The contract management application further enables the buyer to input comments regarding the reasons the buyer rejected or made line item changes on a line by line basis. The system preferably highlights all suggested changes to the contract and to the products to the supplier to easily enable the supplier contract manager to see the changes made by the buyer and also enables the supplier to send the comments associated with each rejected contract.

The buyer can also reject the contract and add comments to the rejected comments as indicated by oval 118, and the system designates the contract "rejected by buyer" as indicated by block 140. The system enables the buyer to change the contract as indicated by oval 142. When the buyer saves the suggested changes as indicated by oval 144, the system designates the contract "edited by supplier" as indicated by block 146 and the supplier sends it to the buyer for approval, rejection or editing as indicated by oval 148, wherein the above-described loop is repeated beginning at block 108.

The supplier receives and opens the contract as edited by buyer in block 128 indicated by oval 150, designating the contract "in review by supplier" as indicated by block 152. The supplier can approve the contract with the suggested changes as a whole as indicated by oval 154, view the catalog or view items as indicated by oval 156, edit the contract for approval as indicated by oval 158 or reject it as indicated by oval 160. If the supplier approves the contract, it is available in the system and the system changes the contract status to "approved" as indicated by block 120. If the supplier changes the contract, the system changes the contract status to "in review by supplier" as indicated by block 152. In editing the contract for approval, the supplier can make header level changes or view or edit the catalog as indicated by ovals 162 and 164. In either case the supplier saves the changes as indicated by oval 166, and the system designates the contract "edited by supplier" as indicated by block 170 and the supplier sends it back to the buyer as indicated by oval 172, wherein the approval process described above is repeated. The supplier can also reject the contract as indicated by oval 160 whereupon the system designates the contract "rejected by supplier" as indicated by block 174. The system enables the buyer to make changes as indicated by oval 178, saves the changes as indicated by oval 180, designates the contract "edited by buyer" as indicated by block 182, and sends it to the supplier for approval, rejection or editing as indicated by oval 184, wherein the above-described loop beginning at block 132 is repeated.

The contract can only be approved when it is either "sent by supplier" or "sent by buyer." The contract management application highlights or displays the previous changes made by the buyer or supplier each time the contract is sent by the supplier or sent by the buyer except when the contract is first sent by the supplier to the buyer. If the buyer approves the contract, the contract status changes to "approved" and the contract moves to an existing folder on the contract databases. After a working contract is approved, the contract becomes an existing contract available to the searching interface 93. It should be appreciated that the supplier and buyer work together to determine what items will be included in the contract. It should be appreciated that the system will preferably not enable a supplier or buyer to change a price of a product under contract for the particular buyer without approval by the supplier and buyer.

The buyer's requisitioners use the searching interface 93 as described below to find items to add to their electronic shopping cart. The existing contract includes all of the items in all of the general catalogs attached to the contract. The items are visible to the designated requisitioners until the contract expires.

In one embodiment of the present invention, the contract management application 22 sends an e-mail notification to the appropriate party when the other party completes an action. More specifically, in this embodiment of the present invention, the contract management application sends a e-mail notification to a buyer when a supplier sends a contract to the buyer. The contract management application also sends an e-mail when a contract is rejected or approved by the buyer. Similarly, when the buyer sends a revised contract to the supplier, the contract management application sends an e-mail notification to the supplier.

The contract management application of the present invention preferably provides a plurality of additional features and options for both the buyer and suppliers. These features, functions and options include one or more of the following: (a) the application provides a warning message to buyers if they attempt to approve a contract with previously rejected line items; (b) the application enables a buyer to quickly scan a contract to determine if the supplier has edited previously rejected line items, and in particular the application provides a flag of modified items; (c) the application enables the buyer contract manager to reject a contract and provide notes in the field as to why the contract manager has rejected certain items, thereby making it possible for suppliers to review and edit a contract with rejected items and making it quicker for suppliers to find rejected items and return the contract to the buyer for reapproval; (d) the contract application enables the supplier or buyer to set a contract expiration date upon a return of an edited contract; and (e) the contract management application enables the buyer to self-approve contracts if the buyer only makes modifications to terms which only the buyer can modify.

The contract management application also enables the buyer to define contract header fields which include information relevant to buyers not captured in the other fields. The contract management application also enables the buyer to create buyer defined line item fields which provide item-level information relevant to buyers that are not captured in the other fields of the contract.

For instance, many buyers need the ability to track whether an item should be tracked as capital equipment for each item in the buyer master catalog. These user defined fields can be defined by each buyer company and can be populated with information specific to a particular buyer.

Supplier Contract Interfaces

Figure 11:
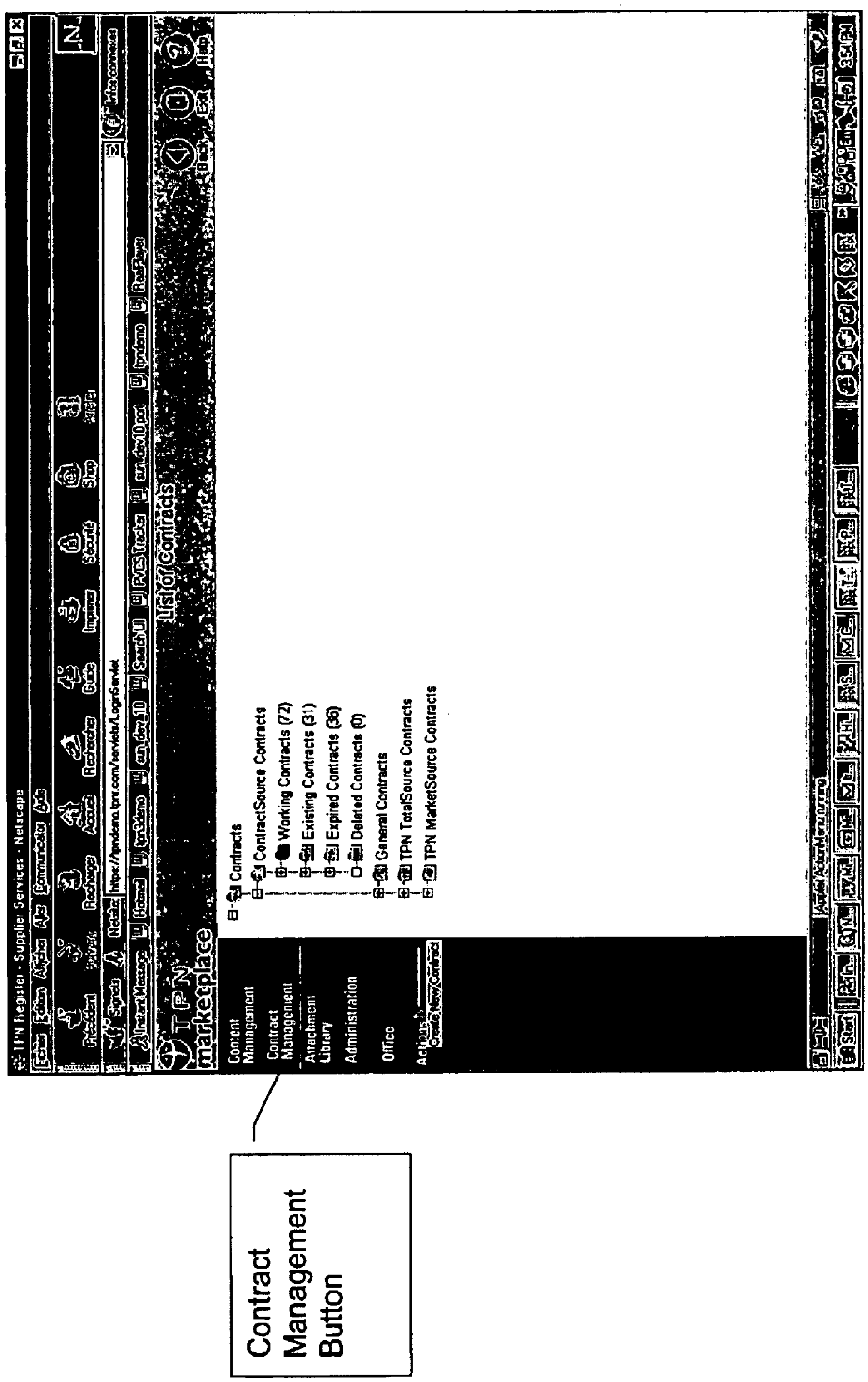
FIG. 11 is an illustration of the interface identifying the types of contracts of one embodiment of the electronic marketplace of the present invention.
Figure 11A:
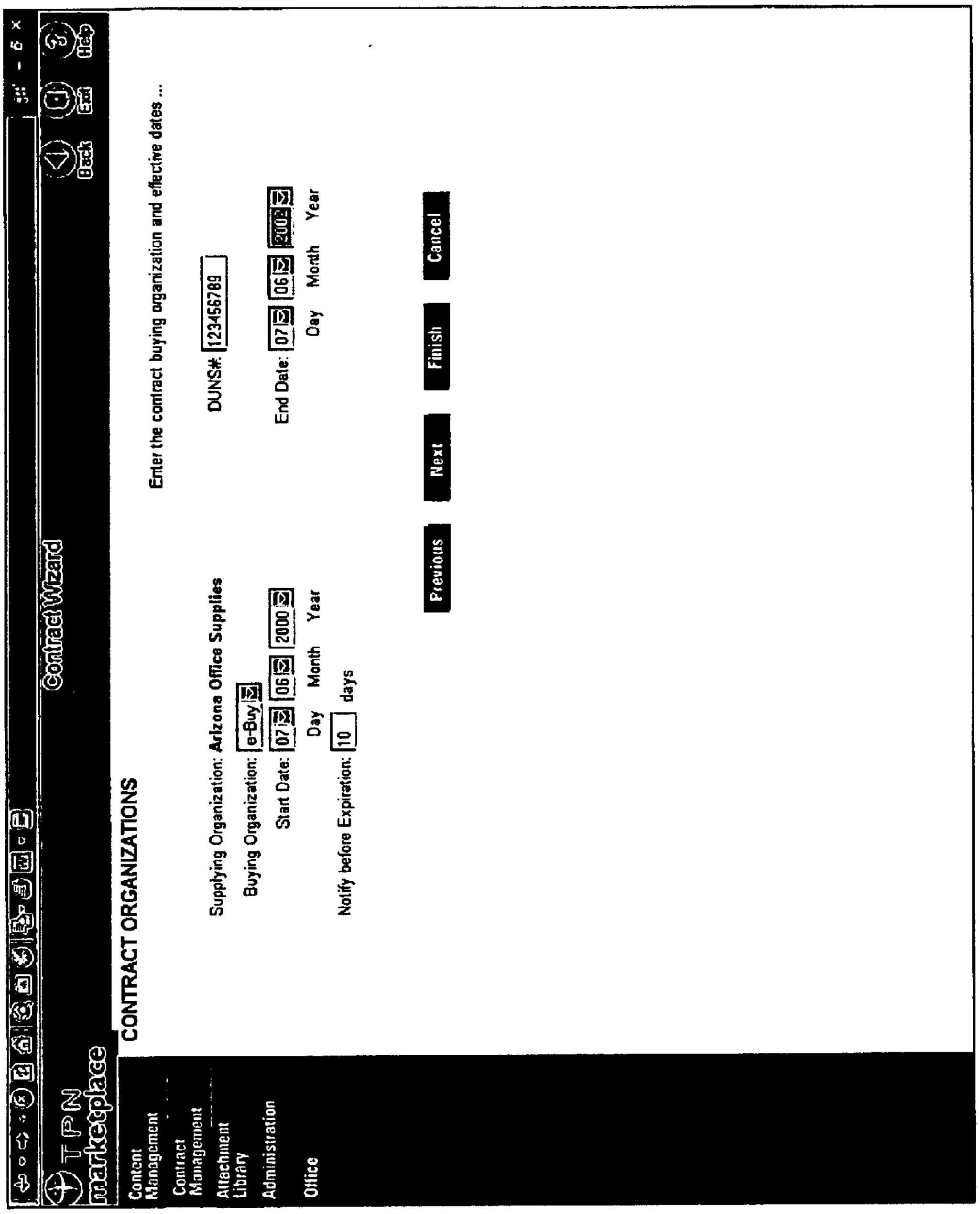
FIGS. 11A through 11Q are illustrations of the supplier contract tool interfaces of one embodiment of the electronic marketplace of the present invention.
Figure 11B:
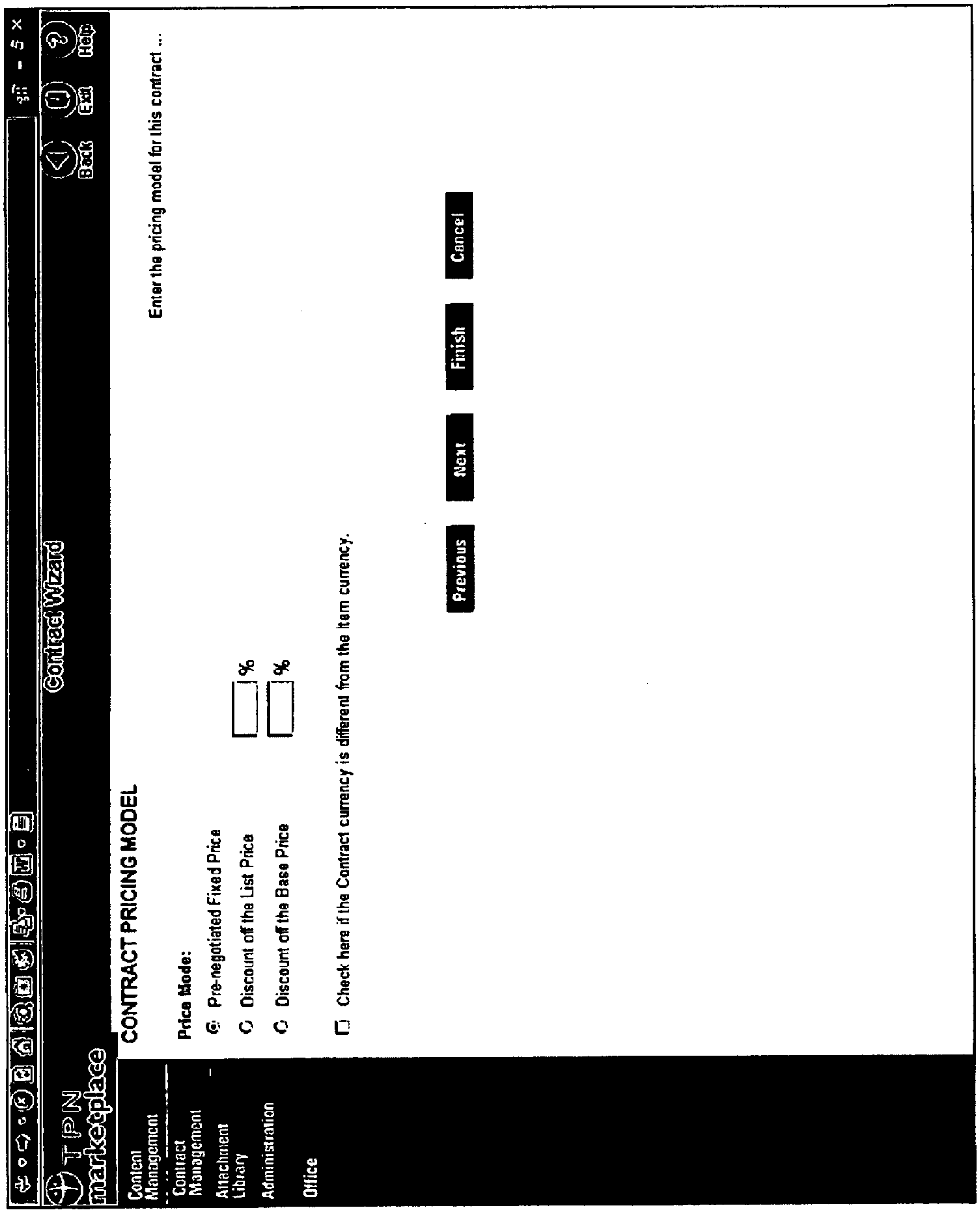
Figure 11C:
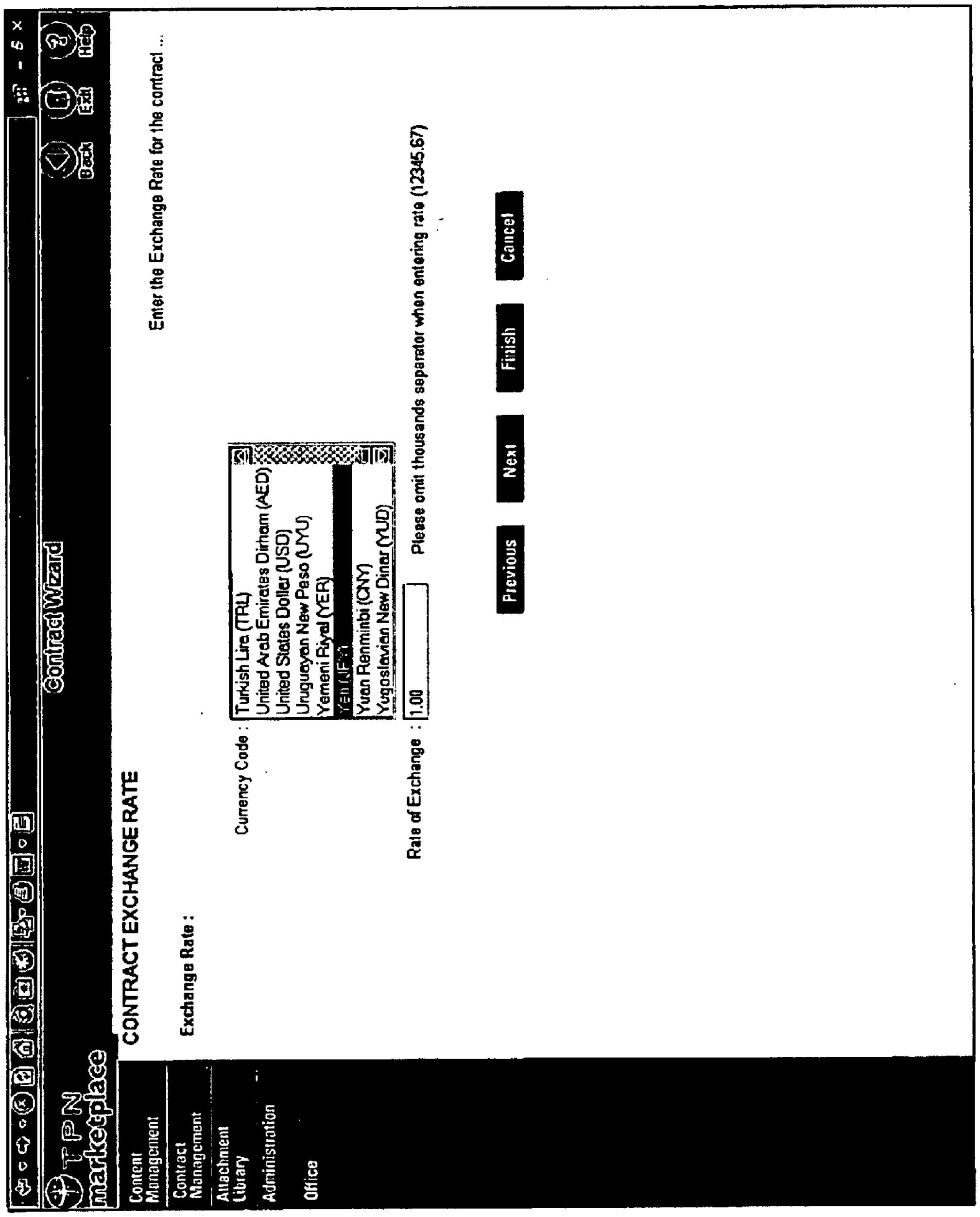
Figure 11D:
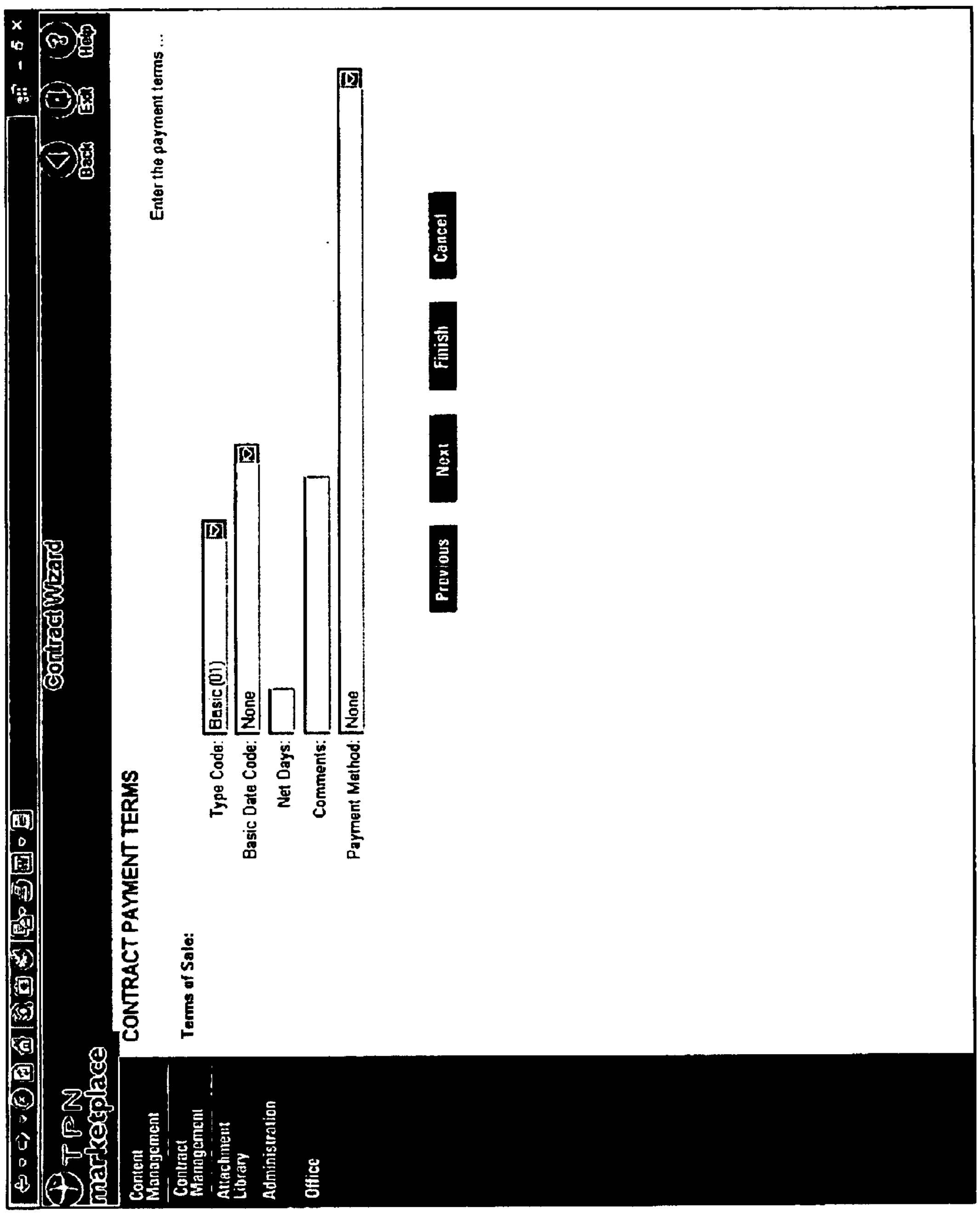
Figure 11E:
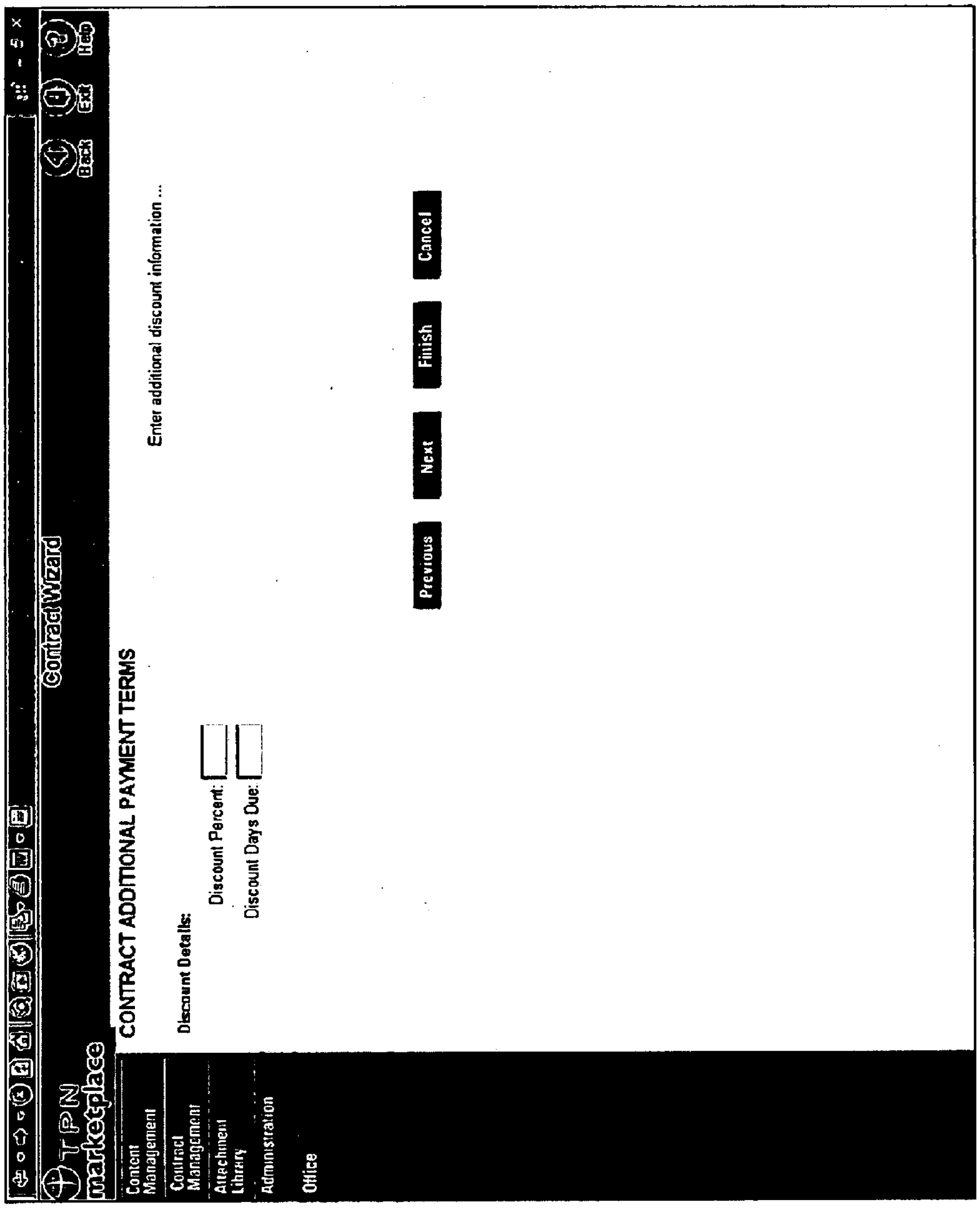
Figure 11F:
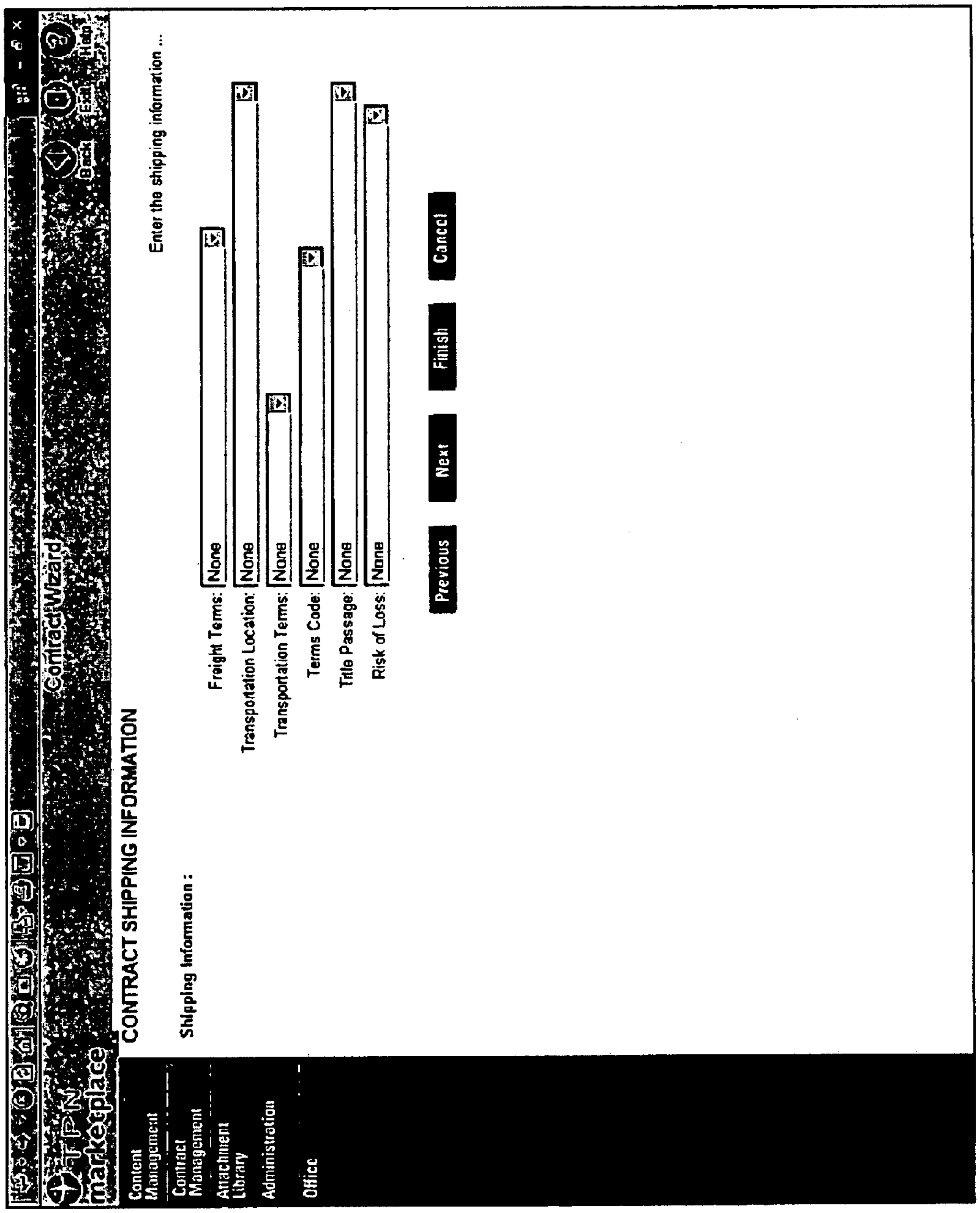
Figure 11G:
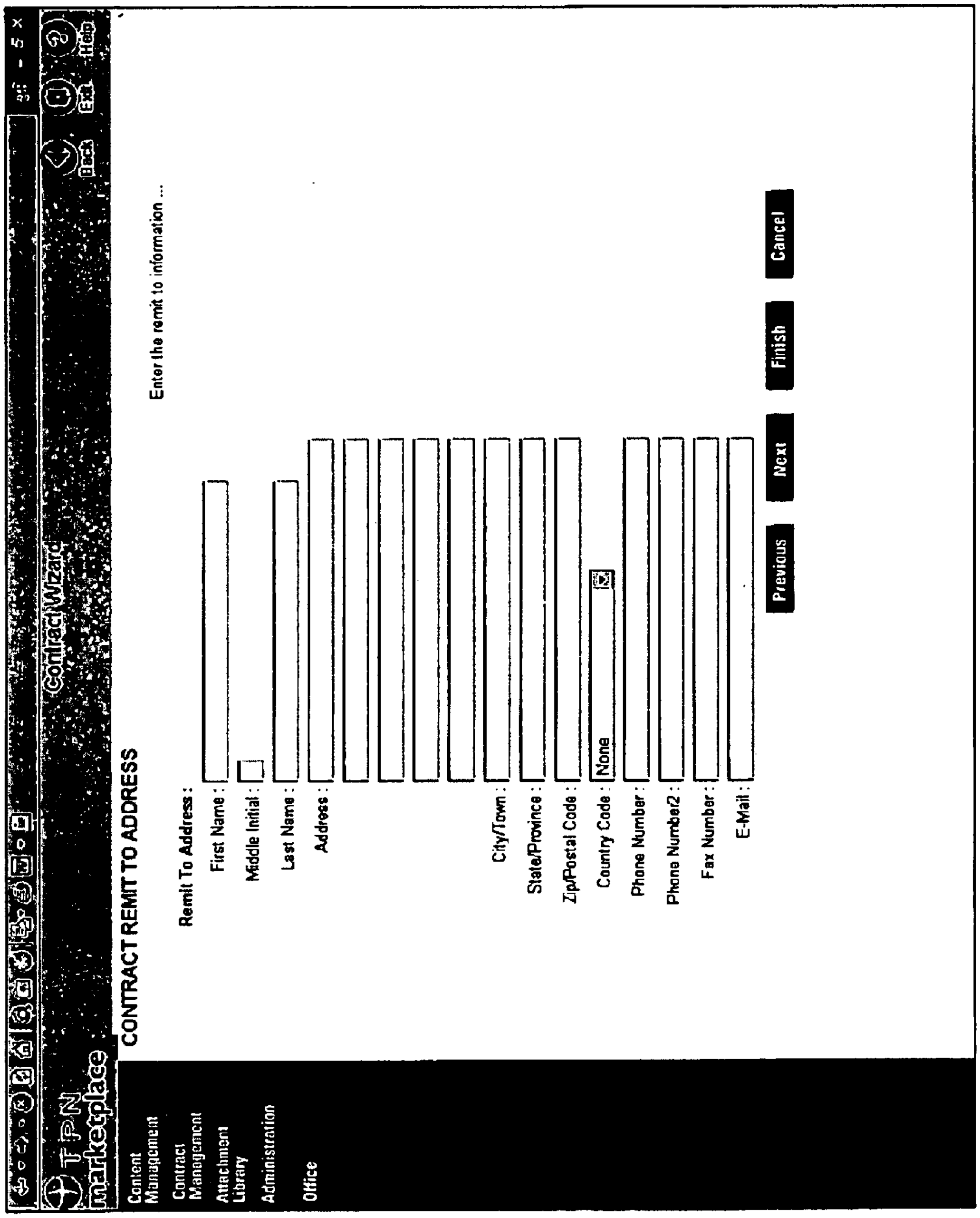
Figure 11H:
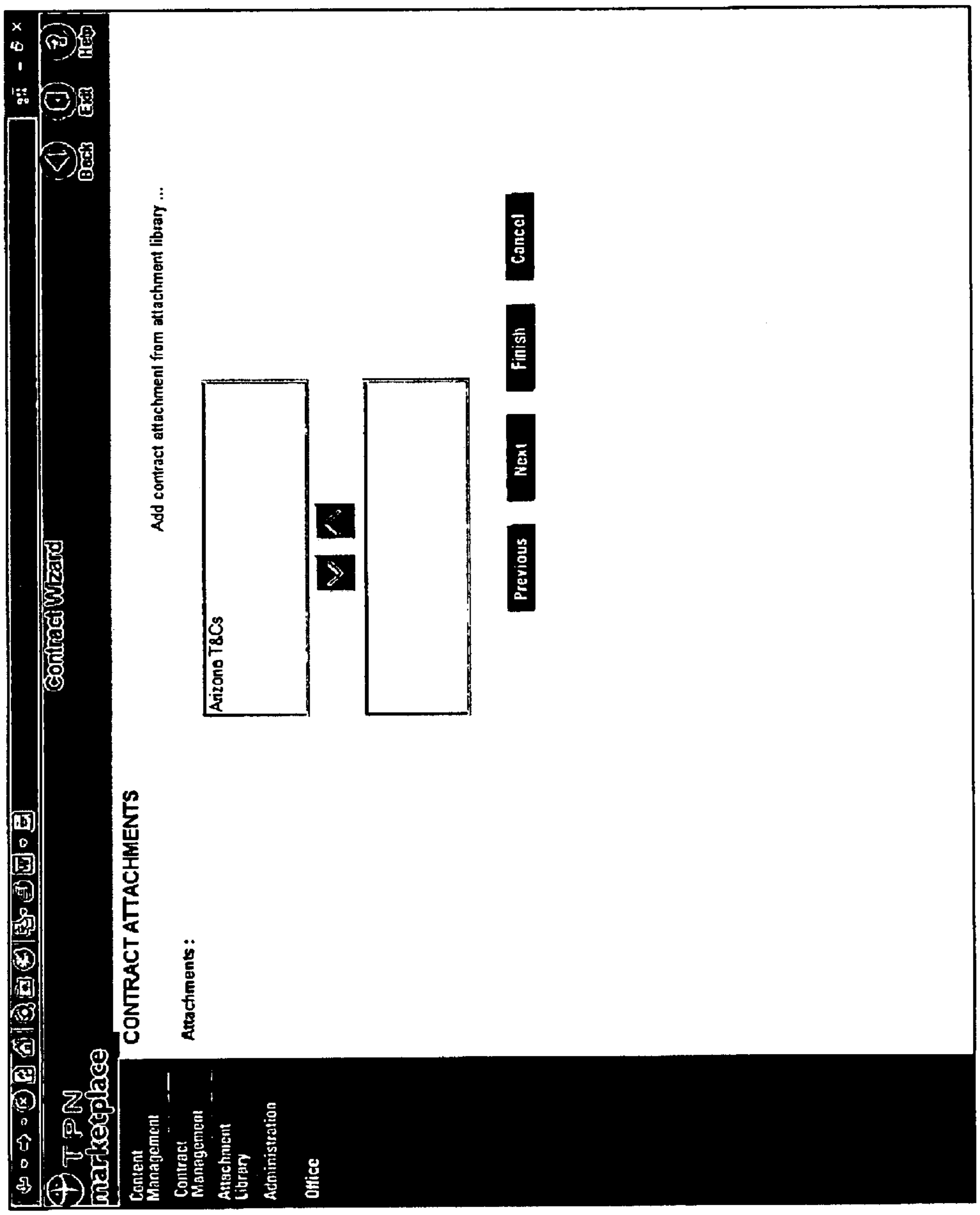
Figure 11I:
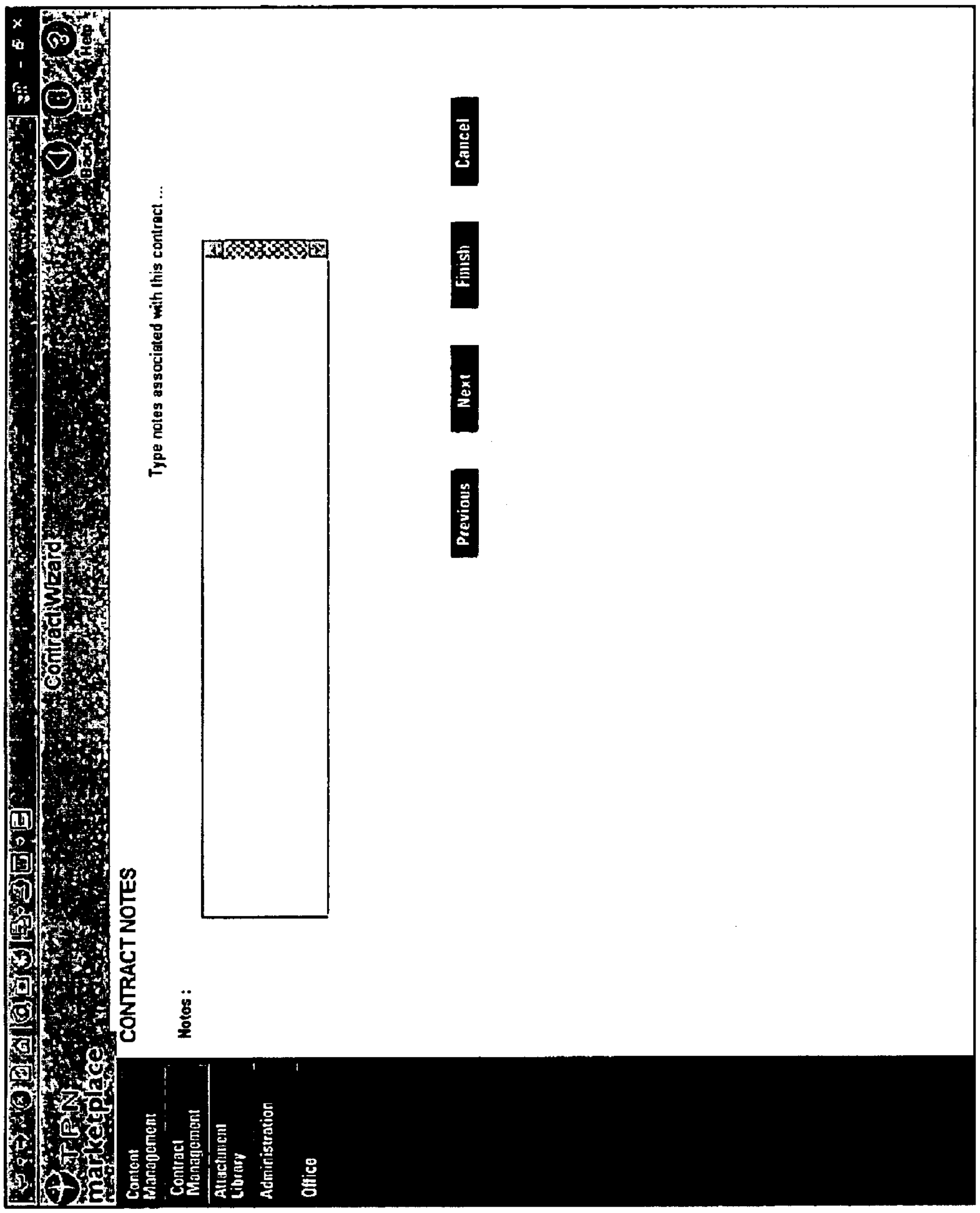
Figure 11J:
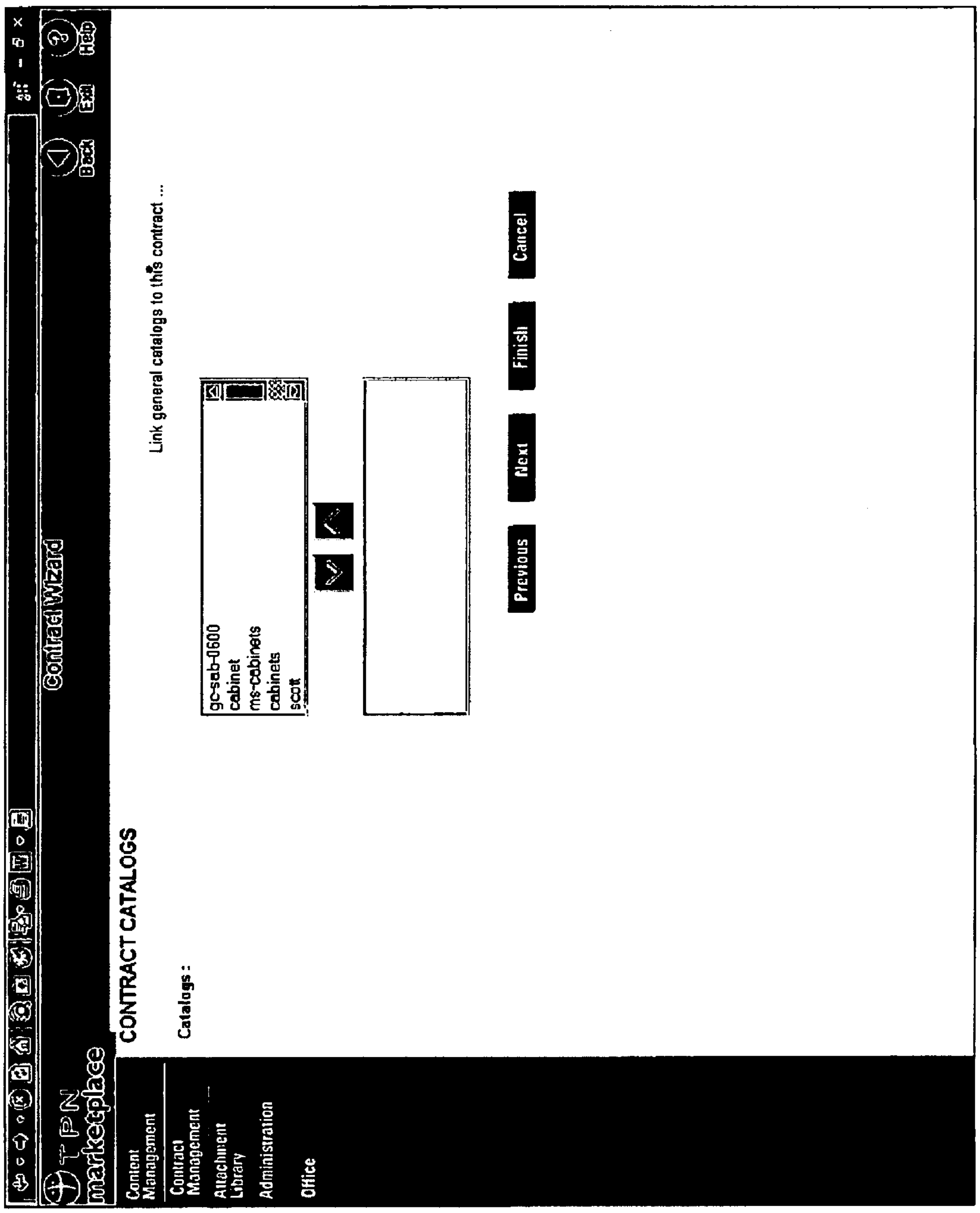
Figure 11K:
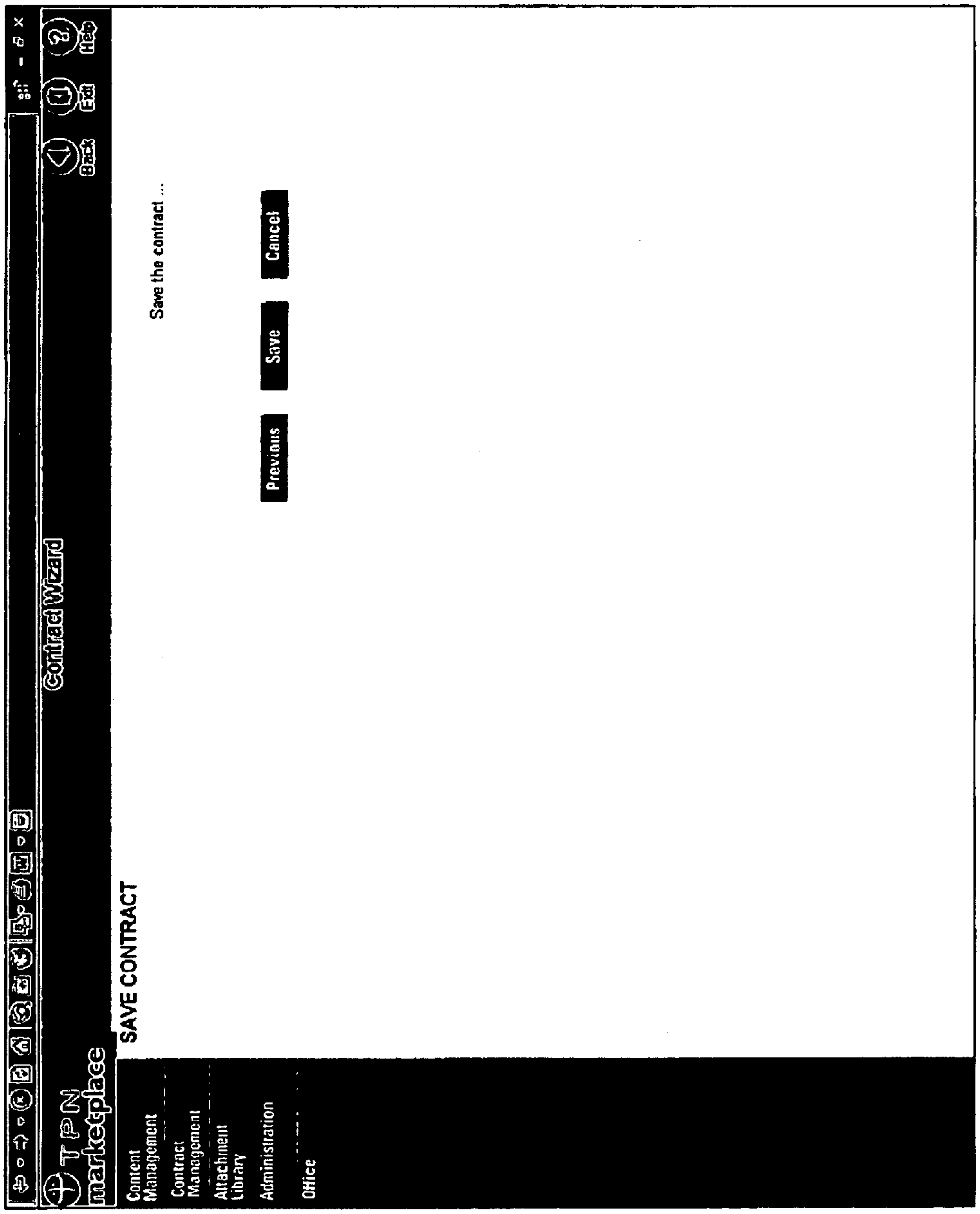
Figure 11L:
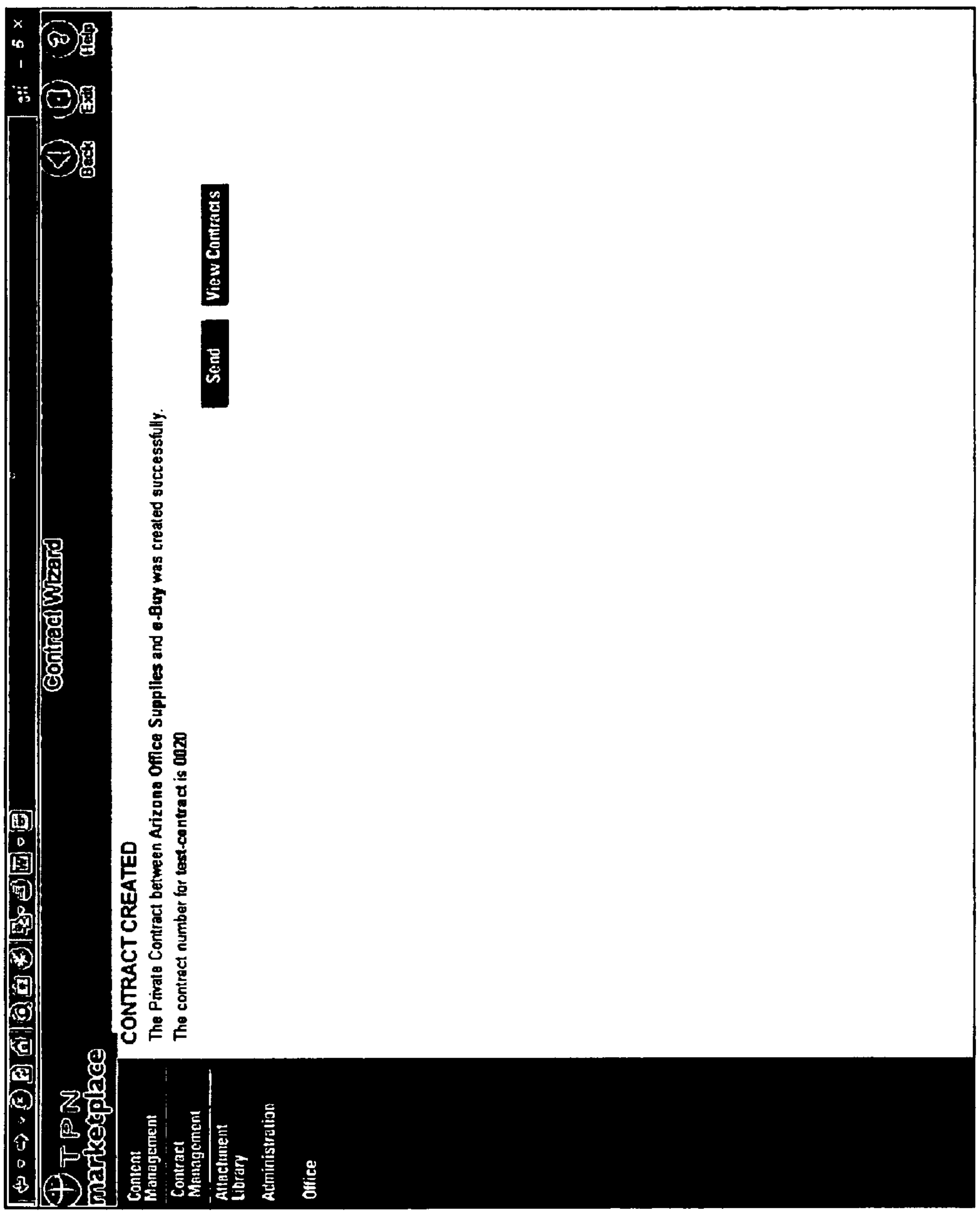
Figure 11M:
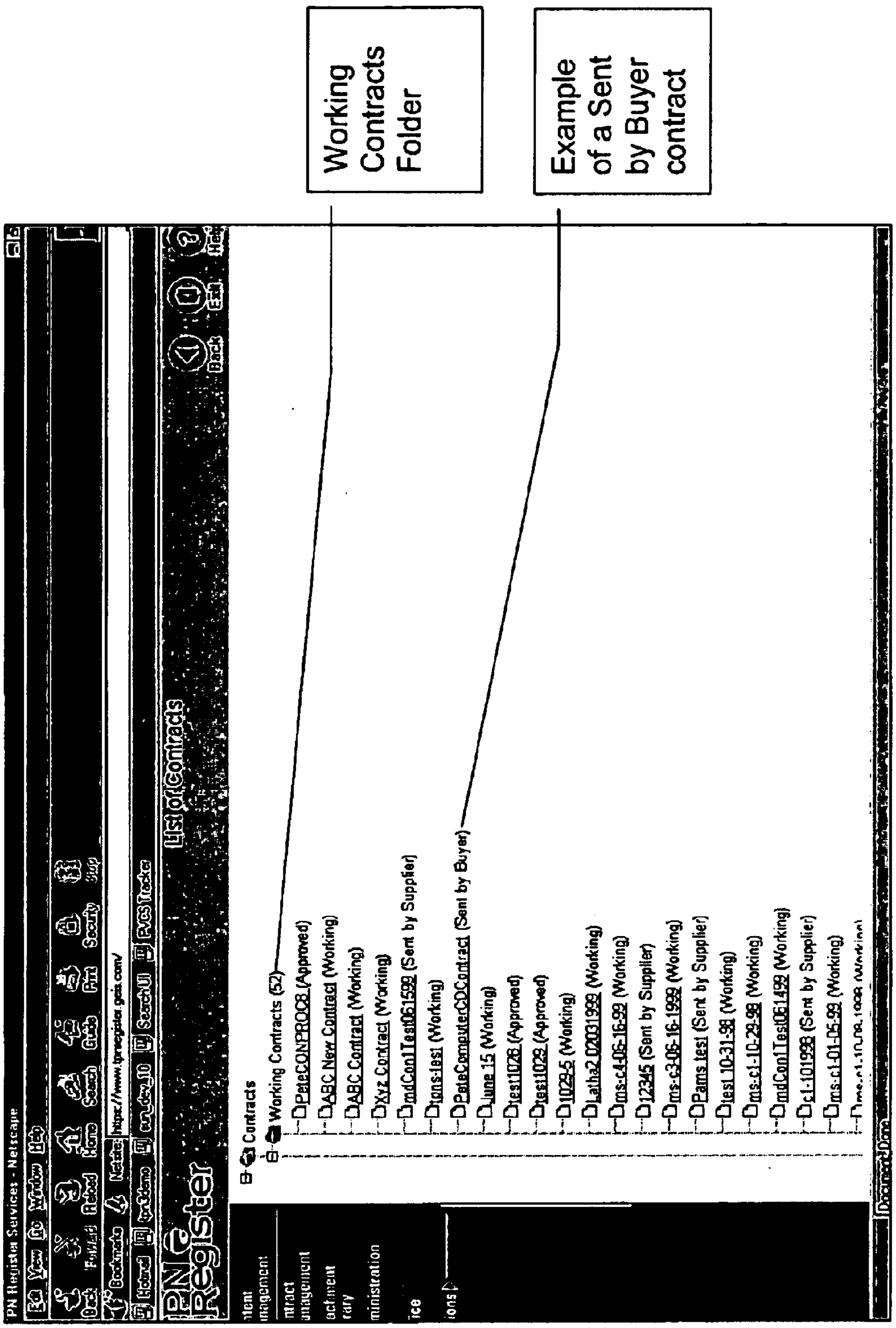
Figure 11N:
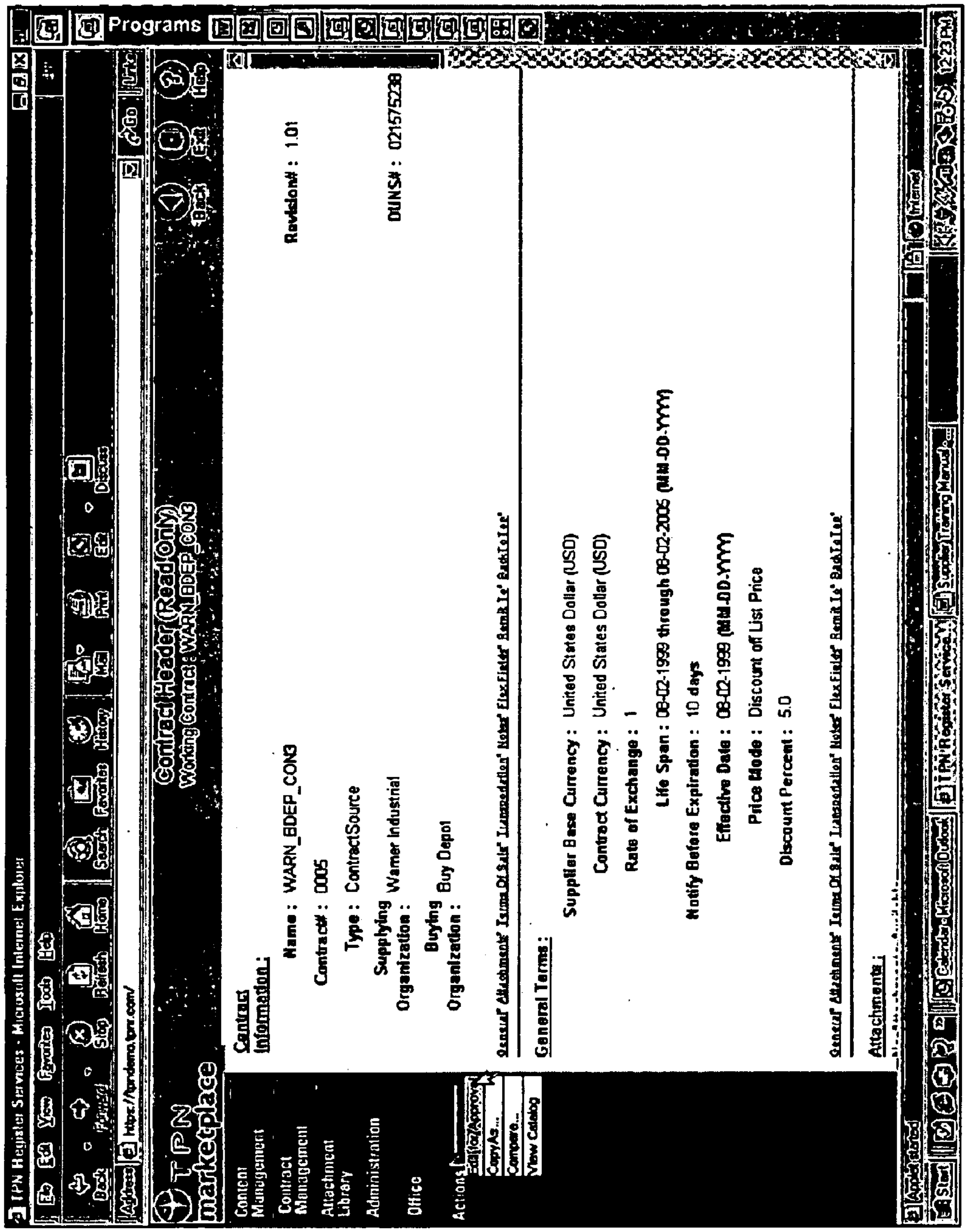
Figure 11O:
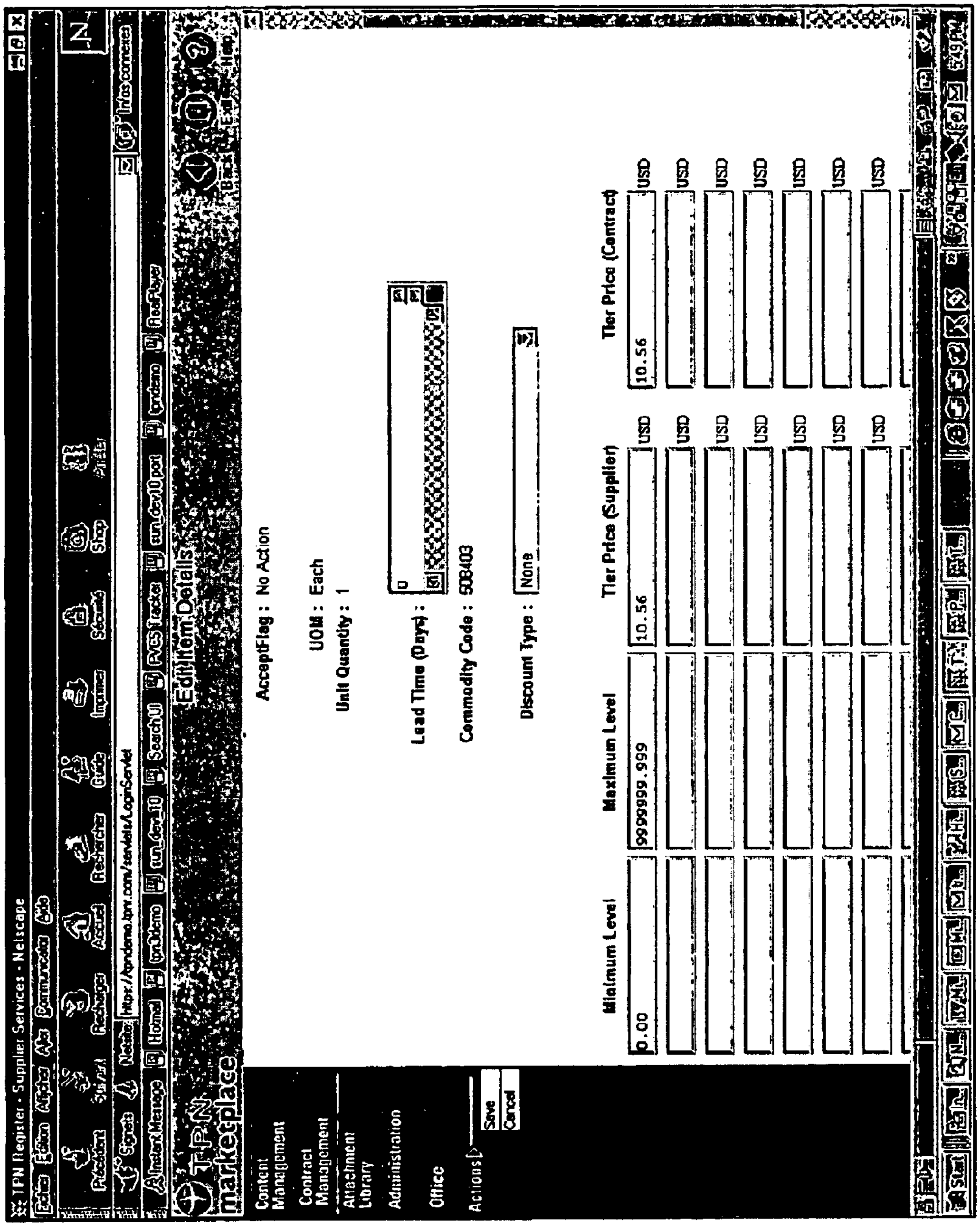
Figure 11P:
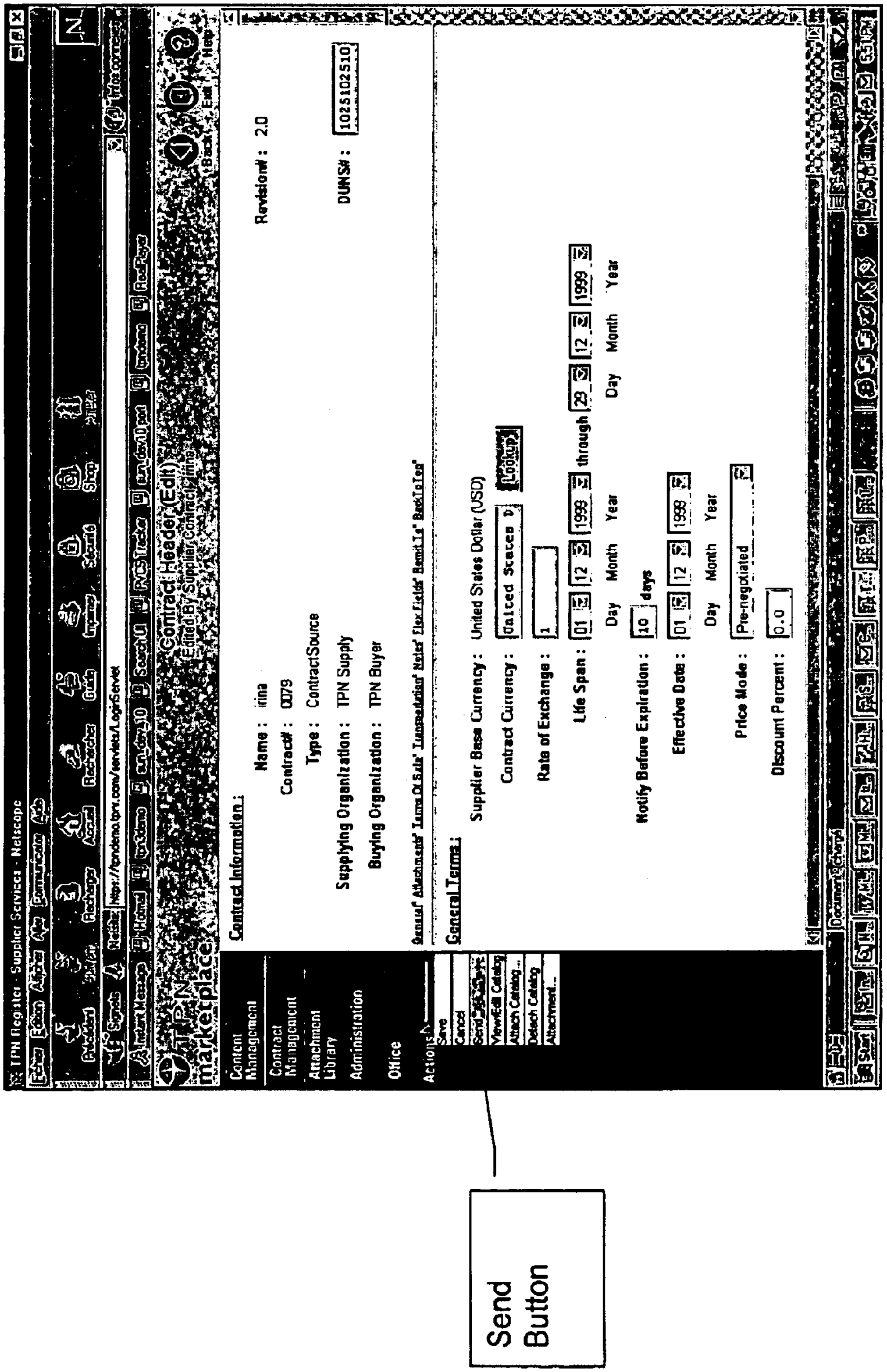
Figure 11Q:
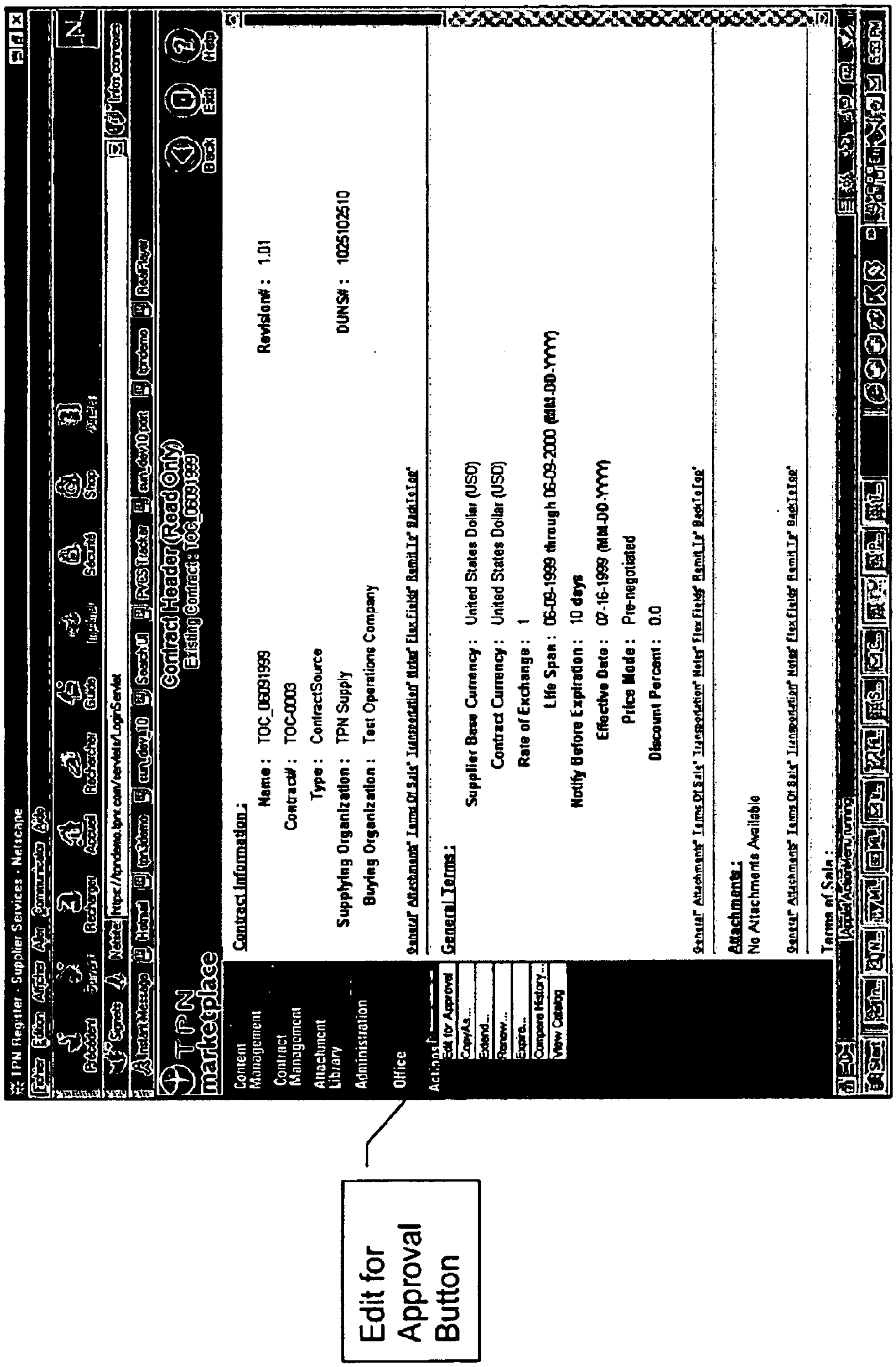

As further illustrated in FIGS. 11 and 11A to 11Q, the system 10 provides a plurality of interfaces to the supplier 12 which enable the supplier's contract manager to create and negotiate the contracts as described above. In one embodiment of the present invention, the system 10 provides a contract creation assistance interface which prompts the supplier for information pertaining to the contract as illustrated in FIG. 11. The system 10 also preferably provides: (a) a contract organization interface as illustrated in FIG. 11A which enables a supplier to specify the buying organization that will receive the contract, the contract duration and a notification, when the contract expires; (b) a defined contract type interface as illustrated in FIG. 11B which enables the supplier to define a contract type; (c) a contract currency interface which as illustrated in FIG. 11C which enables the supplier to define the currency for the contract; (d) a contract payment terms interface as illustrated in FIG. 11D which enables the supplier to define the payment terms for the contract; (e) a contract discount interface as illustrated in FIG. 11E which enables the supplier to define the discount terms if the contract has a discount offered; (f) a contract freight terms interface as illustrated in FIG. 11F which enables the supplier to define the freight terms for the contract; (g) a contract address interface as illustrated in FIG. 11G which enables the supplier to define the "remit to address" of the supplier; (h) a contract attached documents interface as illustrated in FIG. 11H which enables the supplier to attach documents to the contract; (i) a contract interface as illustrated in FIG. 111 which enables the supplier to add contract notes for the buyer to review; (1) a contract add items interface as illustrated in FIG. 11J which enables the supplier to add items or products to the contract; (k) a contract save interface as illustrated in FIG. 11K enables the supplier to save the contract; (I) a contract send interface as illustrated in FIG. 11L, which enables the supplier to send the contract to a buyer or return to the view contracts interface; (m) a contract review interface as illustrated in FIG. 11M which enables the supplier to access a contract that was edited or rejected by the buyer and returned to the supplier; (n) a contract revision-edit header interface as illustrated in FIG. 11N which enables the supplier to access the contract header and review any changes the buyer made to the contract; (o) a contract discounting items interface as illustrated in FIG. 110 which enables the supplier to edit the negotiated prices of items; (p) a contract save and send interface as illustrated in FIG. 11P which enables the supplier to save and send the contract; and (q) a contract working copy interface as illustrated in FIG. 11Q which enables the supplier to revise an existing contract by creating a working copy of the contract.

Buyer Contract Interfaces

Referring now to FIGS. 12A through 12J, the system provides a buyer contract tool which the buyer accesses through an appropriate web site using its internet browser. The buyer accesses the system through the site login interface as illustrated in FIG. 6. The buyer's contract manager logs in using this interface, entering buyer's company ID, user name and password.

Figure 12A:
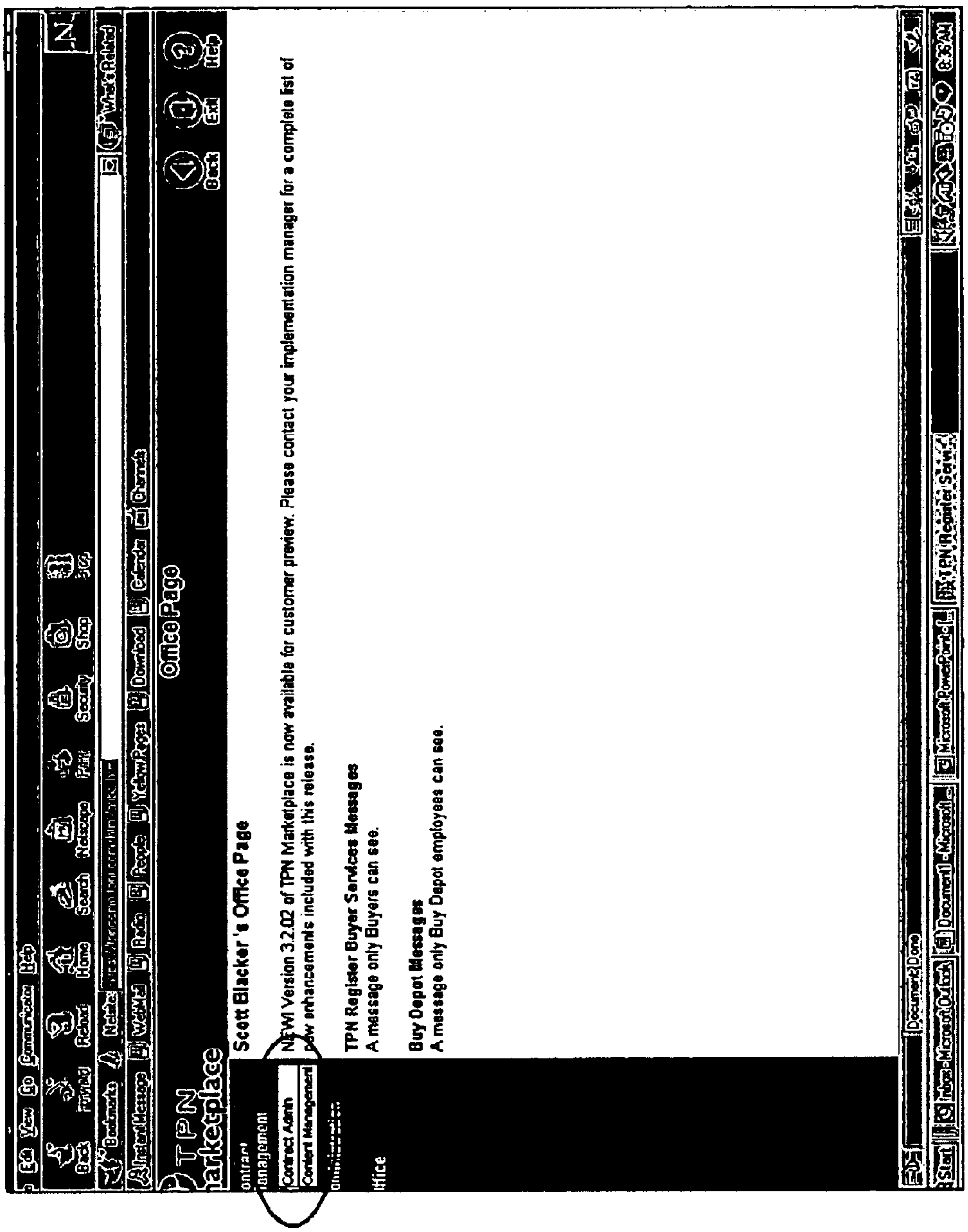
FIGS. 12A through 12L are illustrations of the buyer contract tool interfaces of one embodiment of the electronic marketplace of the present invention.
Figure 12B:
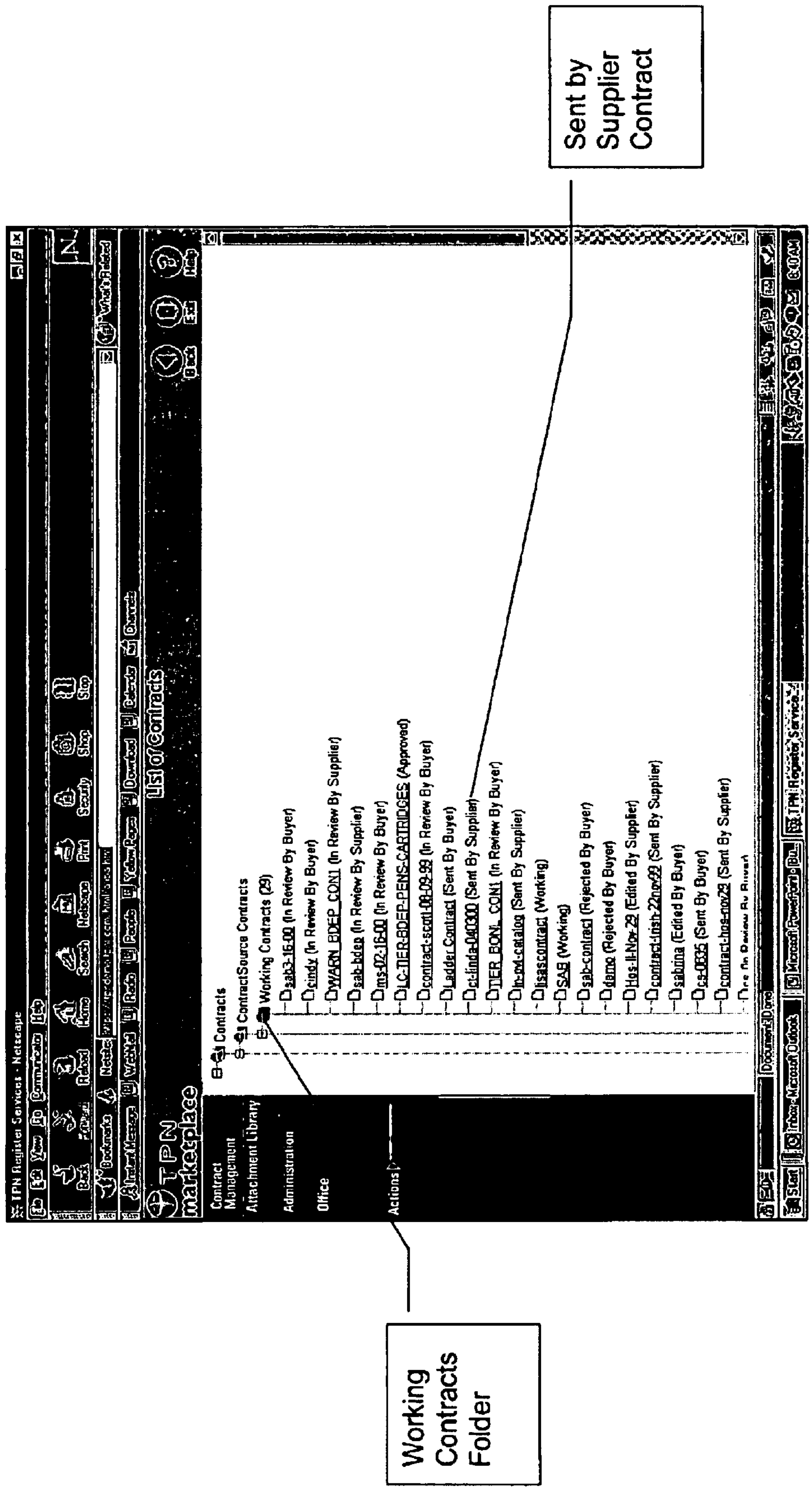
Figure 12C:
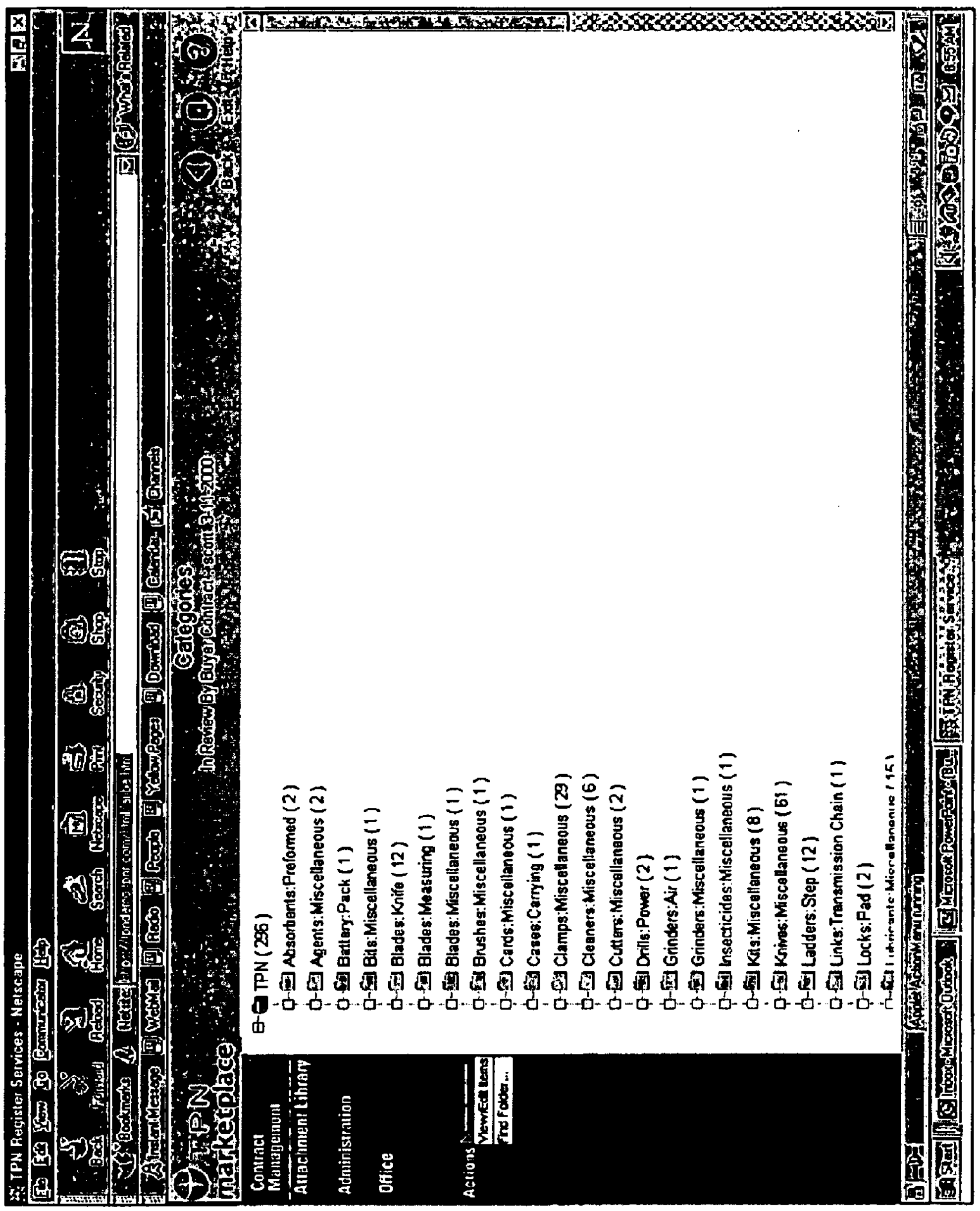
Figure 12D:
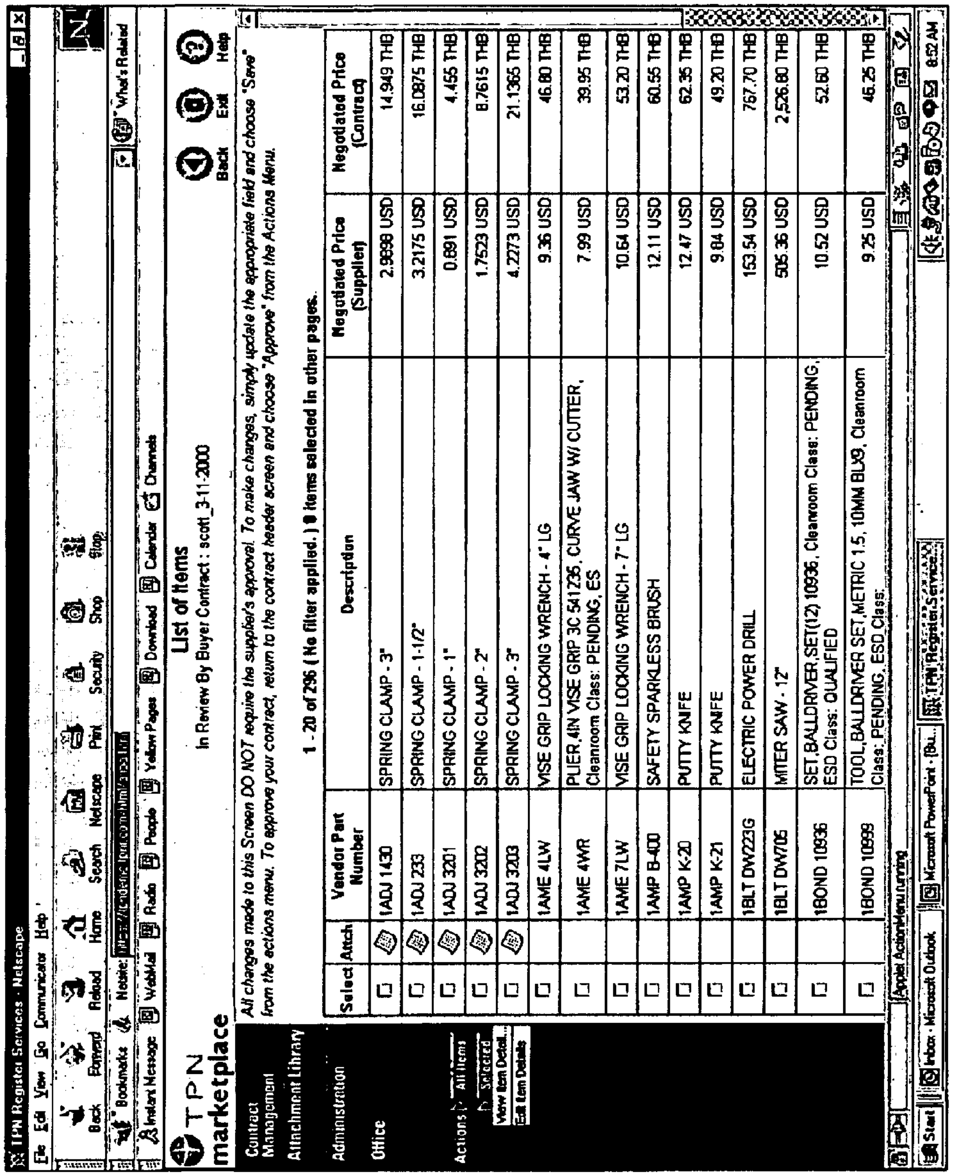
Figure 12E:
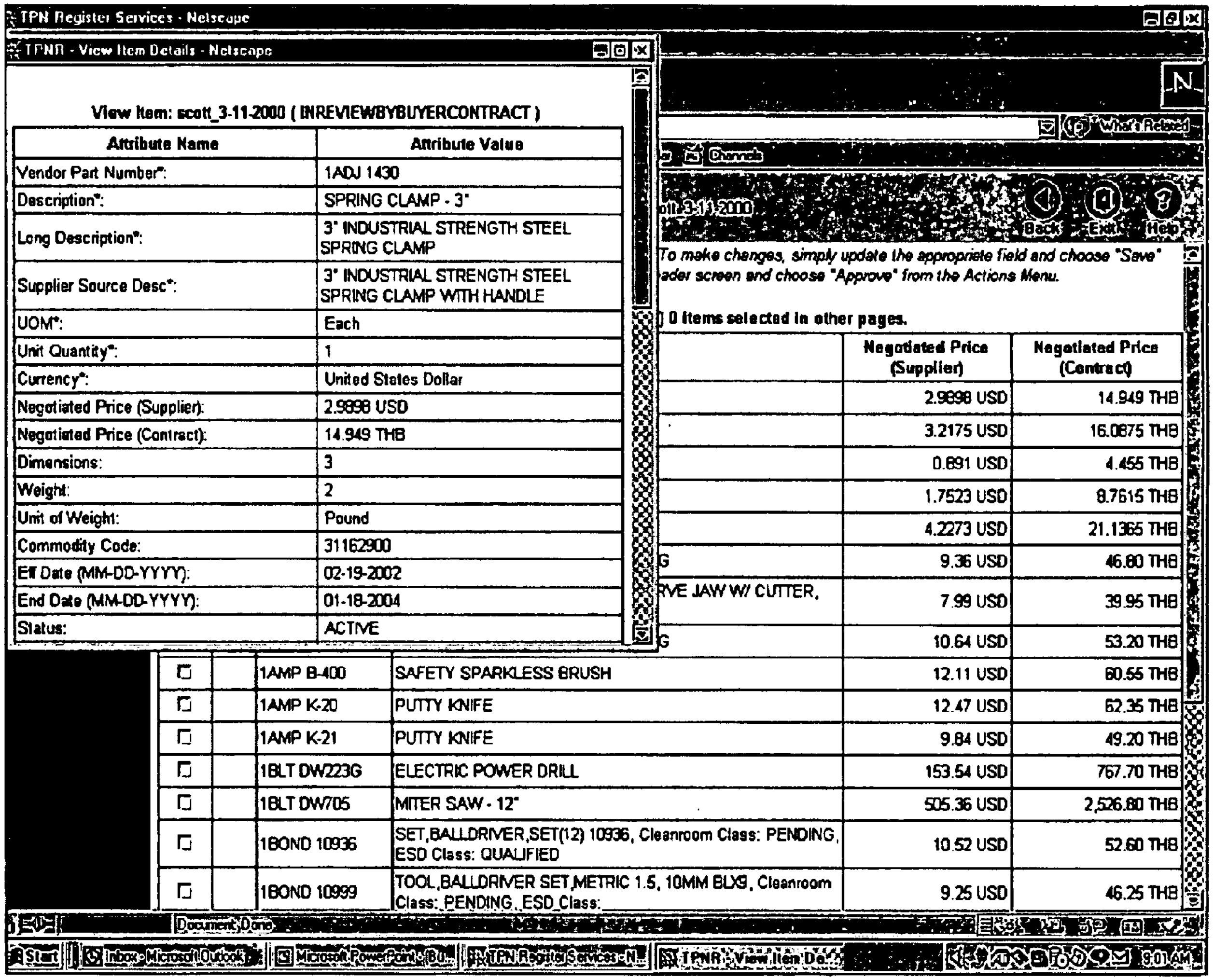
Figure 12F:
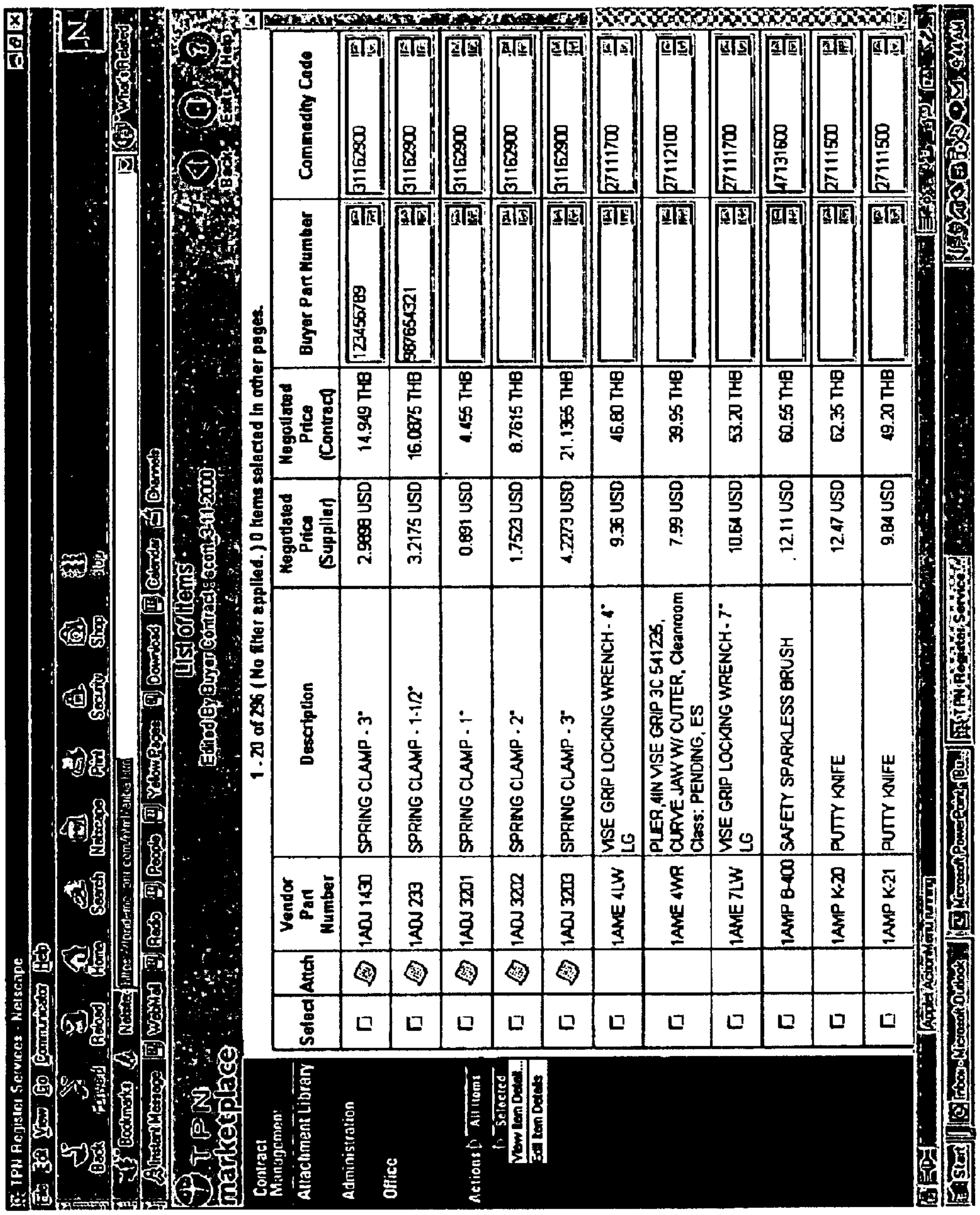
Figure 12G:
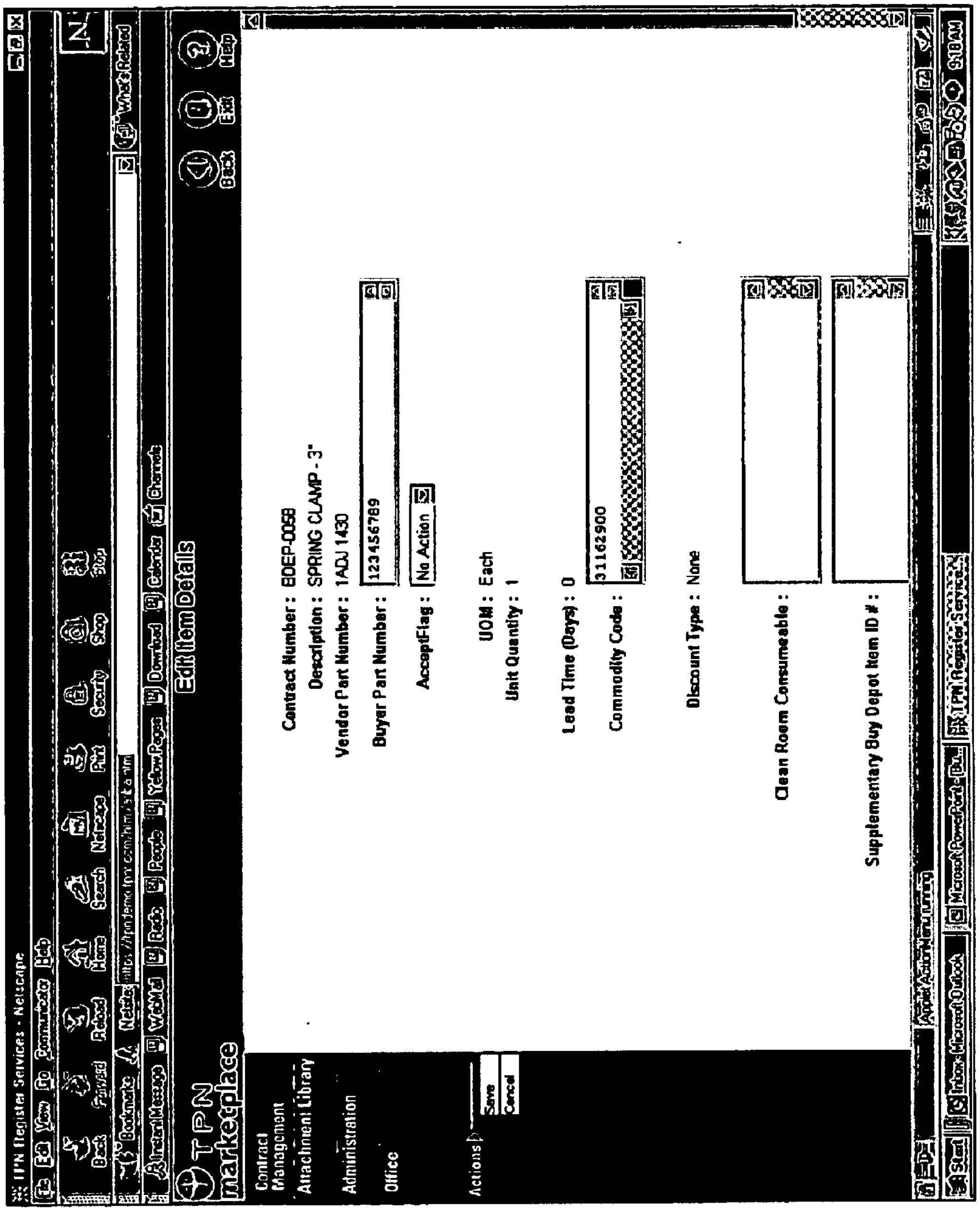
Figure 12H:
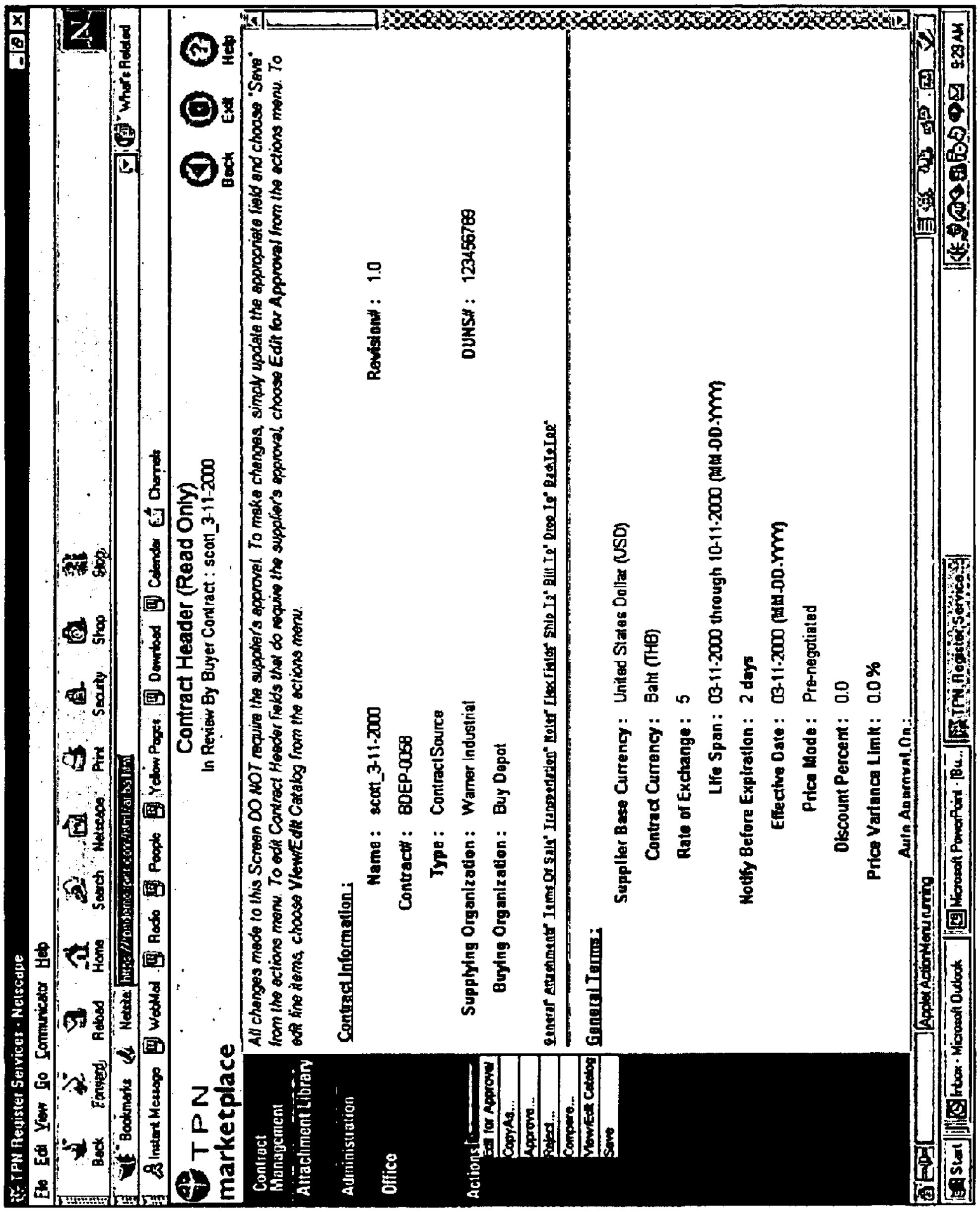
Figure 12I:
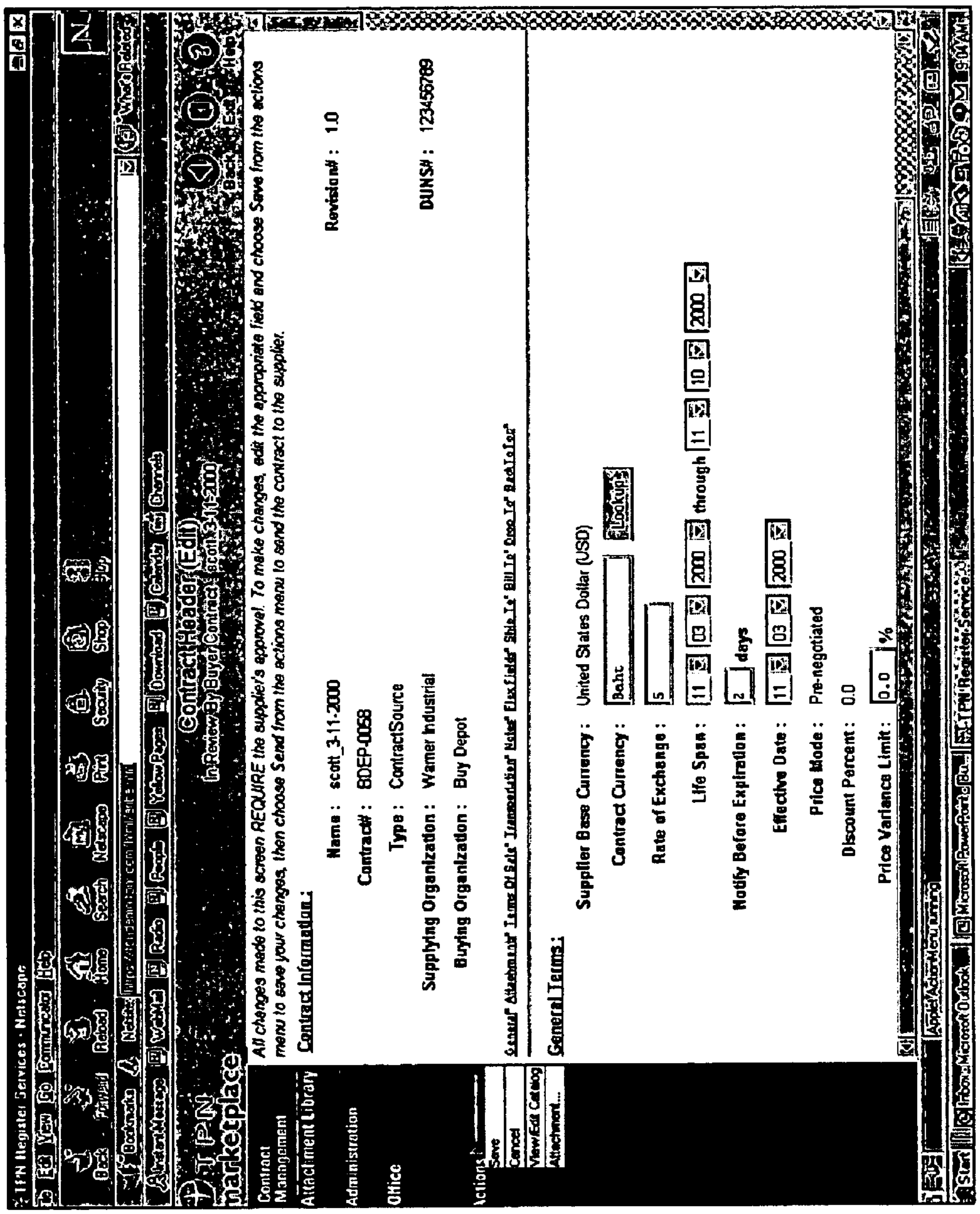
Figure 12J:
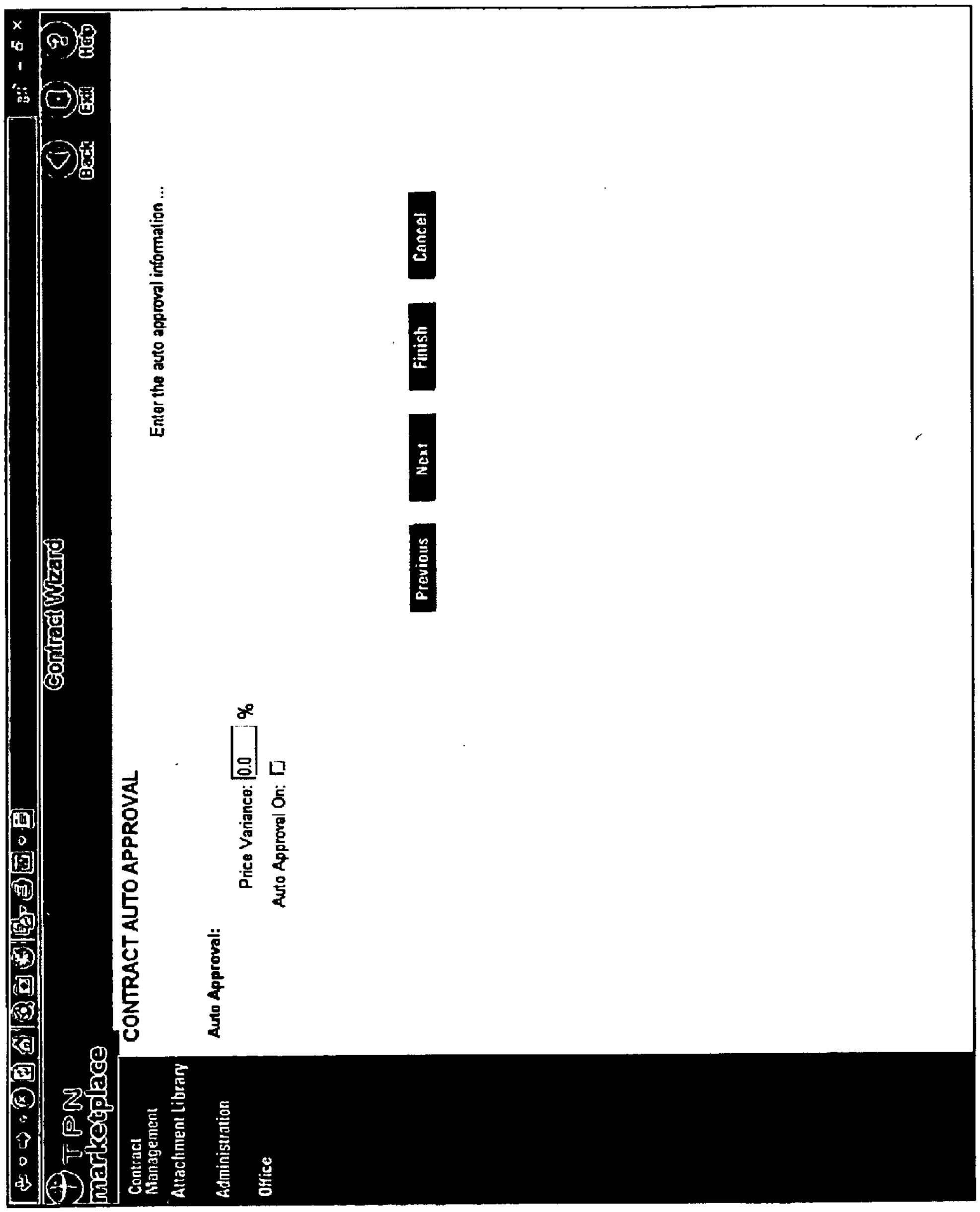
Figure 12K:
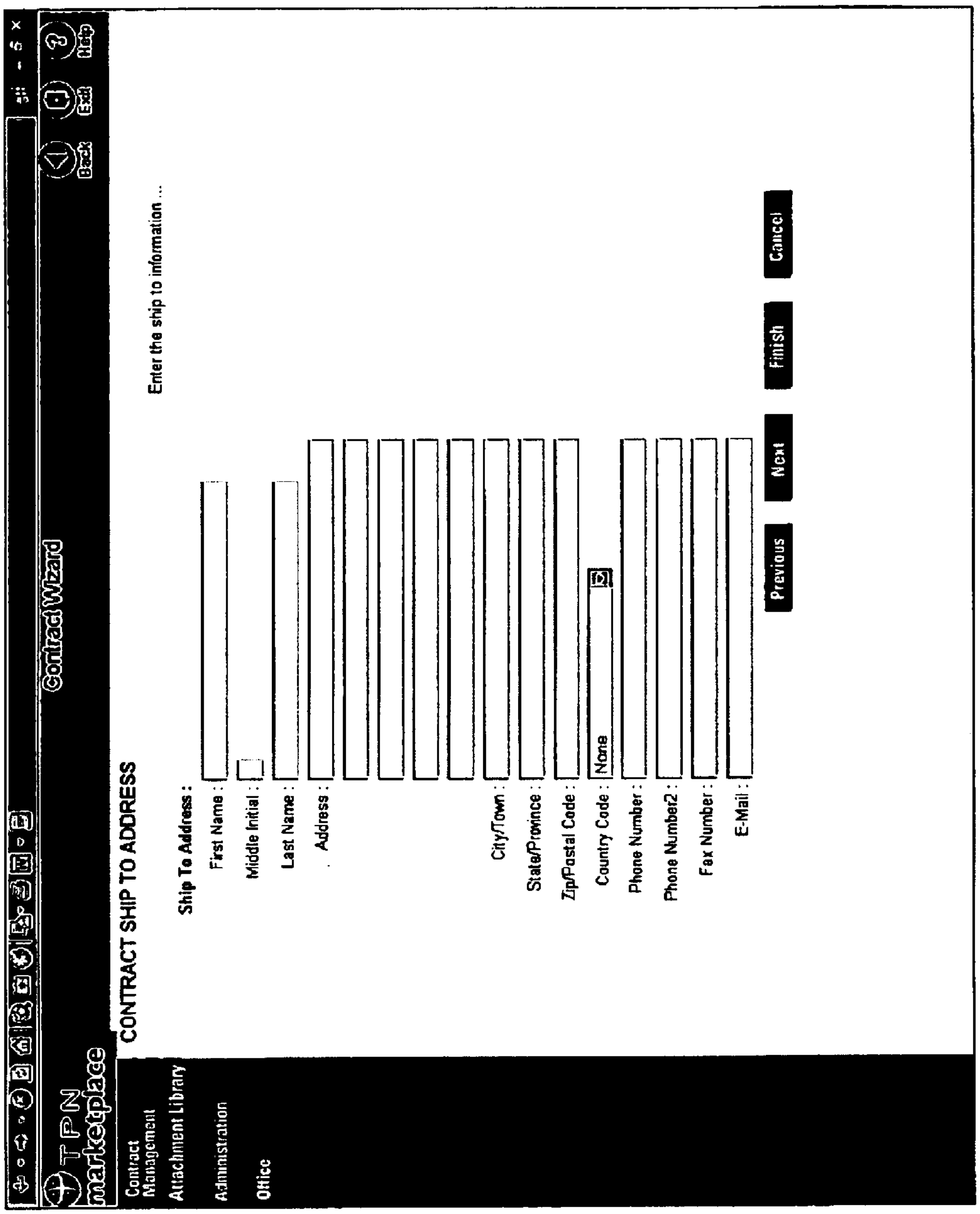
Figure 12L:
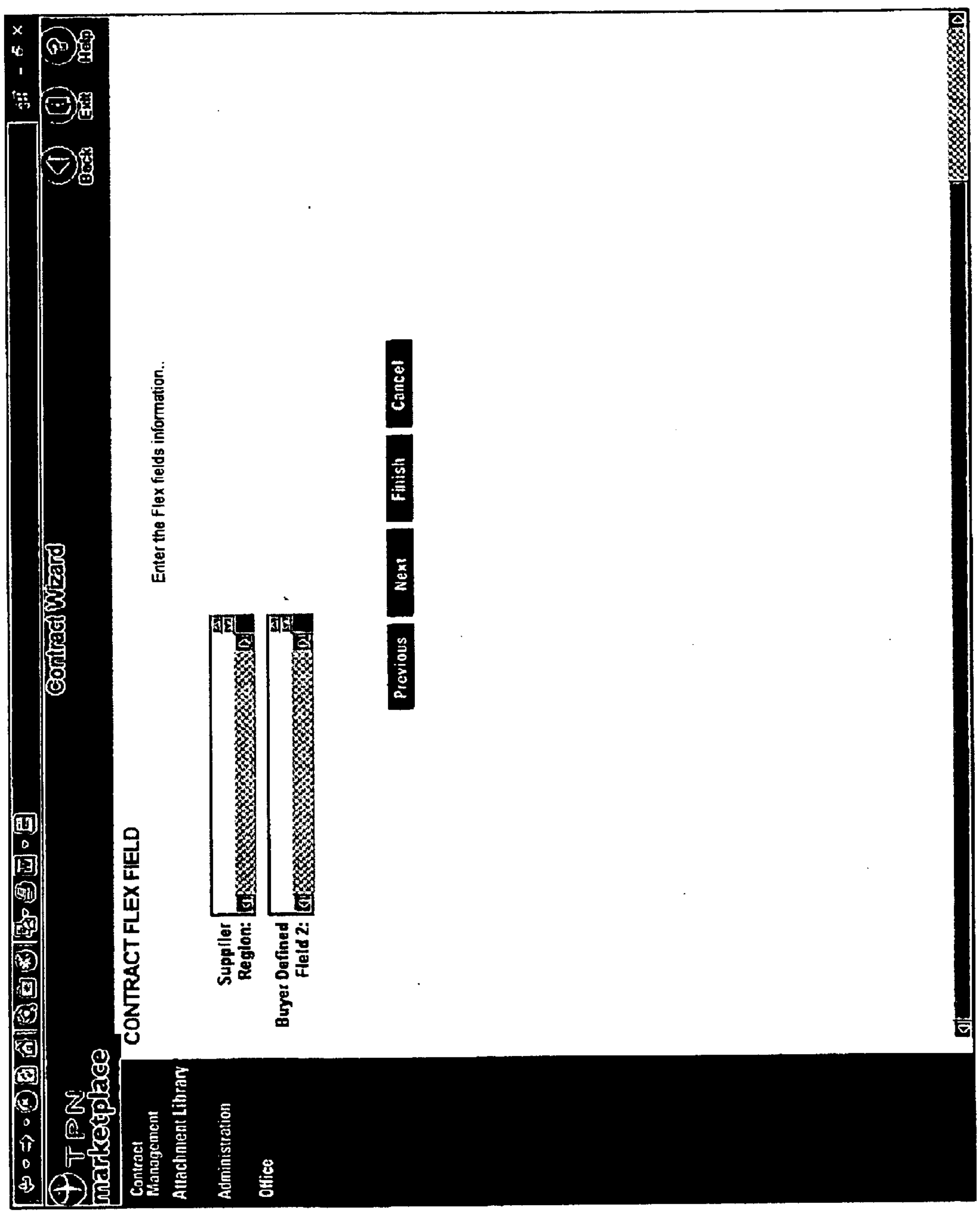

The system provides a plurality of interfaces to the buyer's contract manager. Preferably, these interfaces include: (a) an office page-review contract interface as illustrated in FIG. 12A which enables buyers to view system messages and perform tasks within the marketplace; (b) a contract administration-review contract interface as illustrated in FIG. 12B which enables the buyers to review working contracts in the working folder, existing contracts and expired contracts; (c) a contract administration-view catalog interface as illustrated in FIG. 12C which enables the buyer to view the categories in the general catalog attached to the contract; (d) a contract administration-view all items interface as illustrated in FIG. 12D which enables the buyer to view items in a particular category or view all items in a catalog together; (e) a contract administration-view item details interface as illustrated in FIG. 12E which enables buyers to view all line items attributes or more detailed information for each product associated with a contract; (f) a contract administration-edit buyer part number interface as illustrated in FIG. 12F which enables buyers to specify items in a particular catalog and modify the buyer part numbers; (g) a contract administration-edit line items interface as illustrated in FIG. 12G which enables buyers to edit fields at the line item level such as commodity code or buyer part number and enables buyers to flag an item as accepted or rejected; (h) a contract administration-review contract header interface as illustrated in FIG. 12H which enables buyers to approve, copy, reject and compare the contract; (i) a contract administration-edit contract header interface as illustrated in FIG. 12I which enables buyers to edit the contract header of a contract and resend it to the supplier; (j) a contract business rules interface as illustrated in FIG. 12J which enables the buyer to specify business rules for receiving updates to existing contracts; (k) a contract address interface as illustrated in FIG. 12K which enables the buyer to specify a "ship to," "bill to" and "drop to" addresses for the contract; and (l) a contract populate interface as illustrated in FIG. 12L which enables the buyer to populate any user defined field for the contract header.

Buyer Created Sub-Catalogs and Resources

Figure 13:
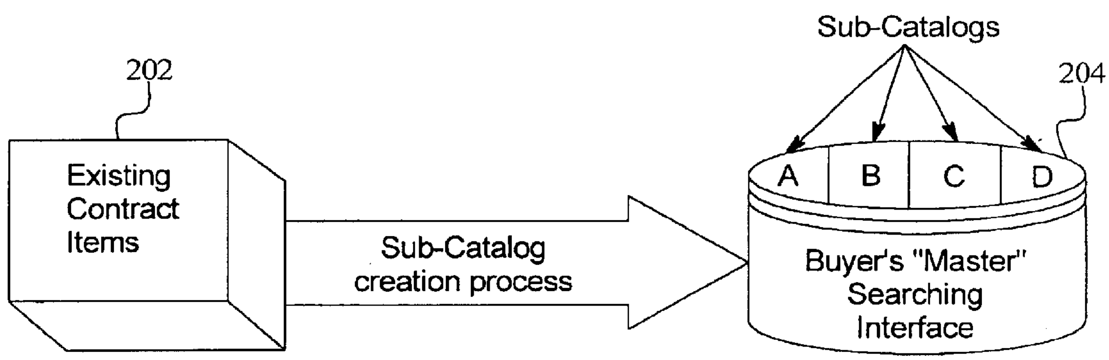
FIG. 13 is a schematic diagram of the creation of sub-categories in accordance with one embodiment of the electronic marketplace of the present invention.
Figure 14:
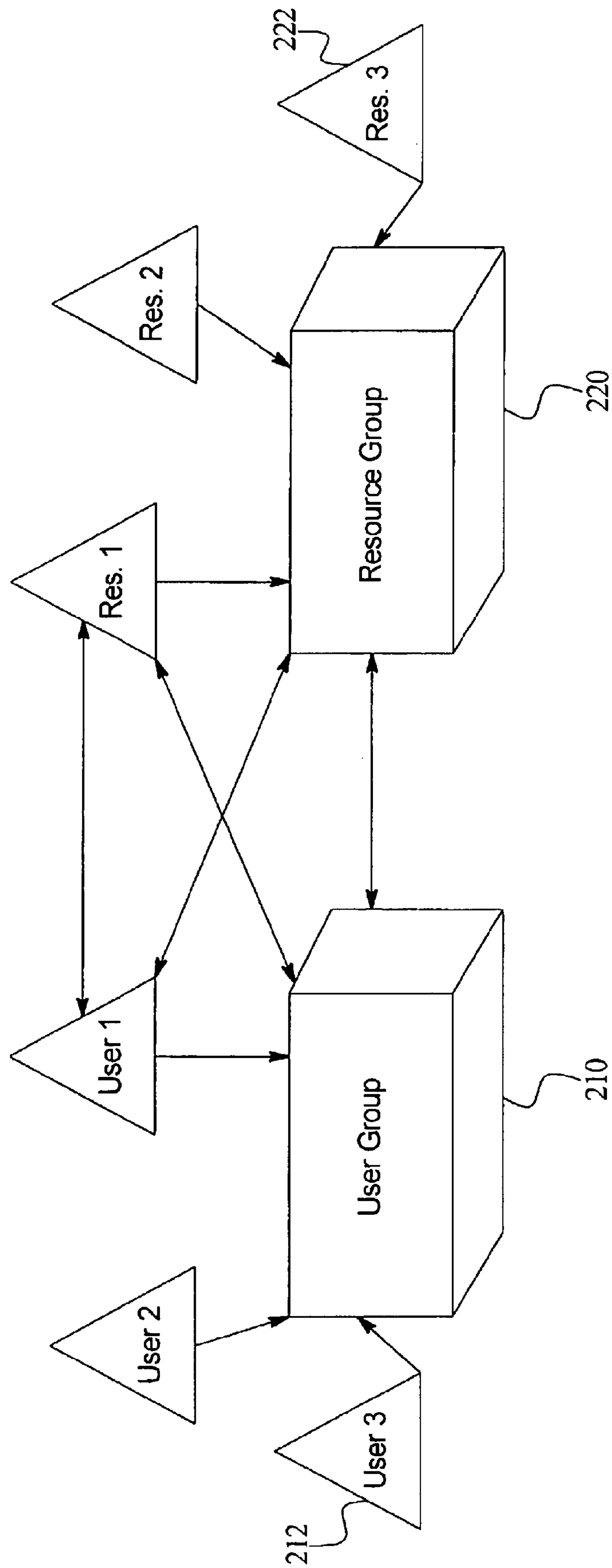
FIG. 14 is a schematic diagram of the user groups and resource groups in accordance with one embodiment of the electronic marketplace of the present invention.

The system enables the buyer to view the general contract items 202, and create sub-catalogs of products 204 from the contract items as illustrated in FIG. 13. The system also enables the buyer contract manager or administrator to create user groups 210 and resource groups 220 to determine how each requisitioner will view the items and which items the requisitioner will see as illustrated in FIG. 14. This enables the buyer to create a plurality of sub-catalogs from the content of one or more suppliers (i.e., across suppliers), whereby each requisitioner may only be allowed to see certain items and other requisitioners may be allowed to see all of the items.

The buyer may be a party to a plurality of contracts from one or more suppliers. The buyer uses the contract management application as discussed below to create a plurality of sub-catalogs. Each sub-catalog may include products from a single contract, products covered by multiple contracts from a single supplier and products covered by one or more contracts from multiple suppliers.

For instance, one supplier may have one hundred products in its master catalog and another supplier may have two hundred products in its master catalog. The buyers contract manager works with the contract manager of the first supplier to contract for fifty of the one hundred products and works with the contract manager of the second supplier to contract for one hundred of the two hundred products. The buyer's master catalog 202 includes all contracted products from both suppliers. The buyer can create sub-catalogs 204 of the one-hundred fifty products including products from both suppliers. The buyer determines who has access to the items in the contract by creating sub-catalogs. As further illustrated in FIG. 14, the contract management application enables both the buyer and suppliers to create user groups 210 and resource groups 220. The user groups 210 include one or more users 212 such as contract managers, content managers and requisitioners of the supplier and buyer respectively. The resource groups 220 include for the supplier one or more resources 222 such as contracts or catalogs and for the buyer include one or more resources such as contracts, catalogs and sub-catalogs. The administrative management applications as discussed below enable the supplier and buyer to create the user groups which have access to one or more resource groups and to specify which user has access to one or more resource groups.

For example, the buyer can create a resource group which is a sub-catalog of office supplies and a sub-catalog of hardware components, each of which are only accessible by certain requisitioners in a user group. If the requisitioner is an engineer who orders office equipment, but also orders supplies for their particular group, the buyer can create a resource group for that employee that contains both the office equipment and office supplies catalogs. Resource groups can also be used to group contracts. A contract administrator that is responsible for all contracts relating to computer equipment and supplies for example can be granted access to a resource group containing a contract for a computer hardware supplier and a contract for all computer software and computer supplies.

Figure 15:
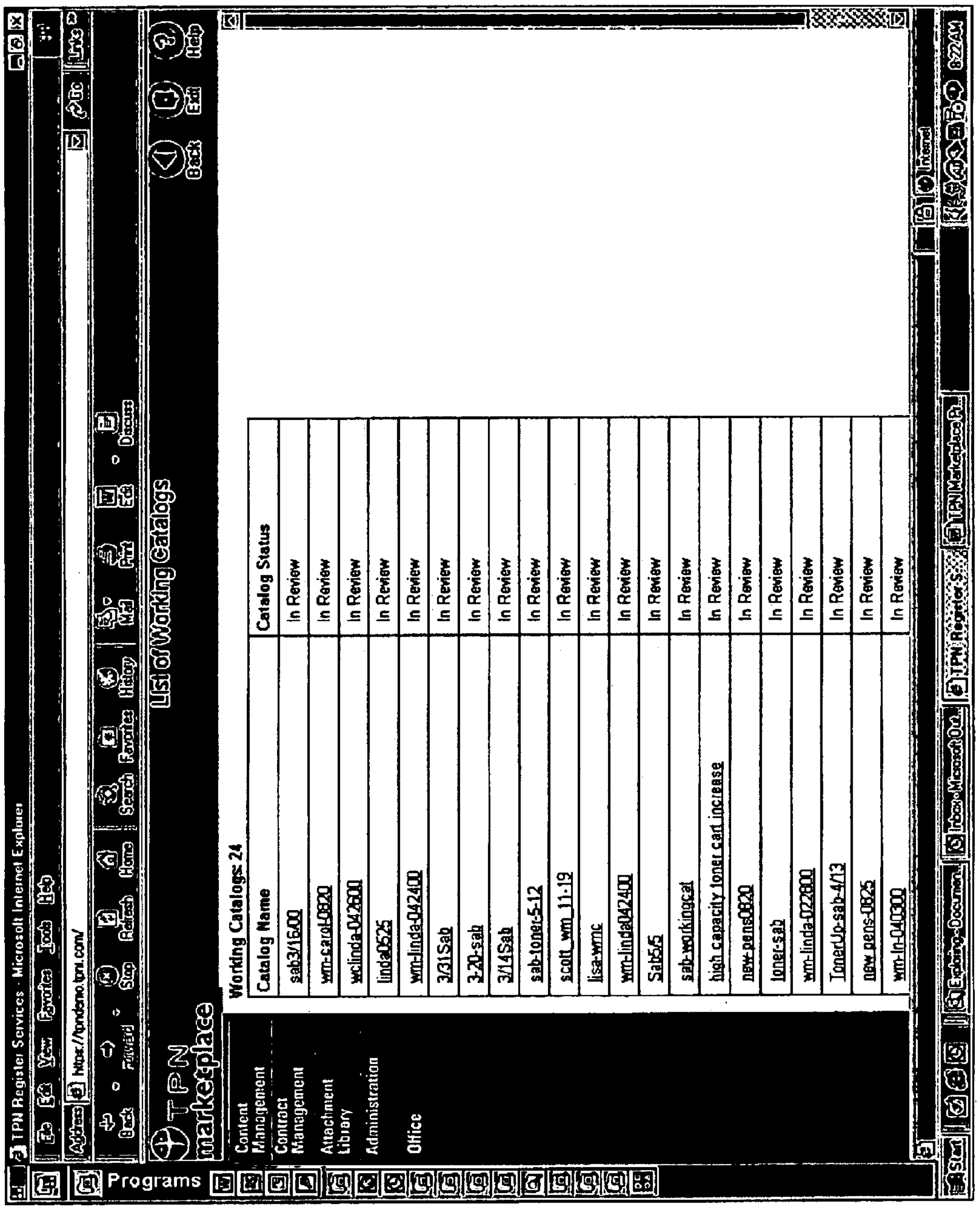
FIGS. 15 and 15A through 15G are illustrations of the buyer sub-catalogs creation interfaces of one embodiment of the electronic marketplace of the present invention.
Figure 15A:
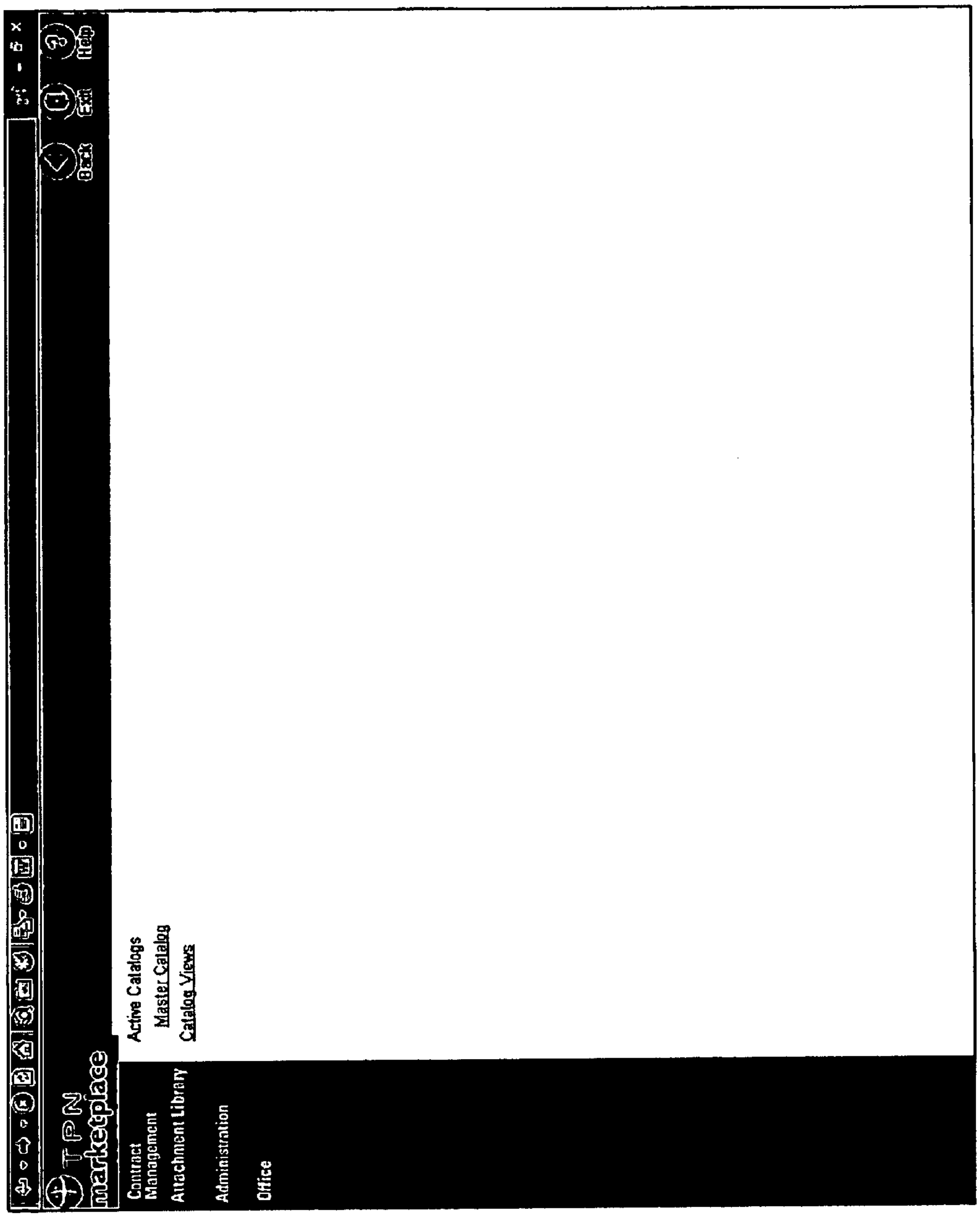
Figure 15B:
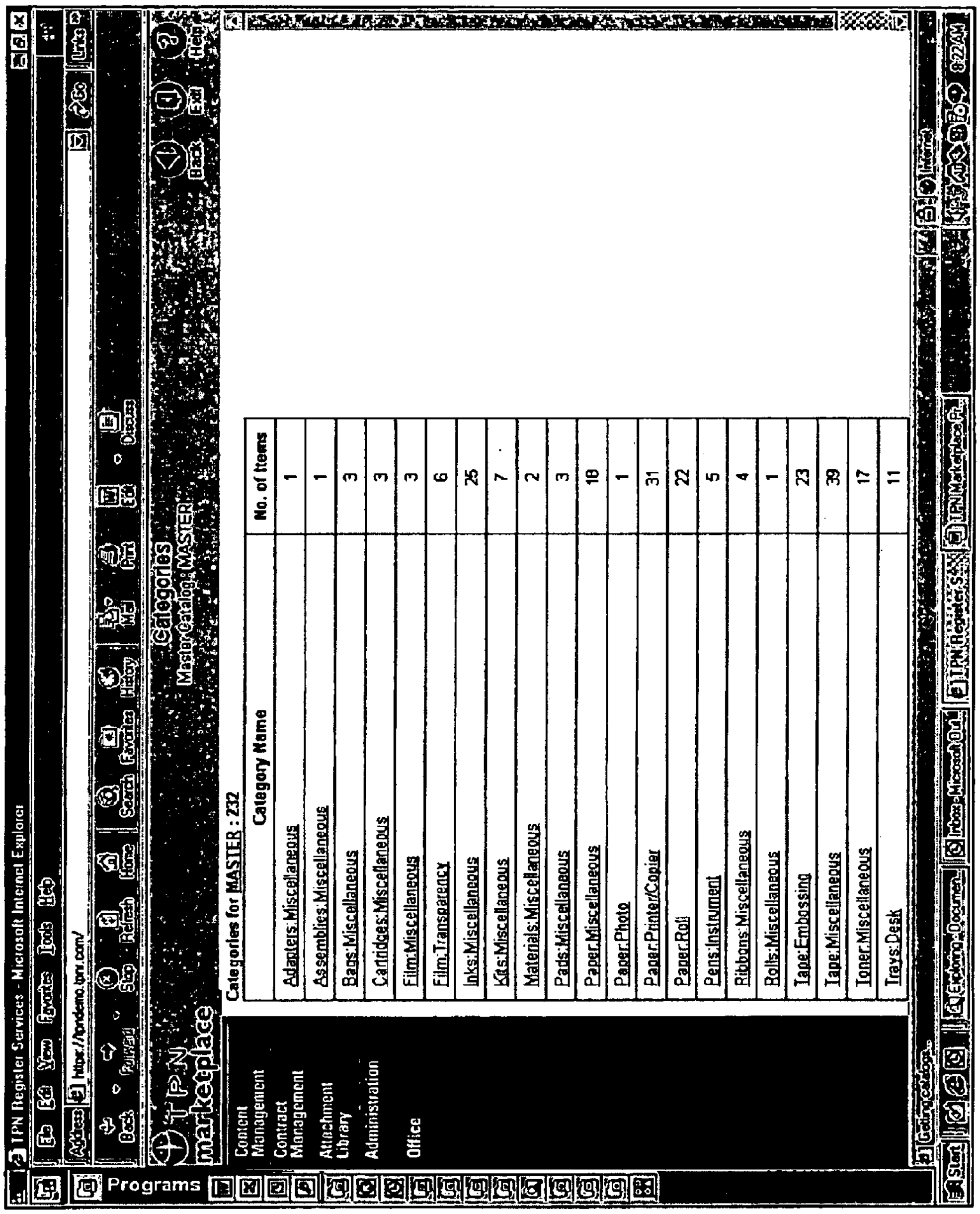
Figure 15C:
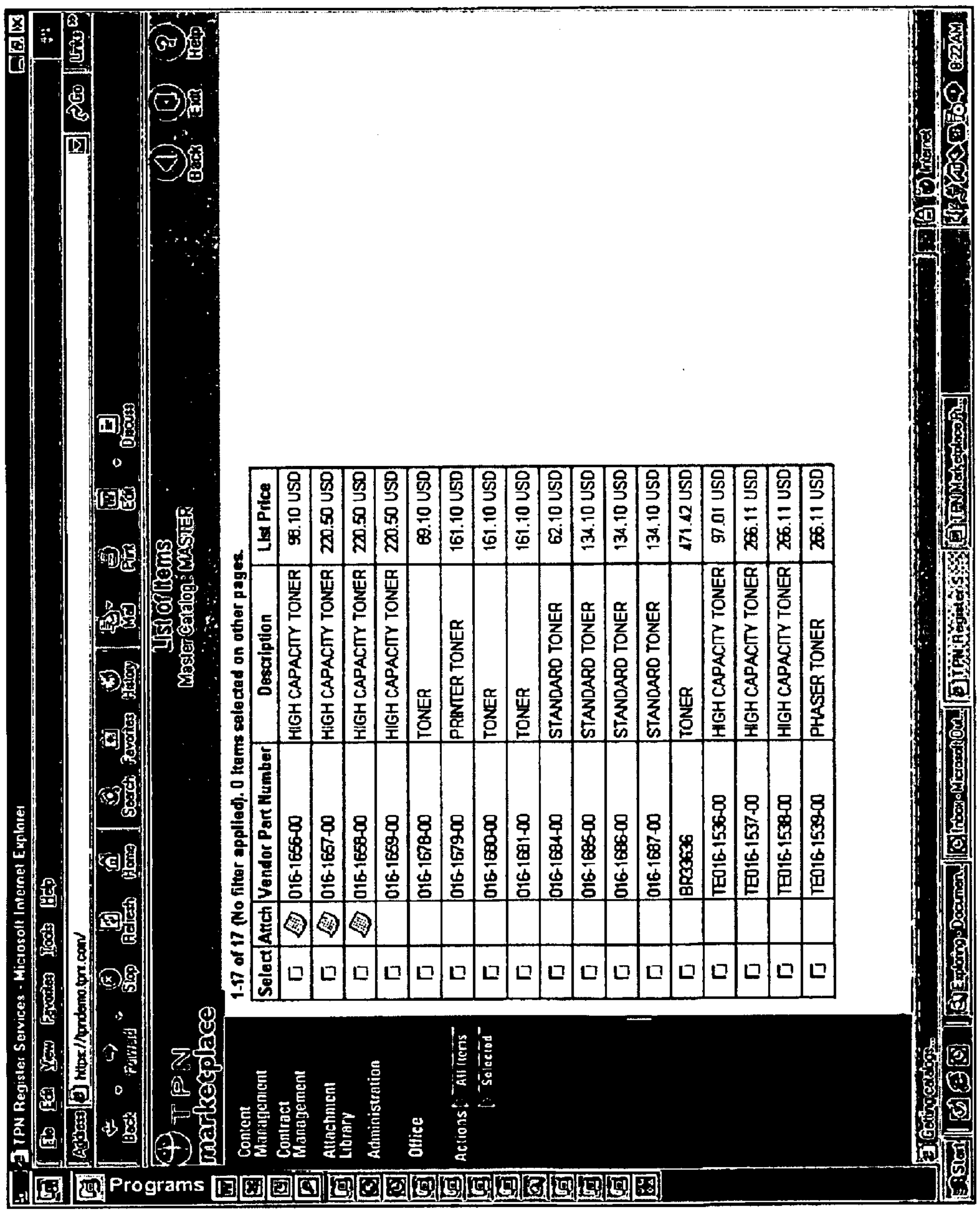
Figure 15D:
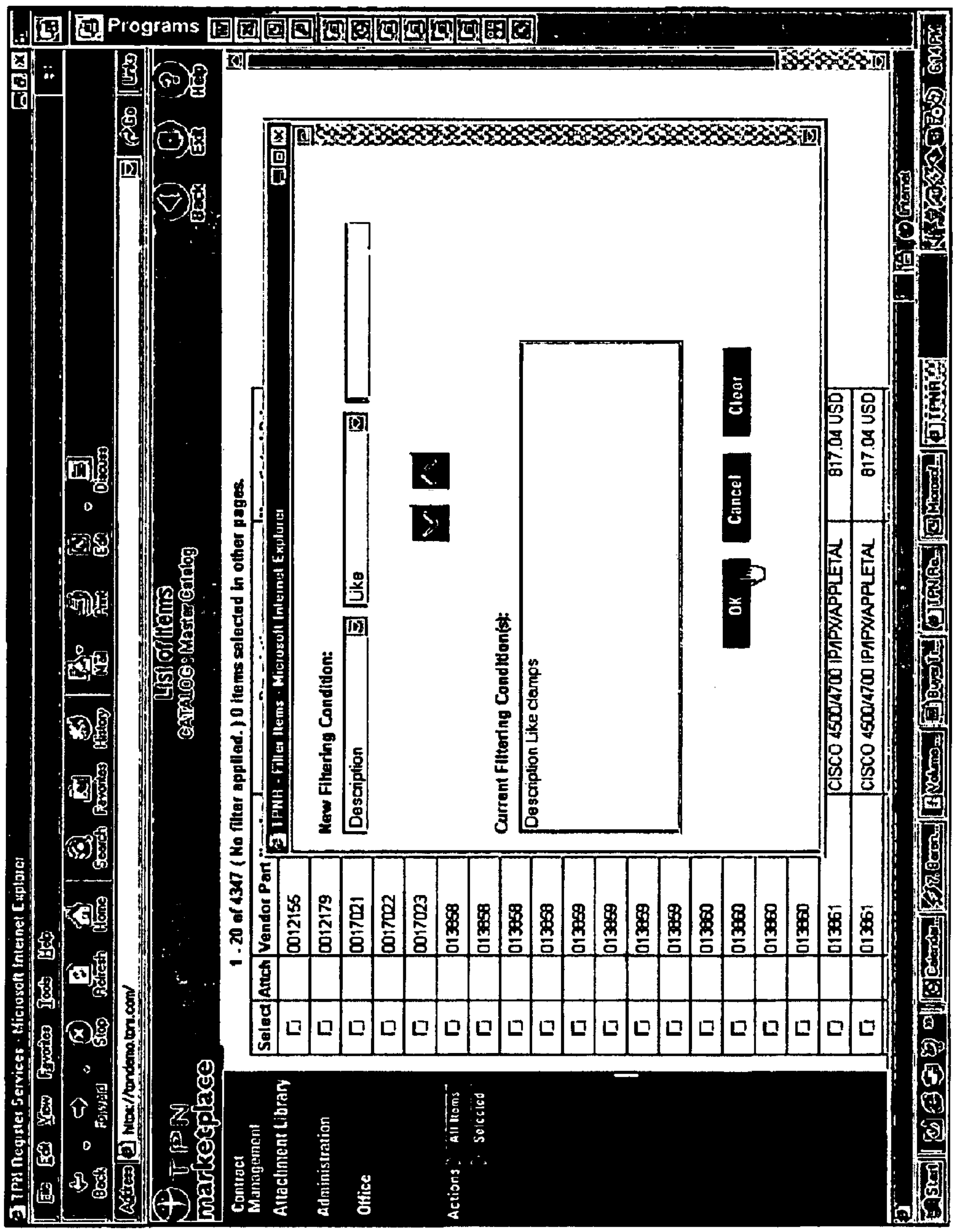
Figure 15E:
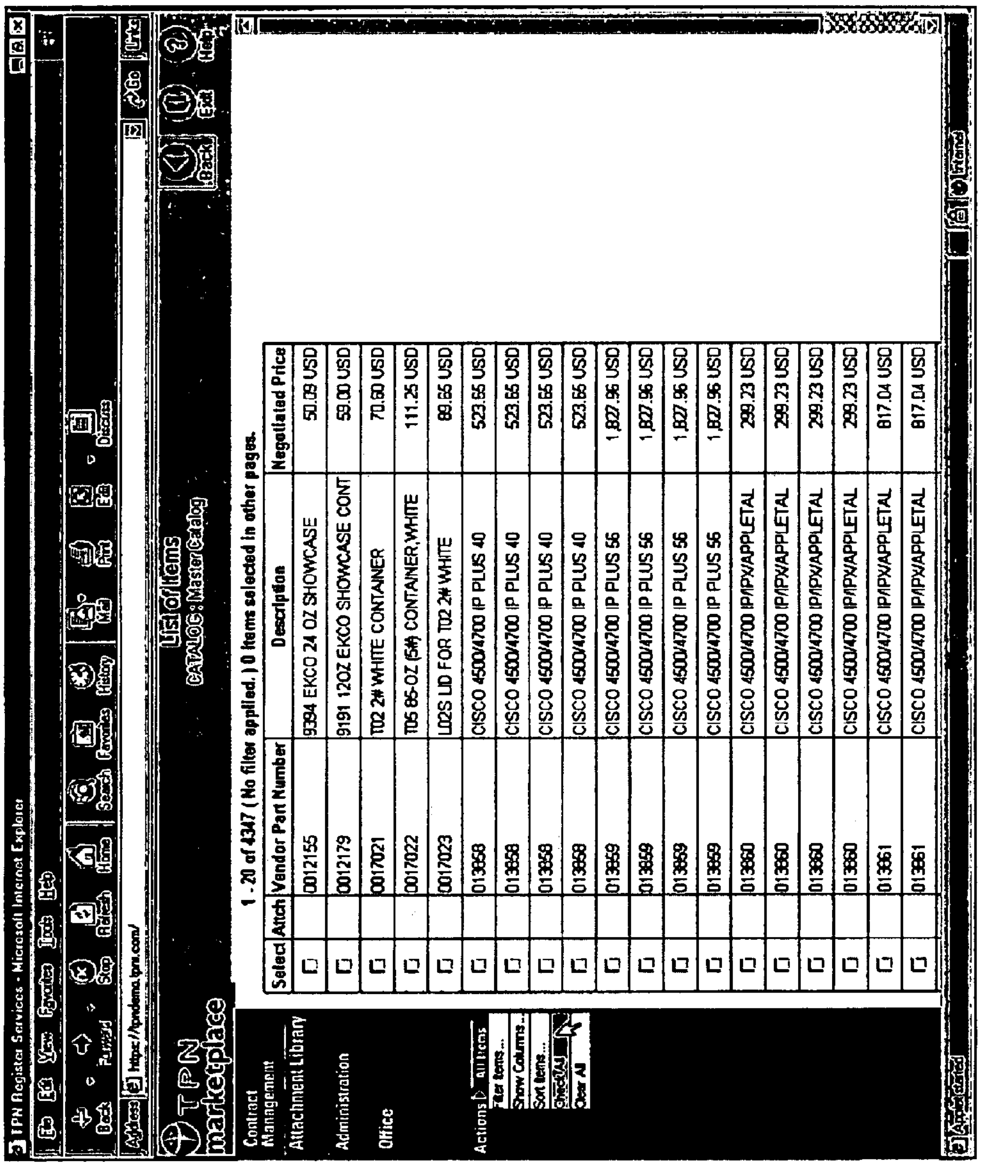
Figure 15F:
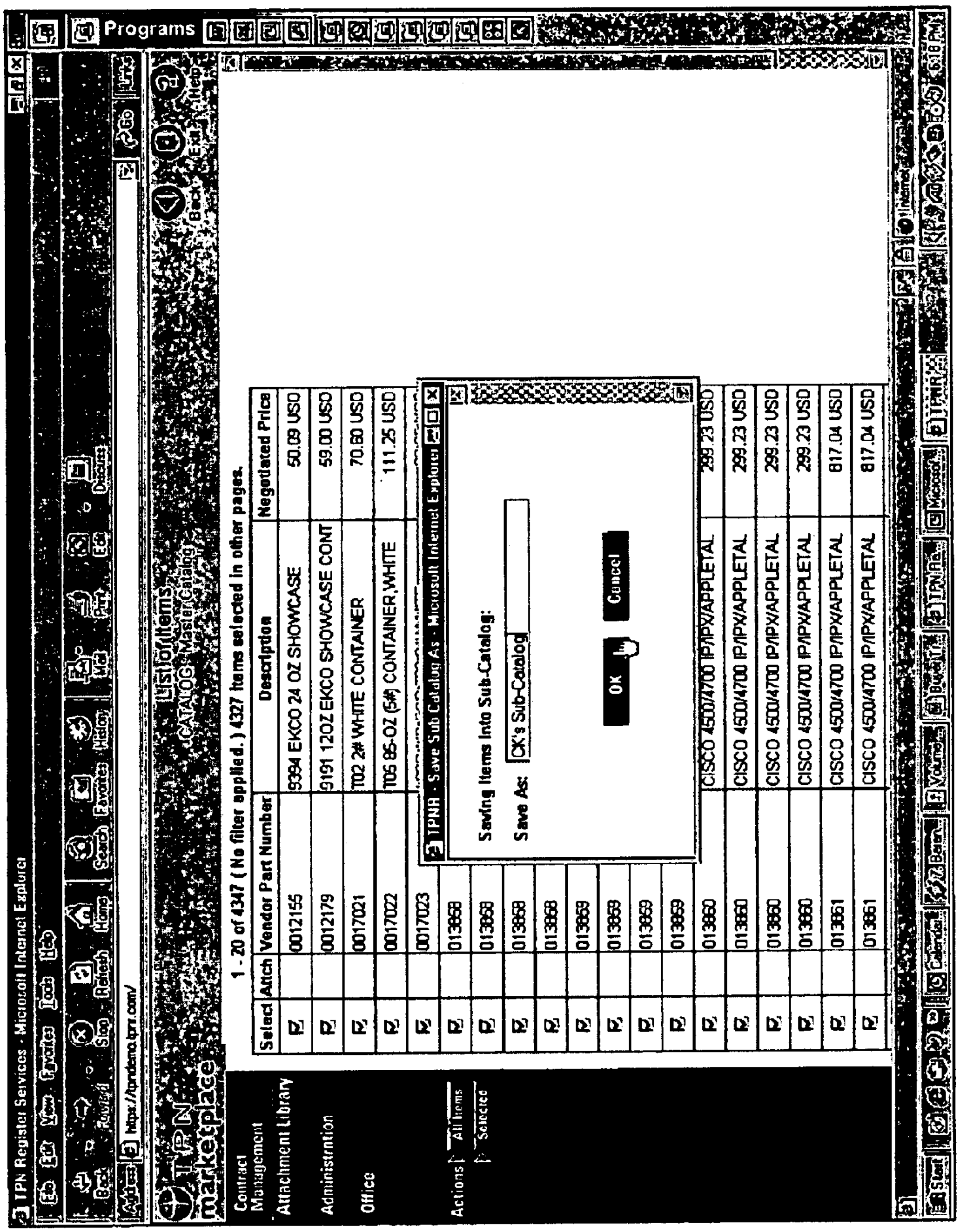
Figure 15G:
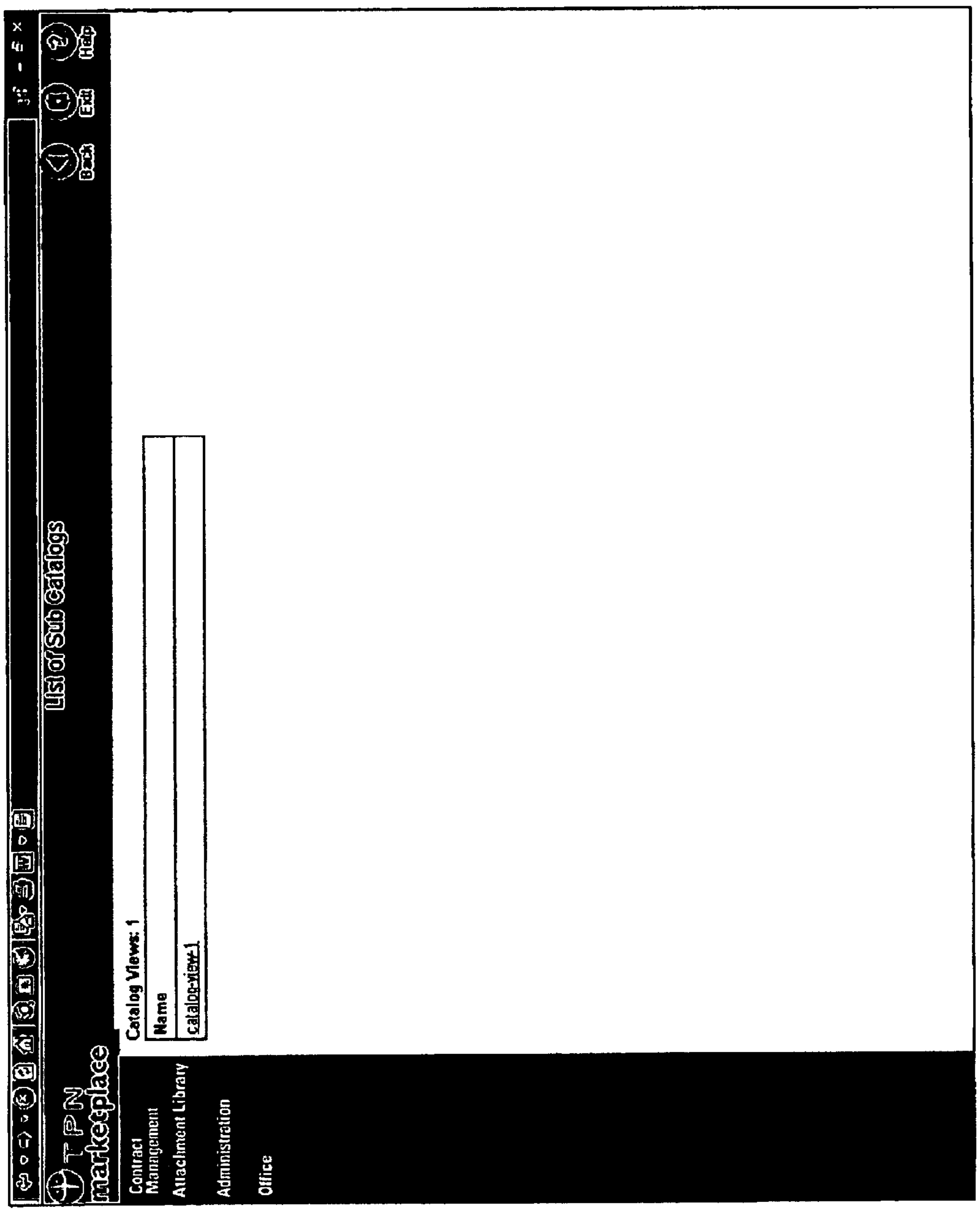

Referring now to FIGS. 15 and 15A through 15G, the system 10 provides: (a) a contract management-view list of catalogs interface as illustrated in FIG. 15A which enables the buyers to view its primary content management page, is used to create and manage sub-catalogs catalogs within the system, and specifically enables buyers to determine which requisitioners or other employees in its organization have access to which items across all approved contracts; (b) a contract management-view categories interface as illustrated in FIG. 15B which displays the buyer master catalog including all the categories for the buyer master catalog; (c) a content management-view items in the master interface as illustrated in FIG. 15C which enables the buyer to view a list of items in the buyer master catalog; (d) a content management-filter item interface as illustrated in FIG. 15D which enables the buyer to create sub-catalogs in the system using filtering criteria (i.e., sub-catalogs by contract name, contract number, etc.); (e) a content management-select all items in a list interface as illustrated in FIG. 15E which enables the buyer to add items to a sub-catalog that match its specified criteria; (f) a content management-create a sub-catalog interface as illustrated in FIG. 15F which enables the buyer to save their sub-catalogs so that users are assigned to it; and (g) a content management confirm save interface as illustrated in FIG. 15G which enables the buyers to confirm the sub-catalogs have been saved.

The buyer can also filter certain base or extended attributes or fields and can attach messages to each product or sub-catalog of products to provide the requisitioner with messages or information including, for example, volume discount indicators for the buyer's requisitioners.

On-Contract Sourcing Application

Figure 16A:
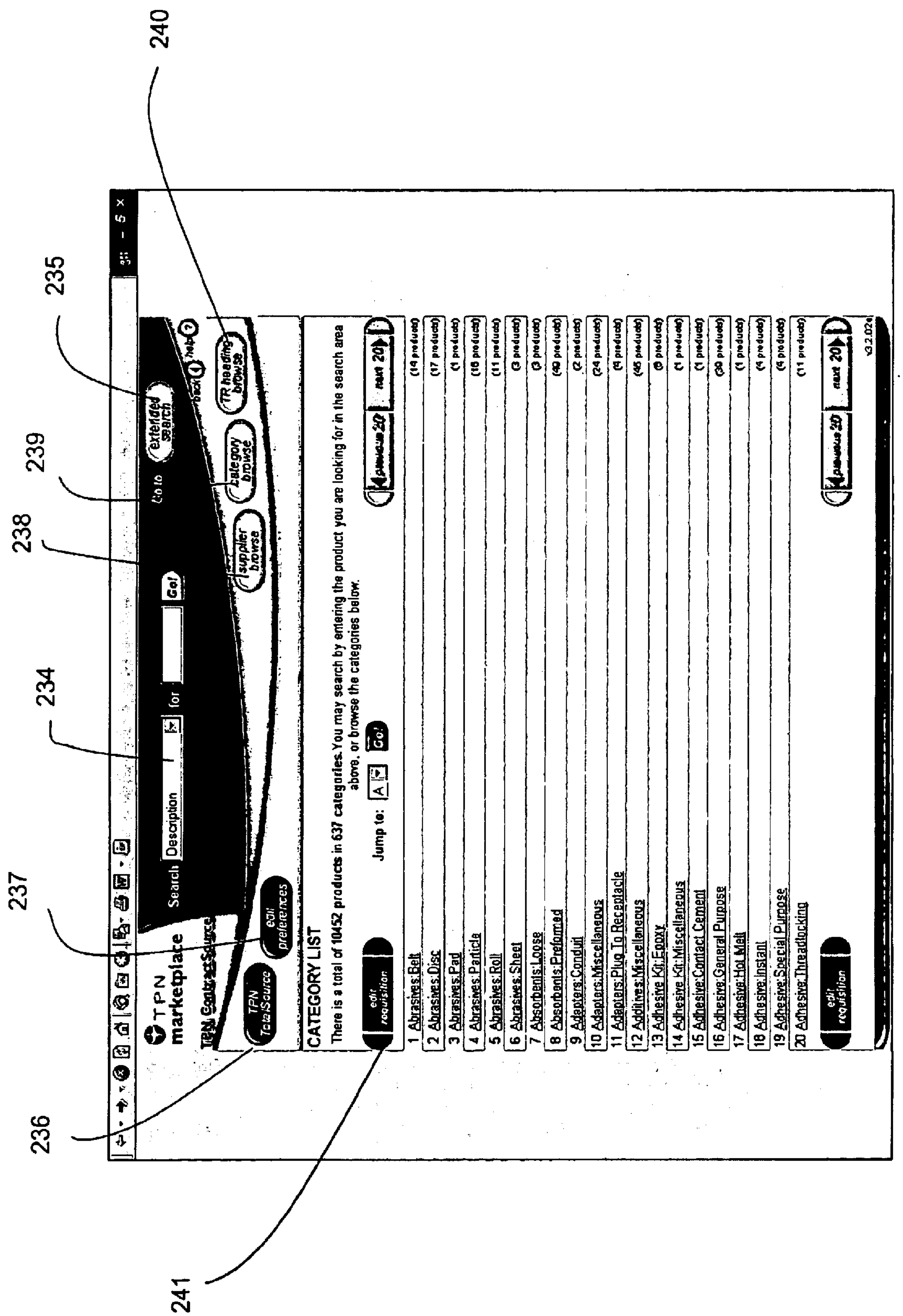
FIGS. 16A and 16B are illustrations of the on-contract sourcing application interfaces of one embodiment of the electronic marketplace of the present invention.
Figure 16B:
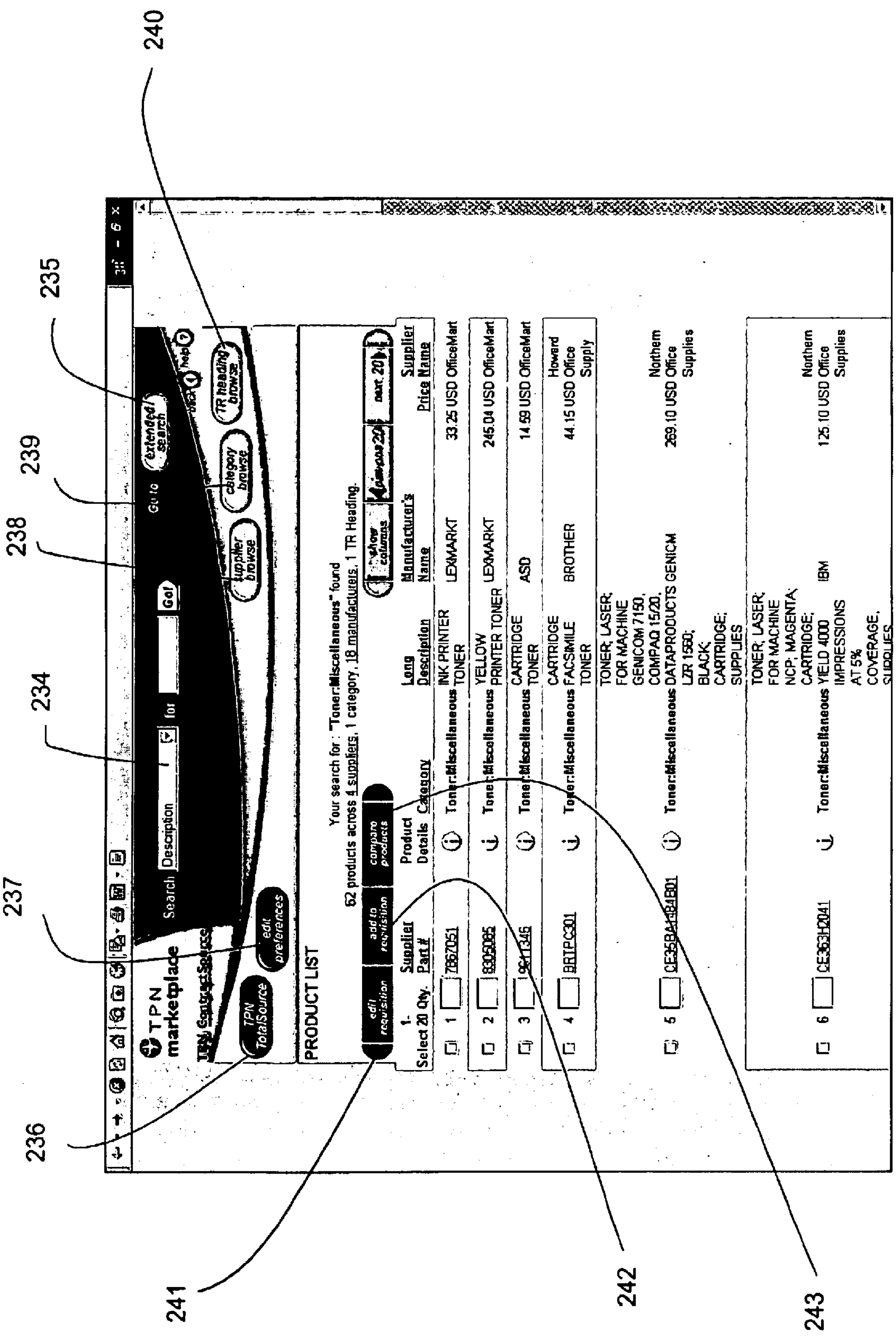

Referring now to FIGS. 16A and 16B, the private on-contract sourcing application 24 of the present invention enables a requisitioner to search for, find, compare and select products which are included in contracts between the buyer and one or more suppliers. As described above, the requisitioner is only allowed to view certain contracts or sub-catalogs accessible by the requisitioner's user group and within a resource group as described above. The on-contract sourcing application provides a category list interface 230 as illustrated in FIG. 16A, a product list interface 232 as illustrated in FIG. 16B and a plurality of searching commands accessible from either interface.

The category list interface 230 identifies the categories accessible to the requisitioner from a search result and the number of products in each category. The product list interface 232 lists or identifies each product in a search result and enables the requisitioner to select the products and the quantity of the products. More specifically, the product list interface 232 provides the supplier part number, the category, a product description, the manufacturers name, the price and the supplier name. The product list interface also enables the requisitioner to obtain more details regarding the product and to compare products. The product interface 232 also enables the requisitioner to show different product columns with different product information including any base attribute or extended attribute.

The commands accessible from each interface include a quick search command 234 and an extended search command 235 which enable the requisitioner to search products by base and extended attributes, respectively. For extended attributes the system preferably displays the extended attributes for products in a category. The interfaces provide an off-contracting sourcing application button or function 236 which enables the requisitioner to enter the off-contract sourcing application, and an edit preferences function 237. The edit preferences function enables the requisitioner to create, view and change the requisitioners private catalog to individualize the requisitioner's shopping experience. The edit preferences function enables the requisitioner to customize the searching environment to their particular preferences, specifically in the area of viewing date formats, default view when accessing the system, default attributes when viewing the results of a search and define the attributes and order of the attributes viewable when performing a keyword search. The system also provides browse functions 238 and 239 which enable the requisitioner to browse supplier and categories, respectively, and the TR heading browse function 240 which enables the requisitioner to browse by THOMAS REGISTER™ heading. The product interface 232 also provides an edit requisition function 241 which enables the requisitioner to edit the requisition, an add to requisition function 242 which enables the requisitioner to add a product to the requisition and a compare products function 243 which enables the requisitioner to compare two or more products.

Off-Contract Sourcing Application

If the buyer requisitioner cannot find the products that the requisitioner is searching for in the on-contract sourcing application, the requisitioner, by clicking on the off-contracts sourcing application button 236 on either of the on-contract sourcing interfaces, can access the off-contract sourcing application or second tier sourcing application of the present invention. The off-contract sourcing application enables the requisitioner to access all of the supplier products in the master catalogs for the participating suppliers (unless otherwise designated by a supplier). In particular, the off-contract sourcing application enables the buyer to access the catalogs of the suppliers with which the buyer has contracts and other suppliers participating in the system with which the buyer does not have contracts. Therefore, the off-contract sourcing application substantially increases the likelihood that buyers will purchase products from suppliers with which the buyer already has contracts or other suppliers which participate in the system of the present invention. This enables such suppliers to capture a greater share of the purchases of buyers with which they have contracts or of buyers participating in the system of the present invention.

Figure 17A:
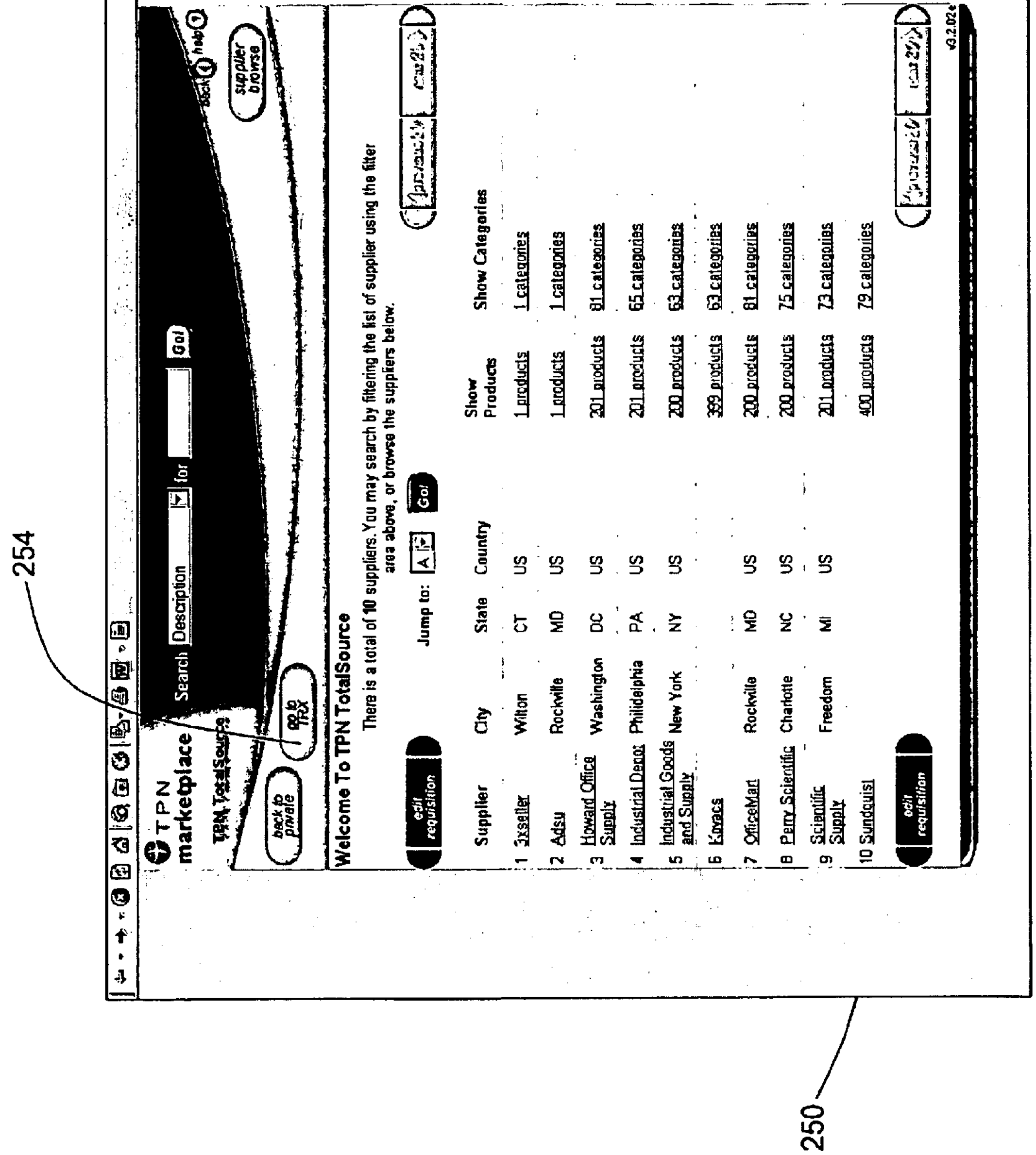
FIGS. 17A and 17B are illustrations of the off-contract sourcing application interfaces of one embodiment of the electronic marketplace of the present invention.
Figure 17B:
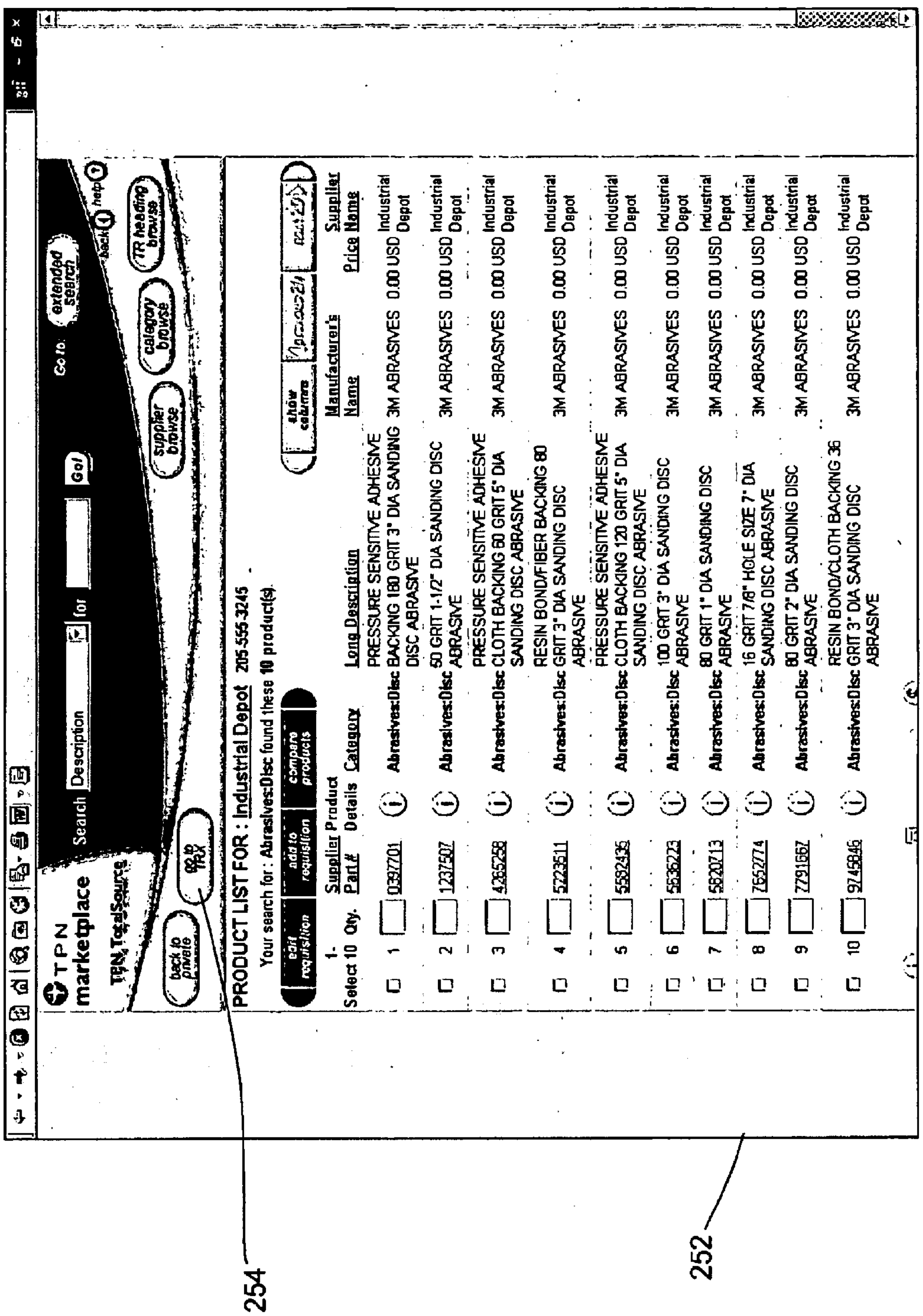

Referring now to FIGS. 17A and 17B, the off-contracting sourcing application provides a supplier list interface 250 as illustrated in FIG. 17A, a product list interface 252 as illustrated in FIG. 17B, and a plurality of searching commands accessible from either interface. The supplier list interface 250 identifies the suppliers accessible to the requisitioner, the city of the suppliers, the state of the suppliers, the country of the suppliers, the number of products provided by the supplier and the number of categories. The product list interface 252 identifies each product in a category and enables the requisitioner to select the products and the quantity of products desired by the requisitioner. More specifically, the product list interface 252 provides the supplier the part number, the category, a product description, the manufacturer name, the price and supplier name. The product list interface 252 also enables the requisitioner to obtain more details regarding the products and to compare products.

The commands accessible from each off-contract sourcing application interface are generally identical to the commands in the on-contract searching interfaces. These commands include a search category or product attribute command, an extended search command, an on-contract sourcing application function which enables the requisitioner to return to the on-contract sourcing application, the supplier internet browser function, the category browse function, the TR heading browse function, edit requisition function, add to requisition function and compare products function. The interface also includes the product index sourcing function 254 which enables the buyer to access the product index sourcing application as discussed below.

Product Index Sourcing Application

Figure 18A:
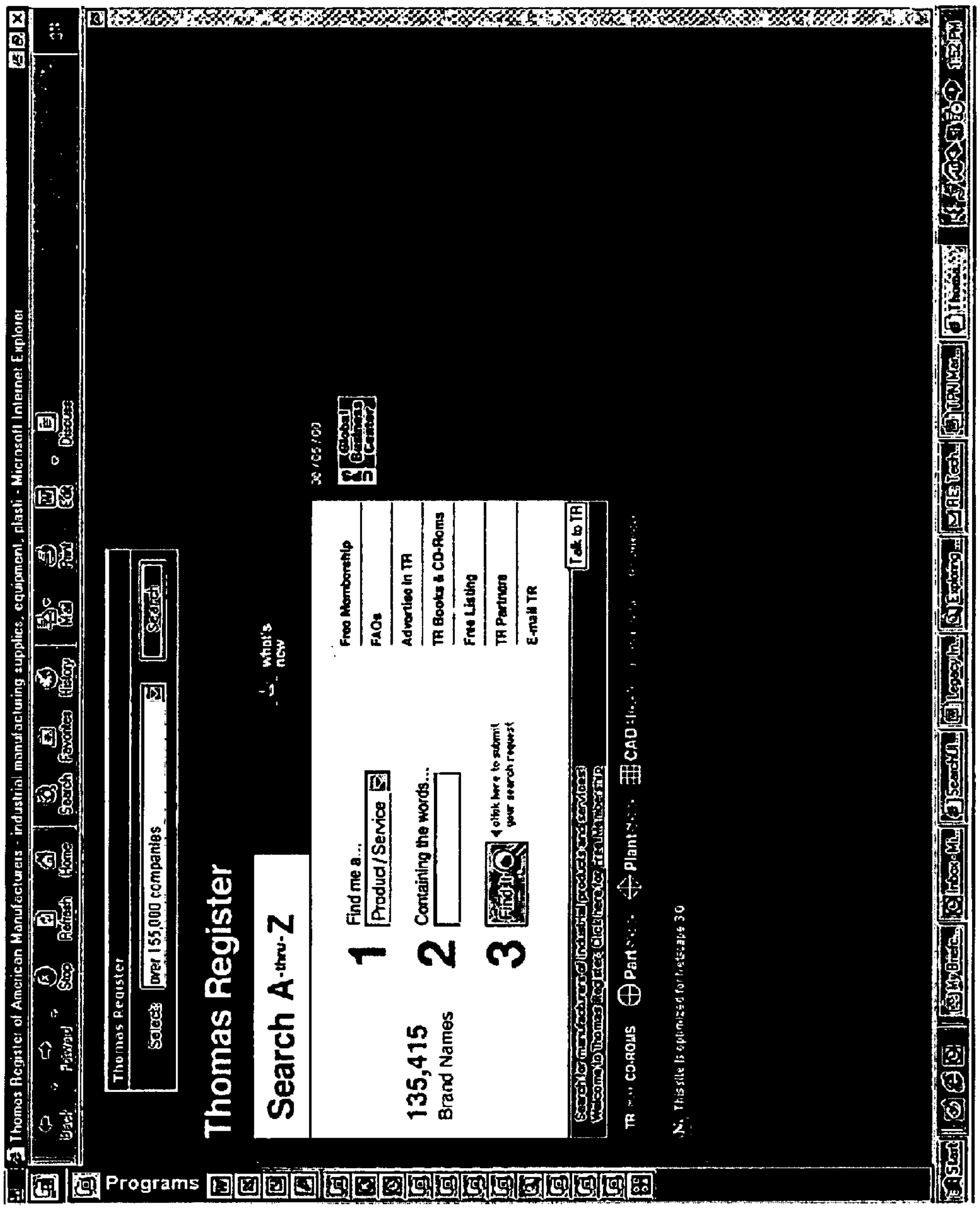
FIGS. 18A, 18B and 18C are illustrations of the product indexing sourcing application interfaces of one embodiment of the electronic marketplace of the present invention.
Figure 18B:
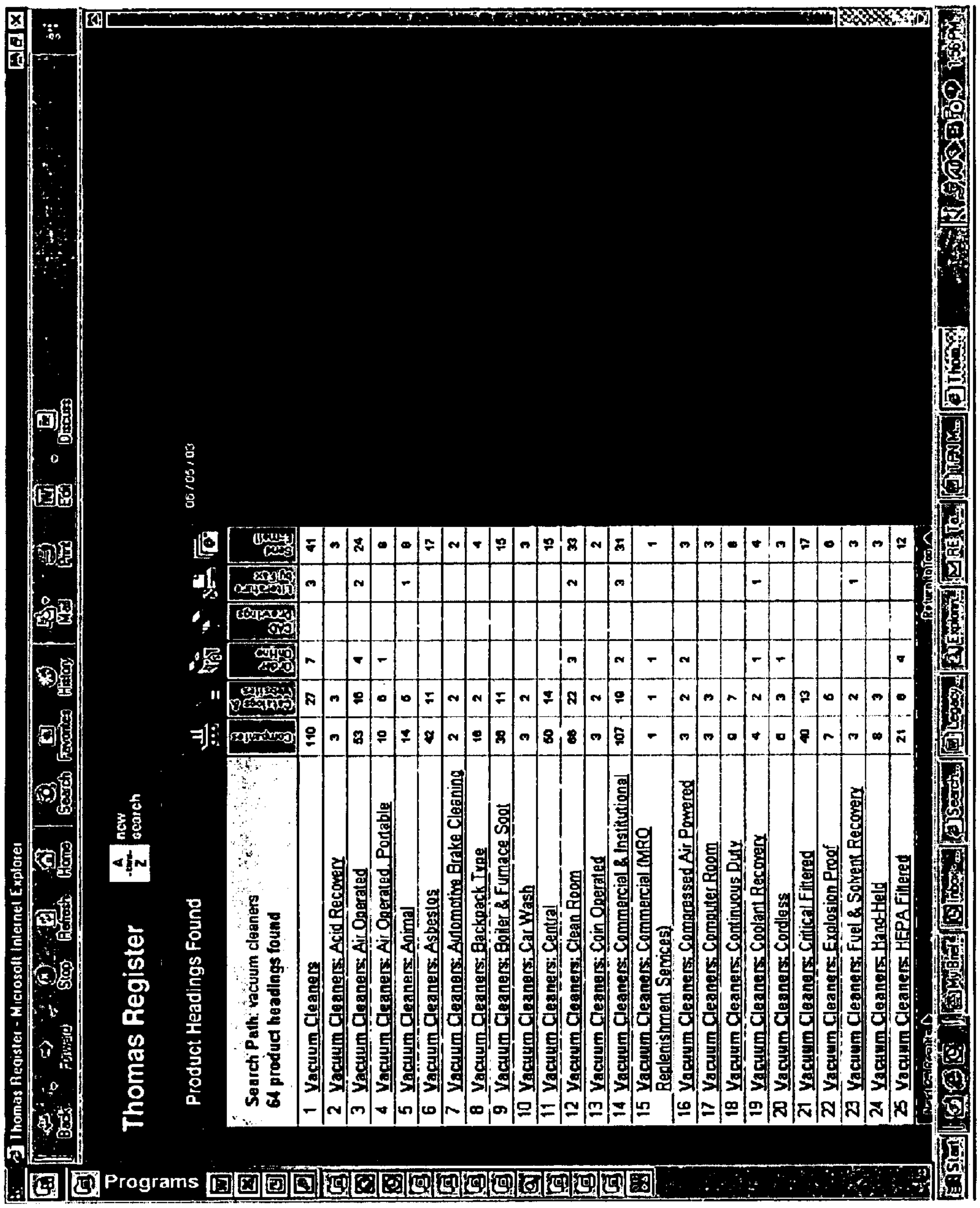
Figure 18C:
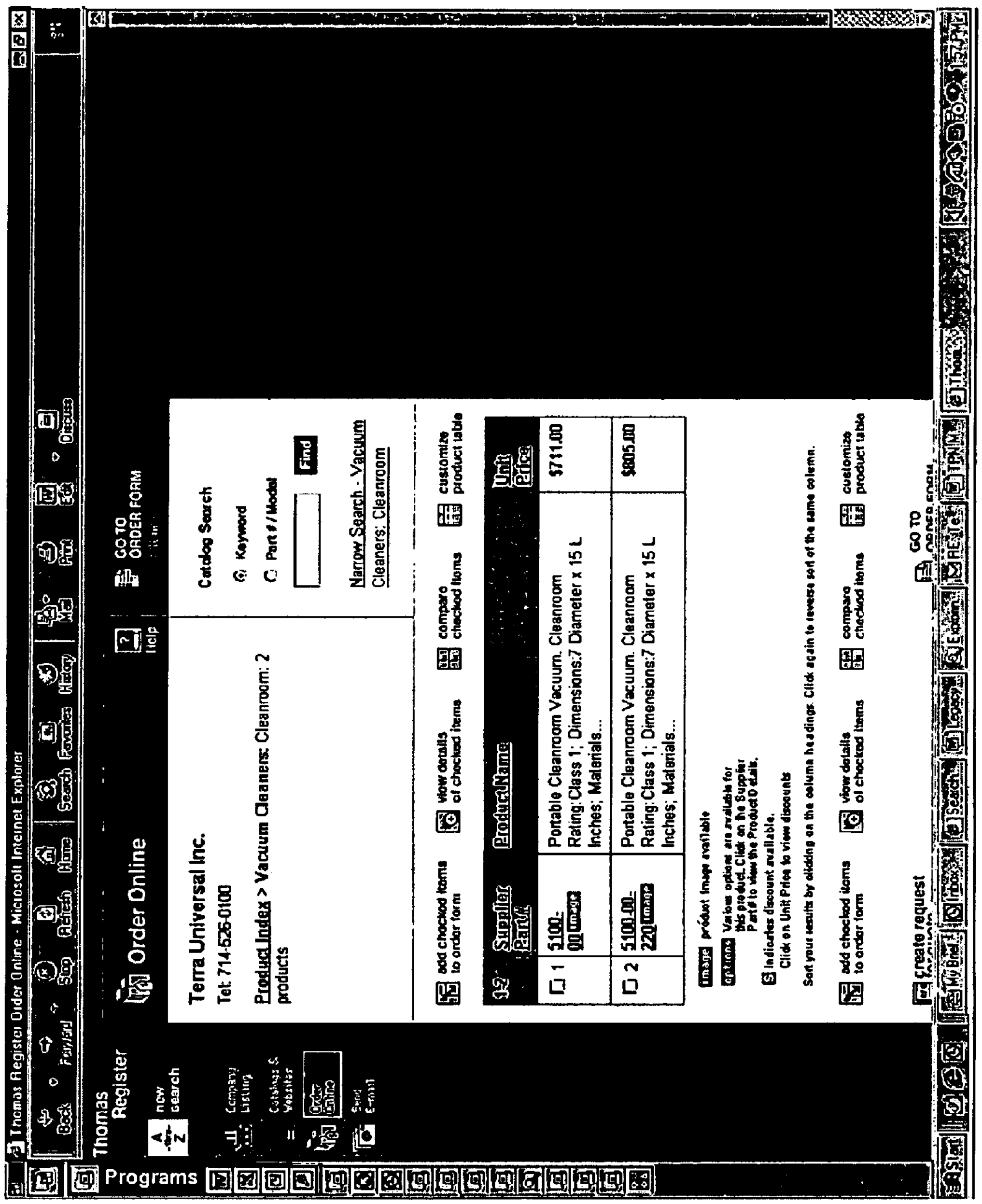

Referring now to FIGS. 18A, 18B and 18C, the product index sourcing application is preferably a private version of a public availability product index such as the index provided by THOMAS REGISTER of American Manufacturers$^{SM}$. THOMAS REGISTER of American Manufacturers$^{SM}$ extranet is an indirect/MRO supplier listing, enabling buyers to purchase items from sources of supply having over 155,000 listings. The private version is preferably a secure site and includes reporting capabilities as desired by the system implementor.

As further illustrated in FIG. 18A, the product sourcing index application provides a plurality of product search functions which enables the requisitioner to search by product or service, brand name, or company. As further illustrated in FIG. 18B when the requisitioner conducts a search, the search results are displayed by the attribute which the requisitioner searched. For each product heading found in the search, various types of information may be provided to the requisitioner. In one preferred embodiment, this information includes information regarding the companies which have the products, the on-line catalogs and web sites of such companies, the ability to order online, the ability to see drawings of the product, the ability to obtain literature by fax, and the ability to send an e-mail to the product manufacturer. The other functions and features are similar or identical to the function offered at the web site at www.thomasregister.com. As further illustrated in FIG. 18C, the product index sourcing application also enables the requisitioner to order products online in the same manner that the www.thomasregister.com web site. The orders are sent directly to the suppliers as indicated above.

Private Supplier Sourcing

The present invention also provides a private supplier sourcing system which enables one or more suppliers or an aggregating third party to create a sourcing environment for buyers that do not have procurement applications. These buyers are typically small to medium size companies. The private supplier sourcing application enables suppliers to sell their products to such buyers and provide the content in the master catalogs of the suppliers to such buyers. A plurality of suppliers can use the private supplier sourcing system and in particular the on-contract sourcing application to create contracts under which any buyer can use the system to purchase products.

Figure 19A:
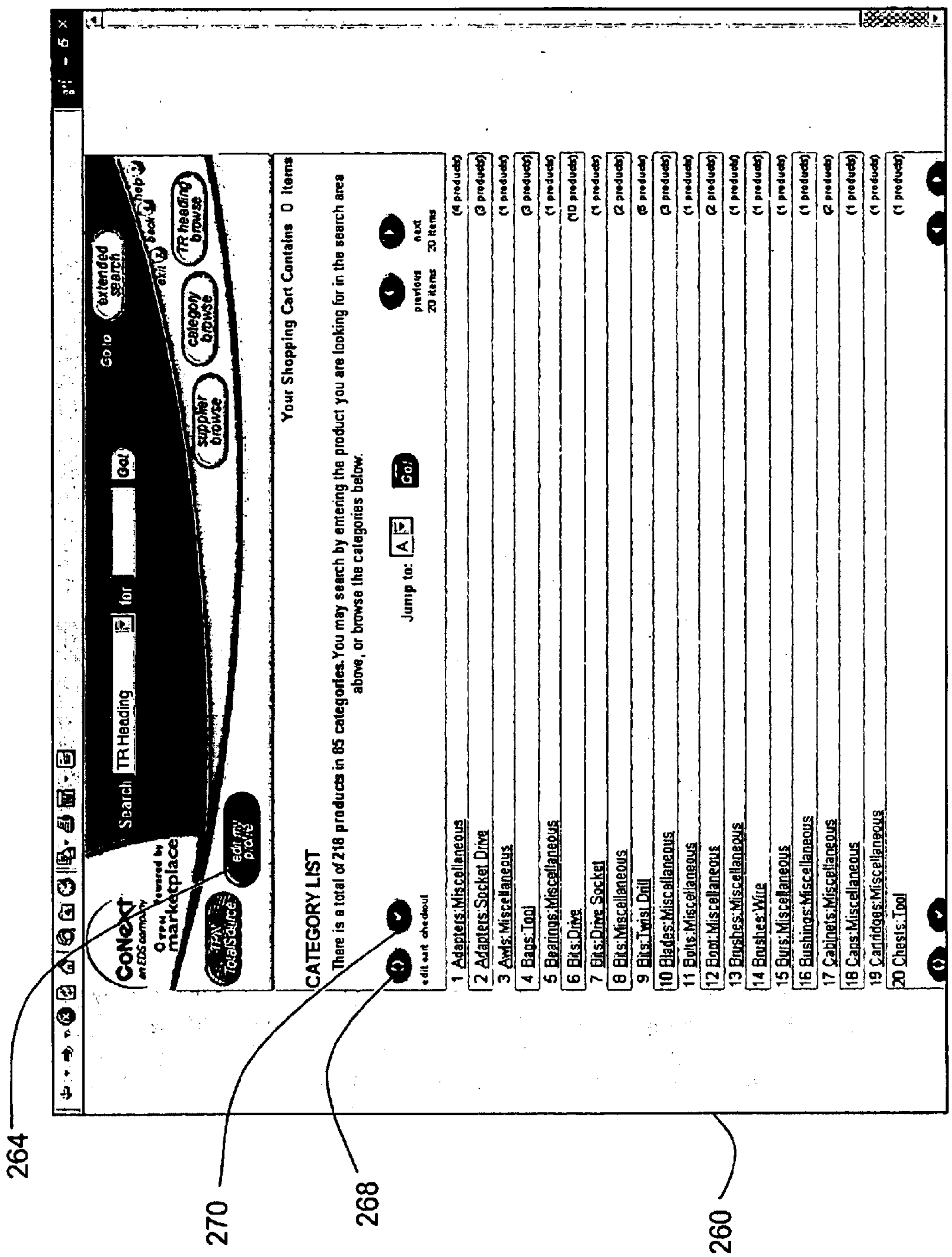
FIGS. 19A and 19B are illustrations of the private supplier sourcing application interfaces of one embodiment of the electronic marketplace of the present invention.
Figure 19B:
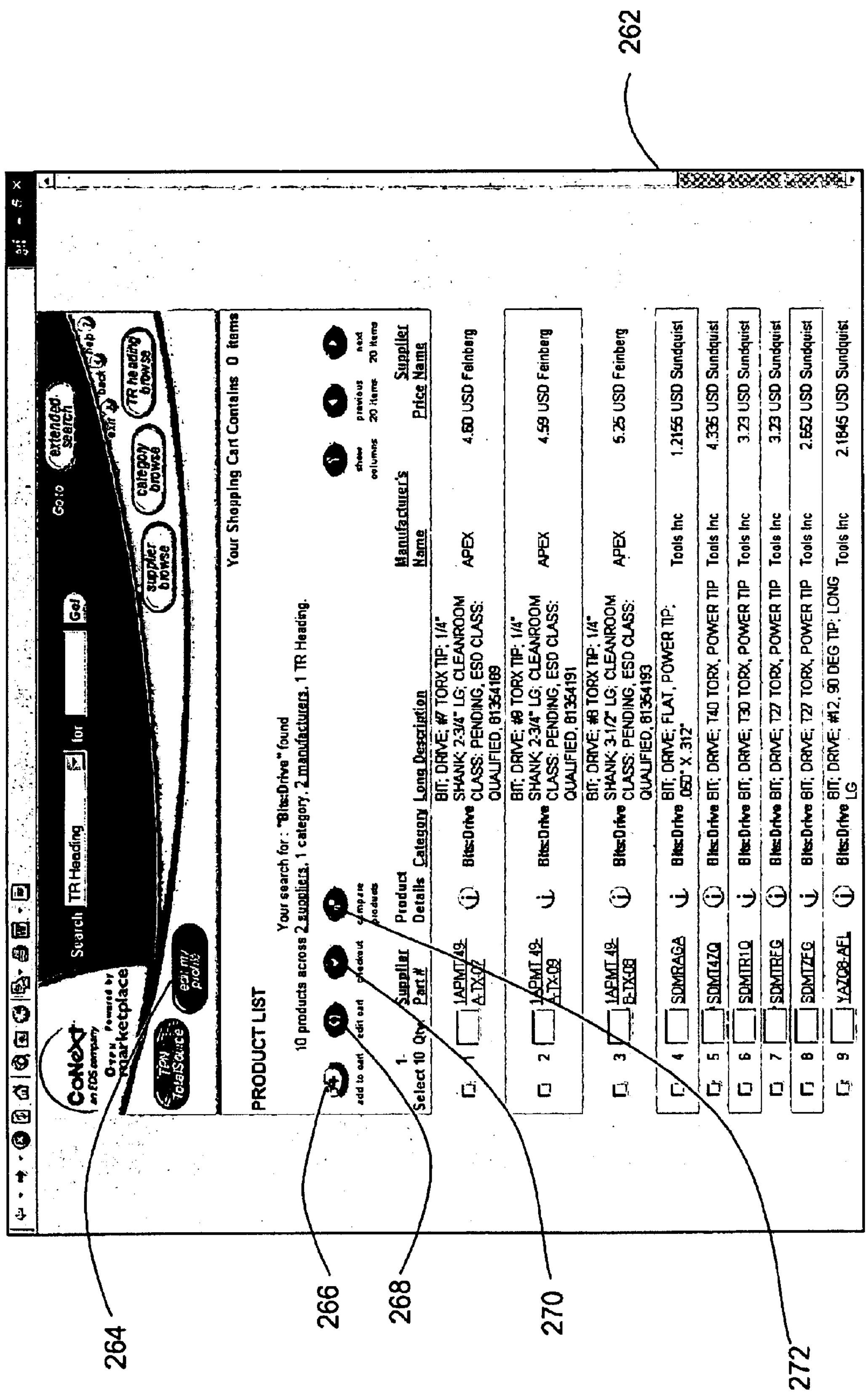

The private supplier sourcing application provides a category list interface 260 as illustrated in FIG. 19A, a product list interface 262 as illustrated in FIG. 19B and plurality of searching commands accessible from either interface. The category list interface 260 identifies the categories accessible to the buyer and the number of products in each category. The product list interface 262 identifies each product in a category and enables the buyer to select the products and the quantity of the products the buyer desires. More specifically, the product list interface 262 provides the supplier the part number, the category, the product description, the manufacturer name and the price and the supplier name. The product list interface 262 also enables the requisitioner to obtain more details regarding the products and to compare products. Each interface includes a search command, an extended search command, and an off-contract sourcing function which enables the buyer to use the off-contract sourcing application for all suppliers as described above. The private sourcing interfaces also provide an edit my profile function 264 which enables the buyer to provide information regarding the buyer, a supplier browse function, a category browse function, and a TR heading browse function.

The private supplier sourcing interfaces further provide an add-to-cart function 266 which enables the buyer to add a product to the buyer's shopping list, an edit cart function 268 which enables the buyer to edit an item in the buyer's shopping cart, a checkout function 270 which enables the buyer to purchase the items in the buyer's shopping cart, and a compare products function 272 which enables the requisitioner to compare products.

When the buyer checks out the private supplier system sends the items in the buyer's shopping cart to a procurement application provided by the system which creates a requisition with the buyer's information and sends the requisition to the appropriate suppliers. The system is thus adapted to enable a plurality of suppliers to group their service together. For instance, associated supplier groups may create a sourcing level which includes office supplies, computer software and temporary services.

Public Buyer Sourcing

If desired by one or more suppliers, the present invention may be adapted to enable non-participating buyers or the public (i.e., public buyers) to access the system and search the master catalog or sub-catalogs of all, some of or one of the suppliers. Preferably, the system enables the individual participating suppliers to make a determination of access to their product content by public buyers based upon the profile of the buyer which is preferably determined by the system prior to enabling the buyer to use the system of the present invention.

Progressive Searching Application

One preferred embodiment of the present invention includes a progressive searching function or command. The progressive searching function enables a requisitioner to narrow a search after a product search results in too many hits or products. The progressive searching application summarizes the number of attributes found in the search including the number of products, suppliers, categories, manufacturers and TR headings found in the search. The requisitioner selects one or more of the attributes to use to narrow the search.

Figure 20A:
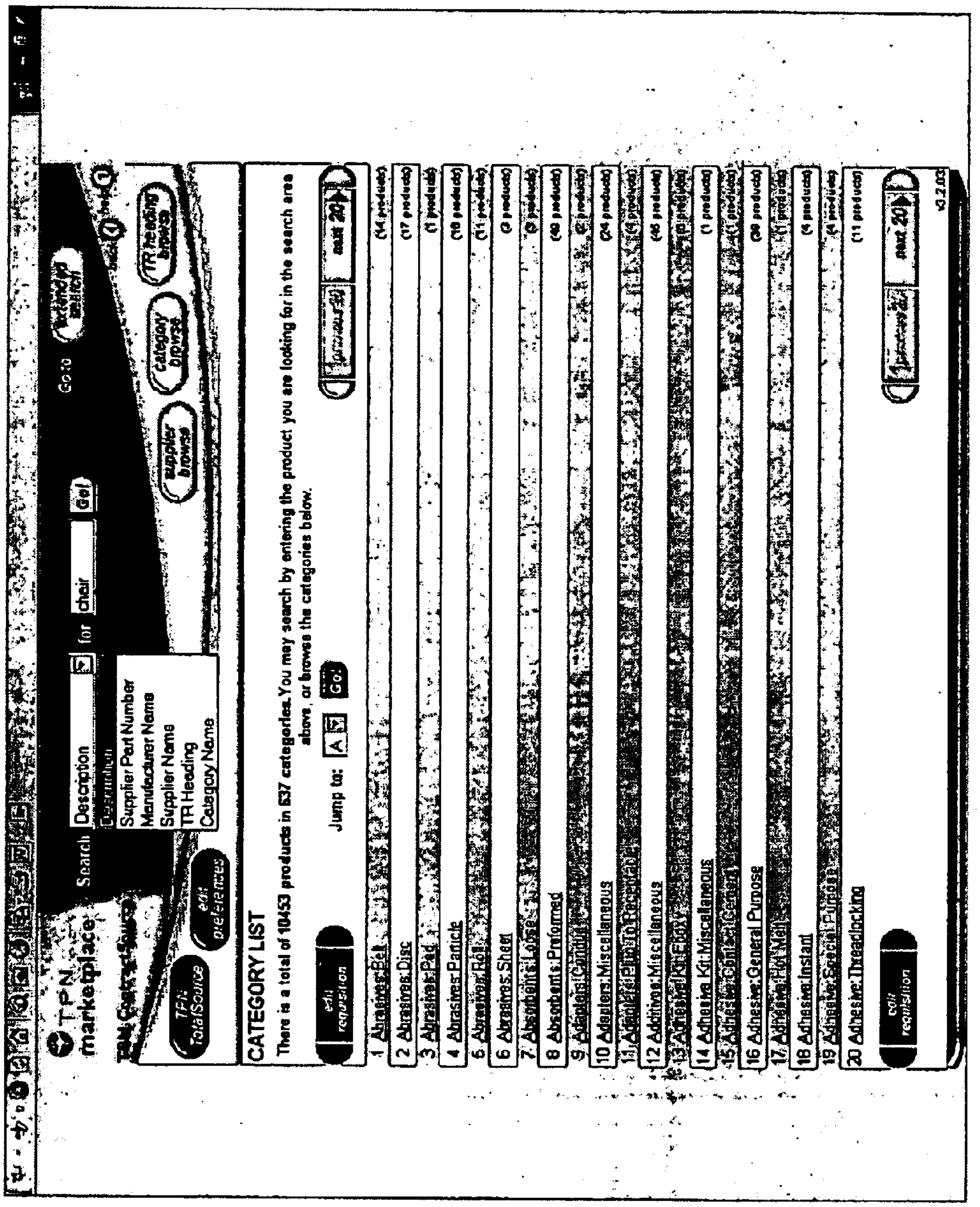
FIGS. 20A, 20B, 20C and 20D are illustrations of the progressive searching application interfaces of one embodiment of the electronic marketplace of the present invention.
Figure 20B:
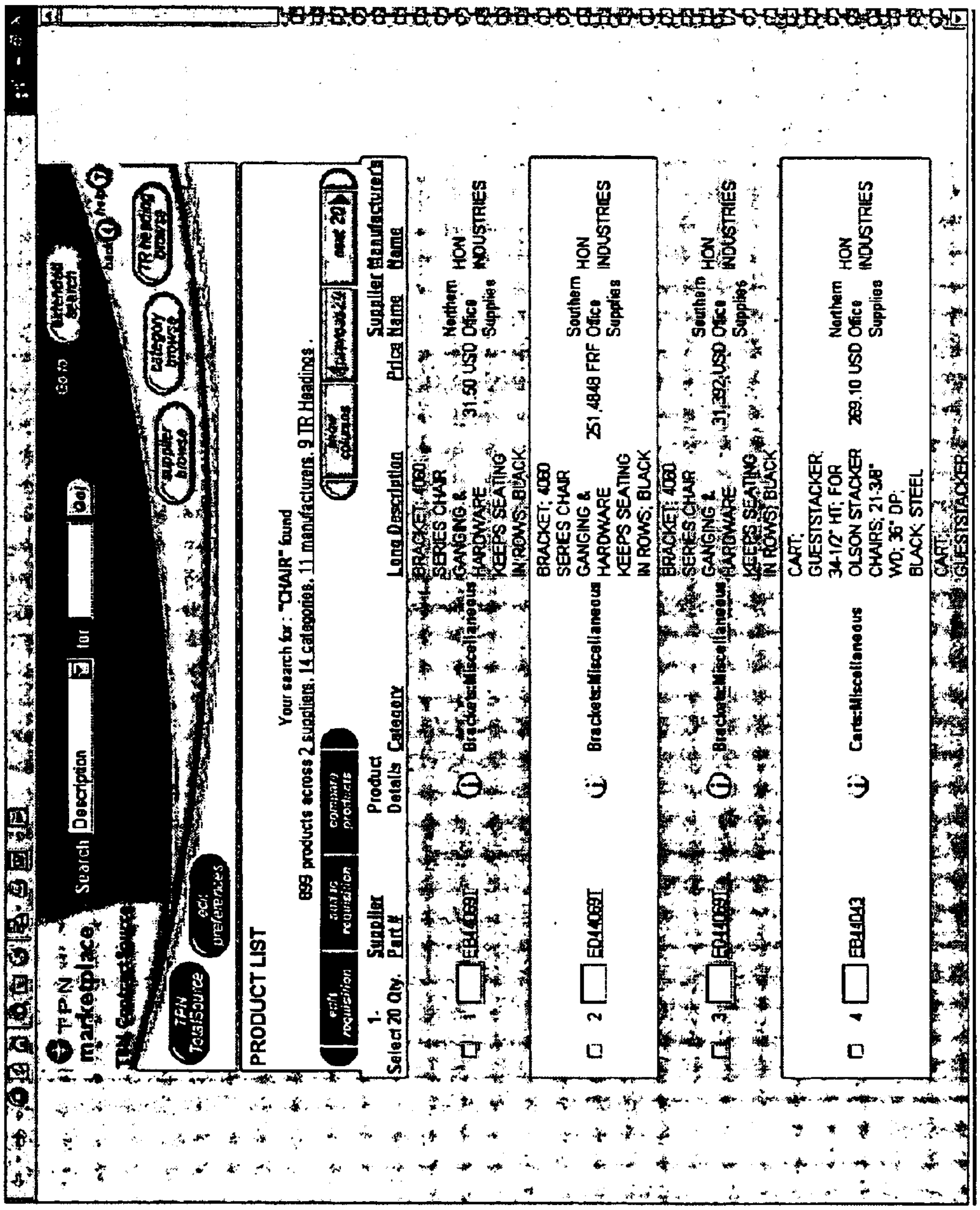
Figure 20C:
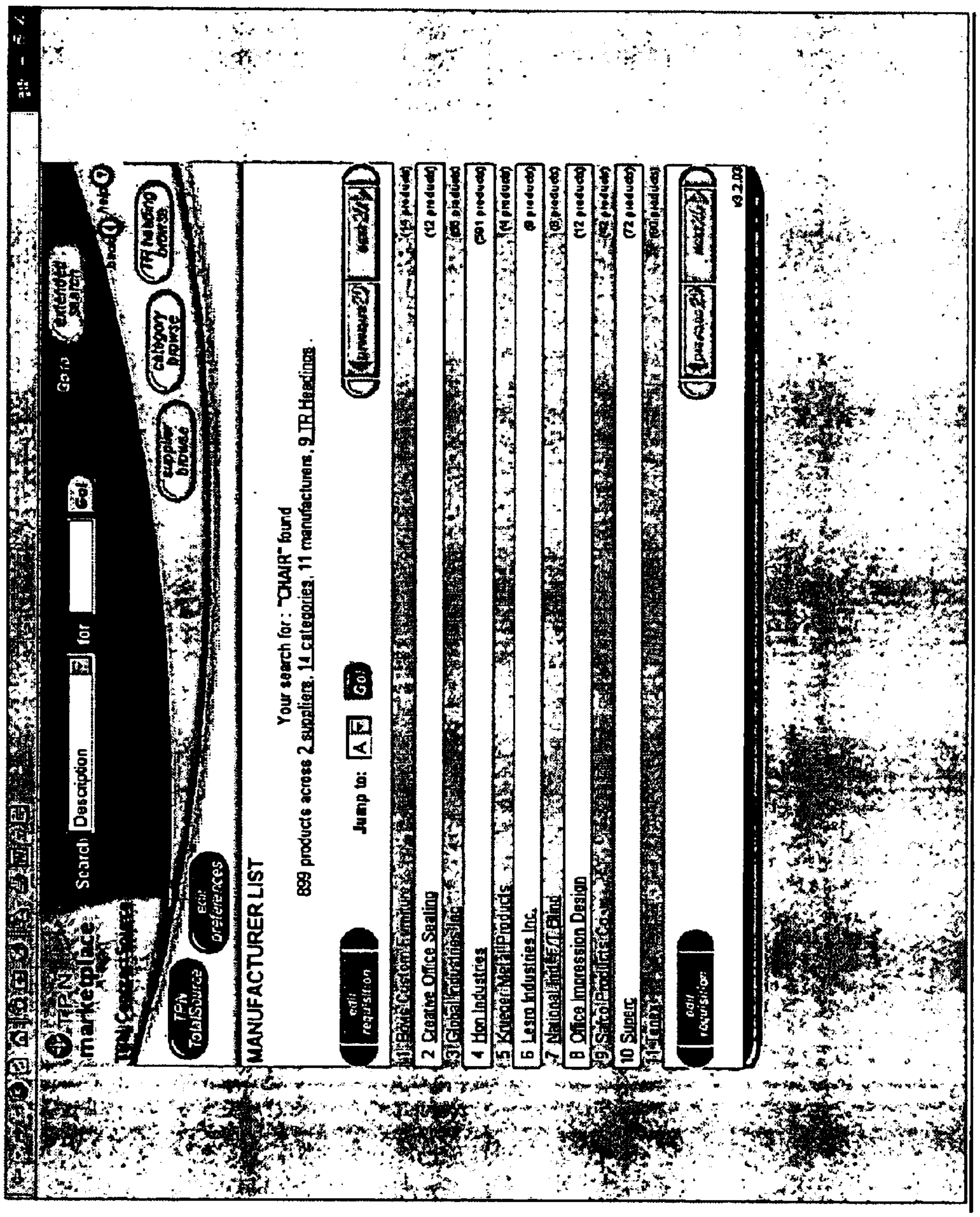
Figure 20D:
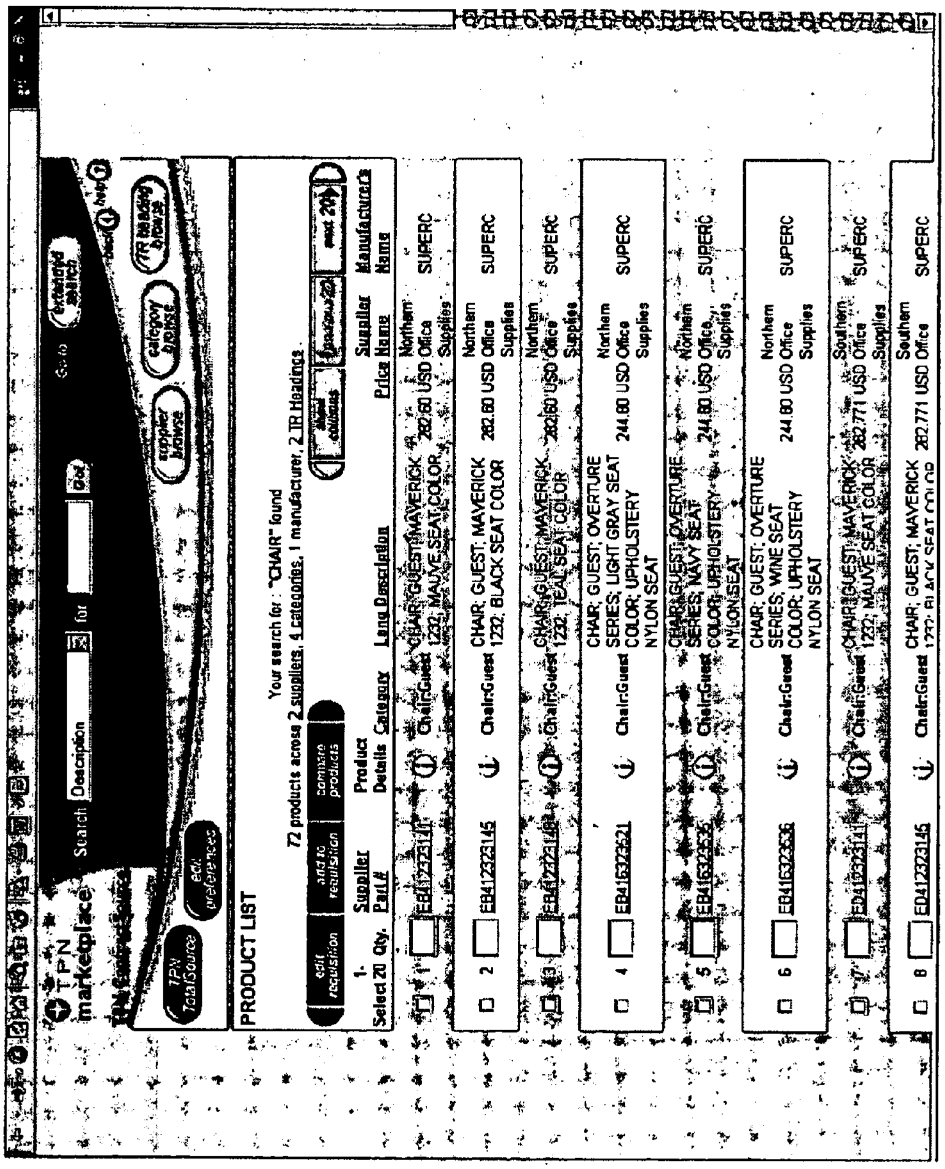

An example of the progressive search feature is illustrated in FIGS. 20A through 20D. As illustrated in FIG. 20A, the requisition performs a description search for a chair. As further illustrated in Fig. B, the search results in 899 products, 2 suppliers, 14 categories, 11 manufacturers and 9 TR headings. The requisitioner may select one of these options to refine or narrow the search. The requisitioner refines the search by selecting the manufacturer. The system provides the requisitioner with a list of manufacturers as illustrated in FIG. 20C. When the requisitioner selects one of the manufacturers, the system displays a list of only the products produced by the selected manufacturer as illustrated in FIG. 20D. The requisitioner could further narrow the search by other attributes such as suppliers, categories or TR headings.

Price Check Verification

The present invention preferably provides a price check verification to prevent a requisitioner from purchasing a product through the off-contract sourcing which is available to the requisitioner in a contract source. Prior to sending any requisition back to the buyer's procurement application, the system preferably checks all of the items in the requisitioner's requisition and verifies that none of the items are present or under a contract in the on-contracting sourcing application. If the items are present in the on-contracting source application, the system preferably automatically changes those items to the on-contract sourcing application so that the negotiated price and other terms for the product will apply such items.

Universal Shopping Cart

The present invention preferably provides the requisitioner a universal shopping cart with the below described functions. The requisitioner can add items to the shopping cart from one to many suppliers. The requisitioner can add items to the shopping cart for items that may have pricing represented in one to many currencies. The requisitioner can add items to the shopping cart from on-contract suppliers and off-contract suppliers.

International Functions

The present invention preferably provides a plurality of international functions to facilitate transactions between international buyers and suppliers in different countries. In particular, the contract management application is preferably adapted to provide exchange rate functions which enable the supplier and the buyer to view prices in designated currencies. The present invention also contemplates a translation of the catalogs from English to other languages after the product information is transformed and reviewed using the load review process and a master catalog for a supplier is created. The system is also preferably adapted to support international address formats and international date formats. The present invention preferably enables suppliers to manage their master catalog of products in their preferred currency. As a contract is created between a supplier and buyer, the system provides the ability to define a different currency and exchange that will be used when determining the negotiated pricing between the supplier and buyer. The marketplace may be adapted to provide the ability to distribute multi-lingual, preferred trading relationship catalogs, for supported languages, to a buying organization or trading community's electronic procurement solution. Where preferred, aggregated, transactive catalog content may be viewed by requisitioners within their local electronic procurement application, in their preferred, supported locale. The marketplace may also be adapted to host within the marketplace a buying organization or trading community's multi-lingual, preferred trading relationship catalogs. In such adaptation, aggregated, transactive catalog content can be viewed by requisitioners and administrative users within the marketplace, in their preferred, supported locale. Additionally, the system may provide a localized user interface throughout the marketplace solution for all members of the marketplace to view and work with catalog content in a user's preferred, supported locale.

Contract Comparison Function

The present invention preferably enables buyers and suppliers to compare contracts. In particular the present invention enables the buyer and supplier to compare prices and other items between two or more contracts. The system enables the supplier and the buyer to compare all attributes tracked for the contract header from one contract to another and highlights the differences. The system enables the supplier and buyer to view a summary comparison of all differences between the items on one contract to another including: (1) number of items added; (2) number of items deleted; (3) number of price increases; (4) number of price decreases; (5) number of items with no price change; (6) largest price increase by percentage; (7) smallest price increase by percentage; (8) largest price decrease by percentage; (9) smallest price decrease by percentage; (10) average price change; (11) least expensive item; and (12) most expensive item. The system enables the supplier and buyer to compare all attributes tracked for all items from one contract to another and highlight the differences.

Global Price Modifications

The present invention preferably enables the supplier to apply price changes to individual products or to make global price changes to the list price of all products, products in certain categories, or products in certain sub-categories. The system enables the supplier to change the prices by increasing or decreasing the dollar value or increasing or decreasing the price in dollars or by a percentage such as five percent. More specifically, the system enables the supplier to change the list price in the master catalog, and in any working master or working contract. Any such changes in a working contract ultimately must be approved by a buyer.

Content Distribution

Referring back to FIG. 1, the system 10 provides participating suppliers 12 with multiple distribution channels for distributing their content to participating buyers 14 and non-participating buyers. In addition to the on-contract sourcing, off-contract sourcing, product index sourcing, private supplier sourcing and public buyer sourcing discussed above, the system enables the supplier to use and distribute the content in a variety of ways. Generally, the present invention facilitates content distribution for buy-side sourcing, content distribution for supply-side sourcing, and content distribution for exchanges including multi-buyer exchanges and multi-supplier exchanges. The supplier controls where the supplier's content is distributed.

The content distribution application 32 enables the supplier to distribute and update the content to one or more buyer systems behind the buyer computer system fire walls. The buyer can use this data in electronic buy-side web systems or directly with the buyer's procurement systems. The content distribution application tracks which product information is downloaded on the buyer systems and the date the product information is downloaded on the buyer systems. When the supplier of the downloaded product information updates the content information, the system is preferably adapted to download the updated product information on the buyer systems having the product information previously downloaded.

The content distribution application 32 also facilitates the distribution of transformed content and updated content back to the supplier and supplier supply-side systems. In one embodiment of the present invention, the system and particularly the content distribution system 32 delivers the content to the supplier web based order system. The supplier can use this content in any manner desired by the supplier. For instance, the supplier can divide the content into various sub-catalogs for particular buyers or allow buyers access to the entire catalog. In this manner, the supplier can create buyer communities in which different types of buyers can access different categories. The content on the system can further be used by multi-buyer or multi-seller exchanges such as AutoExchange, Ventro, MetalSite and VerticalNet using the Internet. The content distribution system 32 may be adapted to update the information on these exchanges on a regular basis.

Supplier Administrations

Figure 21A:
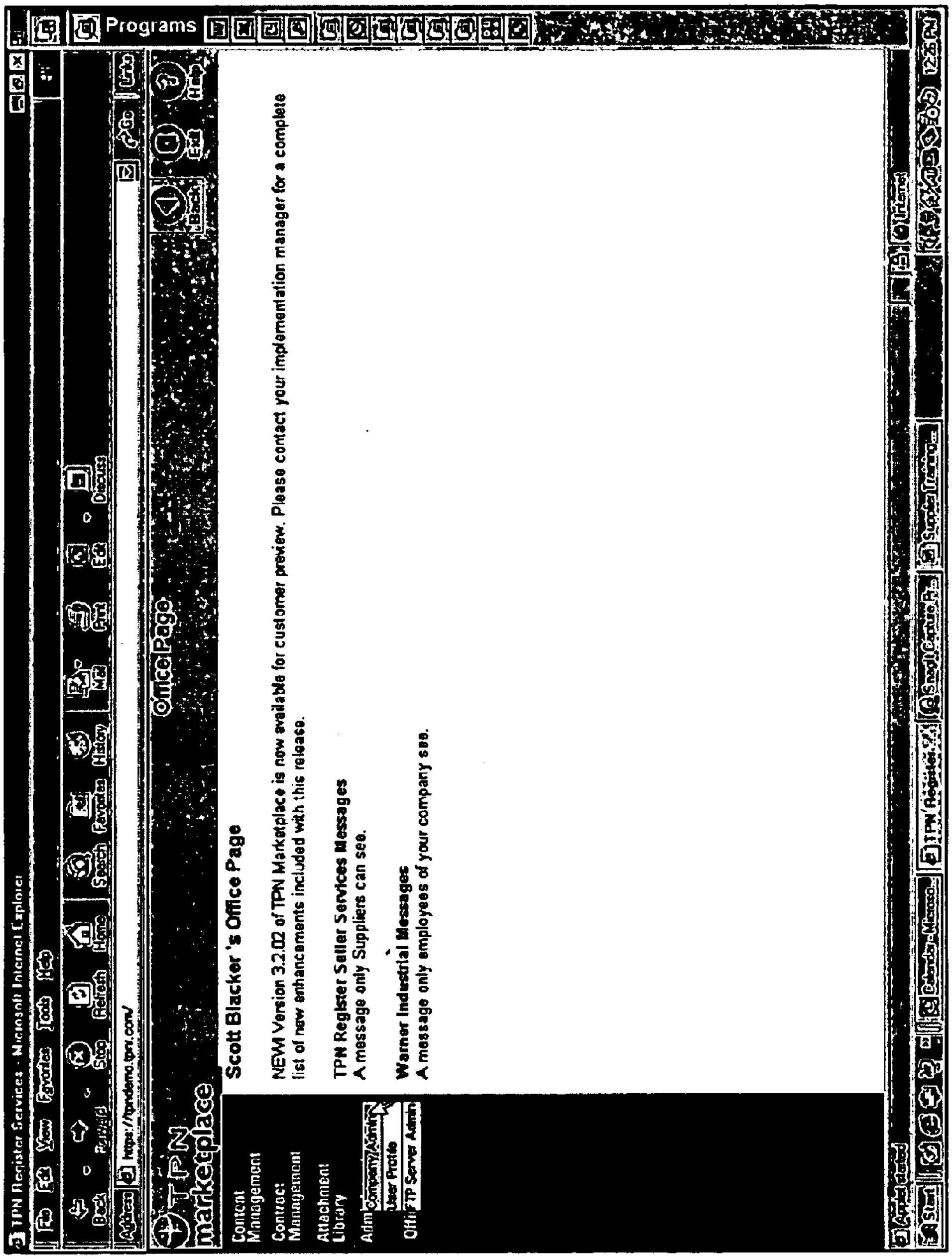
FIGS. 21A through 21D are illustrations of the supplier administration interfaces of one embodiment of the electronic marketplace of the present invention.
Figure 21B:
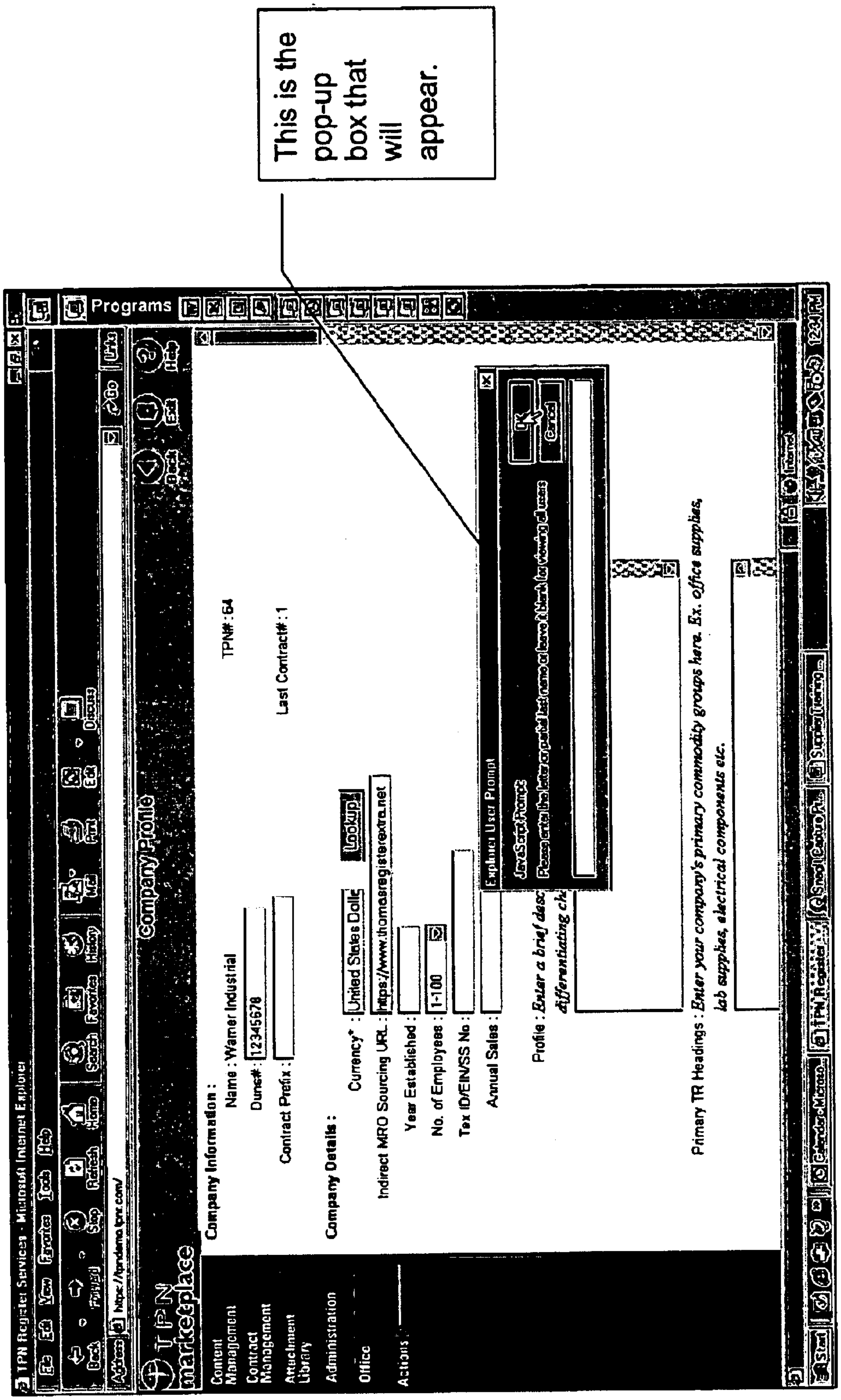
Figure 21C:
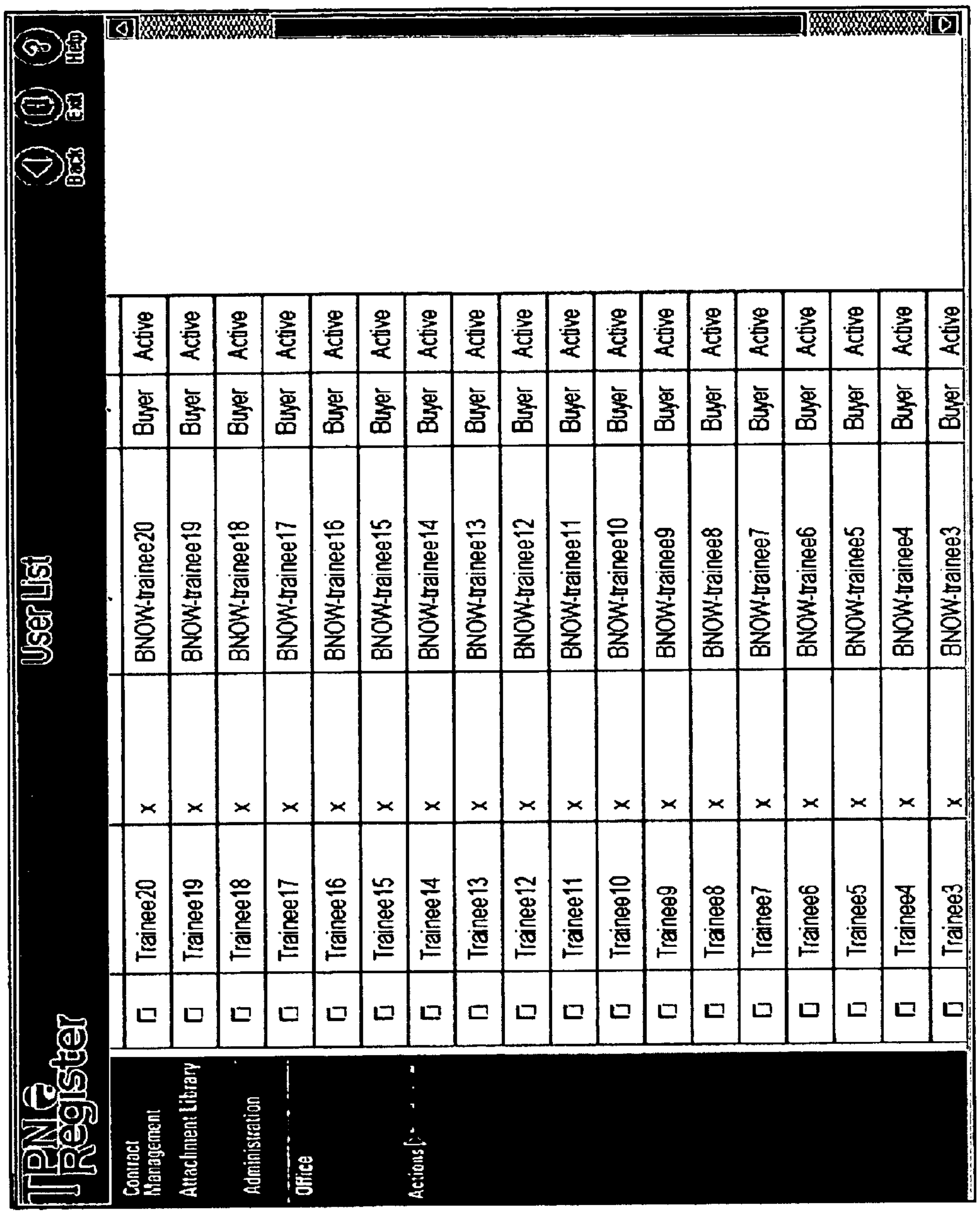
Figure 21D:
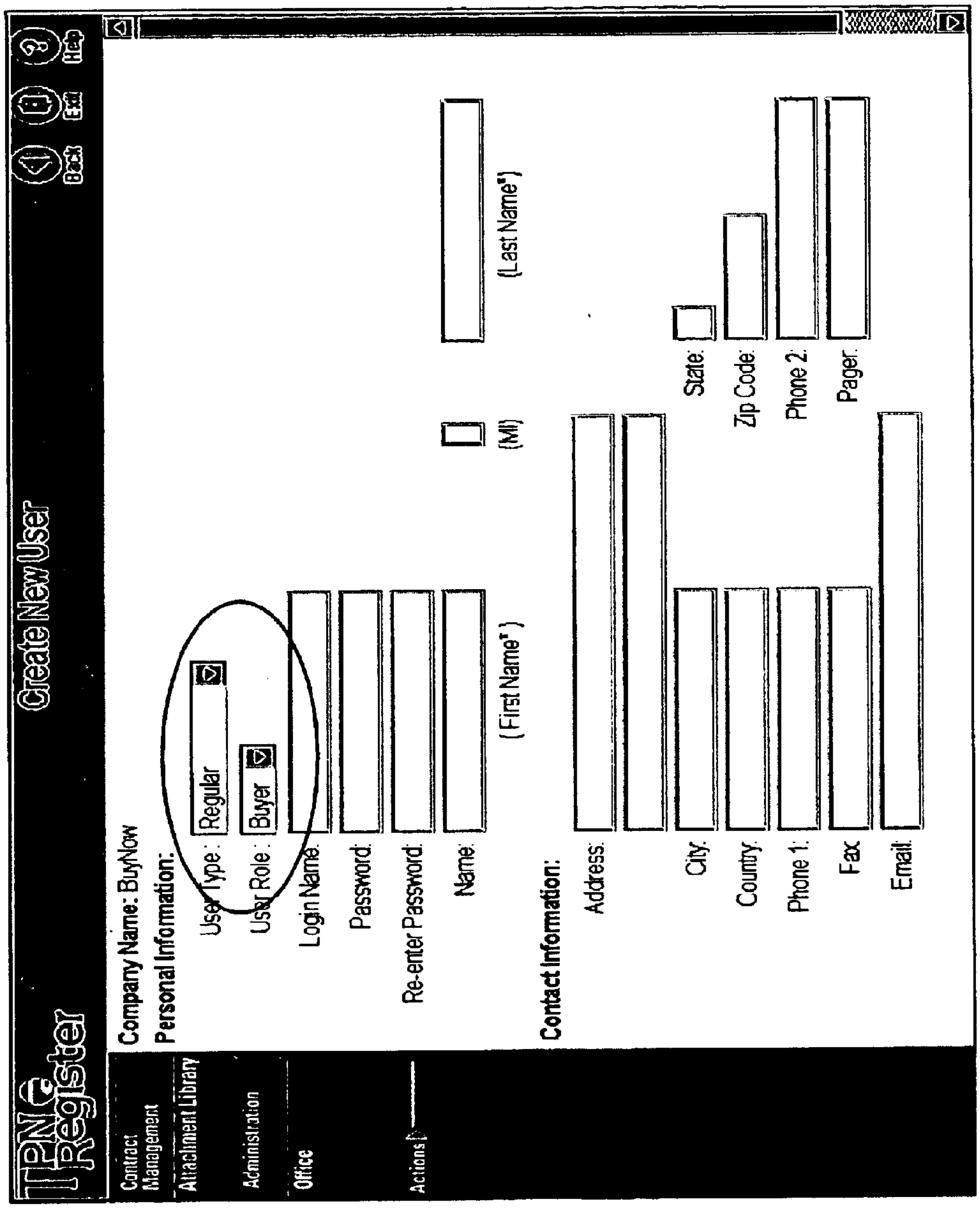

As illustrated in FIGS. 21A through 2D, the system provides the supplier with a plurality of suppler interfaces which enable the supplier to perform a plurality of supplier administrative tasks. In particular, the system provides: (a) an Administration-edit company profile interface, as illustrated in FIG. 21A which enables the supplier to access administrative functions and is limited to users having administrator status; (b) an administration-view/edit company profile interface, as illustrated in FIG. 21B, which enables the administrator to view or edit the supplier's profile information; (c) an administration-user interface, as illustrated in FIG. 21C, which enables the administrators to view and activate or deactivate a user, enabling users to access the system; and (d) an administration-user interface, as illustrated in FIG. 21D, which enables the administrators to enter pertinent information about users including mandatory information such or login name, password, name, last name and e-mail address. It should be appreciated that the system does not define a supplier as only a supplier. Rather, the system defines the supplier as a user. This enables suppliers to also use the system to purchase products from other suppliers.

Figure 22A:
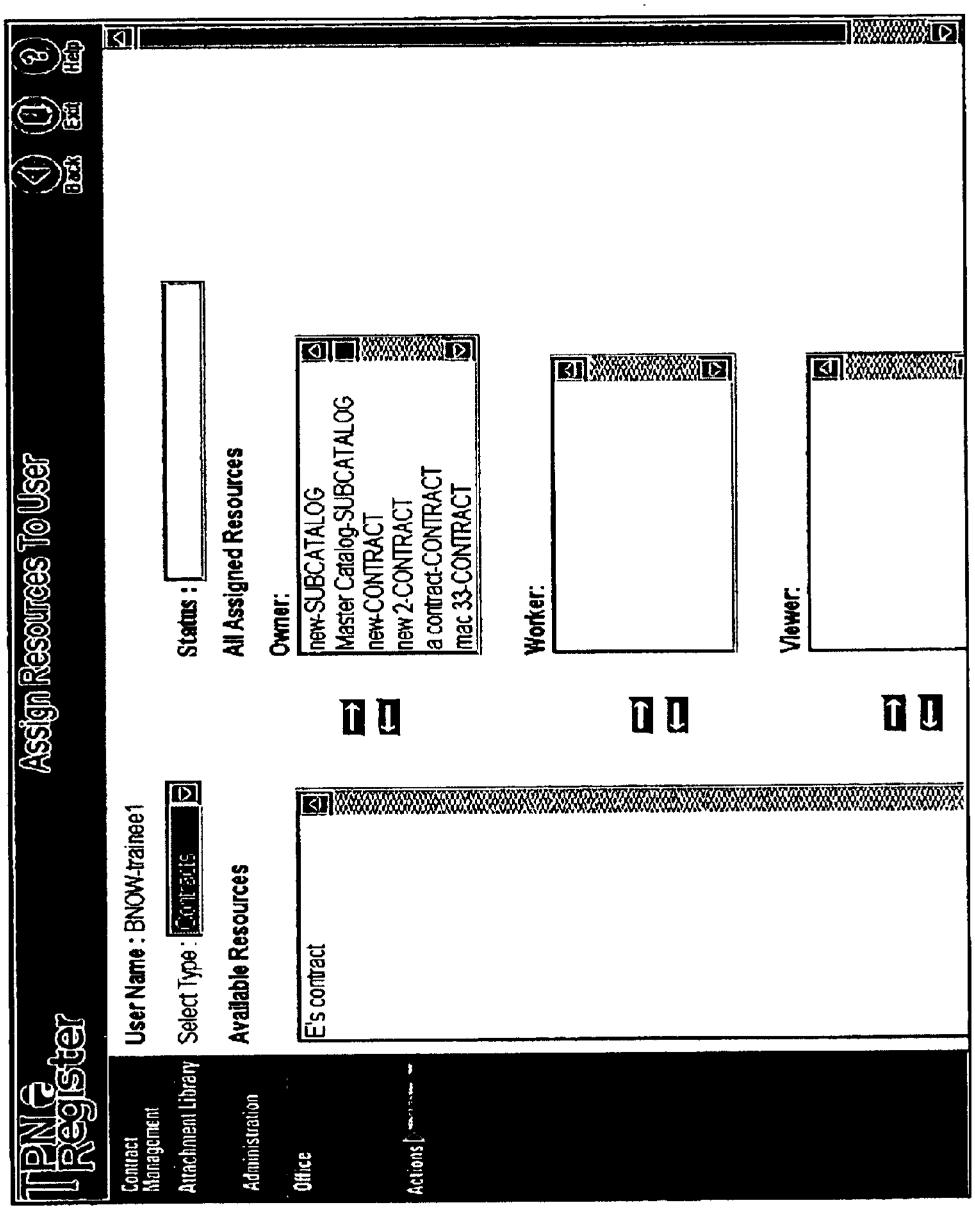
FIGS. 22A through 22E are illustrations of the supplier administration resource interfaces of one embodiment of the electronic marketplace of the present invention.
Figure 22B:
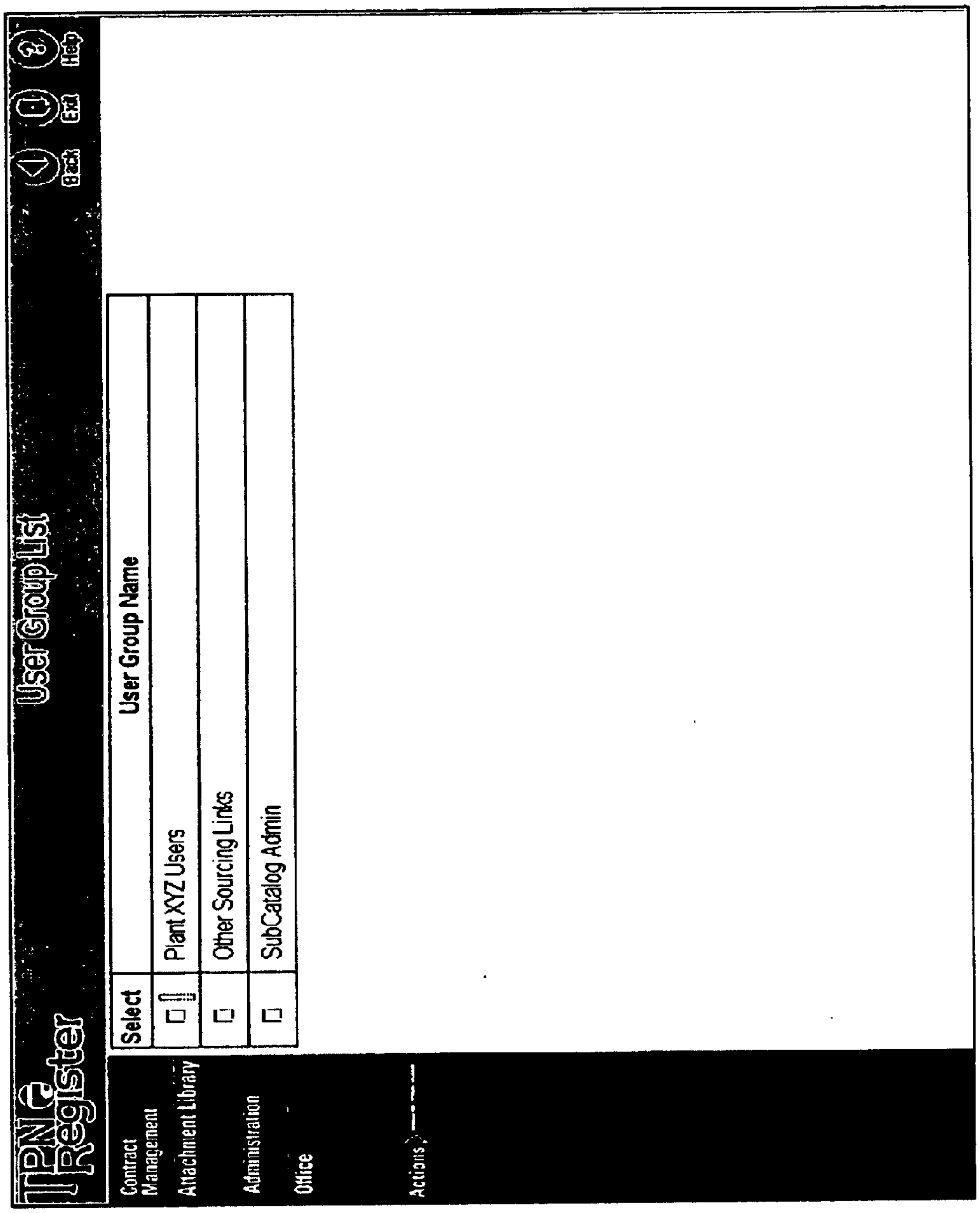
Figure 22C:
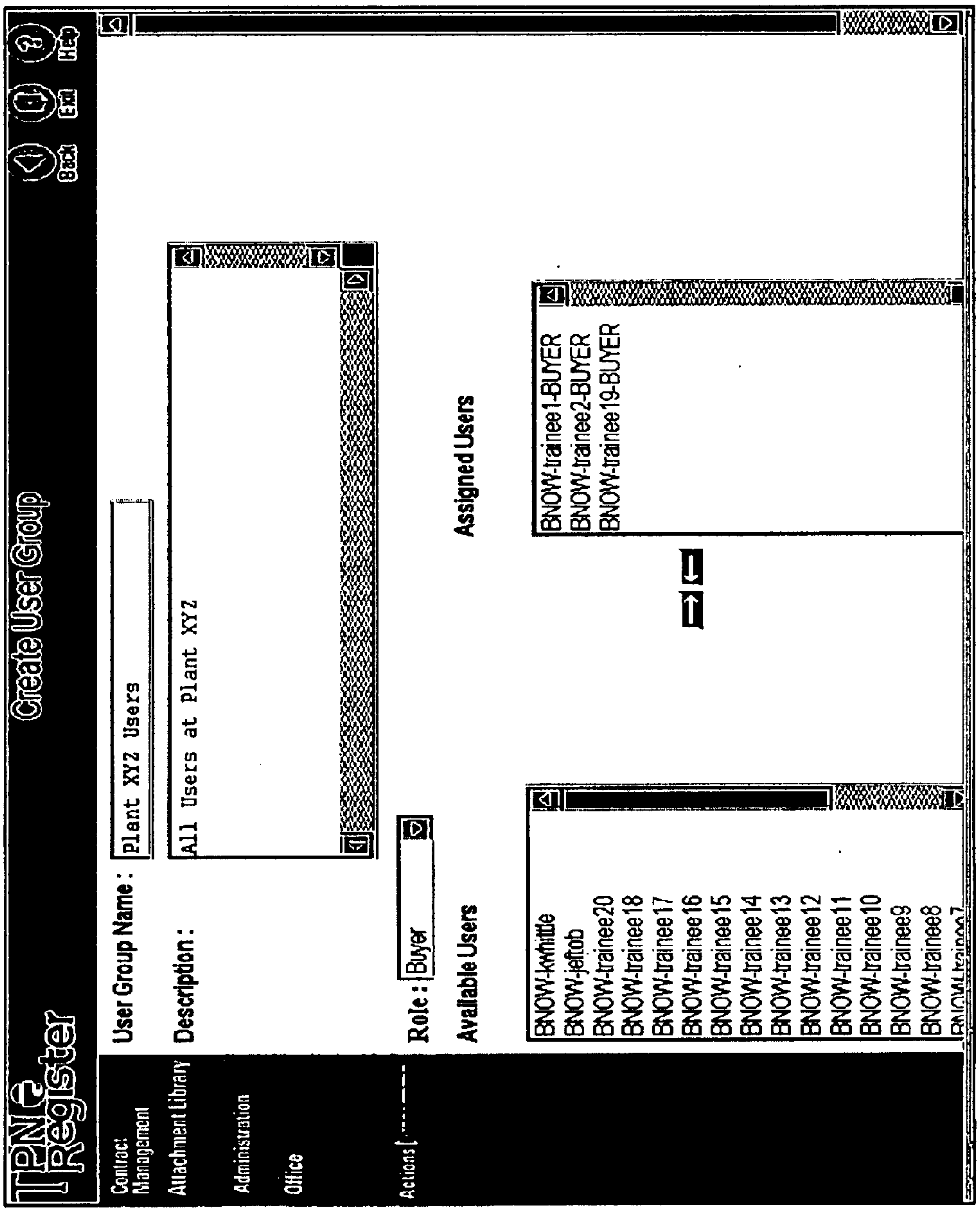
Figure 22D:
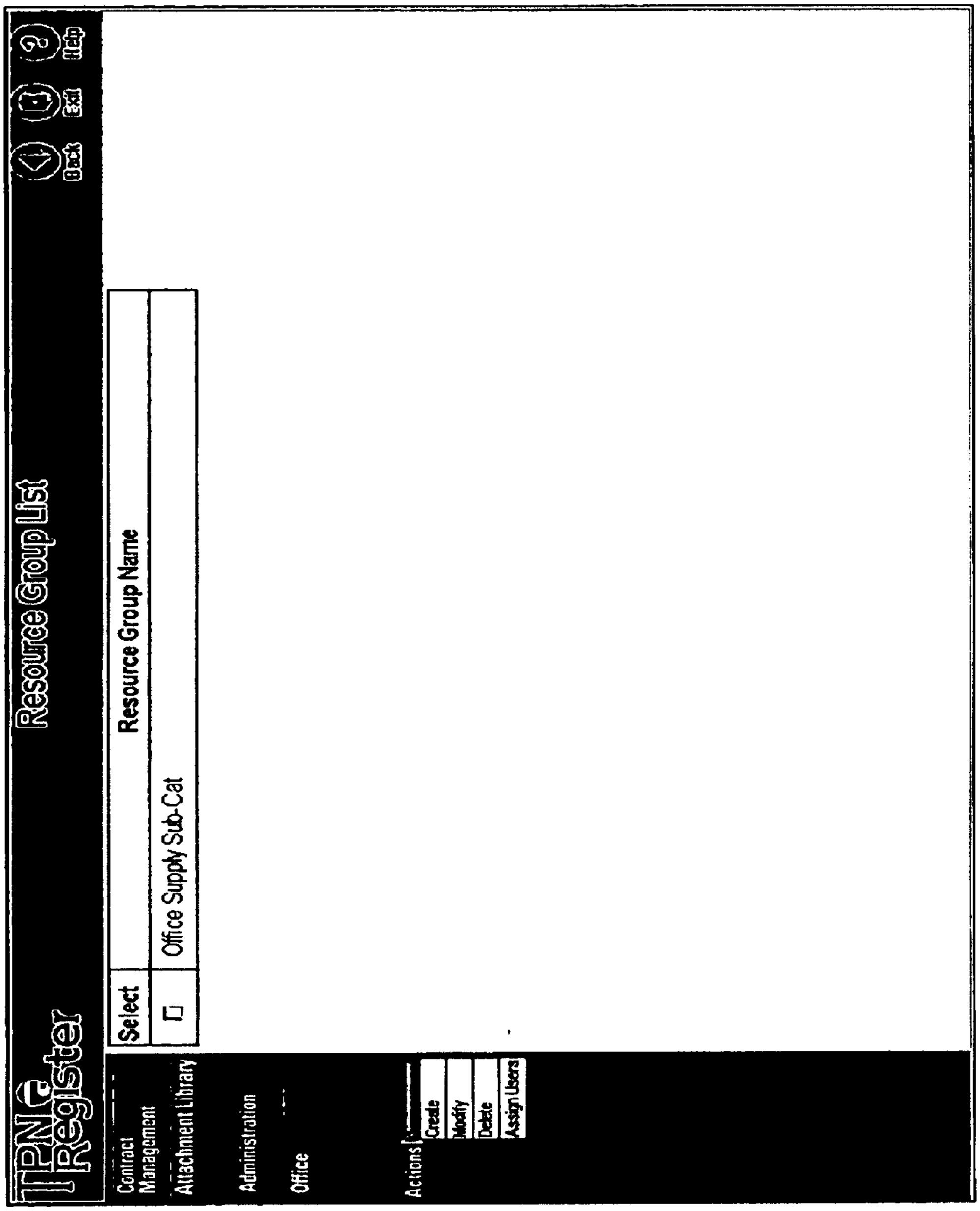
Figure 22E:
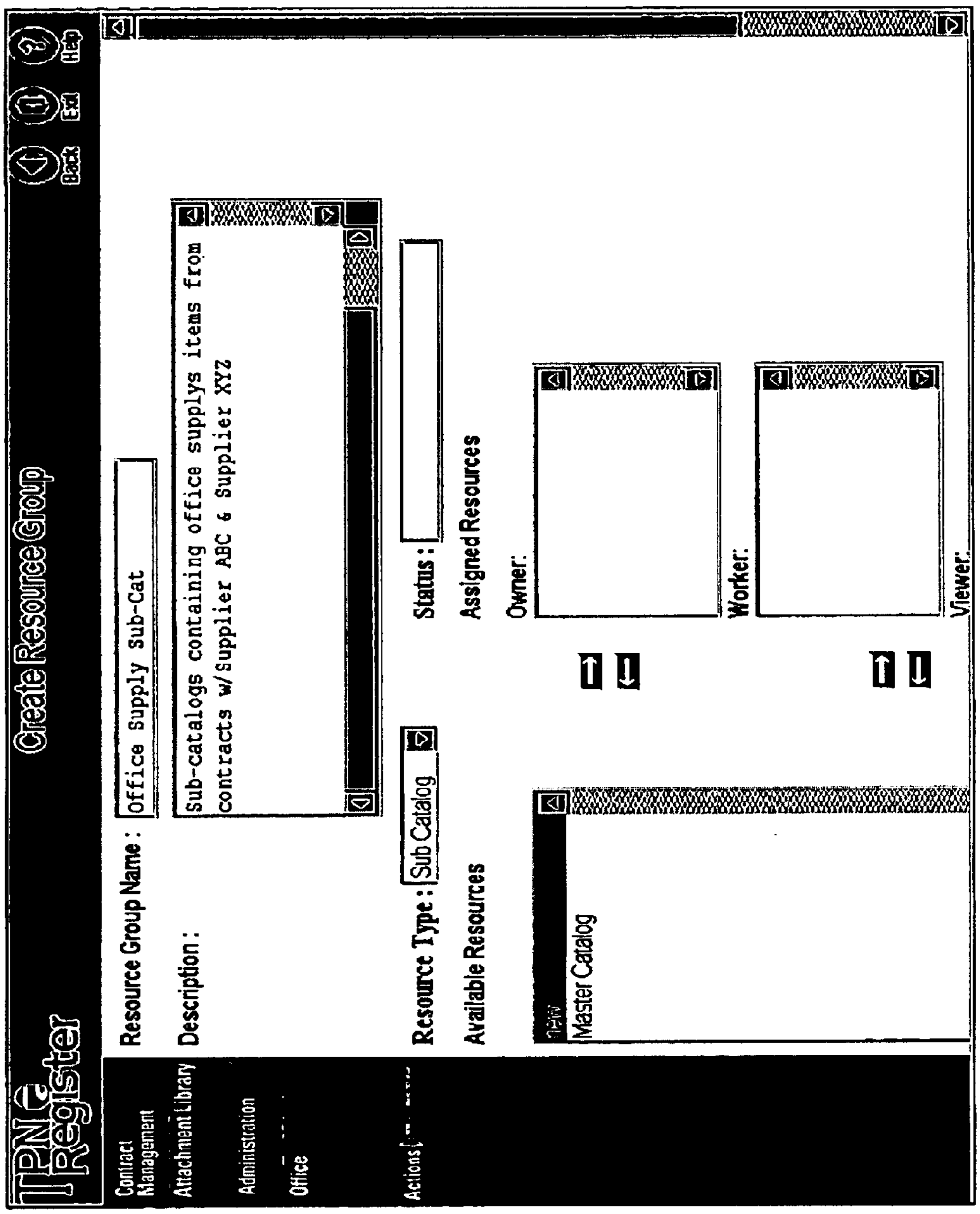

The system also provides: (a) an administration-assign resources to user interface, as illustrated in FIG. 22A, which enables administrators to grant users permission to view specific contracts and catalogs; (b) an administration-create user group interface, as illustrated in FIG. 22B, which enables the administrator to group users together forming a user group, wherein the entire group can be assigned to a resource catalog or contract; (c) an administration-create a user group interface, as illustrated in FIG. 22C, which enables the supplier to name and assign users to a specific user group; (d) a resource group administration-view group list interface, as illustrated in FIG. 22D, which enables the supplier to view a resource group containing several sub-catalogs; and (e) a resource group administration-create group interface, as illustrated in FIG. 22E, which enables the supplier to create the resource group and assign resources to the resource group. It should be appreciated that the resource group is a collection of resources (sub-catalogs or catalogs) within the system. The user group can be used, for example, to group all office supply vendors together.

Figure 23A:
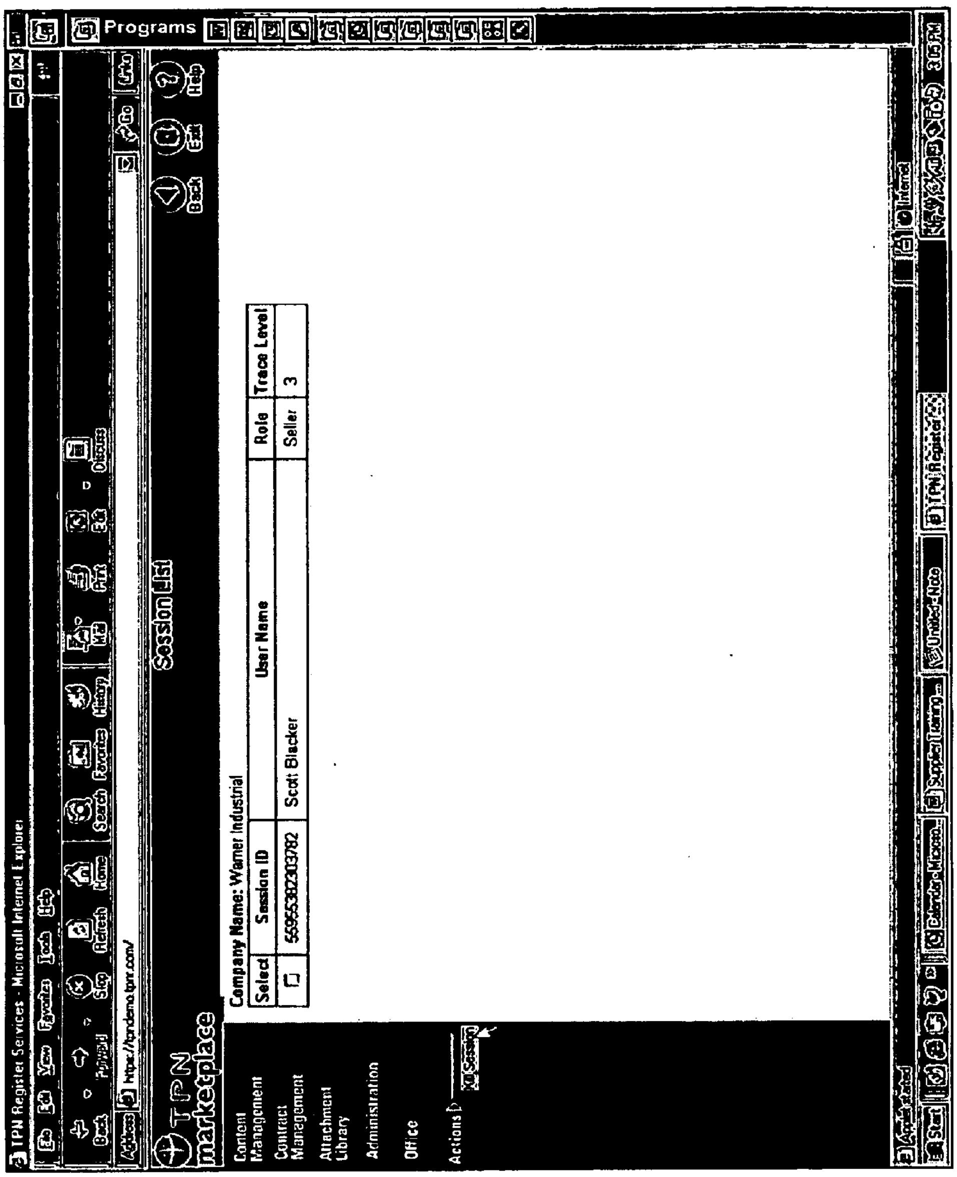
FIGS. 23A through 23D are illustrations of the supplier session administration interfaces of one embodiment of the electronic marketplace of the present invention.
Figure 23B:
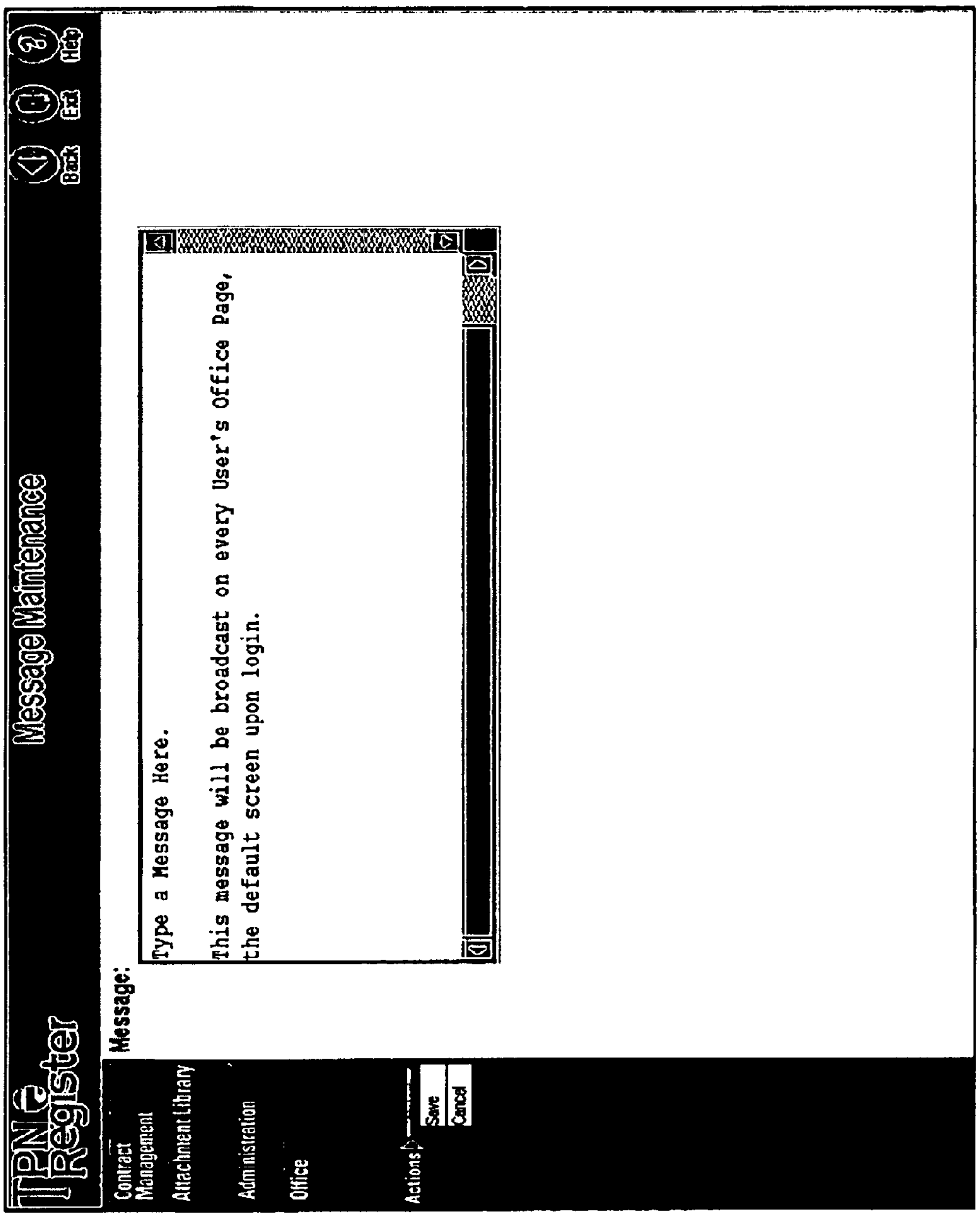
Figure 23C:
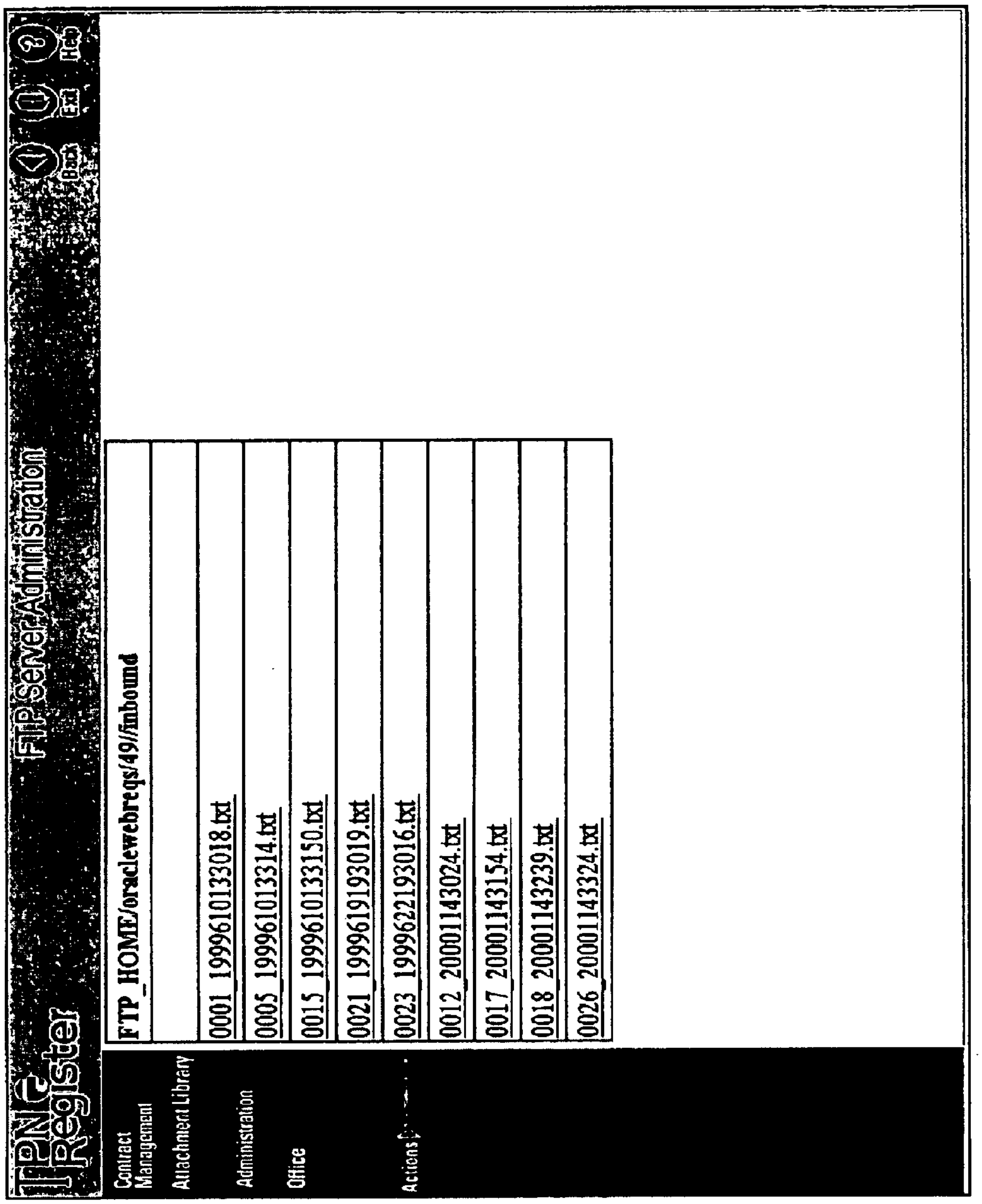
Figure 23D:
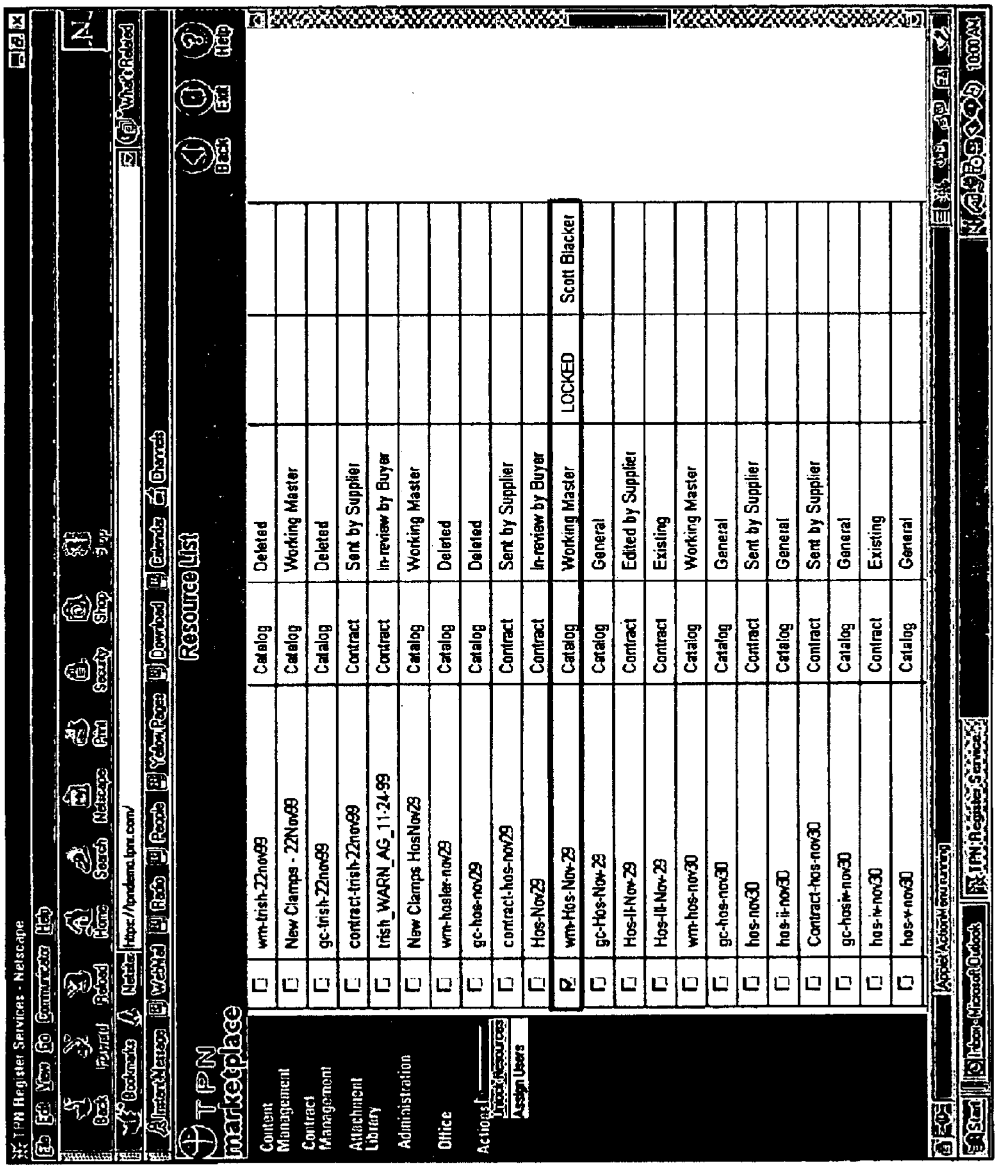

The system further provides: (a) a session administration-view/administer sessions interface, as illustrated in FIG. 23A, which enables the administrator to view and administer specific user sessions, and specifically, enables the administrator to terminate a user session; (b) a message administration-broadcast a message interface, as illustrated in FIG. 23B, which enables the suppliers to broadcast messages to all marketplace users; (c) a message administration-FTP administration interface, as illustrated in FIG. 23C, which enables the supplier to download "Thin Contracts"; and (d) an unlocking resources interface as illustrated in FIG. 23D, which enables an administrator to unlock a user who is "locked up."

The Buyer Administrations

Figure 24A:
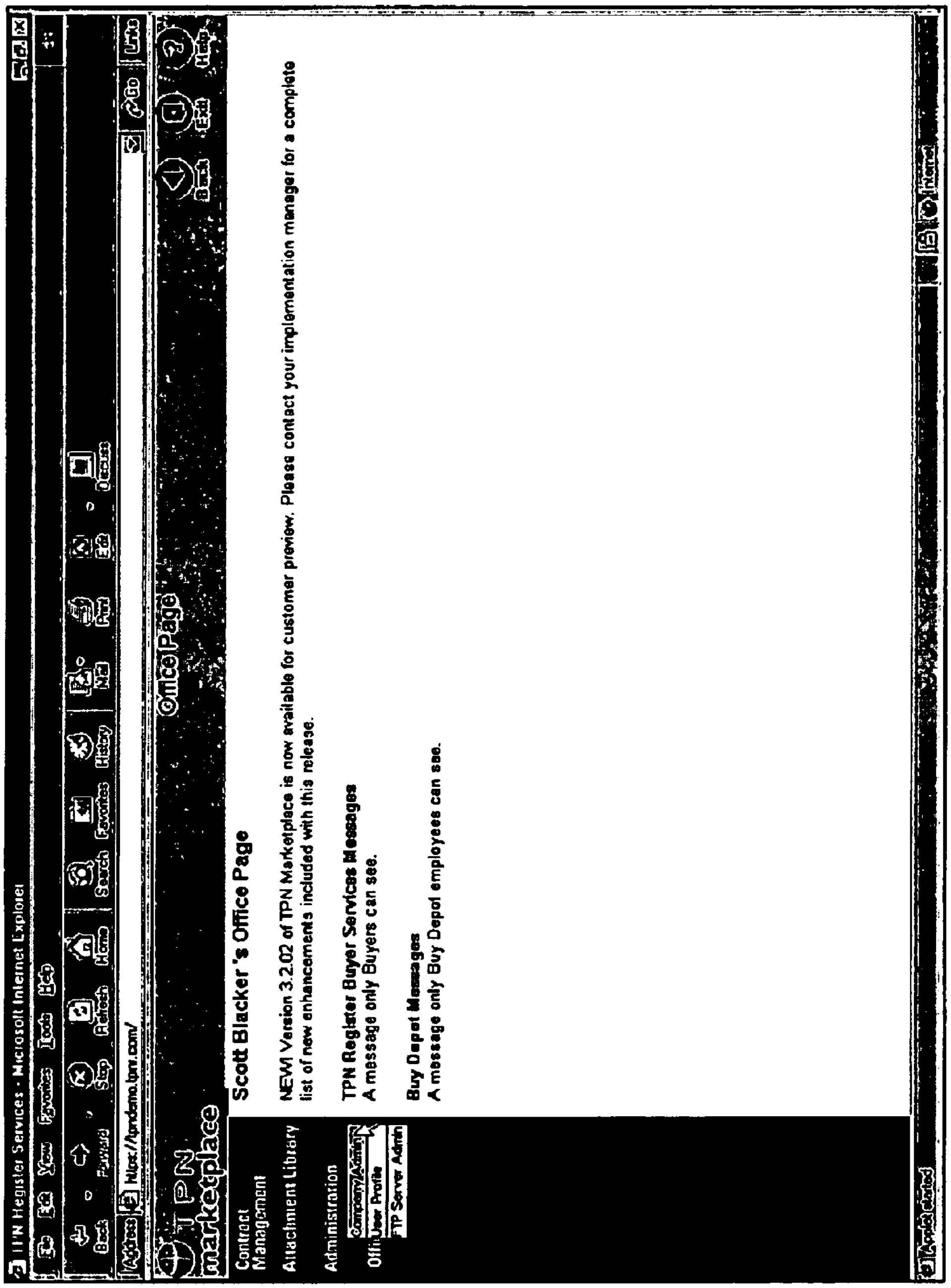
FIGS. 24A through 24D are illustrations of the buyer administration interfaces of one embodiment of the electronic marketplace of the present invention.
Figure 24B:
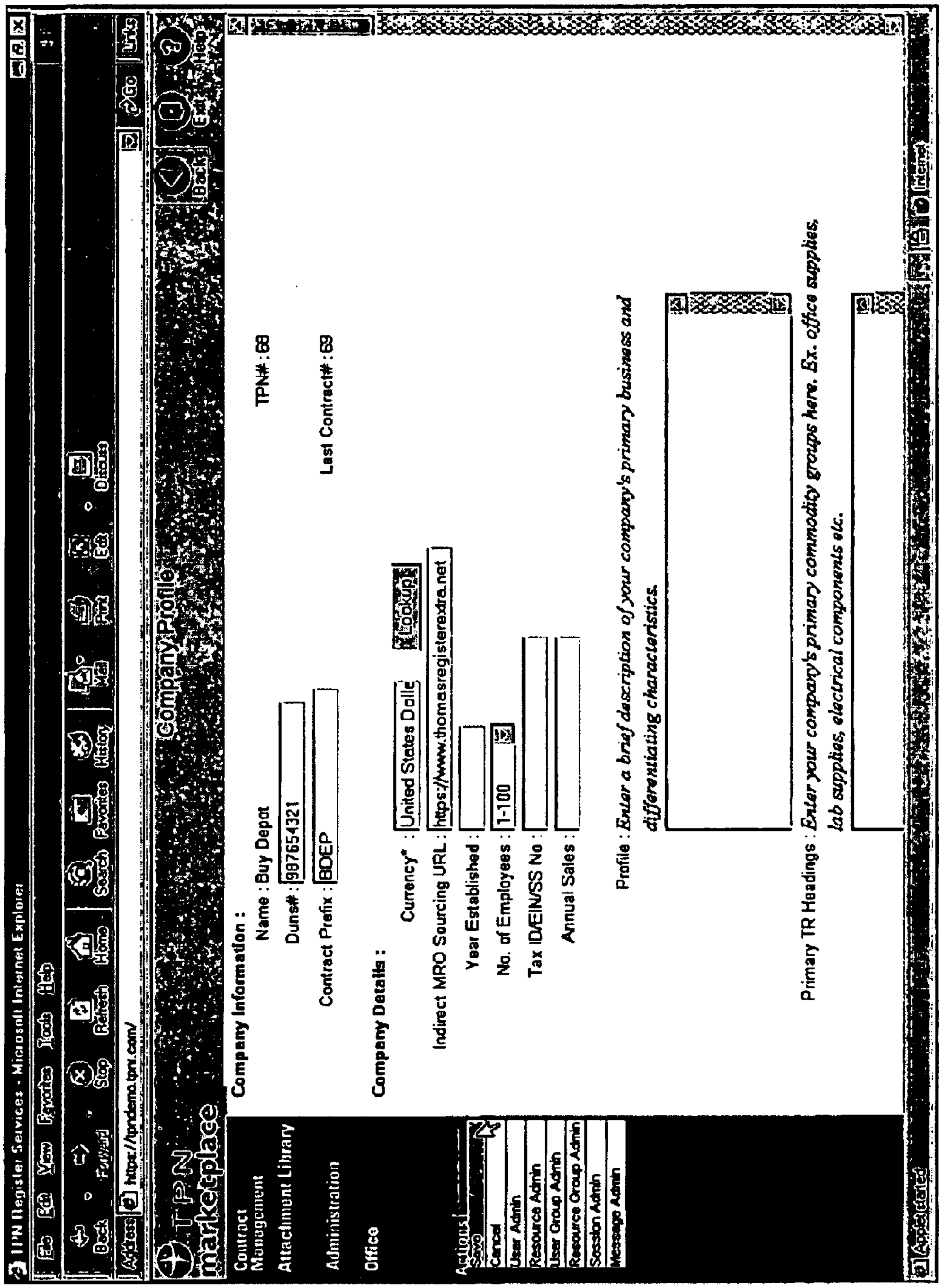
Figure 24C:
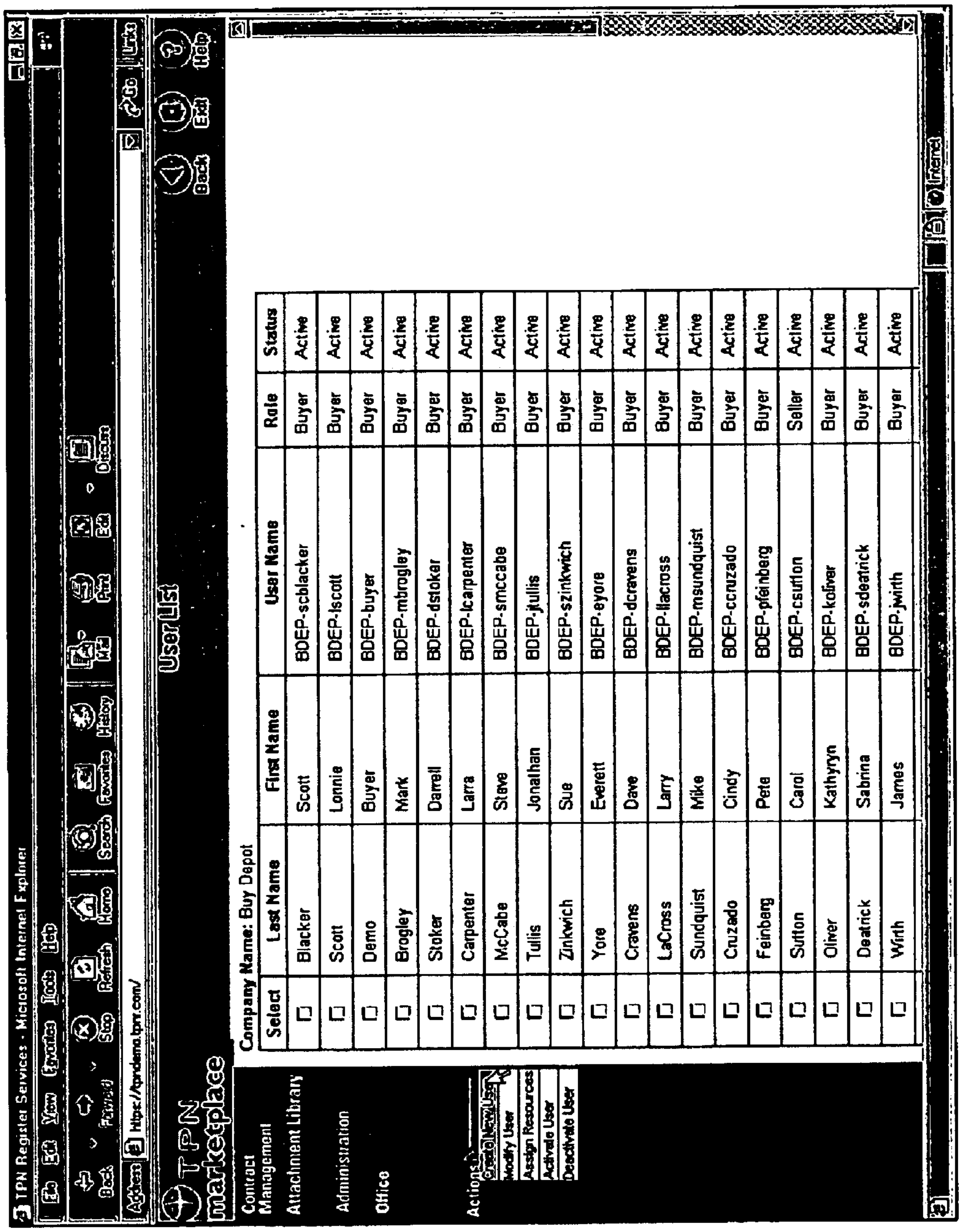
Figure 24D:
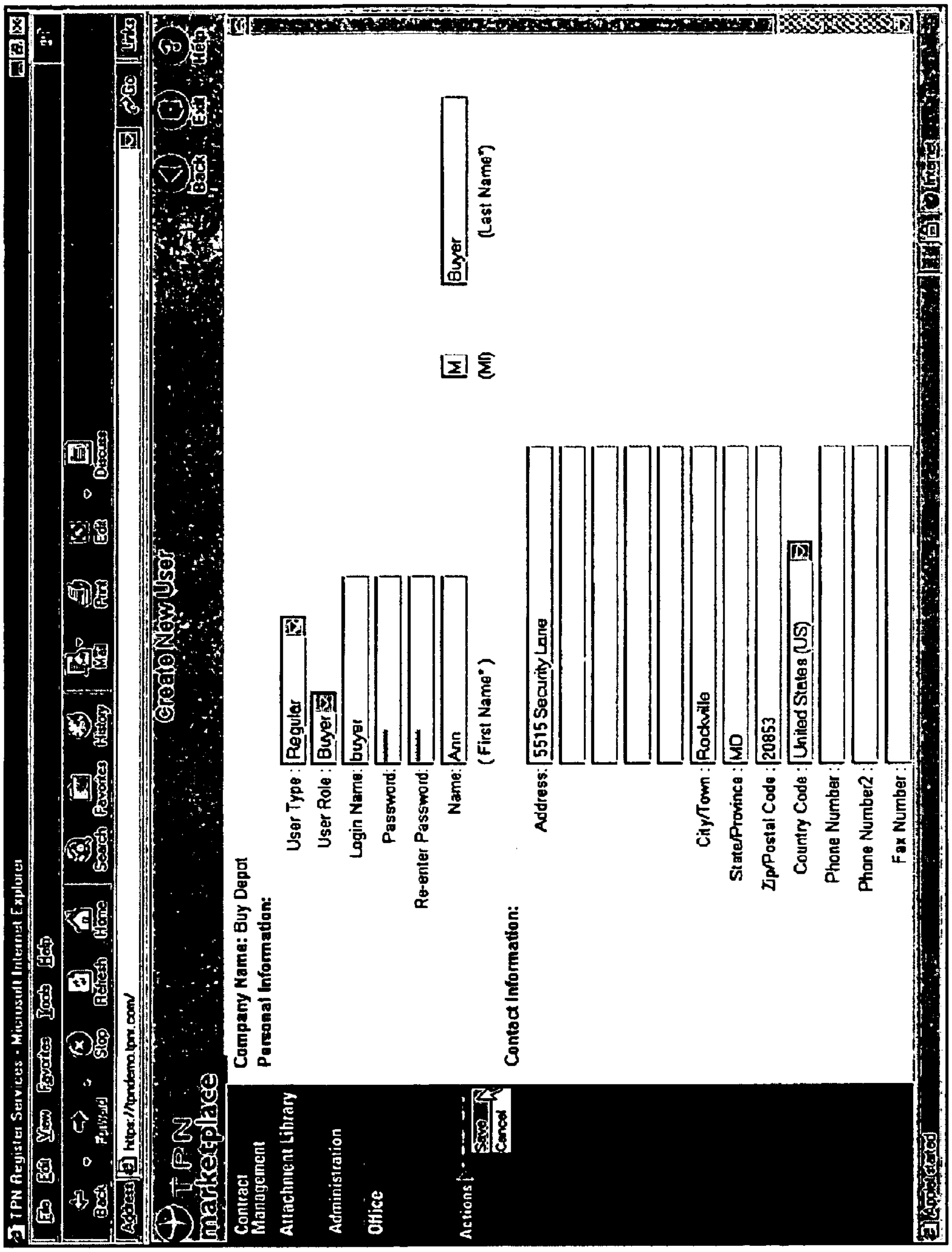

The system provides the buyer with a plurality of buyer interfaces which enable the buyer to perform a plurality of buyer administrative tasks. More specifically, the system provides: (a) an administration-access company profile interface, as illustrated in FIG. 24A, which enables the buyer to access administrative functions and is limited to users having administrator status; (b) an administration-view/edit company profile interface, as illustrated in FIG. 24B, which enables the administrator to view or edit the buyer's profile information; (c) an administration-user interface, as illustrated in FIG. 24C, which enables administrators to activate or deactivate a user, thereby facilitating individual user access to the system; and (d) an administration-create new user interface, as illustrated in FIG. 24D, which enables the administrators to enter pertinent information about users and enables the administrators to assign resources to the users. It should be appreciated that the system does not define a buyer as only a buyer. Rather, the system defines each buyer as a user. This enables buyers to act as a supplier.

Figure 25A:
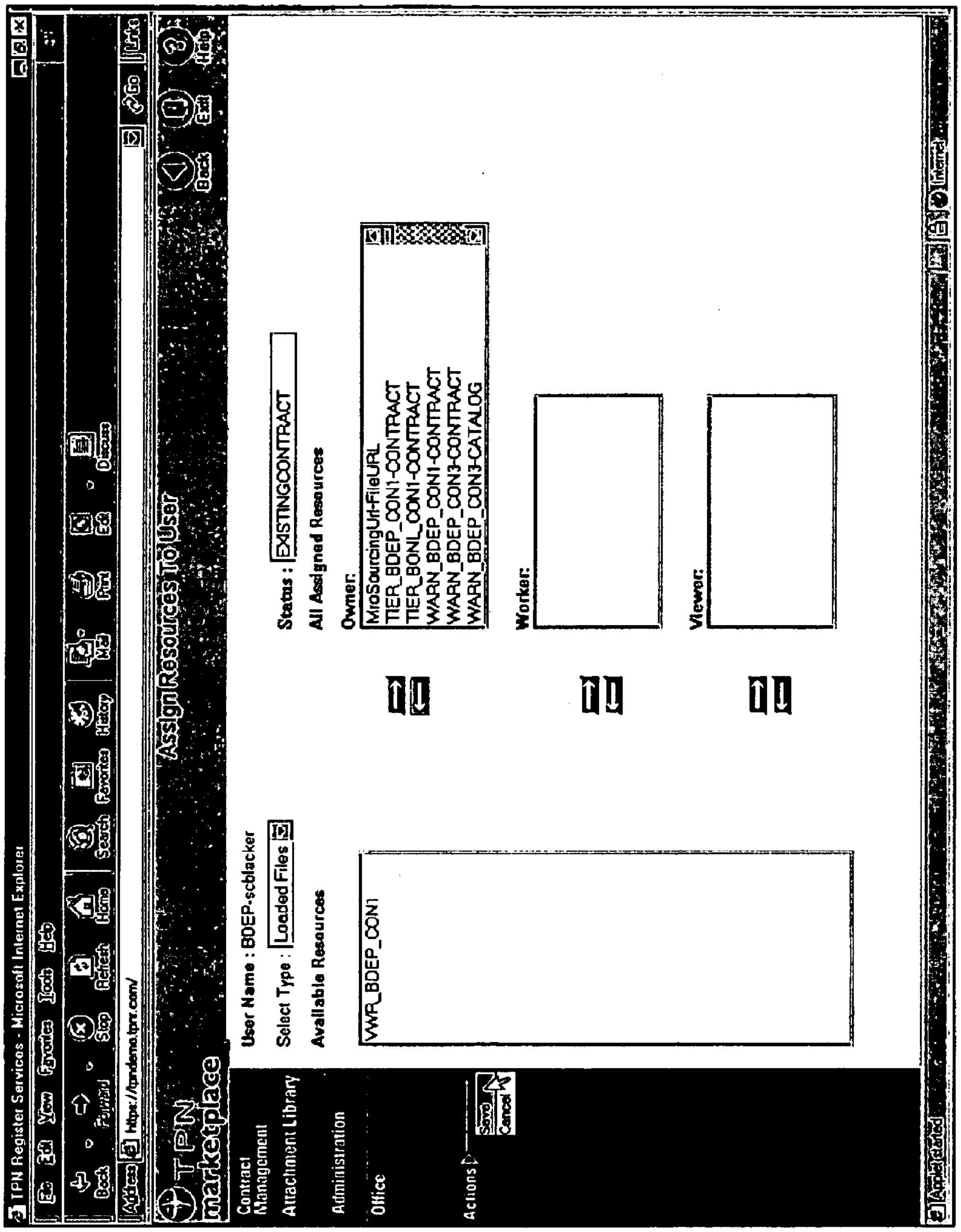
FIGS. 25A through 25F are illustrations of the buyer administration resource interfaces of one embodiment of the electronic marketplace of the present invention.
Figure 25B:
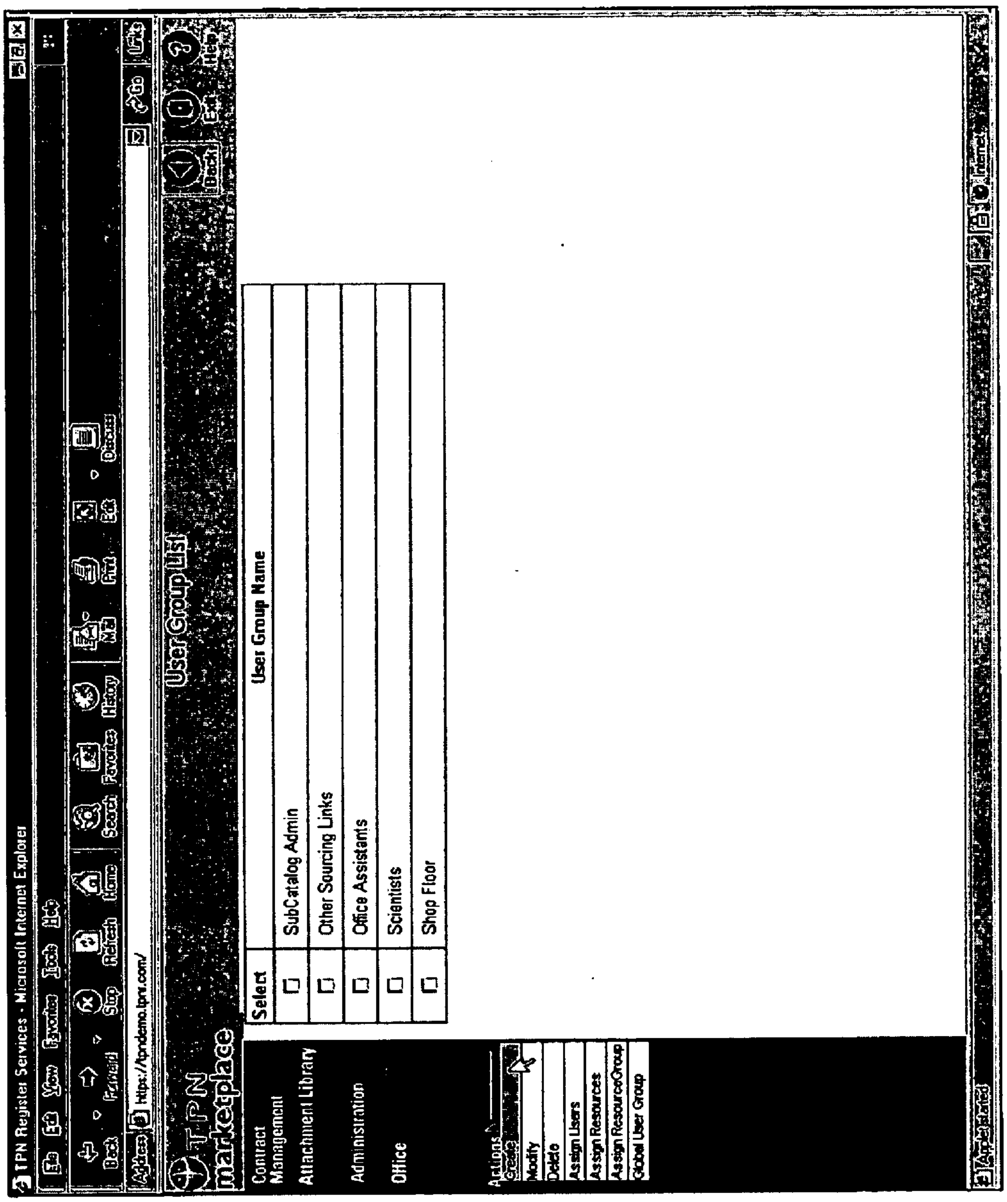
Figure 25C:
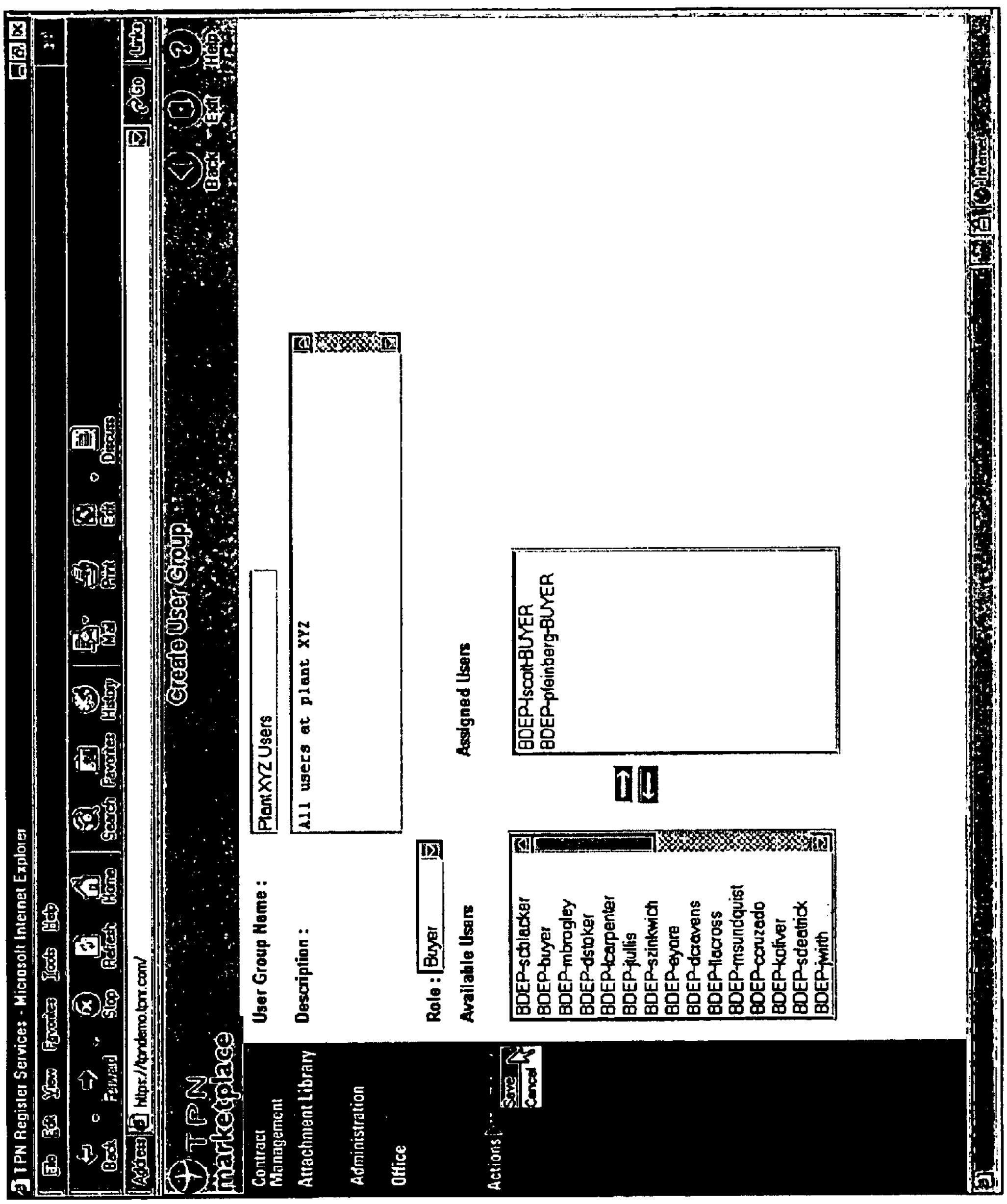
Figure 25D:
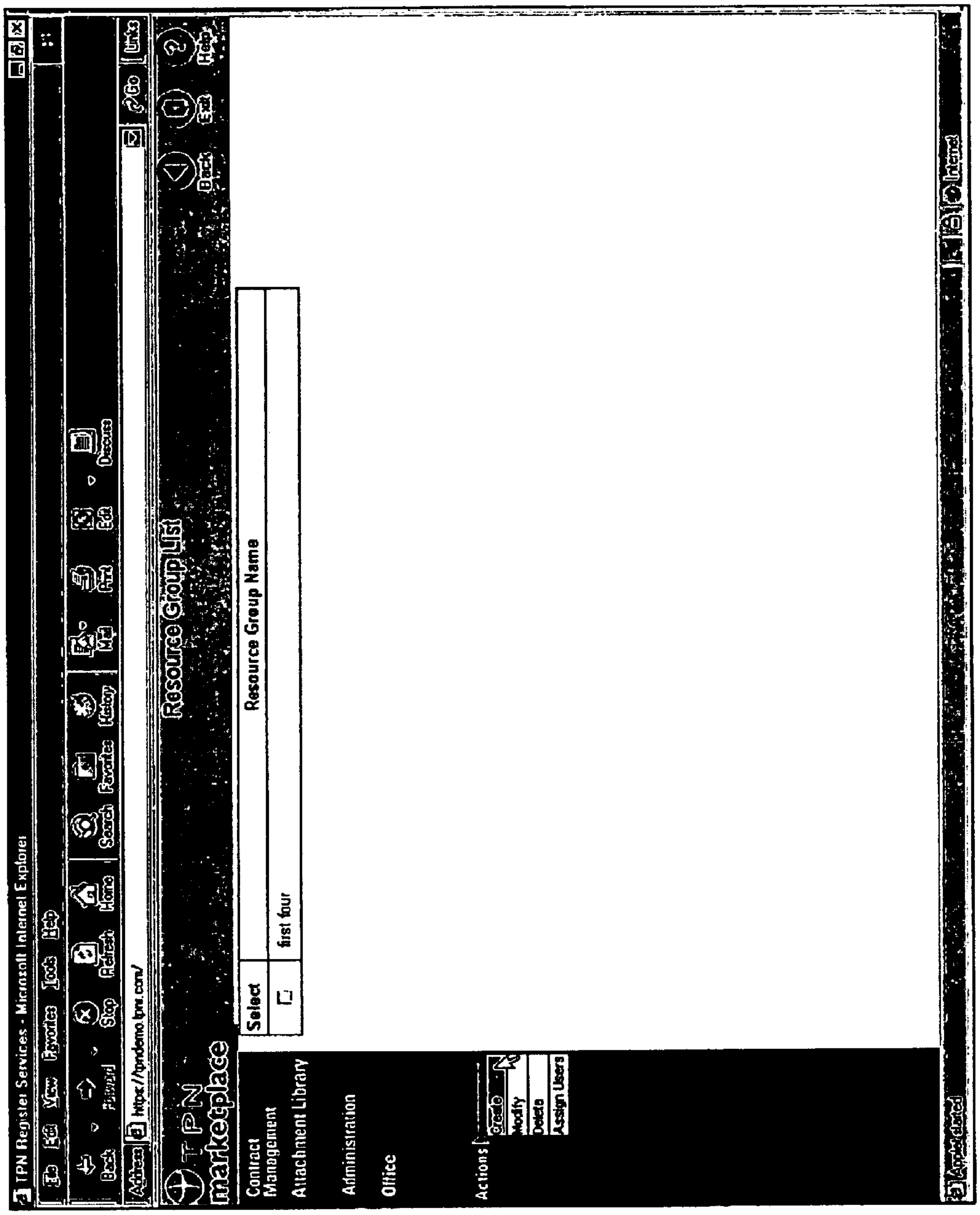
Figure 25E:
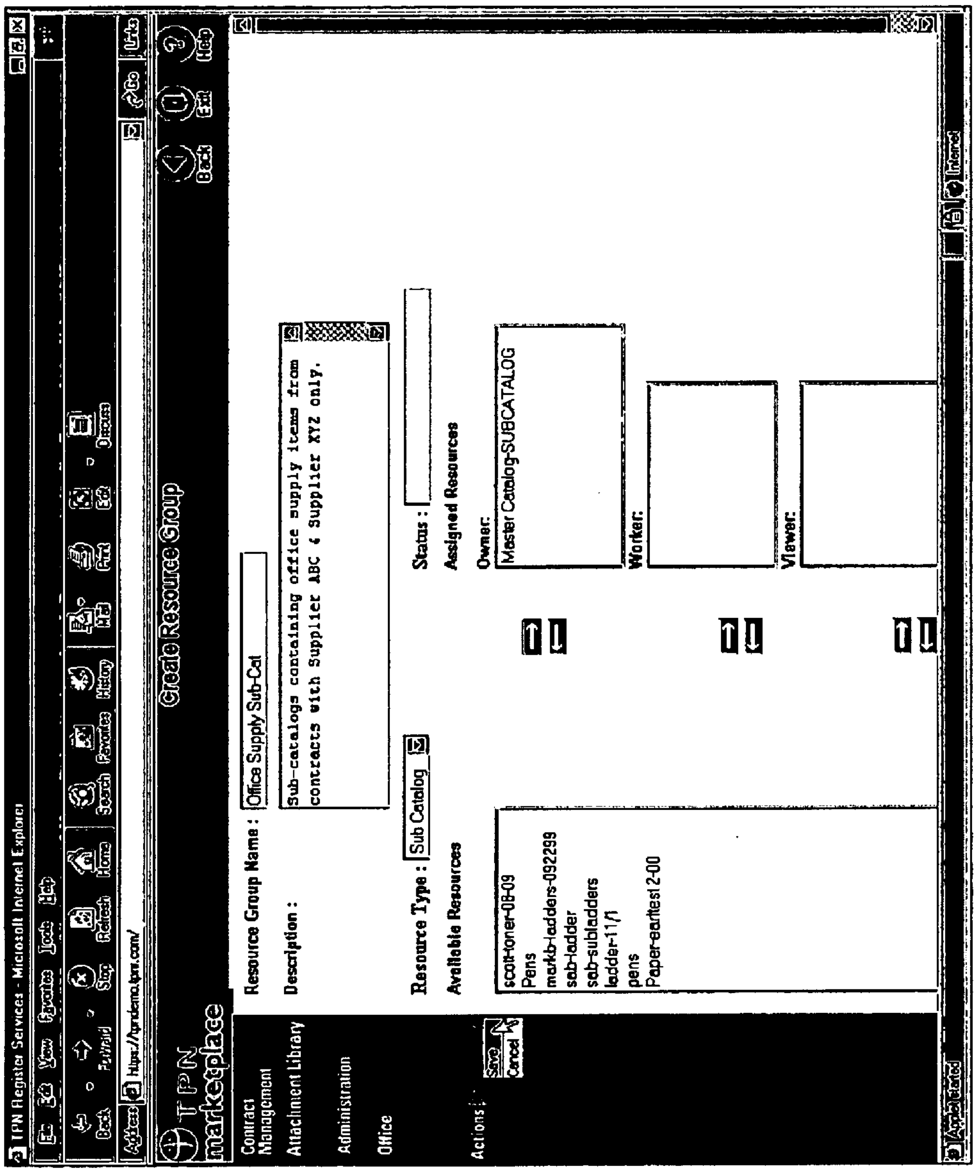
Figure 25F:
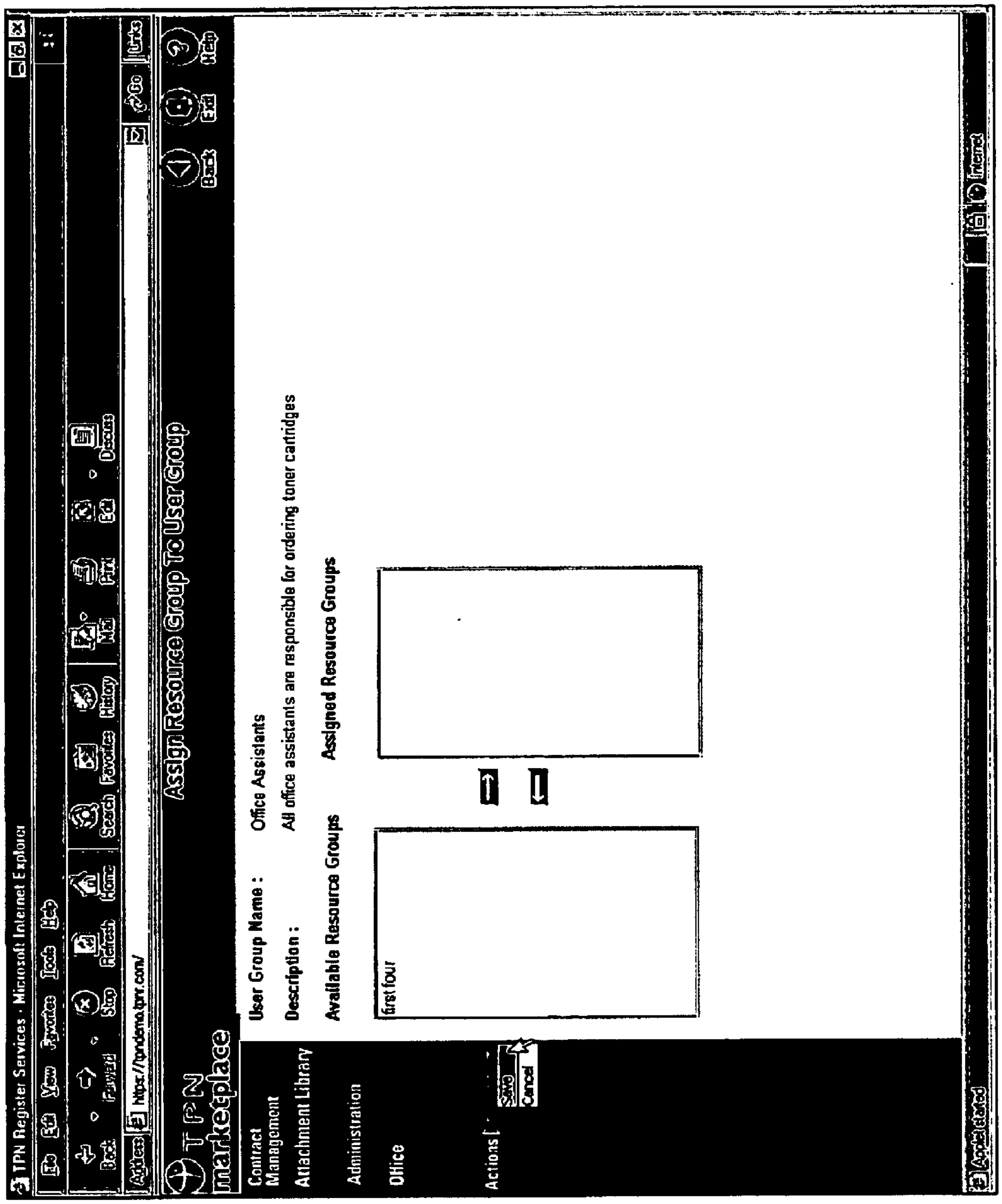

The system also provides: (a) an administration-assign resources to user interface, as illustrated in FIG. 25A, which enables administrators to grant users permission to view specific contracts and catalogs; (b) a administration-create user group interface, as illustrated in FIG. 25B, which enables the administrator to group users together forming a user group, wherein the entire group can be assigned to a resource; (c) an administration-create a user group interface, as illustrated in FIG. 25C, which enables the buyer to name and assign users to a specific user group; (d) an administration-view resource group interface, as illustrated in FIG. 25D, which enables the buyer to create a resource group containing several sub-catalogs; (e) an administration-create resource group interface, as illustrated in FIG. 25E, which enables the buyer to create the resource group and assign resources to it; and (f) an administration-assign user group to resource group interface, as illustrated in FIG. 25F, which enables the buyer to assign specific user groups to a resource group. It should be appreciated that the resource group is a collection of resources (sub-catalogs or catalogs) within the system. The user group can be used, for example, to group all office supply vendors together.

Figure 26A:
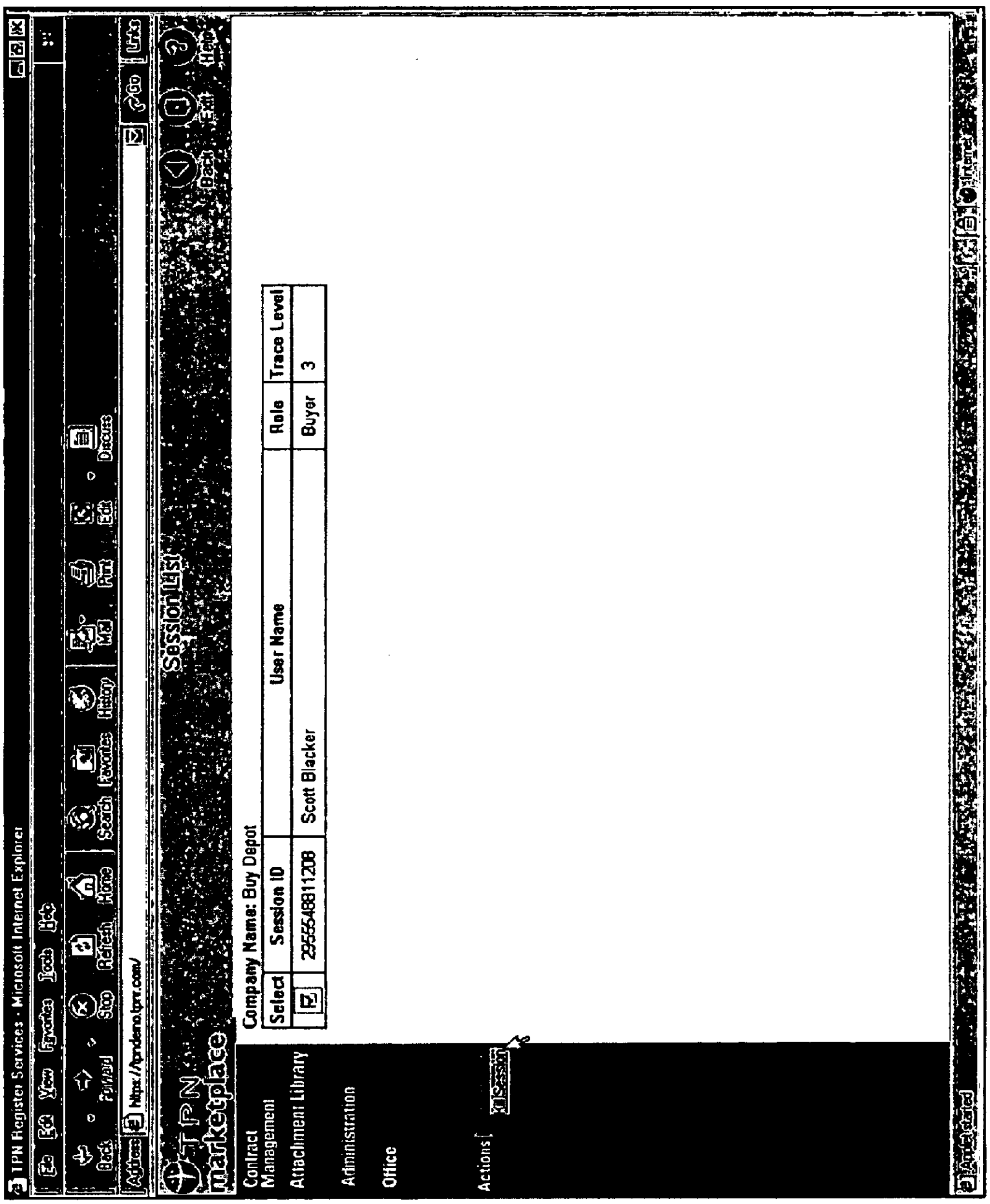
FIGS. 26A through 26C are illustrations of the buyer session administration interfaces of one embodiment of the electronic marketplace of the present invention.
Figure 26B:
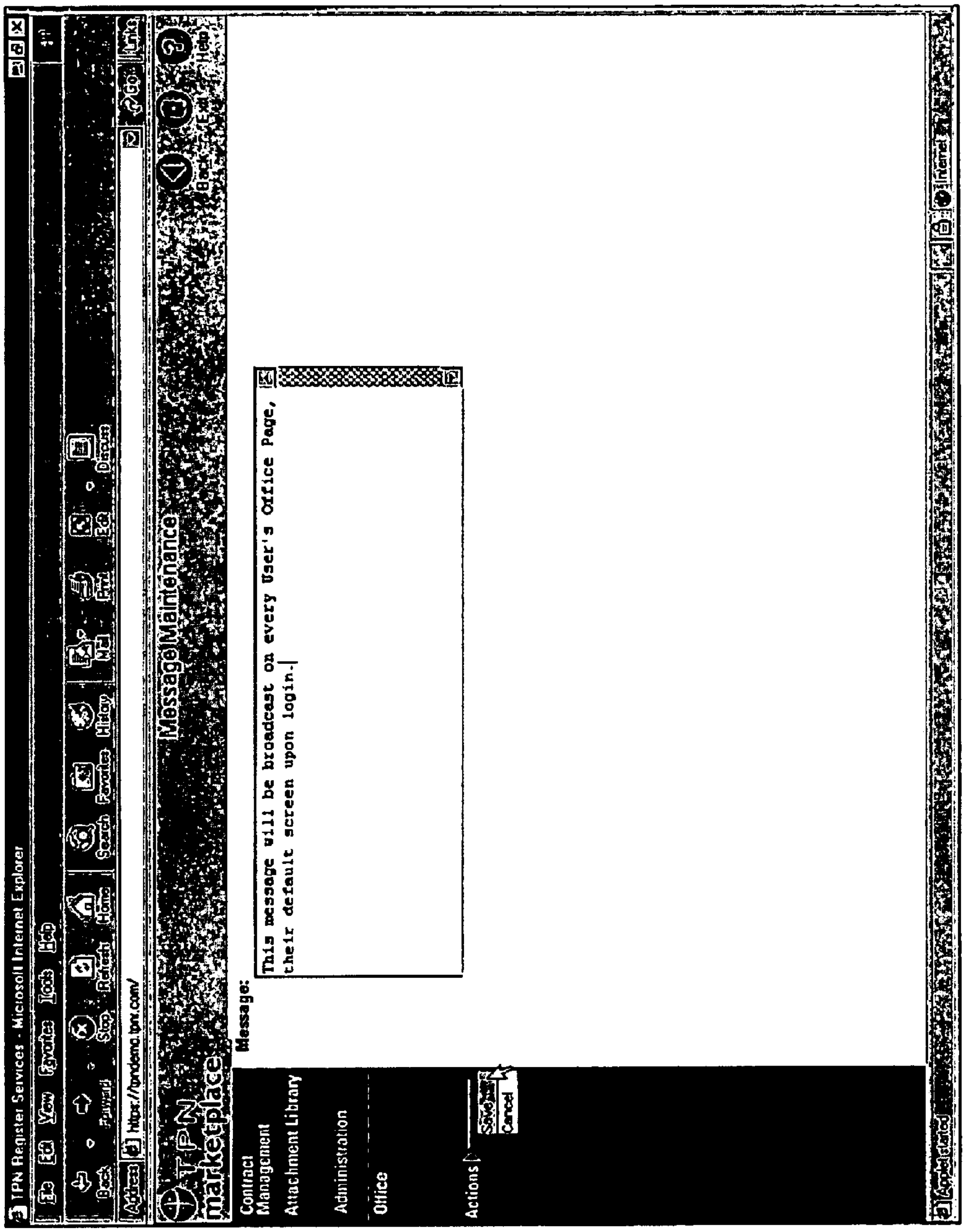
Figure 26C:
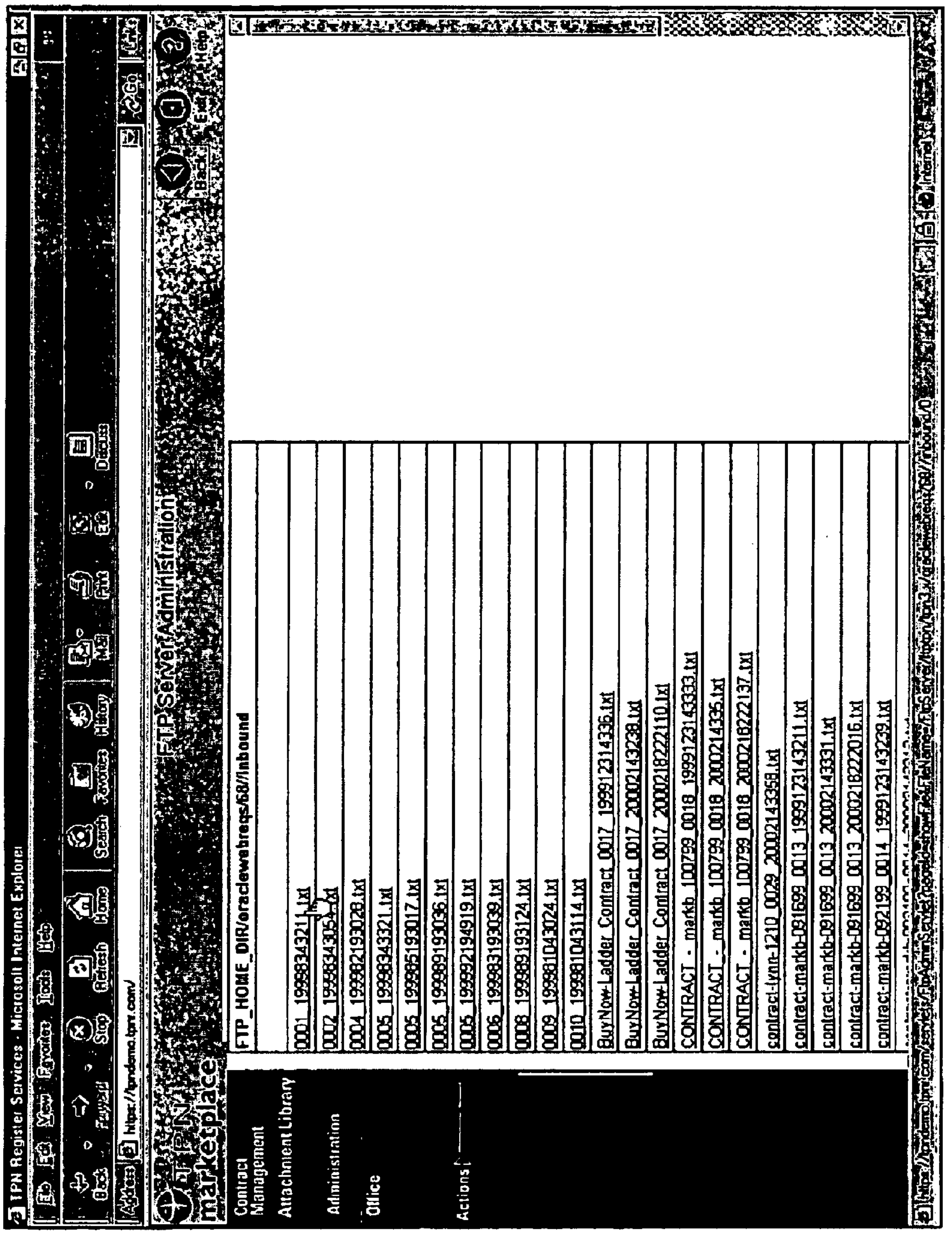

The system further provides: (a) an administration-view/administer sessions interface, as illustrated in FIG. 26A, which enables the administrator to view and administer specific purchasing sessions, and specifically, enables the administrator to terminate a user session; (b) an administration broadcast a message interface, as illustrated in FIG. 26B, which enables the buyers to broadcast messages to all marketplace users; and (c) an administration interface, as illustrated in FIG. 26C, which enables the buyer to download contracts to their procurement systems. It should be appreciated that this process can be automated such that the system could deliver the documents to the procurement system on a regular basis or the procurement system could retrieve the documents from the system in an automated fashion on a regular basis.

Procurement Applications and Integration

The system is preferably fully integrated with the participating buyer procurement systems. A buyer may have an existing or legacy system or may install one of a plurality of procurement systems specifically adapted for communication and use with the present invention. Example procurement systems include Oracle iprocurement, Ariba ORMS and Clarus eProcurement. It should be appreciated that each existing or legacy procurement system may need to be modified for communication and integration with the marketplace.

Figure 27A:
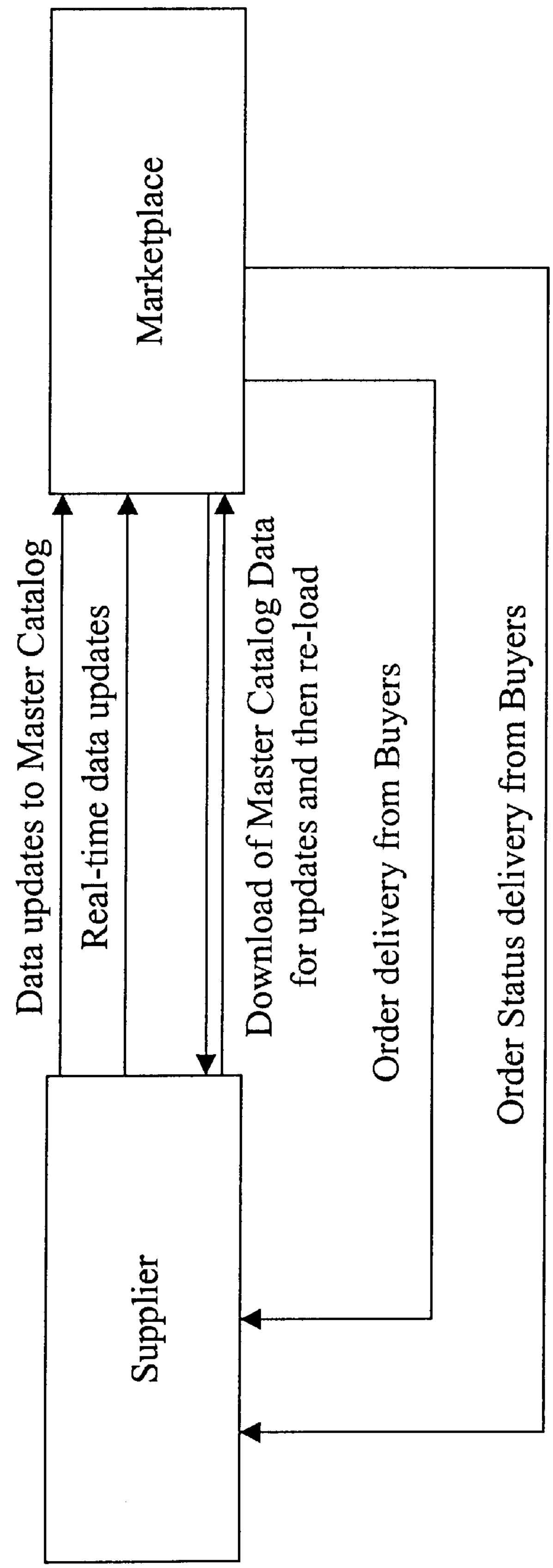
FIGS. 27A and 27B are schematic diagrams of the supplier integration structures and buyer integration structures of one embodiment of the electronic marketplace of the present invention.

Referring now to FIG. 27A, the supplier system integration is generally illustrated. The supplier downloads the supplier content or data to the marketplace, the content or data is transferred by the marketplace and stored in a supplier master catalog and the supplier updates the content or data in real-time. The marketplace enables buyers to send orders to the suppliers and enables buyers to determine the status of orders sent to the suppliers.

Figure 27B:
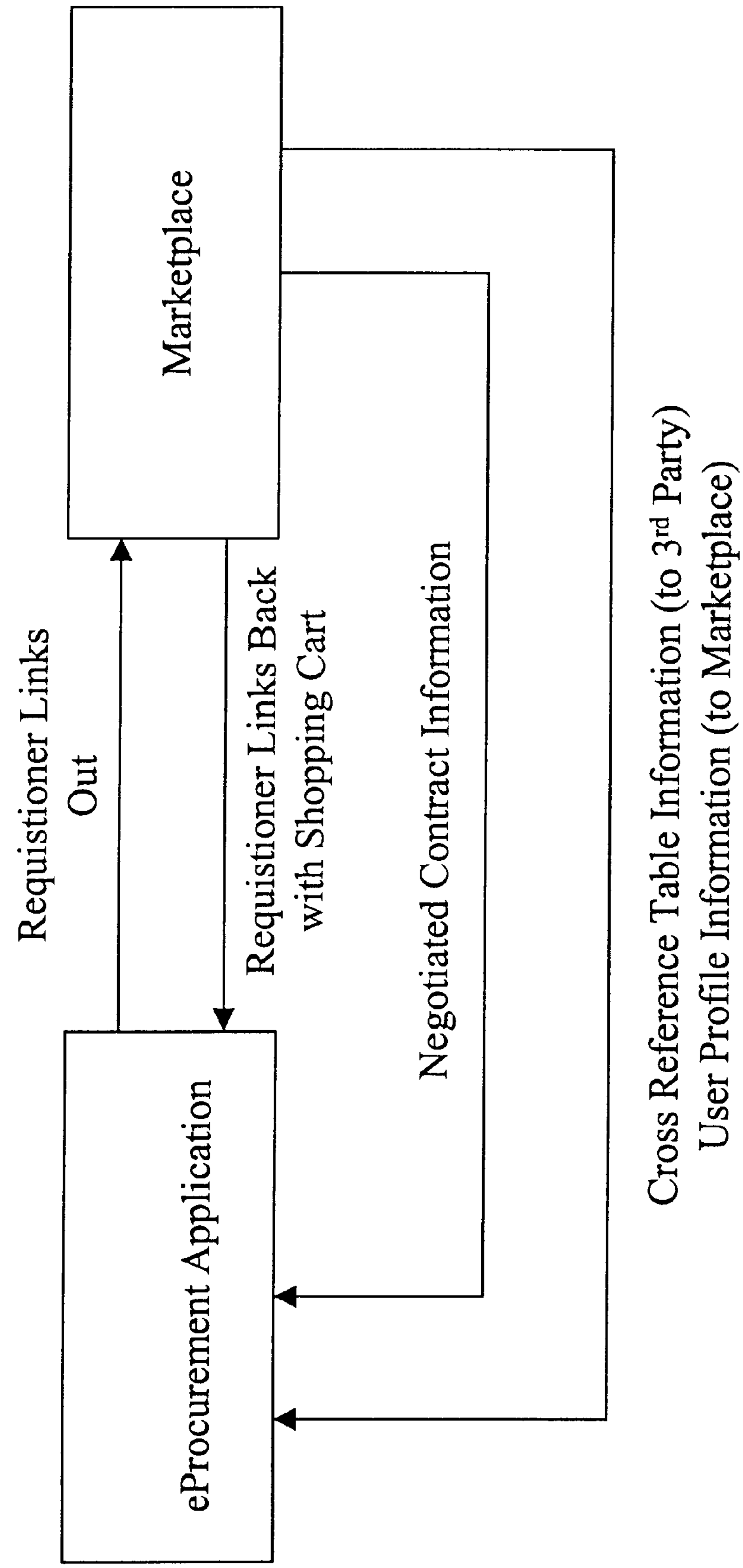

Referring now to FIG. 27B, the buyer system integration is generally illustrated. The buyer or requisitioner accesses the marketplace preferably through the buyers third party developed procurement application, and the products selected by the requisitioner using certain sourcing levels of the system are transmitted back in a shopping cart to the procurement application used by the buyer. The marketplace also provides the negotiated contract information to the buyer, and cross reference table information for UN/SPSC codes, currency codes and unit of measure codes to the procurement application. The buyer provides user profile information to the marketplace.

More specifically, the procurement system will preferably include one or more marketplace access options for the requisitioners, and preferably is adapted to receive files sent back to the procurement system from the marketplace. The procurement application may be integrated in several alternative fashions as discussed below. In one embodiment, the procurement system maintains the same user or requisitioner experience by maintaining the same interfaces of the procurement system such that the user appears to still be at the buyer's procurement system. This reduces the amount of training for the requisitioner and the requisitioner uncertainty about using the marketplace. In another embodiment, the requisitioner may directly access the interfaces provided by the marketplace as discussed above.

The present invention also contemplates three general content integration alternatives. In the first and preferred embodiment, the procurement application is connected to a browser accessing the system through an integrated web interface. In the second alternative, the product content is downloaded into the procurement application. A third embodiment includes a combination of the first two, in which the system updates the product information loaded on the procurement application.

More specifically, in one embodiment of the present invention the requisitioner can decide to shop in the marketplace by using a browser to go directly to the web page or login page of the marketplace. The requisitioner login information is transmitted to the marketplace preferably via a secure encrypted transmission. After login into the system the requisitioner selects the marketplace sourcing application and in particular the on-contract sourcing application or the off-contract sourcing application. Alternatively, in a preferred embodiment of the present invention, requisitioners would select to enter the marketplace through the buyer procurement system. The procurement system would generate an XML (extensible market language) user authentication message that would contain the requisitioner's marketplace logon information and may also contain item and shopping customization (i.e., filtered by category) information. The user authentication message would also contain a return URL that would be used to return the shopping cart message from the marketplace back to the requisitioner's procurement system.

After the requisitioner is granted access to the marketplace, the requisitioner searches for products and selects products for ordering as described above. After selecting the items the requisitioner performs an add to shopping cart function which places the selected items in a shopping cart. When the shopping is completed, the requisitioner selects the checkout function. If the requisitioner has the appropriate permission from the buyer the requisitioner can also access the off-contract sourcing application interfaces.

After the requisitioner has completed his or her shopping in the on-contract and off-contract sourcing applications and presses the checkout function, the shopping cart information is sent back to the procurement system. The shopping cart message could be manually downloaded using the marketplace online tool or the messages could be automatically pulled by or pushed to a procurement system. The shopping cart message includes the particular items or selected products information. The marketplace also preferably sends back a supplier DUNS number (described below) or other supply identifier with each item so that the local procurement system can determine which supplier supplies the items within the requisition file based upon the DUNS number. In this manner, the requisition is separated so that the local procurement solution can send suppliers orders for only their items. The supplier identifier number gets pulled from the supplier's marketplace company environment. The message includes the contract number, the catalog type (i.e., on-contract or off-contract), the product type (i.e., goods or services), the supplier part number, the buyer part number, the manufacturer part number, the item description, the quantity, the unit of measure, the UOM quantity, the UNSPSC code, the UPC code, the currency code, the contracted price, the supplier identifier or DUNS number, and the manufacturer name.

The DUNS number is the Dun & Bradstreet nine digit identification sequence commonly used as a company identifier in EDI and global electronic transactions. A large organization is likely to have many different DUNS numbers since each location of a business may have its own unique DUNS number. The USPSC number is the United Nations Standard Product and Service Codes which is an open non-proprietary system of codes and standardized descriptions for classifying goods and services. It is structured as a five-level hierarchy. At each level a two-character number value classifies each item more specifically.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is hereby claimed as followed:

1. An electronic marketplace for enabling a plurality of buyers to purchase a plurality of products from a plurality of suppliers, the electronic marketplace comprising:

product content transformation and storage means for transforming supplier product content from each of said plurality of suppliers into a generic form and for storing said generic form of said supplier product content;

on-contract sourcing means for enabling a buyer to enter a selection for at least one product of said plurality of suppliers from said stored generic form of said supplier product content, said product being under a pre-existing contract between said buyer and said supplier previously entered into between said buyer and said supplier through the electronic marketplace; and off-contract sourcing means accessible from and housed within a same software system as said on-contract sourcing means for enabling said buyer to select at least one product of said plurality of suppliers, said product from said stored generic form of said supplier product content and not under a contract between said buyer and said suppliers, whereby if said buyer is unable to find a product using the on-contract sourcing means, said buyer can use the selection entered via the on-contract sourcing means in the off-contract sourcing means to find said product.

2. The electronic marketplace of claim 1, which includes contract management means for enabling said buyers to enter into said pre-existing contracts with said suppliers for purchasing certain of said plurality of products.

3. The electronic marketplace of claim 2, wherein the contract management means includes comparing means for enabling said buyers and suppliers to compare at least two contracts.

4. The electronic marketplace of claim 2, which includes product index sourcing means connected to said off-contract sourcing means for enabling said buyers to select at least one product from said plurality of products, whereby if said buyers are unable to find a product using the on-contract sourcing means and off-contract sourcing means, said buyers can use the product index sourcing means to find said product.

5. The electronic marketplace of claim 1, wherein when said buyers select at least one of said plurality of products through the on-contract sourcing means or off-contract means, data representative of said selected products is stored in a temporary storage device.

6. The electronic marketplace of claim 5, wherein the temporary storage device is an electronic shopping cart.

7. The electronic marketplace of claim 6, wherein the electronic shopping cart is adapted to store data representative of said selected products for at least the on-contract sourcing means and the off-contract sourcing means.

8. The electronic marketplace of claim 5, wherein said buyers access the electronic marketplace using a procurement application and upon said buyers' request, the data representative of said selected products stored in the temporary storage device is communicated to said procurement application.

9. The electronic marketplace of claim 1, which includes content distribution means for enabling said suppliers to obtain said generic form of the supplier product content.

10. The electronic marketplace of claim 1, which includes content management means for enabling said suppliers to review, edit and update said generic form of said supplier product content.

11. The electronic marketplace of claim 10, wherein the content management means includes modifying means for enabling said suppliers to make global price modifications to said supplier product content.

12. The electronic marketplace of claim 1, which includes creating means for enabling said suppliers to create catalogs and sub-catalogs including selected supplier product content.

13. The electronic marketplace of claim 1, wherein the on-contract sourcing means includes searching means for enabling said buyer to perform progressive searching to select products.

14. The electronic marketplace of claim 13, wherein the off-contract sourcing means includes searching means for enabling said buyers to perform progressive searching to select products.

15. The electronic marketplace of claim 1, which includes means for verifying that the products selected using the off-contract sourcing means are not under contract between said buyers and said suppliers.

16. The electronic marketplace of claim 1, wherein the off-contract sourcing means is accessed directly from the on-contract sourcing means.

17. The electronic marketplace of claim 1, wherein the on-contract and off-contract sourcing means are maintained within a same software application.

18. An electronic marketplace for enabling a plurality of buyers to purchase a plurality of products from a plurality of suppliers, the electronic marketplace comprising:

product content transformation means for transforming raw product content on said plurality of products from said plurality of said suppliers into generic product content;

database means for storing said generic product content;

content management means for enabling the suppliers to review, edit and update the generic product content;

contract management means for enabling said suppliers and said buyers to negotiate, revise and enter into contracts to purchase said plurality of products prior to the purchase of any of said products;

on-contract sourcing for enabling buyers to select products under said prior entered into contracts between said buyers and suppliers; and off-contract sourcing means for enabling said buyers to select said plurality of products not under a contract between said buyers and said suppliers, whereby if said buyers are unable to find products using the on-contract sourcing means, said buyer can use the off-contract sourcing means to find said products.

19. The electronic marketplace of claim 18, which includes product index sourcing means for enabling said buyers to search a product index database and select products not provided by said suppliers.

20. The electronic marketplace of claim 19, which includes supplier sourcing means for enabling buyers without procurement systems to search said plurality of products from said plurality of suppliers.

21. The electronic marketplace of claim 18, which includes content distribution means for facilitating the transfer of generic product content to said suppliers and said buyers.

22. A method enabling a buyer to purchase a plurality of products through an electronic marketplace, said method comprising the steps of:

accessing the electronic marketplace through a procurement application, wherein the procurement application exists apart from the electronic marketplace and enables the buyer to perform a purchasing function;

entering into a contract with a supplier through the electronic marketplace, wherein products can subsequently be purchased through said electronic marketplace based on terms of said contract;

searching for and selecting products under said contract, wherein at least one of the searching and selecting steps is performed using at least one sourcing application maintained by the electronic marketplace and said searching is from a database of generic supplier product information for said products, wherein the generic supplier product information is transformed from product information provided by each of a plurality of suppliers wherein said transformation includes obtaining raw product information from the suppliers, transforming the raw product information into generic product information and storing the generic product information in the database;

sending data regarding said selected products to the procurement application; and purchasing said products using said procurement application.

23. The method of claim 22, which includes storing said selected products in a temporary storage device before sending data regarding said selected products to the procurement application.

24. The method of claim 22, which includes searching for and selecting products using an on-contract sourcing application and an off-contract sourcing application.

25. The method of claim 24, which includes searching for and selecting products using a product index application.

26. A method for progressively searching for a plurality of products through an electronic marketplace adapted for use by at least one user, said method comprising the steps of:

(a) accessing the electronic marketplace via a procurement application, wherein the procurement application is adapted to operate independently from the electronic marketplace and enables a purchasing function to take place;

(b) negotiating and entering into a contract with at least one supplier through the electronic marketplace for terms which will be subsequently used to purchase a plurality of the products and wherein generic supplier product information for the products is stored in a database of the electronic marketplace, wherein the generic product information is transformed from product information provided by each of a plurality of suppliers wherein said transformation includes obtaining raw product information from the suppliers, transforming the raw product information into generic product information and storing the generic product information in the database;

(c) searching for at least one of said plurality of said products under said contract in said electronic marketplace;

(d) displaying the search results to the user, said display including at least two attributes of the products found in the search;

(e) enabling the user to select one of the attributes to narrow the search;

(f) narrowing the search based on the selected attribute; and (g) displaying the narrowed search results.

27. The method of claim 26, wherein said attributes include at least product suppliers, product categories, product manufacturers and product headings.

28. The method of claim 27, which includes repeating steps (d) to (f) using any said attribute not previously used to narrow the search results.

29. A method for searching for a plurality of products using multiple sourcing levels through a data network and adapted for use by at least one buyer, the method comprising:

accessing a private on-contract sourcing level to search for and enter a selection for at least one of said products, the products of the on-contract sourcing level having at least one pre-negotiated term which is part of a contract previously entered into for said products by said buyer and supplier of said products through said data network and wherein the generic supplier product information for the products is stored in a database for of each a plurality of suppliers, wherein the generic supplier product information is transformed from product information provided by each of said suppliers wherein said transformation includes obtaining raw product information from the suppliers, transforming the raw product information into generic product information and storing the generic product information in the database;

accessing an off-contract sourcing level from the on-contract sourcing level, the sourcing levels residing under a same software system, using the selection entered at the on-contract sourcing level, to search for and select at least one of said products if said products are not available in the on-contract sourcing level; and accessing a product index sourcing level to search for and select at least one product if said buyer is unable to find said products through the off-contract sourcing level.

30. The method of claim 29, which includes accessing the off-contract sourcing level directly from the on-contract sourcing level.

31. The method of claim 29, wherein the on-contract and off-contract sourcing levels are maintained within a same software application.

32. A method for facilitating a purchase of a plurality of products by a buyer using a procurement application through an electronic marketplace having multiple sourcing levels, the method comprising:

negotiating and entering into a contract with at least one supplier through the electronic marketplace for terms used to subsequently purchase at least one of the products and wherein generic supplier product information for each of said products of each a plurality of suppliers is stored in a database of the electronic marketplace, wherein the generic product information is transformed from product information provided by each of said suppliers wherein said transformation includes obtaining raw product information from the suppliers, transforming the raw product information into generic product information and storing the generic product information in the database;

accessing said marketplace through the procurement application, the procurement application existing independently from the electronic marketplace and enabling the buyer to perform a purchasing function;

accessing at least one of said multiple sourcing levels;

selecting at least one of said plurality of products under said contract;

transmitting data on the selected products to the procurement application; and purchasing the products through the procurement application.

33. The method of claim 32, wherein accessing at least one of said multiple sourcing levels includes accessing an on-contract sourcing application.

34. The method of claim 33, wherein accessing at least one of said multiple sourcing levels further includes accessing an off-contract sourcing application.

35. A method for facilitating the distribution of product information, said method comprising the steps of:

obtaining raw product information from each of a plurality of suppliers;

transforming the raw product information into generic product information;

storing the generic product information in a database;

enabling the suppliers to access, review and modify the generic product information;

enabling the suppliers to update the generic product information; and enabling a buyer to access and search the generic product information to find a product under a preexisting contract for said product, wherein the terms of the contract are pre-negotiated, or not under contract if the product is not found under the contract, wherein a same system of software provides the product under contract and the product not under contract.

* * * * *